(12) United States Patent
Alon et al.

(10) Patent No.: US 9,424,306 B2
(45) Date of Patent: Aug. 23, 2016

(54) INCIDENT TRACKING SYSTEMS AND METHODS

(71) Applicant: CASE GLOBAL, INC., Los Angeles, CA (US)

(72) Inventors: Moshe Alon, Encino, CA (US); Uri Gal, Winnetka, CA (US)

(73) Assignee: CASE GLOBAL, INC., Los Angeles, CA (US)

( * ) Notice: Subject to any disclaimer, the term of this patent is extended or adjusted under 35 U.S.C. 154(b) by 182 days.

(21) Appl. No.: 13/974,828

(22) Filed: Aug. 23, 2013

(65) Prior Publication Data

US 2013/0346440 A1 Dec. 26, 2013

Related U.S. Application Data

(62) Division of application No. 12/356,985, filed on Jan. 21, 2009, now Pat. No. 8,549,028.

(60) Provisional application No. 61/023,344, filed on Jan. 24, 2008.

(51) Int. Cl.
*G06F 17/30* (2006.01)

(52) U.S. Cl.
CPC ...... *G06F 17/30424* (2013.01); *G06F 17/3087* (2013.01)

(58) Field of Classification Search
None
See application file for complete search history.

(56) References Cited

U.S. PATENT DOCUMENTS

| 6,061,688 | A  | 5/2000  | Kilpatrick et al. |
|-----------|----|---------|-------------------|
| 6,167,394 | A  | 12/2000 | Leung et al.      |
| 6,367,034 | B1 | 4/2002  | Novik et al.      |
| 6,950,013 | B2 | 9/2005  | Scaman et al.     |
| 7,003,730 | B2 | 2/2006  | Dettinger et al.  |
| 7,043,489 | B1 | 5/2006  | Kelley            |
| 7,107,278 | B1 | 9/2006  | Bandemer          |
| 7,134,088 | B2 | 11/2006 | Larsen            |
| 2001/0029184 | A1 | 10/2001 | I'Anson et al.  |
| 2002/0138289 | A1 | 9/2002  | Thielges et al. |
| 2003/0023476 | A1 | 1/2003  | Gainey           |
| 2003/0126150 | A1 | 7/2003  | Chan             |
| 2003/0172087 | A1 | 9/2003  | Godwin           |
| 2004/0034666 | A1 | 2/2004  | Chen             |
| 2004/0128215 | A1 | 7/2004  | Florance et al.  |

(Continued)

OTHER PUBLICATIONS

CaseGlobal, printout of webpages from web.archive.org showing content of website caseglobal.com on or before Feb. 14,2003.

(Continued)

*Primary Examiner* — Hung Q Pham
(74) *Attorney, Agent, or Firm* — Foley & Lardner LLP

(57) ABSTRACT

Various embodiments of the present invention are related to incident tracking systems and methods. A method allows for receiving input that specifies an incident at a facility, defining a search area adjacent to a position of the incident, and displaying one or more other incidents that occurred at the facility within the search area. A further method allows for dynamically plotting, each time a search area is changed on a map of a facility and an associated date range is indicated, positions on the map within the search area so as to indicate where incidents have occurred at the facility within the date range. Another method allows for receiving input that specifies a name of a person associated with an incident at a facility, and automatically flagging the person as being of interest if the person has been involved in one or more other incidents at the facility.

26 Claims, 70 Drawing Sheets

(56) References Cited

U.S. PATENT DOCUMENTS

| | | |
|---|---|---|
| 2005/0024238 A1 | 2/2005 | Kimura |
| 2005/0131737 A1* | 6/2005 | Joseph et al. ............. 705/2 |
| 2005/0222764 A1 | 10/2005 | Uyeki et al. |
| 2006/0041615 A1 | 2/2006 | Blank et al. |
| 2006/0265406 A1 | 11/2006 | Chkodrov et al. |
| 2006/0294066 A1 | 12/2006 | Dettinger et al. |
| 2007/0044033 A1 | 2/2007 | Larsen |
| 2007/0083424 A1 | 4/2007 | Lang et al. |
| 2008/0228512 A1 | 9/2008 | Calkins et al. |

OTHER PUBLICATIONS

Rich et al., "Guide to Using School COP to Address Student Discipline and Crime Problems", Sep. 2001, U.S. Department of Justice.
US Notice of Allowance dated Jun. 10, 2013 for U.S. Appl. No. 12/356,985.
US Office Action dated Mar. 27, 2013 for U.S. Appl. No. 12/356,985.
US Office Action dated Aug. 27, 2012 for U.S. Appl. No. 12/356,985.
US Office Action dated Jan. 6, 2012 for U.S. Appl. No. 12/356,985.
US Office Action dated Aug. 17, 2011 for U.S. Appl. No. 12/356,985.

* cited by examiner

Incidents Near Bagel Pavilion 3100

| Location | Incident Date | Incident Category | Incident Sub Category |
|---|---|---|---|
| New York | 5/30/2003 | Lost Property | Other |
| New York | 8/14/2003 | Burglary From Motor Vehicle | From a Car |
| New York | 7/10/2003 | Slip and Fall | With Injury |
| New York | 8/21/2003 | Water Leak | Minor |
| New York | 10/30/2003 | Property Damage | Mall property |
| New York | 12/28/2003 | Theft | From person |
| Boston | 6/20/2004 | Fire - Property/Structure | Minor damage |
| Boston | 9/17/2004 | Fire - Property/Structure | Minor damage |
| Boston | 12/19/2004 | Tenant Lease Violation | Trash violation |
| Boston | 1/2/2005 | Slip and Fall | No Injury |
| Boston | 8/17/2005 | Robbery | Purse Snatch |
| Boston | 9/21/2005 | Personal Accident - Injury Not Slip and Fall | Not Slip and Fall |
| Boston | 11/10/2005 | Slip and Fall | With Injury |
| Boston | 12/6/2005 | Tenant Lease Violation | Trash violation |
| Chicago | 3/6/2006 | Burglary From Motor Vehicle | From a vehicle |
| Chicago | 3/12/2006 | Attempted Robbery | Attempted Robbery |
| Chicago | 8/26/2006 | Slip and Fall | With Injury |
| Chicago | 9/2/2006 | Vandalism | With Minor damage |
| Chicago | 10/05/2006 | Fire - Vehicle | N/A |
| Chicago | 2/11/2007 | Slip and Fall | With Injury |
| Chicago | 2/27/2007 | Slip and Fall | With Injury |
| Chicago | 3/11/2007 | Property Damage | Mall property |
| Chicago | 5/22/2007 | Burglary From Motor Vehicle | From a vehicle |
| Chicago | 5/30/2007 | Property Damage | Personal Property |
| Chicago | 8/21/2007 | Ban notice | 1 Year |
| Chicago | 9/7/2007 | Property Damage | Mall property |
| Chicago | 8/22/2007 | Complaint | Patron |
| Chicago | 3/30/2008 | Improper Conduct | N/A |
| Los Angeles | 4/26/2008 | Alarm | Water Flow |
| Los Angeles | 5/2/2008 | Property Damage | Mall property |
| Los Angeles | 5/5/2008 | Alarm - False | Fire |
| Los Angeles | 5/13/2008 | Vehicle Accident - Property Damage | Hit and Run |

```
From: auto_notify@caseglobal.com
To: uri_gal@caseglobal.com
Subject: Incident 349682 at 1950 Gateway East -- Assault Mr. Gal, Here is a summary of Incident 349682:
        (1) Facility: 1950 Gateway East
        (2) Main Category: Assault
        (3) Sub-Category: With a Deadly Weapon
        (4) Secondary Main Category: Arrest by Security
        (5) Incident Date: November 18, 2007
        (6) Short Description: Woman assaulted in parking lot, perpetrator arrested Here is a link to more information about Incident 349682:

http://www.caseglobal.com/incident_349682.htm

Best Regards,

Case Global Automatic Notification Service
```

FIG. 69

```xml
<?xml version="1.0" encoding="UTF-8"?>
<!DOCTYPE incident SYSTEM "incident.dtd">
<incident>
    <incident_id>228518</incident_id>
    <main_category>Vandalism</main_category>
    <sub_category>With Major Damage</sub_category>
    <secondary_main_category>Arrest</secondary_main_category>
    <location_name>New York Plaza</location_name>
    <level_zone>Parking Lot B</level_zone>
    <injuries>Yes</injuries>
    <incident_details>
        <reporting_party>
            <reported_by>Need to Add</reported_by>
        </reporting_party>
        <weather_conditions>
            <condition_1>Need to Add</condition_1>
            <condition_2>Need to Add</condition_2>
        </weather_conditions>
    </incident_details>
</incident>
```

FIG. 70

```
<?xml version="1.0" encoding="UTF-8"?>
<!DOCTYPE incident SYSTEM "incident.dtd">
<incident>
    <incident_id>228518</incident_id>
    <main_category>Vandalism</main_category>
    <sub_category>With Major Damage</sub_category>
    <secondary_main_category>Arrest</secondary_main_category>
    <location_name>New York Plaza</location_name>
    <level_zone>Parking Lot B</level_zone>
    <injuries>Yes</injuries>
    <incident_details>
        <reporting_party>
            <reported_by>Abraham Israel</reported_by>
        </reporting_party>
        <weather_conditions>
            <condition_1>Dark</condition_1>
            <condition_2>Heavy Winds</condition_2>
        </weather_conditions>
        <incident_identification>
            <security_id>SID-2007-37</security_id>
            <insurance_id>2460</insurance_id>
        </incident_identification>
    </incident_details>
</incident>
```

INCIDENT TRACKING SYSTEMS AND METHODS

CROSS-REFERENCE TO RELATED PATENT APPLICATIONS

This application is a divisional application of U.S. patent application Ser. No. 12/356,985, filed Jan. 21, 2009, which claims the benefit of U.S. Provisional App. Ser. No. 61/023,344, filed Jan. 24, 2008, the entire contents of both of which are incorporated by reference herein.

BACKGROUND OF THE INVENTION

Embodiments of the present invention relate generally to incident tracking systems and methods and, more particularly, to systems and methods for tracking incidents that have occurred at a facility.

Everyday, millions of people populate facilities such as shopping centers, office buildings, apartment buildings, assembly plants, schools, hospitals, airports, casinos, and the like. Such facilities often include structures and other improvements for functional purposes or aesthetics. In the normal course of life, there are bound to be incidents at such facilities, such as incidents involving people, incidents involving structures, incidents involving items, and the like. Some incidents may lead to injury, loss of property, lawsuits, or other complications that are generally undesirable.

Consider, for example, various incidents that may occur at a common shopping mall. A mall patron might slip-and-fall in the food court and then file a lawsuit claiming some bodily injuries. Hoodlums might be involved in disorderly conduct outside of a movie theater late at night. There may be a theft of allergy pills from a pharmacy located next to a pet store. A radio might be stolen from a vehicle parked in a parking lot near an adjacent field. Various other incidents may involve, for example, broken windows, backed-up toilets, lost children, and the like.

In order to address such incidents, facilities often require managers, maintenance personnel, security officers, and the like, which may be a significant cost for a facility owner. Also, some incidents may lead to a temporary closure of part or all of a facility, which may result in lost profits for a facility owner and general patron discontent. Thus, undesirable incidents are often of great concern to facility owners and managers alike, and the ability to reduce such incidents is widely desired.

SUMMARY OF THE DISCLOSURE

Various embodiments of the present invention are related to incident tracking systems and methods. In some embodiments, the incident tracking systems and methods allow for organizing and storing information concerning incidents that have occurred at a facility, and for providing informative output such as maps, reports, statistics, messages, warnings, or the like, based on the stored information. Such informative output may aid in analyzing patterns of repeating incidents and in understanding causes or factors contributing to undesirable incidents. By enabling a greater knowledge of the circumstances and similarities of incidents at a facility, there is the potential to formulate preventive actions to avoid future incidents.

A method in one or more computers in accordance with an embodiment of the present invention includes: (i) receiving input that specifies an incident at a facility, where the incident is associated with a position at or near the facility; (ii) defining a search area adjacent to the position, where the search area is changeable; and (iii) displaying one or more other incidents that are each associated with a corresponding position that is within the search area. In various embodiments, the displaying includes displaying the one or more other incidents on a display screen. In some embodiments, the position is an area in the facility.

A method in accordance with an embodiment of the present invention includes: (i) receiving, by a server over a network from a computer, input that specifies an incident at a facility, where the incident is associated with a position at or near the facility; (ii) defining a search area adjacent to the position, where the search area is changeable; and (iii) initiating a search in a database based at least partially on the search area to obtain information about other incidents that are each associated with a corresponding position that is within the search area. In various embodiments, the method further includes displaying the other incidents on a display screen. In some embodiments, the position is an area in the facility.

In various embodiments, the defining includes receiving input that specifies the search area in terms of one of a polygon or a closed convex shape on a map of at least a portion of the facility on a display screen. Also, in various embodiments, the defining includes locating the position on a grid and receiving input that specifies the search area with reference to the grid. In some embodiments, the defining includes displaying the position on a map of at least a portion of the facility on a display screen, and receiving input that specifies the search area by highlighting pixels of the display screen. Also, in some embodiments, the defining includes specifying the search area as an area within a particular radial distance from the position. In various embodiments, the defining includes automatically defining, upon receiving the input that specifies the incident, the search area adjacent to the position based on one or more stored values.

In some embodiments, the initiating includes initiating the search in the database based at least partially on the search area and a date search range. Also, in some embodiments, the method further includes automatically causing icons representing positions of the other incidents to be displayed on a map once the information about the other incidents has been obtained. In various embodiments, the receiving includes receiving input that specifies the incident including information about the position. In some embodiments, the receiving includes receiving input that specifies the incident including information about a main category that applies to the incident, a sub-category within the main category that applies to the incident, and a secondary main category that applies to the incident. In further embodiments, the initiating includes initiating the search in the database based at least partially on the search area and the main category and the secondary main category.

In various embodiments, the receiving includes receiving input that specifies the incident including information about an item involved in the incident. In further embodiments, the method includes displaying information relating to how many times items of a same type as the item have been involved in incidents. Also, in further embodiments, the method includes displaying information relating to how many times items of a same type as the item have been involved in incidents at the facility within a date range. In some embodiments, the receiving includes receiving input that specifies the incident including information about a vehicle involved in the incident, where the information about the vehicle includes at least one of a make, a model, a vehicle identification number, license plate information, or an owner of the vehicle. Also, in some embodiments, the method further includes displaying information relating to how many times vehicles with a same make and model as the vehicle have been involved in incidents.

In various embodiments, the receiving includes receiving input that specifies the incident including information about a person involved in the incident and a role the person played in the incident. In further embodiments, the method includes identifying the person as being a person of interest in a case where the person has played a same role as the role in at least one other incident. In some embodiments, the method includes identifying the person as being a person of interest in a case where the person has played a same role as the role in at least one other incident that occurred at any facility identified with a currently logged-in user. In some embodiments, the receiving includes receiving input that specifies the incident including information about a type of the incident and a business related to the incident, where the business has stores at multiple facilities. Also, in some embodiments, the method further includes displaying information about incidents of a same type as the type that are related to the stores of the business and that occurred within a date range.

In various embodiments, the receiving includes receiving input that specifies the incident including at least one of a photo, a video, a sound, a text file, a spreadsheet file, a multi-media file, a scanned document, a binary file, or any other type of computer file associated with the incident. In some embodiments, the method further includes displaying, for each of the other incidents, a corresponding icon at the corresponding position associated with that incident on a map of at least a portion of the facility. Also, in some embodiments, the facility is at least one of a shopping center, a mall, a school, a stadium, a bank, a hospital, a hotel, a casino, an airport, a campus, a church, an office building, an apartment building, a sea port, a university, a college, a logistic hub, a logistic terminal, a factory, a manufacturing facility, a theatre, a theme park, a military camp, a federal government building, a state government building, a landmark, or the like. In various embodiments, the initiating includes sending from the server to a database server a database query based at least partially on the search area.

A computer readable storage medium in accordance with an embodiment of the present invention stores a computer program that when executed on a computer performs a method, where the method includes: (i) receiving input that specifies an incident at a facility, where the incident is associated with a position at the facility; (ii) determining one or more other incidents that are each associated with a corresponding position that is within a specified search area adjacent to the position; and (iii) providing information about the one or more other incidents.

A method in accordance with an embodiment of the present invention includes: (i) causing, by a server, a map of at least a portion of a facility to be displayed on a display screen of a computer; and (ii) dynamically plotting, each time a search area is changed on the map and an associated date range is indicated, positions on the map within the search area where incidents have occurred within the date range.

A method in accordance with an embodiment of the present invention includes: (i) receiving, by a server over a network from a computer, input that specifies an incident at a facility including a name of a person associated with the incident at the facility; (ii) automatically identifying, when the input is received, the person as being of interest if the person has been involved in one or more other incidents; and (iii) automatically displaying a warning on a display screen in a case where the person is identified as being of interest. In further embodiments, information related to the person is flagged in a database in a case where the person has played a same role in at least two incidents at the facility.

A method in accordance with an embodiment of the present invention includes: (i) receiving, by a server over a network from a computer, input that specifies at least one of an item or a vehicle involved in an incident at a facility; (ii) identifying the at least one of the item or the vehicle as being of interest in a case where the at least one of the item or the vehicle has been involved in one or more other incidents; and (iii) displaying a warning on a display screen in a case where the at least one of the item or the vehicle is identified as being of interest.

A method in accordance with an embodiment of the present invention includes: (i) receiving, by a server over a network from a computer, data that specifies an incident at a facility including a main category that applies to the incident; (ii) determining one or more users that are to be notified of the incident based at least partially on the main category of the incident and information about user category subscriptions; and (iii) providing one or more notifications to one or more devices associated with the one or more users that are to be notified of the incident, where at least one of the one or more notifications includes a link that provides access to information stored in a database concerning the incident.

In various embodiments, the at least one of the one or more notifications further includes a summary of the information concerning the incident. Also, in various embodiments, the at least one of the one or more notifications is provided as at least one of a text message or an e-mail. In some embodiments, the providing comprises automatically transmitting the one or more notifications after receiving the data that specifies the incident at the facility and determining the one or more users that are to be notified of the incident. In various embodiments, the method further includes providing a computer generated voice message that recites at least a portion of the information stored in the database concerning the incident to a telephone.

In various embodiments, the method further includes determining whether a response is received from a first contact individual of the one or more users within a time period after a notification has been provided to a device associated with the first contact individual, and providing a separate notification to a device associated with a second contact individual in a case where it is determined that the response was not received from the first contact individual within the time period. Also, in various embodiments the method further includes determining whether the incident is a potential high liability incident based at least partially on the data and a set of liability criteria, and automatically notifying an insurance company of the incident in a case where it is determined that the incident is a potential high liability incident.

In some embodiments, the input further includes a sub-category within the main category that applies to the incident and a secondary main category that applies to the incident. Also, in some embodiments, the determining of the one or more users is based further on the sub-category of the incident and the secondary main category of the incident. In various embodiments, the method further includes receiving subscription requests from users that each identify one or more main categories of incidents for which notifications are requested to be received by a corresponding user, and associating the users with main categories to which the users have subscribed based at least partially on the subscription requests that have been received so as to provide the information about user category subscriptions. In some embodiments, the method further includes determining whether the incident occurred within a given time period, where the providing comprises automatically providing the one or more notifications in a case where it is determined that the incident occurred within the given time period.

A method in accordance with an embodiment of the present invention includes: (i) forming, by one or more computers, an extensible markup language (XML) document with tags and content based at least partially on information stored in a database, where the XML document is formed to include at least one start-tag and at least one end-tag that correspond to a field in the database for which data is needed, and where the XML document is further formed to include at least one identifier between the at least one start-tag and the at least one end-tag to indicate that data is needed for the field; (ii) transmitting the XML document to a system that is able to provide appropriate data for the field; (iii) receiving a reply XML document from the system that includes the at least one start-tag, the at least one end-tag, and the appropriate data for the field between the at least one start-tag and the at least one end-tag; and (iv) storing the appropriate data from the reply XML document into the database for the field.

In various embodiments, the method further includes determining whether the reply XML document further includes one or more tags that were not included in the XML document and that correspond to one or more fields in the database. Also, in various embodiments, the method further includes storing, in a case where it is determined that the reply XML document further includes the one or more tags, content associated with the one or more tags from the reply XML document into the database. In some embodiments, the method further includes transmitting, to the system, information concerning available tags that each correspond to a respective field in the database and that can each be selectively inserted into the reply XML document to demarcate respective data for the respective field.

In various embodiments, the content of the XML document includes information about an incident that occurred at a facility. In some embodiments, the system is one of an insurance system, a risk management system, a security system, a loss prevention system, or a maintenance system. Also, in some embodiments, the appropriate data specifies data related to the incident. In various embodiments, the content of the XML document includes information about an incident that occurred at a facility and the appropriate data includes an insurance claim number for the incident.

Various embodiments of the present invention relate to incident tracking systems including a web server and client computers that communicate with the web server over one or more network connections. In some embodiments, the incident tracking systems further include a firewall for security and one or more database servers for storing database information. Thus, various embodiments of the present invention provide for incident tracking systems, methods, and computer readable storage mediums storing computer programs that allow for tracking incidents at one or more facilities.

BRIEF DESCRIPTION OF THE DRAWINGS

FIG. 7 illustrates a new incident addition page in accordance with an embodiment of the present invention that shows a selection of a sub-category within a main category for a new incident;

FIG. 10 illustrates a new incident addition page in accordance with an embodiment of the present invention that shows a selection of a location code for a new incident;

FIG. 14 illustrates a guard tracking report parameters page in accordance with an embodiment of the present invention for specifying guard tracking report parameters;

FIG. 15 illustrates a guard tracking report in accordance with an embodiment of the present invention for providing details of a security guard tour around a facility;

FIG. 17 illustrates an incident details page in accordance with an embodiment of the present invention that shows a selection of a nearest tenant to a position of an incident at a facility;

FIG. 31 illustrates a business incident report for a business having stores at multiple facilities;

FIG. 34 illustrates a people count/vehicle count report page for a facility in accordance with an embodiment of the present invention;

FIG. 47 illustrates a vehicles involved page in accordance with an embodiment of the present invention for receiving input that specifies information about one or more vehicles involved in an incident;

FIG. 48 illustrates a vehicles involved page in accordance with an embodiment of the present invention that shows a selection of a model of a vehicle;

FIG. 49 illustrates a vehicles involved page in accordance with an embodiment of the present invention that shows a selection of a type of a vehicle;

FIG. 50 illustrates a vehicles involved page in accordance with an embodiment of the present invention that shows a selection of one or more exterior colors of a vehicle;

FIG. 51 illustrates a vehicles involved page in accordance with an embodiment of the present invention that shows an identification of a vehicle as being of interest;

FIG. 52 illustrates a parking violation page in accordance with an embodiment of the present invention for receiving input that specifies information about a parking violation;

FIG. 58 illustrates an incident page with an injured person selection window in accordance with an embodiment of the present invention for receiving input that describes an injured person;

FIG. 59 illustrates a police report page in accordance with an embodiment of the present invention for receiving input that specifies police report information about an incident;

FIG. 62 illustrates an incident page in accordance with an embodiment of the present invention that shows an incident that has been submitted and that has amendments;

FIG. 64 illustrates an example of a notification of an incident at a facility in accordance with an embodiment of the present invention;

FIG. 69 illustrates an example of an XML document in accordance with an embodiment of the present invention; and FIG. 70 illustrates an example of a reply XML document in accordance with an embodiment of the present invention.

DETAILED DESCRIPTION OF PREFERRED EMBODIMENTS

Figure 1:
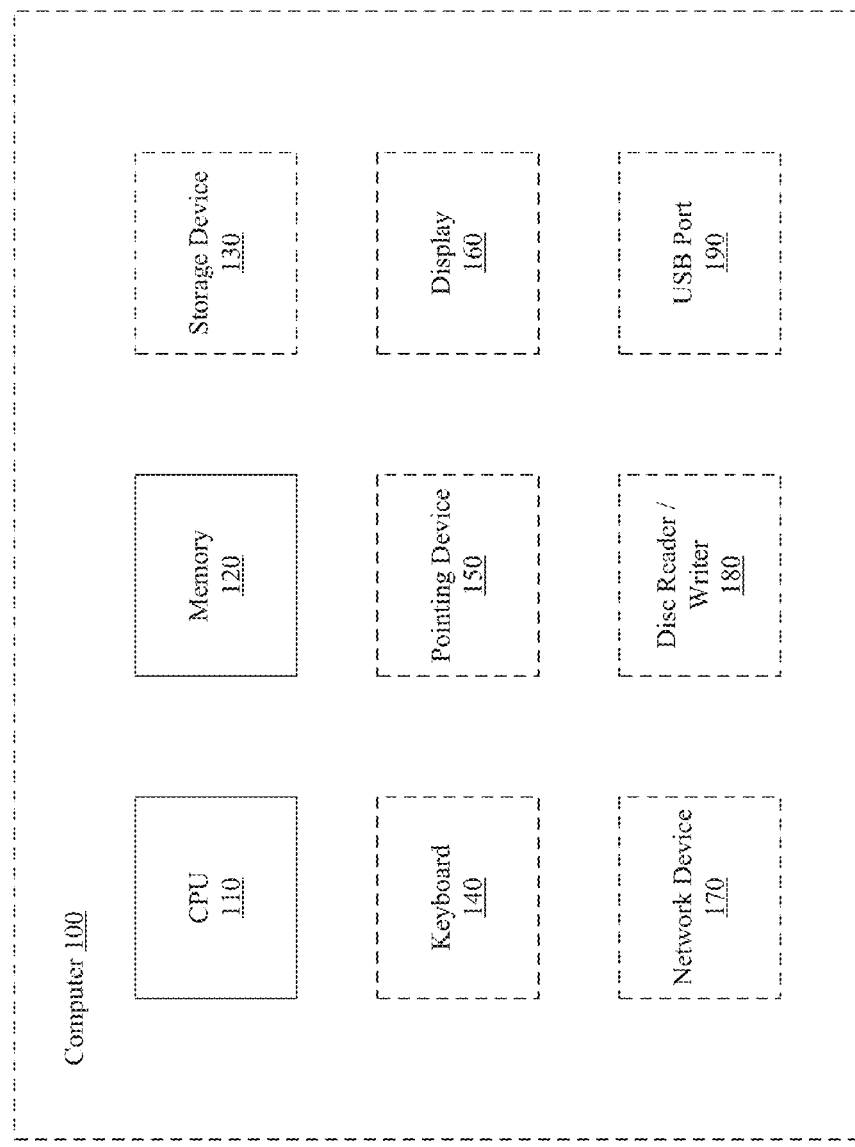
FIG. 1 illustrates a block diagram of a computer for use in various embodiments of the present invention.

FIG. 1 illustrates a block diagram of a computer 100 for use in various embodiments of the present invention. The computer 100 includes at least one central processing unit (CPU) 110 and memory 120. The CPU 110 allows for executing instructions and for processing data. The memory 120 may include, for example, one or more of random access memory (RAM), read-only memory (ROM), cache memory, or the like. In some embodiments, the computer 100 further includes, for example, a storage device 130, a keyboard 140, a pointing device 150, a display 160, a network device 170, a disc reader/writer 180, and a universal serial bus (USB) port 190.

The storage device 130 may allow for storing, for example, one or more of computer programs, database information, data, and the like. In various embodiments, the storage device 130 may include a hard disk drive or the like. The keyboard 140 allows for inputting character information into the computer 100. The pointing device 150 may include, for example, a mouse, a track-pad, a touch-pad, a track-ball, a stylus pen, or the like, for moving a cursor or the like based on user motions. The display 160 may include, for example, a monitor with a display screen, a flat-panel display screen, or the like, for displaying images or other information provided by the computer 100. In further embodiments, the computer 100 may include a printer (not shown) for printing information provided by the computer 100.

The network device 170 may include, for example, an Ethernet card, a wireless network card, or the like, for connecting the computer 100 to a network. In some embodiments, the CPU 110 may be configured to communicate data over a network without a separate network device. The disc reader/writer 180 may include, for example, a digital versatile disc (DVD) reader/writer, a compact disc (CD) reader/writer, or the like, for reading data from a disc and/or writing data to a disc. The USB port 190 may be configured to allow for connecting flash memory devices (not shown) or the like to the computer 100. In various embodiments, a computer readable storage medium for storing one or more computer programs may include one or more of RAM, ROM, a hard disk drive, a DVD, a CD, flash memory, or the like.

Figure 2:
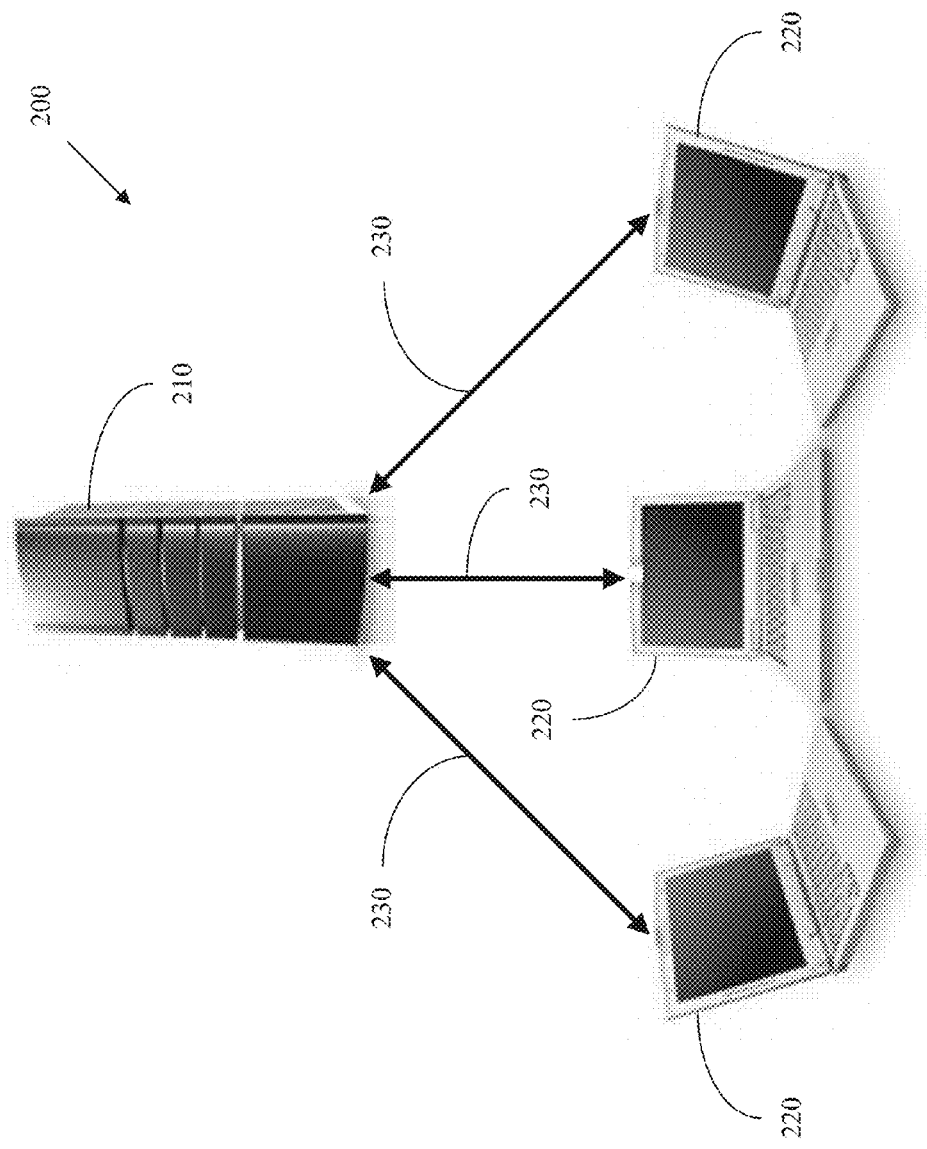
FIG. 2 illustrates a system that is able to be programmed for incident tracking in accordance with an embodiment of the present invention.

FIG. 2 illustrates a system 200 that is able to be programmed for incident tracking in accordance with an embodiment of the present invention. The system 200 includes a web server 210, one or more client computers 220, and one or more networks 230 that allow for communication between the web server 210 and the one or more client computers 220. The web server 210 is configured to provide web pages and database information to the one or more client computers 220 over the one or more networks 230. In various embodiments, the web server 210 comprises, for example, a computer such as the computer 100 of FIG. 1. In various embodiments, the web server 210 is programmed by a computer program stored on a computer-readable storage medium to provide web pages and database information related to incident tracking, and to receive and store data in a database related to incident tracking.

The one or more client computers 220 are clients and allow for sending data and requests to the web server 210 over the one or more networks 230, and allow for receiving web pages and data from the web server 210 over the one or more networks 230. In various embodiments, each of the one or more client computers 220 comprises, for example, a computer such as the computer 100 of FIG. 1. The one or more networks 230 may be a single network, or may be separate networks for transmitting data. In some embodiments, the one or more networks 230 include one or more of an Ethernet network, a local area network (LAN), a metropolitan area network (MAN), and/or a wide area network (WAN). Also, in some embodiments, the one or more networks 230 include the Internet.

Figure 3:
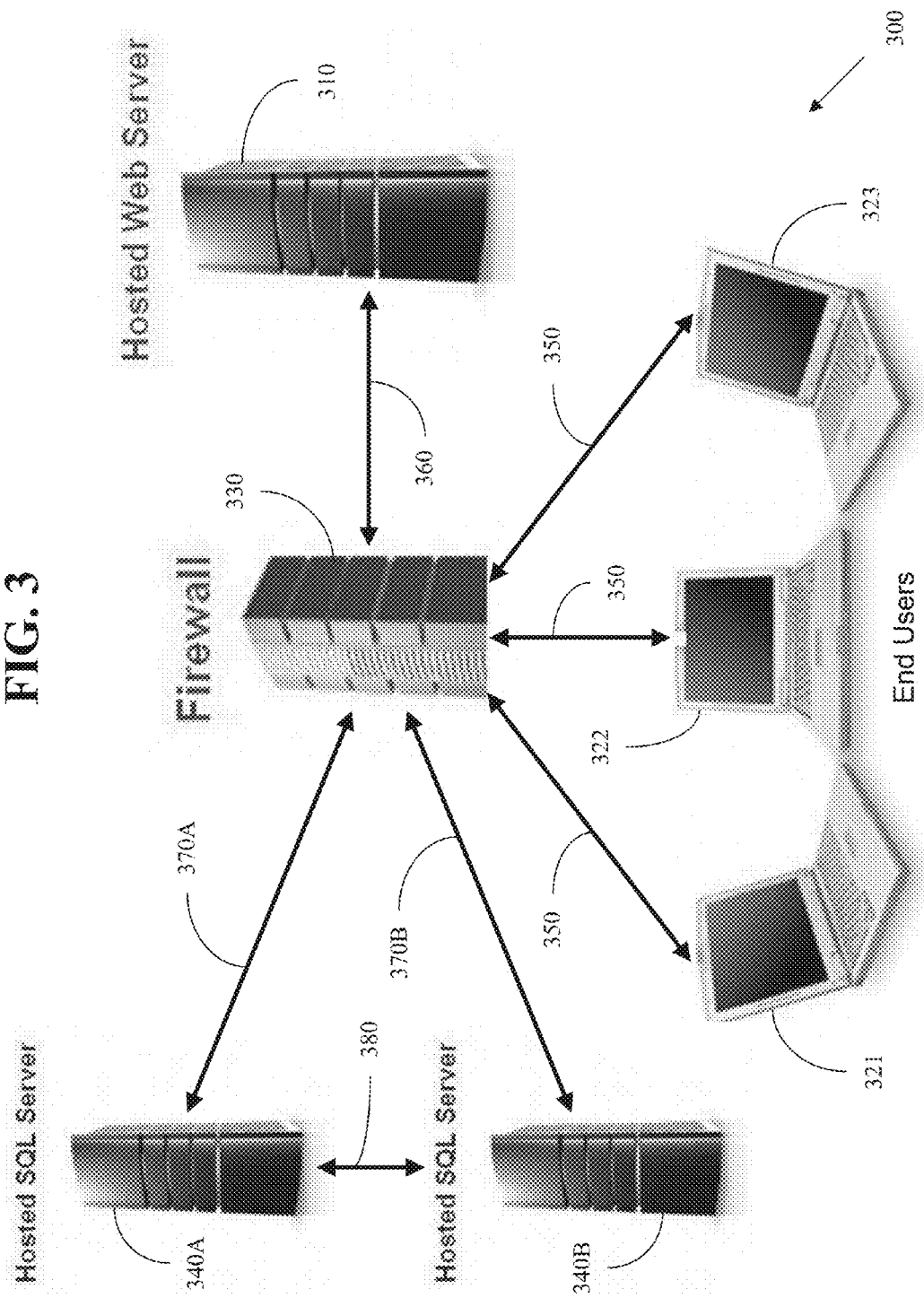
FIG. 3 illustrates a system in accordance with another embodiment of the present invention that is able to execute programs for incident tracking.

FIG. 3 illustrates a system 300 in accordance with another embodiment of the present invention that is able to execute programs for incident tracking. The system 300 includes a web server 310, a firewall 330, one or more structured query language (SQL) servers, such as the SQL servers 340A, 340B, and one or more client computers, such as the client computers 321, 322, 323. The system 300 further includes: (i) one or more networks 350 for communicating data between the firewall 330 and the one or more client computers 321, 322, 323; (ii) a network 360 for communicating data between the firewall 330 and the web server 310; and (iii) one or more networks 370A, 370B, for communicating data between the firewall 330 and the one or more SQL servers 340A, 340B. In a case where there are two or more SQL servers 340A, 340B, the system 300 may further include a network 380 for communicating data between a first SQL server 340A and a second SQL server 340B.

The web server 310 may comprise, for example, a computer such as the computer 100 of FIG. 1. In various embodiments, the web server 310 is configured to execute a computer program stored on a computer-readable storage medium that causes the web server 310 to accept requests sent from the one or more client computers 321, 322, 323 through the firewall 330, and that causes the web server 310 to provide data such as web pages and database information to the one or more client computers 321, 322, 323 through the firewall 330. The firewall 330 may comprise one or more of hardware and software for protecting the web server 310 and the one or more SQL servers 340A, 340B, from unwanted network traffic based on one or more rules specified in the firewall 330. Thus, the firewall 330 may provide security to prevent intruders and unwanted outside traffic from reaching the web server 310 and the one or more SQL servers 340A, 340B. It should be appreciated that the web server 310 is merely an example of a type of server that may be used in various embodiments and that, in various other embodiments, other types of servers may be used in place of the web server 310.

The one or more SQL servers 340A, 340B, may each comprise, for example, a computer such as the computer 100 of FIG. 1. The one or more SQL servers 340A, 340B, may each be configured to execute computer programs from computer-readable storage mediums to function as, for example, relational database management systems. In various embodiments, the one or more SQL servers 340A, 340B, store data in one or more relational databases and provide data from the one or more relational databases in response to queries formatted as SQL queries. In some embodiments, the one or more SQL servers 340A, 340B, provide data to the web server 310 through the firewall 330 in response to SQL queries from the web server 310 sent to the one or more SQL servers 340A, 340B, through the firewall 330. It should be appreciated that each of the one or more SQL servers 340A, 340B are merely an example of a type of database server that may be used in various embodiments and that, in various other embodiments, other types of database servers may be used in place of the one or more SQL servers 340A, 340B. For example, it should be appreciated that, in various embodiments, other types of database systems than relational database systems, such as object oriented database systems, hierarchical database systems, or the like, may be used to provide database information in place of the one or more SQL servers 340A, 340B.

The one or more client computers 321, 322, 323, are clients and allow for sending data and requests to the web server 310 through the firewall 330, and allow for receiving web pages and data from the web server 310 through the firewall 330. In various embodiments, each of the one or more client computers 321, 322, 323, comprises, for example, a computer such as the computer 100 of FIG. 1. In some embodiments, each of the one or more client computers 321, 322, 323, allows for executing a computer program stored in a computer-readable storage medium to run a web browser application that allows for displaying web pages and accepting user input. In various embodiments, each of the one or more client computers 321, 322, 323, is one of a desktop computer, a laptop computer, a cellular phone, a personal digital assistant (PDA), or the like.

In some embodiments, the one or more networks 350, the network 360, the one or more networks 370A, 370B, and the network 380 include one or more of an Ethernet network, a local area network (LAN), a metropolitan area network (MAN), and/or a wide area network (WAN). Also, in some embodiments, the one or more networks 350, the network 360, the one or more networks 370A, 370B, and the network 380 include the Internet. In various embodiments, the web server 310 serves data over a public network, such as the Internet. In some embodiments, the web server 310 serves data over a private network. Also, in some embodiments, the web server 310 serves data over both a public network and a private network.

An operation of the system 300 in accordance with an embodiment of the present invention will now be described. The operation will be described with respect to the client computer 321, but it should be appreciated that similar operations may be provided by other client computers, such as the client computers 322 and 323. In operation, the client computer 321 may execute a web browser and send a request or data to the firewall 330 over one of the one or more networks 350. The firewall 330 may be configured to verify that the client computer 321 is a trusted computer and that the request or data is of a permissible type to send to the web server 310. In an event that the firewall 330 determines that requests or data are of an impermissible type, the firewall 330 may block the requests or data from being forwarded to the web server 310. On the other hand, in an event that the firewall 330 determines that the requests or data are of a permissible type, the firewall 330 may forward the requests or data to the web server 310 over the network 360.

When the web server 310 receives requests or data from the client computer 321, the web server 310 may access a database in the first SQL server 340A to obtain data from the database or to store data into the database. In such a case, the web server 310 may be configured to form a SQL query to obtain data from the database, or to form one or more commands to insert or update data in the database at the first SQL server 340A. The web server 310 may send the queries or commands to first SQL server 340A through the firewall 330 and over the network 360 and the network 370A. The firewall 330 may be configured to verify that proper access is being made to the first SQL server 340A before sending the queries or commands over the network 370A.

In a case where the first SQL server 340A receives one or more commands to insert, update, modify, delete, or the like, data or tables in a database, the first SQL server 340A may be configured to carry out the commands. When there are two or more SQL servers 340A, 340B, the two or more SQL servers 340A, 340B, may be synchronized in real time to allow for redundancy in the system 300. For example, each time a database is changed in the first SQL server 340A, the change to the database may be backed-up on the second SQL server 340B by sending information regarding the change over the network 380. In some embodiments, the synchronization between the first SQL server 340A and the second SQL server 340B may allow for sending changes to the second SQL server 340B within seconds of the changes being made in the first SQL server 340A. Thus, in case of a failure of the first SQL server 340A, a back-up copy of the database is stored for use in the second SQL server 340B.

In a case where the first SQL server 340A receives a SQL query from the web server 310, the first SQL server 340A may be configured to access the relevant database and to provide data to the web server 310 in response to the SQL query. The data sent from the first SQL server 340A to the web server 310 passes over the network 370A, through the firewall 330, and over the network 360. The firewall 330 may again provide security to verify that the data to be transmitted to the web server 310 is of a permissible type and originated from a trusted source.

Once the web server 310 receives the data in response to the SQL query, the web server 310 may be configured to form a new web page to send to the client computer 321, or to issue a command with data to update an existing web page at the client computer 321. Such information is transmitted from the web server 310 to the client computer 321 by transmitting the information over the network 360, through the firewall 330, and over the one or more networks 350. The client computer 321 may then display on a display screen the new or updated web page. It should be appreciated that the web server 310 is able to service each of the one or more client computers 321, 322, 323, in a similar fashion.

Thus, in various embodiments, all communications with the web server 310 must go through the firewall 330, which helps to protect the web server 310 from unauthorized use or malicious attacks. Also, in various embodiments, only the web server 310 is able to access the one or more SQL servers 340A, 340B, and such access is through the firewall 330, which helps to protect the data in the databases at the one or more SQL servers 340A, 340B, from unauthorized access or malicious attacks. Moreover, in various embodiments, all accesses to the first SQL server 340A must originate from the web server 310, which may lead to an advantage in that if the first SQL server 340A goes down and is unable to provide service, a change must only be made at the web server 310 to redirect queries, commands, and data to the second SQL server 340B. In such an instance, the web server 310 would be able to communicate with the second SQL server 340B over the network 360, through the firewall 330, and over the network 370B, to keep the system 300 functional even when the first SQL server 340A goes down.

Each of the one or more client computers 321, 322, 323, may be located at any suitable corresponding location where there is a network connection available for connecting to the web server 310. In various embodiments, some of the one or more client computers 321, 322, 323, are located in security offices, management offices, customer stores, or the like. In various embodiments, the web server 310 and the one or more SQL servers 340A, 340B, may each be located at one or more corresponding data centers run by web hosting service companies, such that the web server 310 is a hosted web server and such that the one or more SQL servers 340A, 340B, are hosted SQL servers.

In some embodiments, rather than having a client-server model with the one or more client computers 321, 322, 323, and the web server 310, a single stand-alone computer (not shown) may be employed for incident tracking to allow users to work off-line. In such a case, the single stand-alone computer may be configured to directly receive user input, store data into and retrieve data from a local database, and display information to a user. In various other embodiments, other types of network configurations, such as peer-to-peer, or the like, may be employed to allow for transmitting data.

The following description of embodiments of incident tracking systems and methods will be described with reference to the elements of system 300, but it should be understood that the other types of configurations noted above could be used instead of system 300. Also, the following description of embodiments of incident tracking systems and methods will be described with reference to the client computer 321, but it should be appreciated that similar operations may be provided by other client computers, such as the client computers 322 and 323. In the following description of embodiments of incident tracking systems and methods, various web pages are described as having entries for receiving or displaying information. It should be appreciated that the entries in the web pages are provided as example entries and that, in various other embodiments, more or fewer entries may be provided.

Figure 4:
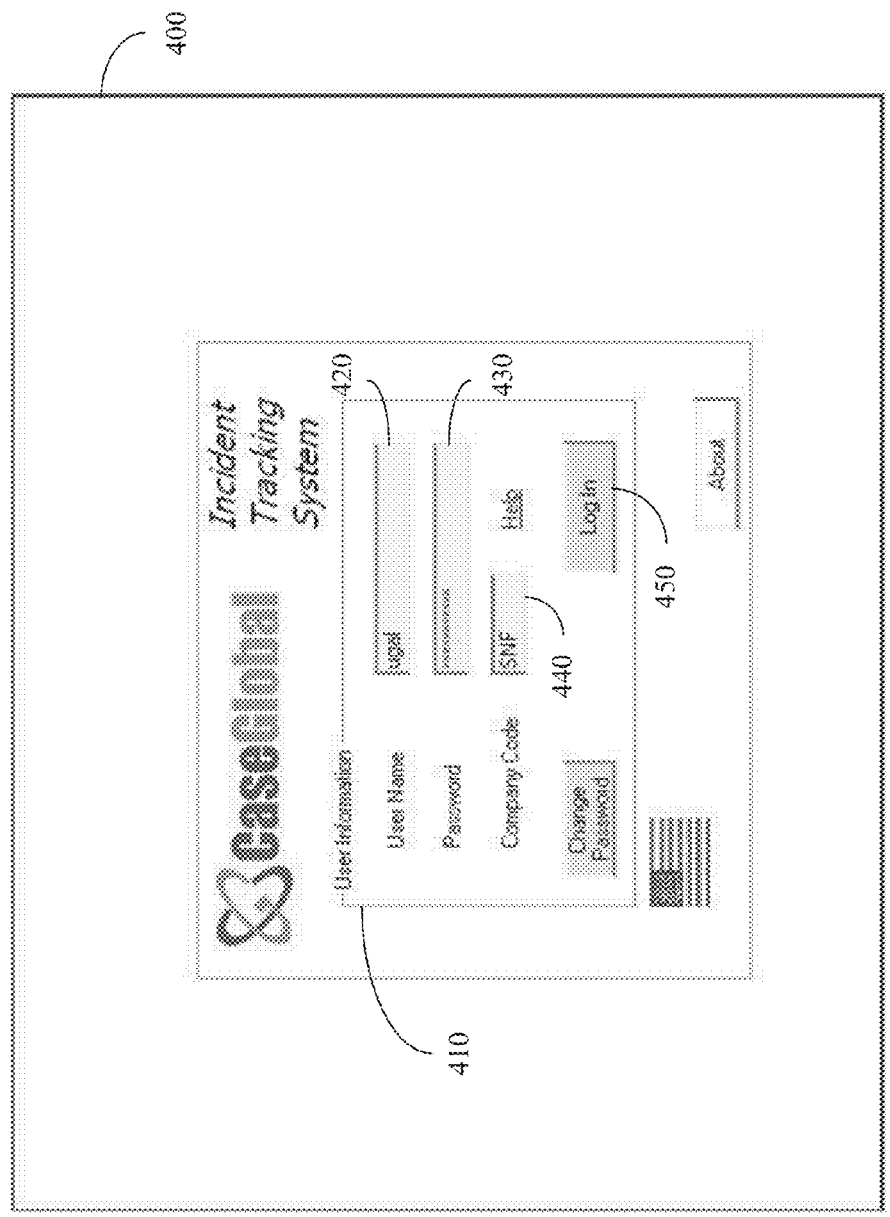
FIG. 4 illustrates a log-in page in accordance with an embodiment of the present invention.

FIG. 4 illustrates a log-in page 400 in accordance with an embodiment of the present invention. With reference to FIGS. 3 and 4, in various embodiments, the client computer 321 may execute a browser application computer program stored in a computer-readable storage medium, and may specify a uniform resource locator (URL) in the browser from which the log-in page 400 is to be accessed. In various embodiments, the web server 310 is configured to execute a web server application computer program stored in a computer-readable storage medium to cause the web server 310 to serve the log-in page 400 to the client computer 321. The log-in page 400 is then displayed by the browser of the client computer 321 on a display screen of a display, such as the display 160 of FIG. 1, of the client computer 321.

In various embodiments, the web server 310 includes one or more computer programs written in one or more of Visual Basic, Java, C#, or the like, for generating web pages, formulating database queries and commands, receiving and transmitting data, and the like, where the one or more computer programs may be stored on one or more computer-readable storage mediums to be read by the web server 310. Web pages provided to the client computer 321 from the web server 310 may be transmitted as Hypertext Markup Language (HTML) files, or the like, and may include embedded scripts or programs such as JavaScript routines, Java Applets, Adobe Flash files, or the like. The web pages may include text boxes, buttons, menus, drop-down lists, check boxes, radio buttons, or the like, for receiving user input. In various embodiments, some web pages are dynamically generated by the web server 310 based on one or more of user input information, database information returned in response to database queries, or the like.

The client computer 321 may include a keyboard, such as the keyboard 140 of FIG. 1, for allowing a user to input text into text boxes, press buttons, make selections from menus and drop-down lists, select check boxes and radio buttons, or the like. The client computer 321 may also include a pointing device, such as the pointing device 150 of FIG. 1, for allowing a user to press buttons, make selections from menus and drop-down lists, select check boxes and radio buttons, or the like.

The log-in page 400 may be a web page, and includes a user information section 410 for receiving input related to user log-in information. In various embodiments, the user information section 410 includes a user name section 420, a password section 430, a company code section 440, and a log-in button 450. The user name section 420 may include a text box, or the like, for receiving input that specifies a user name. The password section 430 may include a text box, or the like, for receiving input that specifies a password. The company code section 440 may include a text box, or the like, for receiving input that specifies a company code. The log-in button 450 may be clicked by a user to start a log-in process in which the user name entered in the user name section 420, the password entered in the password section 430, and the company code entered in the company code section 440 are transmitted to the web server 310 for verification.

The web server 310 may be configured to execute a computer program upon receipt of the user name, password, and company code, to verify that the user name is a valid user name for a company specified by the company code, and to verify that the password is a valid password for the user name associated with the company code. In a case that the password is not a valid password, the web server 310 may send a web page to prompt a user for another password. In a case that the password is a valid password, then the web server 310 may allow access to the user. Thus, the web server 310 provides for password protection against unauthorized use by individuals.

The company code allows for specifying a company with which the user is associated. Many companies may each have an account for tracking incidents at facilities related to the company. In addition, different organizations within a company may be supplied unique company codes for accessing the web server 310. The web pages subsequently provided by the web server 310 after log-in may be customized based on the company code associated with the user, so that the types of incidents, reports, information, and the like, available to users may be customized for each company or organization. Thus, companies and organizations may capture and analyze particular information specially suited for their purposes.

Moreover, different users within each company or organization may have different access privileges to input or access particular information within the system 300. The web server 310 may be programmed, for example, to set the access privileges based on the user name specified in the log-in page 400 by referencing a table of privileges for users indexed by user name. Thus, there may be some secure areas and information that are protected or even hidden from users based on their access privileges. For example, in some embodiments, investigation information related to investigations for incidents may be hidden from some users that do not have appropriate access privileges.

Also, once a user has logged-in, the web server 310 may maintain a session timer that begins counting each time a user is idle and has not submitted information to or requested information from the web server 310 after logging-in. In such a case, if the session timer indicates that the user has been idle for more than a specified time period, such as ten minutes, then the web server 310 may automatically terminate the session and log-off the user. The user would then be forced to log-in again before accessing information. Such a session timer may provide for improved security in a case where a user forgets to log-off before leaving the client computer 321, because the session will automatically be terminated after a specified idle time period has elapsed.

Figure 5:
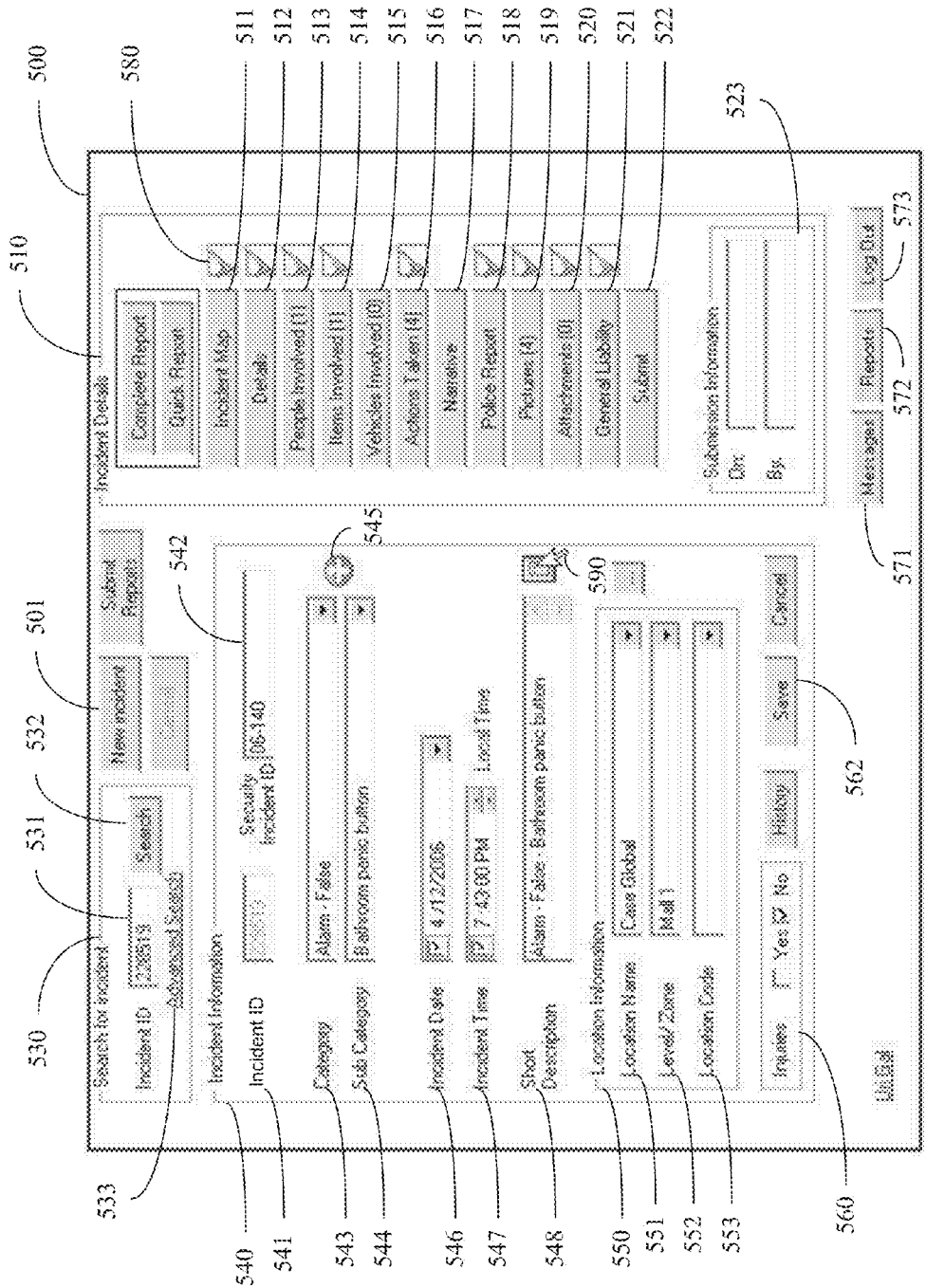
FIG. 5 illustrates an incident page in accordance with an embodiment of the present invention.

FIG. 5 illustrates an incident page 500 in accordance with an embodiment of the present invention. With reference to FIGS. 3 and 5, in various embodiments, the incident page 500 may be a web page that is provided from the web server 310 to the client computer 321 upon a user logging-into the web server 310 from the client computer 321. The incident page 500 includes a new incident button 501, an incident details section 510, a search for incident section 530, an incident information section 540, a messages button 571, a reports button 572, and a log-out button 573.

The incident details section 510 includes an incident map button 511, a details button 512, a people involved button 513, an items involved button 514, a vehicles involved button 515, an actions taken button 516, a narrative button 517, a police report button 518, a pictures button 519, an attachments button 520, a general liability button 521, a submit button 522, and a submission information section 523. The search for incident section 530 includes an incident identification (ID) section 531, a search button 532, and an advanced search link 533. The incident information section 540 includes an incident ID 541, a security incident ID 542, a main category section 543, a sub-category section 544, a secondary main category button 545, an incident date section 546, an incident time section 547, a description section 548, a location information section 550, an injuries section 560, and a save button 562. The location information section 550 includes a location name section 551, a level/zone section 552, and a location code section 553.

The incident page 500 may be displayed on a display screen of the client computers 321. The client computer 321 may include a keyboard, such as the keyboard 140 of the computer 100 of FIG. 1, for inputting information into the incident page 500. The client computer 321 may also include a pointing device, such as the pointing device 150 of the computer 100 of FIG. 1, for controlling a cursor 590 on the display screen to provide input to the incident page 500. In various embodiments, data input in the incident page 500 is transmitted to the web server 310 at the request of a user. In various other embodiments, data input in the incident page 500 is automatically transmitted to the web server 310 after being input at the client computer 321.

In various embodiments, in a case where the new incident button 501 is pressed using the cursor 590 or keyboard input, the client computer 321 transmits a new incident request to the web server 310, and the web server 310 returns a web page to the client computer 321 for adding new incident information. In various embodiments, each incident is assigned a unique incident ID, and the incident ID may, for example, be incremented by one for each new incident. The entry of information for specifying a new incident upon selection of the new incident button 501 is described below with reference to FIGS. 6-10. In various embodiments, an incident may be an occurrence, an event, or the like, and information about the incident may include information about the occurrence or event.

Referring again to FIGS. 3 and 5, the search for incident section 530 allows for searching for incidents that have already been previously entered. The incident ID section 531 allows for receiving input that specifies an incident ID in order to search for an incident associated with the incident ID. In various embodiments, the incident ID section 531 includes a text box for receiving the incident ID, and the client computer 321 transmits the incident ID specified in the incident ID section 531 to the web server 310 when the search button 532 is pressed through user input. The web server 310 may be programmed to receive the incident ID that specifies the incident from the client computer 321, and to form a SQL query to send to the first SQL server 340A to retrieve information related to the incident specified by the incident ID. The first SQL server 340A may be programmed to search a database in response to the SQL query based on the incident ID, and to transmit information from the database related to the incident specified by the incident ID to the web server 310. The web server 310 may be programmed to update the incident information section 540 and the incident details section 510 of the incident page 500 based on the information returned from the first SQL server 340A, and to transmit the updated information for the incident page 500 to the client computer 321.

The client computer 321 is programmed to display the updated information for the incident page 500. FIG. 5 illustrates an example in which a search has been performed for an incident associated with incident ID number 228519, and in which the incident information section 540 and the incident details section 510 have been updated based on the results of the search. In various embodiments, the advanced search link 533 may be clicked on using the cursor 590 or selected using keyboard input to search for incidents based on additional criteria, as is described below with reference to FIG. 18.

With reference again to FIGS. 3 and 5, information provided in various embodiments in the incident information section 540 will now be discussed. The incident ID 541 provides the unique incident ID for the currently displayed incident. The security incident ID 542 provides a security ID for the currently displayed incident.

The main category section 543 provides information related to a main category selected for the currently displayed incident. The main category associated with an incident may indicate a type of the incident, such as false alarm, assault, attempted burglary, ban notice, customer service, non-criminal other, vandalism, arrest by security, theft, slip and fall, lost property, water leak, property damage, fire, tenant lease violation, personal accident, burglary from motor vehicle, improper conduct, vehicle accident, or the like. The preceding list of main categories is provided as an example, and it should be understood that numerous other incident types may be specified for the main category. In various embodiments, the incident main categories are specially tailored for various companies, or organizations within a company, for reporting the types of incidents that occur with respect to the companies or organizations. In such embodiments, the list of available main categories provided to a user for an incident may then be based on the company code entered by the user in the log-in page 400 of FIG. 4. In various other embodiments, the incident main categories are provided as a default list of main categories specified by a system programmer.

The sub-category section 544 provides information related to a sub-category within the selected main category that is selected for the currently displayed incident. Each main category may have an associated one or more sub-categories that further define a type of the incident. For example, for the main category of assault, a list of sub-categories such as with a deadly weapon, with a weapon, and without a weapon, may be available for selection for the sub-category of the incident. Similarly, for example, for the main category of customer service, there may be available sub-category types of change a tire, exchange an item, fix a defect, or the like. The preceding lists of sub-categories are provided as examples, and it should be understood that numerous other types may be specified for sub-categories. In various embodiments, the available incident sub-categories are specially tailored for various companies, or organizations within a company, for reporting the types of incidents that occur with respect to the companies or organizations. In such embodiments, the list of available sub-categories for each main category provided to a user for an incident may then be based on the company code entered by the user in the log-in page 400 of FIG. 4. In various other embodiments, the incident sub-categories for each main category are provided as a default list of sub-categories specified by a system programmer.

The secondary main category button 545 allows for providing information about a secondary main category and a secondary sub-category within the secondary main category associated with an incident. In various embodiments, the list of available secondary main categories and secondary sub-categories is the same as the list of available main categories and sub-categories, respectively. The secondary main category allows for associating another main category with an incident in addition to the primary main category. The selection of a secondary main category and secondary sub-category for an incident is described below with reference to FIG. 11.

The incident date section 546 provides information about a date associated with the currently displayed incident. In various embodiments, the date specified in the incident date section 546 is a date of occurrence of the currently displayed incident. The incident time section 547 provides information about a time associated with the currently displayed incident. In various embodiments, the time specified in the incident time section 547 is an approximate time of occurrence of the currently displayed incident. The description section 548 provides a short description of the currently displayed incident.

The location name section 551 provides a name of a facility associated with the currently displayed incident. In various embodiments, types of facilities include shopping centers, malls, office buildings, apartment buildings, assembly plants, schools, hospitals, airports, casinos, churches, and the like. In some embodiments, each facility is provided a unique name to distinguish the facility from other facilities. In various embodiments, a list of available facilities from which to select a facility to be associated with an incident may be customized for each company or organization. In such embodiments, the list of available facilities for the location name section 551 may be based on the company code entered by the user in the log-in page 400 of FIG. 4.

The level/zone section 552 provides a level or zone within the facility specified by the location name section 551 that is associated with the currently displayed incident. For example, a shopping center may be divided into levels or zones, such as a first level of stores, a second level of stores, management offices, parking lots, and the like. The location code section 553 provides a more specific location within the level or zone specified by the level/zone section 552 that is associated with the currently displayed incident. For example, in a case where the location name section 551 specifies a name of a shopping center and the level/zone section 552 specifies a zone of offices within the shopping center, the location code section 553 may provide a list of more specific locations within the offices at the shopping center, such as an entrance, a common area, an elevator, or the like.

The injuries section 560 provides information related to whether or not an injury has been associated with the currently displayed incident. In various embodiments, if an injury is indicated, a pop-up window is displayed to receive more information about the injury, as is described below with reference to FIG. 58. For example, in various embodiments, when an injury is associated with the currently displayed incident, a pop-up window may be displayed to obtain information about a type of person injured, such as a security employee, a client employee, a client contractor, a shopper, a visitor, or the like. In some embodiments, an insurance company may be automatically notified by the web server 310 in a case where there is an injury associated with an incident and the incident is to a type of person that raises liability concerns.

In various embodiments, the incident information section 540 of the incident page 500 allows for updating or modifying each of the following for a currently displayed incident: (i) the security ID provided for the security incident ID 542; (ii) the main category provided in the main category section 543; (iii) the sub-category provided in the sub-category section 544; (iv) the secondary main category and secondary sub-category specified in a pop-up screen upon clicking the secondary main category button 545; (v) the date provided in the incident date section 546; (vi) the time provided in the incident time section 547; (vii) the short description provided in the description section 548; (viii) the name of the facility provided in the location name section 551; (ix) the level or zone provided in the level/zone section 552; (x) the more specific location provided in the location code section 553; and (xi) the indication of injuries provided in the injuries section 560.

In various embodiments, in a case where information in the incident information section 540 has been updated or modified and the save button 562 is pressed, the client computer 321 sends the updated or modified data to the web server 310. In various embodiments, the web server 310 is programmed to receive such updated or modified data from the client computer 321 and to formulate one or more commands to send to the first SQL server 340A to update or modify the corresponding data in the database of the first SQL server 340A. Also, in various embodiments, the first SQL server 340A is programmed to update or modify the corresponding data in the database in response to the one or more commands received from the web server 310. Thus, various embodiments of the present invention allow for updating or modifying data related to an incident in a database.

The incident details section 510 of the incident page 500 allows for specifying and viewing information related to a currently displayed incident. In various embodiments, in a case where the incident map button 511 is pressed, a pop-up window with a map of the level or zone specified in the level/zone section 552 of the facility specified in the location name section 551 is displayed on a display screen of the client computer 321. The client computer 321 may then be used to specify a position on the map at which the incident occurred, so as to associate a position at the facility with the incident. An example process of specifying a position on a map of a facility at which an incident occurred is discussed below with reference to FIG. 12.

In various embodiments, in a case where the details button 512 is pressed, a pop-up window with entries for specifying details related to the currently displayed incident is displayed on a display screen of the client computer 321. The client computer 321 may then be used to specify details related to the incident, such as whether the incident was captured on video, information about a reporting party, information about security arrival to the scene of the incident, weather conditions during the incident, an inspection of the location where the incident occurred, a nearest tenant to the incident, or the like. An example process of specifying details related to an incident is discussed below with reference to FIGS. 16-17.

In various embodiments, in a case where the people involved button 513 is pressed, a pop-up window with entries for specifying people involved in the currently displayed incident is displayed on a display screen of the client computer 321. The client computer 321 may then be used to specify people involved in the incident, such as a suspect, a victim, a reporting party, a vehicle owner, or the like. In various embodiments, details related to each person involved in the incident may be entered at the client computer 321, such as address information, contact information, personal information, physical information, employment information, manner of dress during the incident, medical information, a personal narrative, or the like. An example process of specifying people involved in an incident is discussed below with reference to FIGS. 38-44.

In various embodiments, in a case where the items involved button 514 is pressed, a pop-up window with entries for specifying items involved in the currently displayed incident is displayed on a display screen of the client computer 321. The client computer 321 may then be used to specify items involved in the incident, such as damaged items, stolen items, or the like. In various embodiments, details related to each item involved in the incident may be entered at the client computer 321, such as an item description, item properties, an item picture, or the like. An example process of specifying items involved in an incident is discussed below with reference to FIGS. 45-46.

In various embodiments, in a case where the vehicles involved button 515 is pressed, a pop-up window with entries for specifying vehicles involved in the currently displayed incident is displayed on a display screen of the client computer 321. The client computer 321 may then be used to specify vehicles involved in the incident. In various embodiments, details related to each vehicle involved in the incident may be entered at the client computer 321, such as make, model, license plate information, vehicle identification number (VIN) information, exterior and interior colors, vehicle owner information, vehicle damage information, or the like. An example process of specifying vehicles involved in an incident is discussed below with reference to FIGS. 47-51.

In various embodiments, in a case where the actions taken button 516 is pressed, a pop-up window with entries for specifying actions taken with respect to the currently displayed incident is displayed on a display screen of the client computer 321. The client computer 321 may then be used to specify actions taken with respect to the incident. Also, in various embodiments, in a case where the narrative button 517 is pressed, a pop-up window with a text box for providing a narrative related to the currently displayed incident is displayed on a display screen of the client computer 321. The client computer 321 may then be used to provide a narrative related to the incident.

In various embodiments, in a case where the police report button 518 is pressed, a pop-up window with entries for specifying police report information related to the currently displayed incident is displayed on a display screen of the client computer 321. The client computer 321 may then be used to specify police report information related to the incident, such as a date and time the incident was reported to the police, a date and time the police arrived to the scene of the incident, information identifying an officer to which the incident was reported, or the like. An example process of specifying police report information related to an incident is discussed below with reference to FIG. 59.

In various embodiments, in a case where the pictures button 519 is pressed, a pop-up window with entries for providing pictures related to the currently displayed incident is displayed on a display screen of the client computer 321. The client computer 321 may then be used to provide pictures related to the incident, such as photographs of a location where the incident occurred, photographs of a person or item or vehicle involved in the incident, or the like. In various embodiments, details related to each picture may be entered at the client computer 321, such as a person who took the picture, a date and time the picture was taken, a type of camera used to take the picture, a distance from the camera to the principal object in the picture, lighting for the picture, whether a flash bulb was used when taking the picture, a description of the picture, or the like. An example process of providing pictures related to an incident is discussed below with reference to FIGS. 56-57.

In various embodiments, in a case where the attachments button 520 is pressed, a pop-up window with entries for providing attachments related to the currently displayed incident is displayed on a display screen of the client computer 321. The client computer 321 may then be used to provide attachments related to the incident, such as image file attachments, video file attachments, sound file attachments, or the like. In various embodiments, the attachments may be uploaded from the client computer 321 to the web server 310 from a storage device accessible by the client computer 321. An example process of providing attachments related to an incident is discussed below with reference to FIG. 55.

In various embodiments, in a case where the general liability button 521 is pressed, a pop-up window with entries for providing information related to general liability for the currently displayed incident is displayed on a display screen of the client computer 321. The client computer 321 may then be used to provide information about general liabilities related to the incident. In some embodiments, the client computer 321 provides the input information about general liabilities to the web server 310, and the web server 310 provides the information about general liabilities to an insurance provider responsible for paying insurance claims.

In various embodiments, in a case where the submit button 522 is pressed, the information provided in the incident information section 540 and the information entered through the incident details section 510 related to the currently displayed incident is locked to prevent further modification. In some embodiments, only certain users with proper access privileges are able to submit and lock an incident. Also, in some embodiments, even after an incident has been locked, amendments may be added to the record of the incident to note further information related to the incident. In various embodiments, the submission information section 523 allows for specifying a user that is submitting the information related to the currently displayed incident to be locked, and for specifying a date on which the information related to the incident is submitted to be locked. An example process of submitting information related to an incident to be locked and of providing amendments to the submitted information is discussed below with reference to FIG. 62.

In various embodiments, each time a section is completed by pressing on a button in the incident details section 510 and filling out the corresponding information, a check mark 580 is provided next to the button to indicate that the section has been completed. For example, when the incident map button 511 is pressed and a location is indicated on the map of the facility and saved, the check mark 580 appears next to the incident map button 511 to indicate that the incident map section has been completed.

Also, in various embodiments, for each of the people involved button 513, the items involved button 514, the vehicles involved button 515, the actions taken button 516, the pictures button 519, and the attachments button 520, when information has been entered after pressing the respective button, the image of the respective button may be updated with a number to indicate the number of people involved, the number of items involved, the number of vehicles involved, the number of actions taken, the number of pictures provided, and the number of attachments provided, respectively. For example, if four pictures are added for an incident after pressing the pictures button 519, an image of the pictures button 519 on the incident page 500 may be updated to indicate that four pictures have been added for the incident.

In various embodiments, in a case where the messages button 571 is pressed, a pop-up window with entries for sending a message to a user is displayed in a display screen of the client computer 321. The client computer 321 may then be used to send a message to a user, such as message text, an attachment file, or the like. In various embodiments, various options are provided for each message, such as selecting one or more recipients for the message, sending the message to e-mail accounts, selecting a message priority and subject, or the like. An example process of sending a message is discussed below with reference to FIGS. 60-61.

In various embodiments, in a case where the reports button 572 is pressed, a pop-up window with selections for various reports and statistics is displayed in a display screen of the client computer 321. The client computer 321 may then be used to select one or more of the reports or statistics, such as maps with plotted incident locations, people counters, incident statistics by date and time, location comparison statistics, or the like. Example processes of selecting reports for incidents are discussed below with reference to FIGS. 19-37.

In various embodiments, in a case where the log-out button 573 is pressed, a user is logged-out of the system. The client computer 321 may be programmed to send a log-out instruction to the web server 310 when the log-out button 573 is pressed. In various embodiments, the web server 310 may be programmed to record that the user has logged-out and then to send the log-in page 400 of FIG. 4 to the client computer 321 to allow for another log-in from a same or different user.

Figure 6:
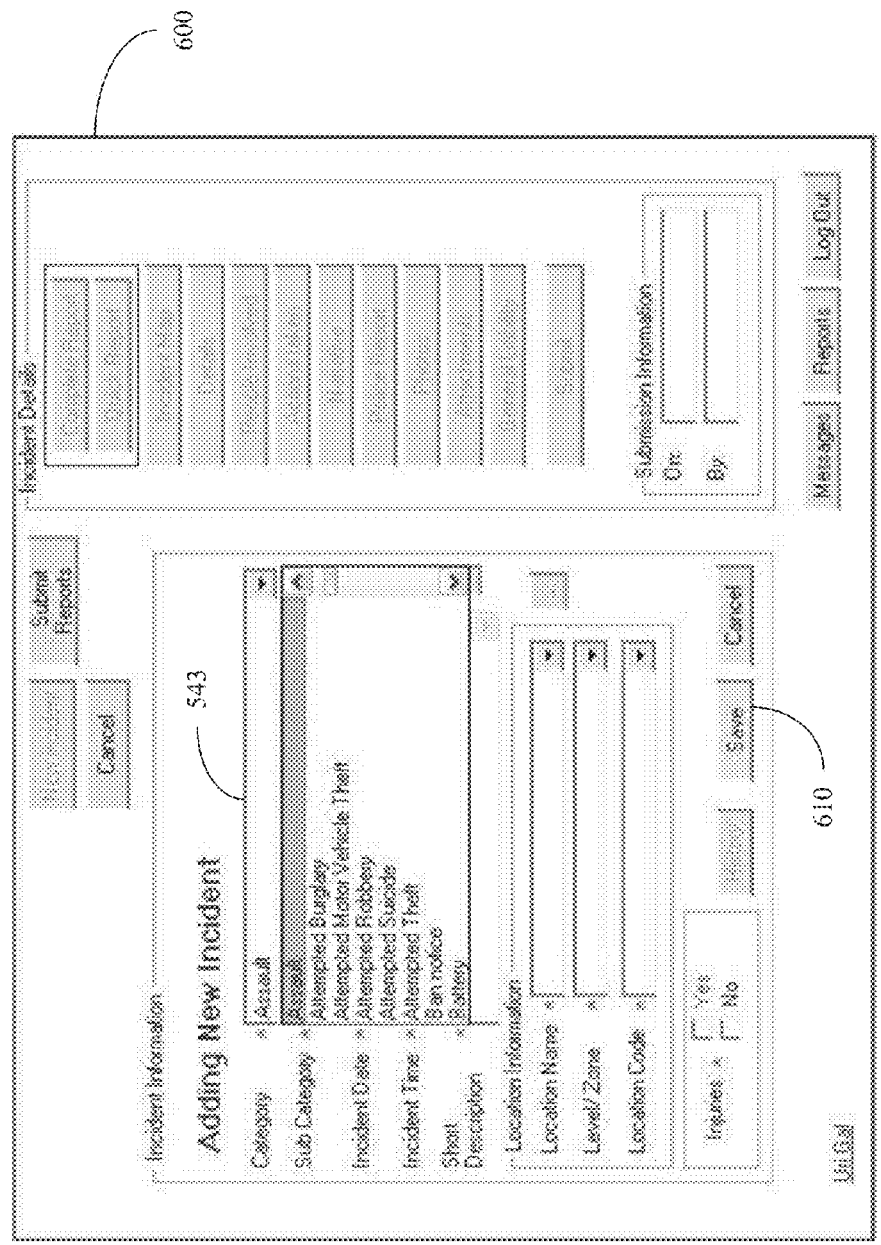
FIG. 6 illustrates a new incident addition page in accordance with an embodiment of the present invention that shows a selection of a main category for a new incident.

FIG. 6 illustrates a new incident addition page 600 in accordance with an embodiment of the present invention that shows a selection of a main category for a new incident. Referring to FIGS. 3, 5, and 6, in various embodiments the client computer 321 is programmed to detect when the new incident button 501 has been pressed, and to provide a request to the web server 310 for the new incident addition page 600 in a case where the client computer 321 detects that the new incident button 501 has been pressed. In various embodiments, the web server 310 is programmed to provide the new incident addition page 600 to the client computer 321 in response to the request for the new incident addition page 600 received from the client computer 321.

In various embodiments, the client computer 321 is programmed to receive input that specifies a new incident at a facility through entries in the new incident addition page 600. Also, in various embodiments, the web server 310 is programmed to receive input that specifies the new incident at the facility from the client computer 321 by receiving the input from the client computer 321 once the client computer 321 receives the input in the new incident addition page 600 and a save button 610 is pressed. In some embodiments, the web server 310 may be programmed to send new incident information received from the client computer 321 to the first SQL server 340A to be stored in a database in the first SQL server 340A in association with an incident ID assigned to the new incident.

As illustrated in FIG. 6, the new incident addition page 600 may include the main category section 543 for selecting a main category for the new incident. In various embodiments, the main category section 543 includes a drop-down list, or the like, with available categories to select for the main category of a new incident. In some embodiments, the available categories may be customized for various companies and organizations, and the available categories may be based on a company code entered in the company code section 440 of the log-in page 400 of FIG. 4. In such embodiments, the web server 310 may be programmed to issue a query to the first SQL server 340A to retrieve a list of categories for a given company code, and then to form the new incident addition page 600 using the retrieved list of categories.

In the example embodiment of FIG. 6, the main category section 543 is illustrated as a drop-down list with the ability to scroll up and down within the list, where the currently visible categories in the list are: assault, attempted burglary, attempted motor vehicle theft, attempted robbery, attempted suicide, attempted theft, ban notice, and battery. In various embodiments, the client computer 321 is programmed to accept user input through a keyboard, a mouse, a touch-pad, or the like, to specify a main category associated with the new incident from the drop-down list. For example, in a case where the incident involved an assault, the category of assault may be selected from the drop-down list for the main category.

Figure 7:
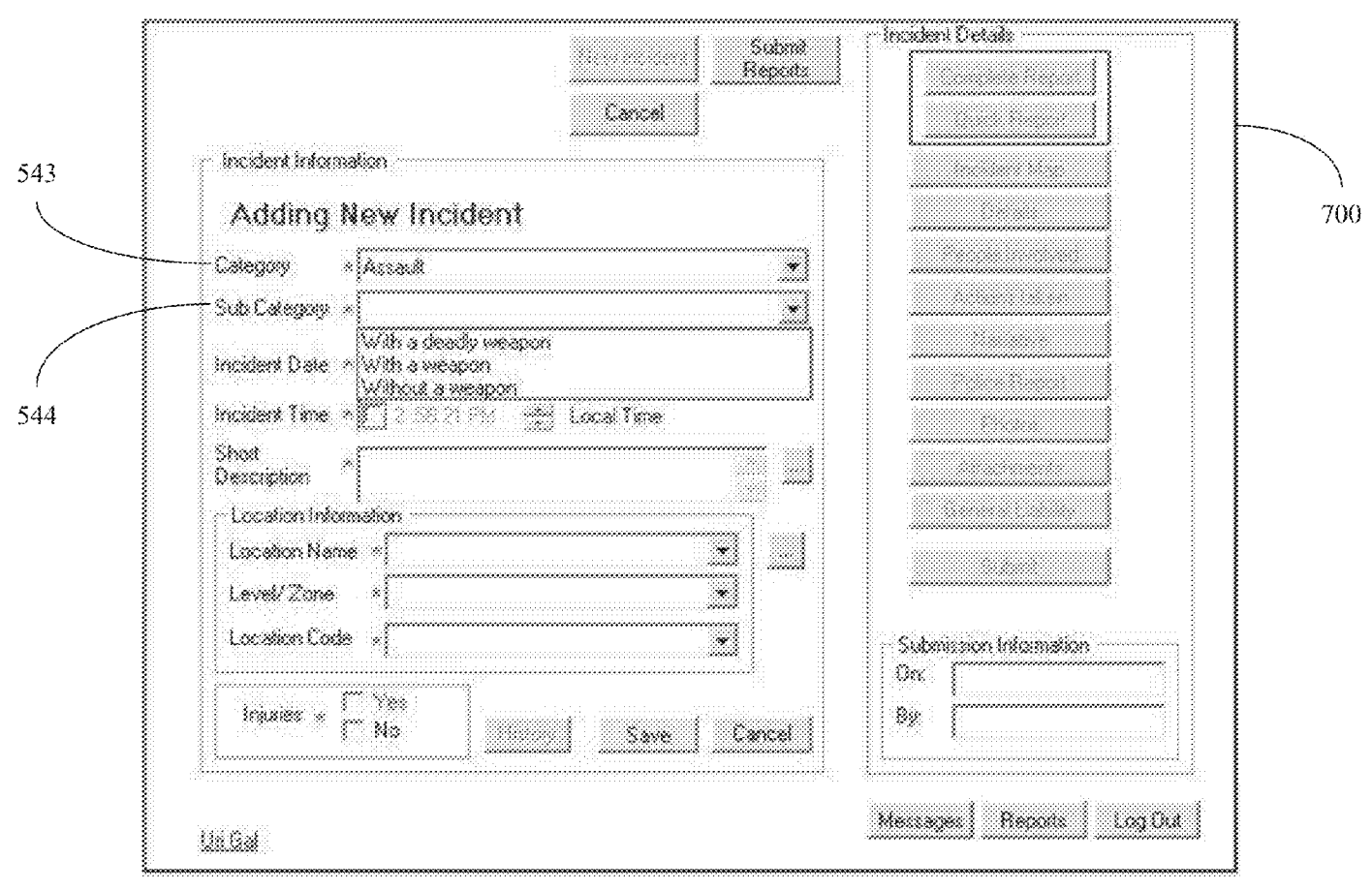

FIG. 7 illustrates a new incident addition page 700 in accordance with an embodiment of the present invention that shows a selection of a sub-category within a main category for a new incident. The new incident addition page 700 is similar to the new incident addition page 600 of FIG. 6. The new incident addition page 700 includes the main category section 543 and the sub-category section 544. In various embodiments, in a case where the main category for the new incident has been selected, the available sub-categories provided in the sub-category section 544 are based on the main category specified in the main category section 543. In some embodiments, the sub-category section 544 includes a drop-down list with the available sub-categories. For instance, in the example illustrated in FIG. 7, the main category of assault has been selected in the main category section 543, and a drop-down list is provided for the sub-category section 544 with available sub-categories for the main category of assault. In the example, the available sub-categories for assault are with a deadly weapon, with a weapon, and without a weapon. In various embodiments, the client computer 321 of FIG. 3 receives input from a keyboard, a mouse, a touch-pad, or the like, that specifies the sub-category from the drop-down list, or the like, in the new incident addition page 700.

Figure 8:
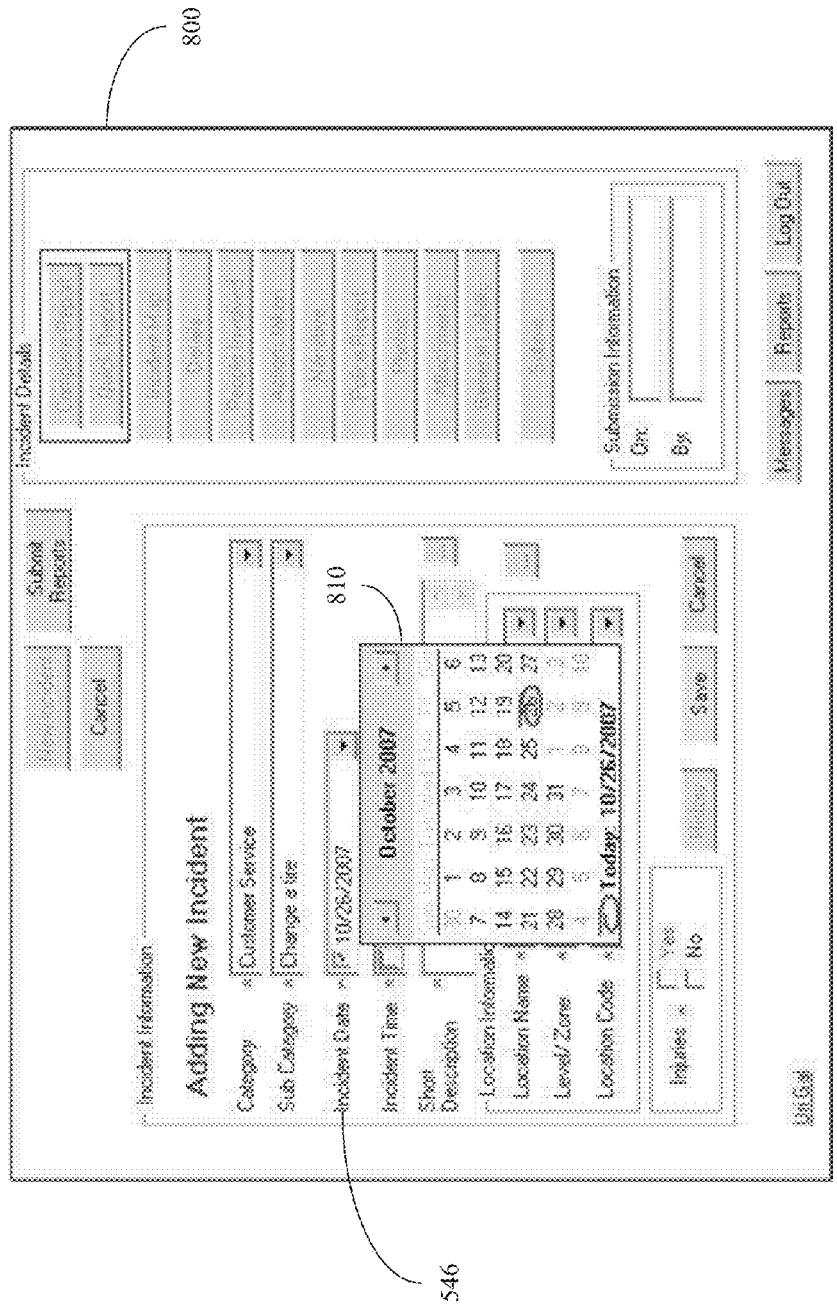
FIG. 8 illustrates a new incident addition page in accordance with an embodiment of the present invention that shows a selection of an incident date for a new incident.

FIG. 8 illustrates a new incident addition page 800 in accordance with an embodiment of the present invention that shows a selection of an incident date for a new incident. The new incident addition page 800 is similar to the new incident addition page 600 of FIG. 6. The new incident addition page 800 includes the incident date section 546. In various embodiments, when a drop-down arrow of the incident date section 546 is selected using a keyboard, a mouse, a touch-pad, or the like, a calendar window 810 is displayed that allows for selection of a date from a calendar to be associated with the new incident. With reference to FIGS. 3 and 8, in various embodiments, the client computer 321 receives input that specifies a date from the calendar in the calendar window 810. In various other embodiments, the client computer 321 receives input that specifies a date that is typed in by a user. In some embodiments, the date indicated in the incident date section 546 represents a date on which the incident occurred. Also, in some embodiments, the date is specified in terms of a month, a day of the month, and a year.

Figure 9:
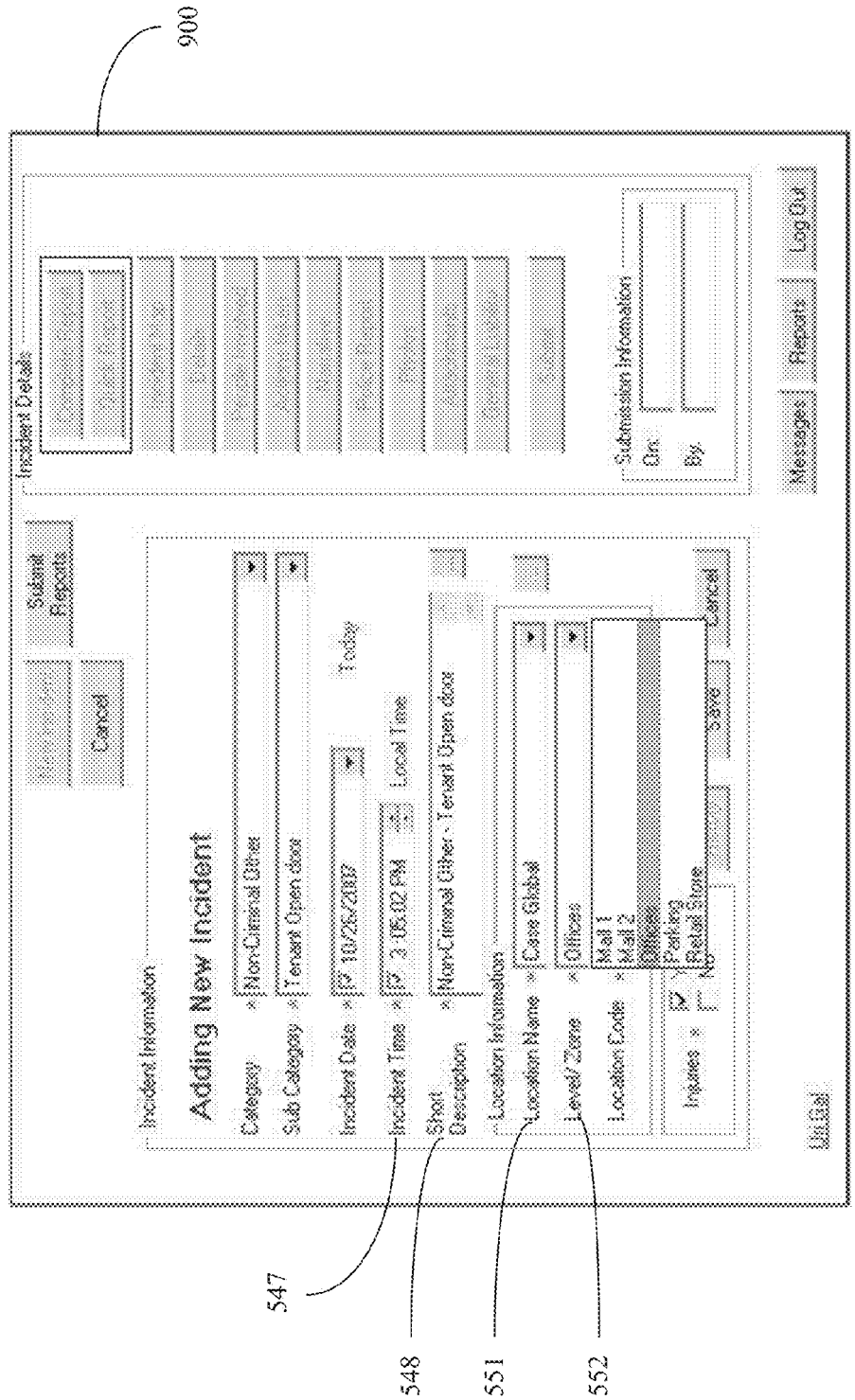
FIG. 9 illustrates a new incident addition page in accordance with an embodiment of the present invention that shows a designation of an incident time, a short description, a name of a facility, and a level or zone within the facility associated with a new incident.

FIG. 9 illustrates a new incident addition page 900 in accordance with an embodiment of the present invention that shows a designation of an incident time, a short description, a name of a facility, and a level or zone within the facility associated with a new incident. The new incident addition page 900 is similar to the new incident addition page 600 of FIG. 6. The new incident addition page 900 includes the incident time section 547, the description section 548, the location name section 551, and the level/zone section 552. With reference to FIGS. 3 and 9, in various embodiments, the client computer 321 is programmed to receive input that specifies a time in the incident time section 547, such as by receiving keyboard input that specifies the time, or by receiving clicks on arrows that allow for scrolling an input time up or down. In some embodiments, the time indicated in the incident time section 547 represents an approximate time at which the incident occurred. Also, in some embodiments, the time is specified in terms of hours, minutes, and seconds in a reference time zone.

In various embodiments, the client computer 321 is programmed to receive input that specifies a short description of the new incident in the description section 548. The description section 548 may include, for example, a text box in which a short description of the new incident may be typed. In some embodiments, a default short description is provided in the description section 548 that describes the category and sub-category of the new incident specified in the main category section 543 (refer to FIG. 7) and the sub-category section 544 (refer to FIG. 7), respectively.

In various embodiments, the client computer 321 is programmed to receive input that specifies a facility at which the new incident occurred in the location name section 551. Examples of types of facilities include shopping centers, malls, office buildings, apartment buildings, assembly plants, schools, hospitals, airports, casinos, churches, and the like. Each facility at which incidents are tracked may be provided with a name. For example, a mall in New York may be named the New York Center. In various embodiments, the location name section 551 includes a drop-down list with names of facilities. In some embodiments, the names of facilities provided in the drop-down list in the location name section 551 may be different for different companies and organization and may depend on the company code entered in the company code section 440 of the log-in page 400 (refer to FIG. 4). For example, a company may have stores at various malls, and the drop-down list in the location name section 551 for users associated with the company may have names of the malls at which the company stores are located. Thus, in various embodiments, the location name section 551 allows for associating the new incident with a facility.

In various embodiments, the client computer 321 is programmed to receive input that specifies a level or zone within the facility at which the new incident occurred in the level/zone section 552. For example, if a facility associated with the new incident is a mall, the level/zone section 552 may allow for specifying a first level of the mall, a second level of the mall, an offices zone, a parking lot zone, a retail store zone, or the like, at which the incident occurred. In various embodiments, the level/zone section 552 includes a drop-down lists with names of levels and/or zones. In some embodiments, the levels and/or zones provided in the drop-down list of the level/zone section 552 are based on the facility specified in the location name section 551.

In various embodiments, the incident time entered in the incident time section 547, the short description entered in the description section 548, the facility name specified in the location name section 551, and the level or zone specified in the level/zone section 552 are provided from the client computer 321 to the web server 310. The web server 310 may be programmed to receive the incident time, short description, facility name, and level or zone from the client computer 321, and to generate one or more commands to store that information in the first SQL server 340A in a database in association with the incident ID for the new incident.

Figure 10:
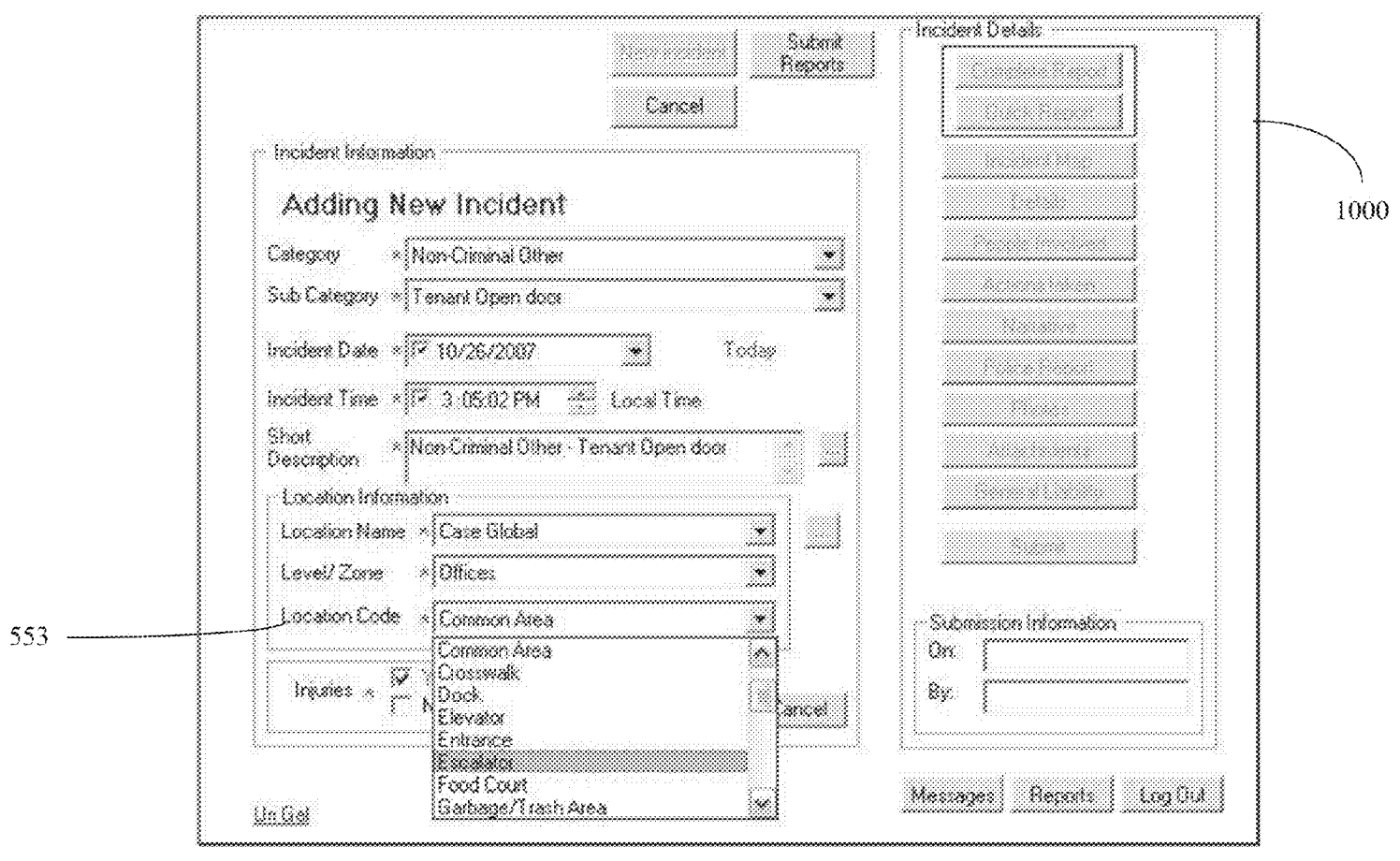

FIG. 10 illustrates a new incident addition page 1000 in accordance with an embodiment of the present invention that shows a selection of a location code for a new incident. The new incident addition page 1000 is similar to the new incident addition page 600 of FIG. 6. The new incident addition page 1000 includes the location code section 553. With reference to FIGS. 3 and 10, in various embodiments, the client computer 321 is programmed to receive input that specifies a location code for the new incident from a drop-down list of available location codes in the location code section 553. In some embodiments, the list of available location codes in the location code section 553 may specify particular areas in the level or zone of the facility specified in the level/zone section 552 (refer to FIG. 9) and the location name section 551 (refer to FIG. 9), respectively. For example, as illustrated in FIG. 10, the location code section 553 may specify available location codes, such as common area, crosswalk, dock, elevator, entrance, escalator, food court, garbage/trash area, or the like. In various embodiments, the location code specified in the location code section 553 is provided from the client computer 321 to the web server 310. The web server 310 may be programmed to receive the location code and to generate one or more commands to store the location code in the first SQL server 340A in a database in association with the incident ID for the new incident.

Figure 11:
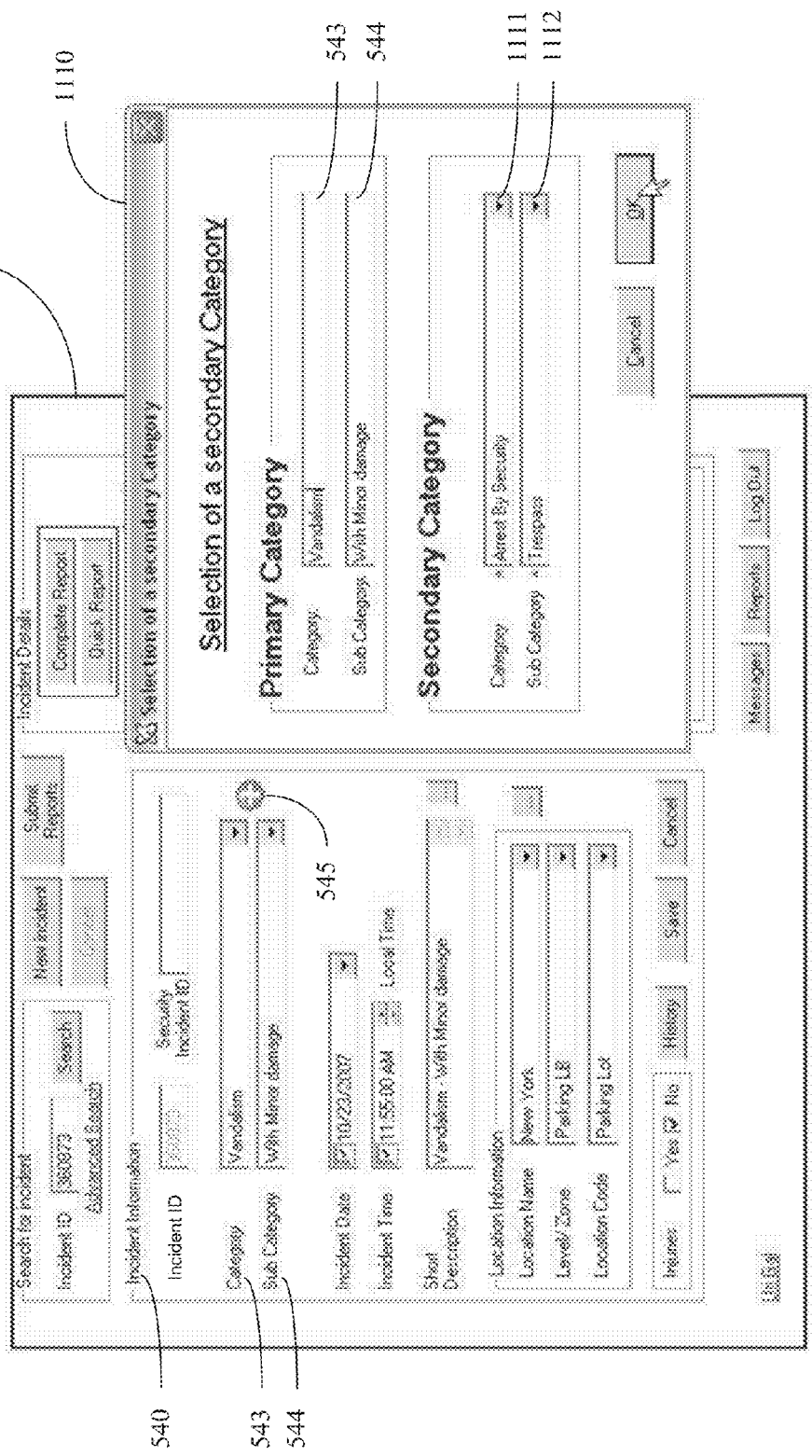
FIG. 11 illustrates an incident page with a secondary main category pop-up window in accordance with an embodiment of the present invention for specifying a secondary main category and secondary sub-category for an incident.

FIG. 11 illustrates an incident page 1100 with a secondary main category pop-up window 1110 in accordance with an embodiment of the present invention for specifying a secondary main category and secondary sub-category for an incident. The incident page 1100 is similar to the incident page 500 of FIG. 5 and includes the incident information section 540 with the main category section 543, the sub-category section 544, and the secondary main category button 545. In the example illustrated in FIG. 11, the main category for the currently displayed incident is provided as vandalism, and the sub-category for the currently displayed incident is provided as with minor damage. With reference to FIGS. 3 and 11, in various embodiments, when the secondary main category button 545 is selected using a keyboard, a mouse, a touch-pad, or the like, of the client computer 321, the client computer 321 displays the secondary main category pop-up window 1110 to allow for selection of a secondary main category and a secondary sub-category for the currently displayed incident.

In various embodiments, the secondary main category pop-up window 1110 includes the main category section 543 and the sub-category section 544 that reproduce the main category and sub-category from the main category section 543 and the sub-category section 544 of the incident page 1100. Also, in various embodiments, the secondary main category pop-up window 1110 includes a secondary main category section 1111 and a secondary sub-category section 1112. In various embodiments, the secondary main category section 1111 includes a drop-down list, or the like, with available categories to select for the secondary main category of the currently displayed incident. In some embodiments, the list of available categories for the secondary main category may be a same list as a list of available categories provided in the main category section 543 for the main category. In some embodiments, the available categories may be customized for various companies and organizations, and the available categories may be based on a company code entered in the company code section 440 of the log-in page 400 of FIG. 4. In such embodiments, the web server 310 may be programmed to issue a query to the first SQL server 340A to retrieve a list of categories for a given company code, and then to form the secondary main category pop-up window 1110 using the retrieved list of categories.

In various embodiments, in a case where the secondary main category for the currently displayed incident has been selected, the available secondary sub-categories provided in the secondary sub-category section 1112 are based on the secondary main category specified in the secondary main category section 1111. In some embodiments, the secondary sub-category section 1112 includes a drop-down list with the available secondary sub-categories. In various embodiments, the client computer 321 receives input from a keyboard, a mouse, a touch-pad, or the like, that specifies the secondary sub-category from the drop-down list, or the like, in the secondary main category pop-up window 1110. In various embodiments, the client computer 321 is programmed to provide the secondary main category specified in the secondary main category section 1111 and the secondary sub-category specified in the secondary sub-category section 1112 to the web server 310. The web server 310 may be programmed to receive the secondary main category and the secondary sub-category and to generate one or more commands to store that information in the first SQL server 340A in a database in association with the incident ID for the currently displayed incident.

Thus, various embodiments of the present invention allow for specifying a main category for an incident, a sub-category within the main category for the incident, a secondary main category for the incident, and a secondary sub-category within the secondary main category for the incident. For instance, in the example illustrated in FIG. 11, a main category of vandalism and a sub-category of with minor damage have been selected for an incident, while a secondary main category of arrest by security and a secondary sub-category of trespass have been selected for the incident. With a secondary main category, more than one category is able to be associated with an incident, which may aid in tracking statistics for incident types. In further embodiments, more than two main categories and more than two sub-categories may be associated with each incident.

Figure 12:
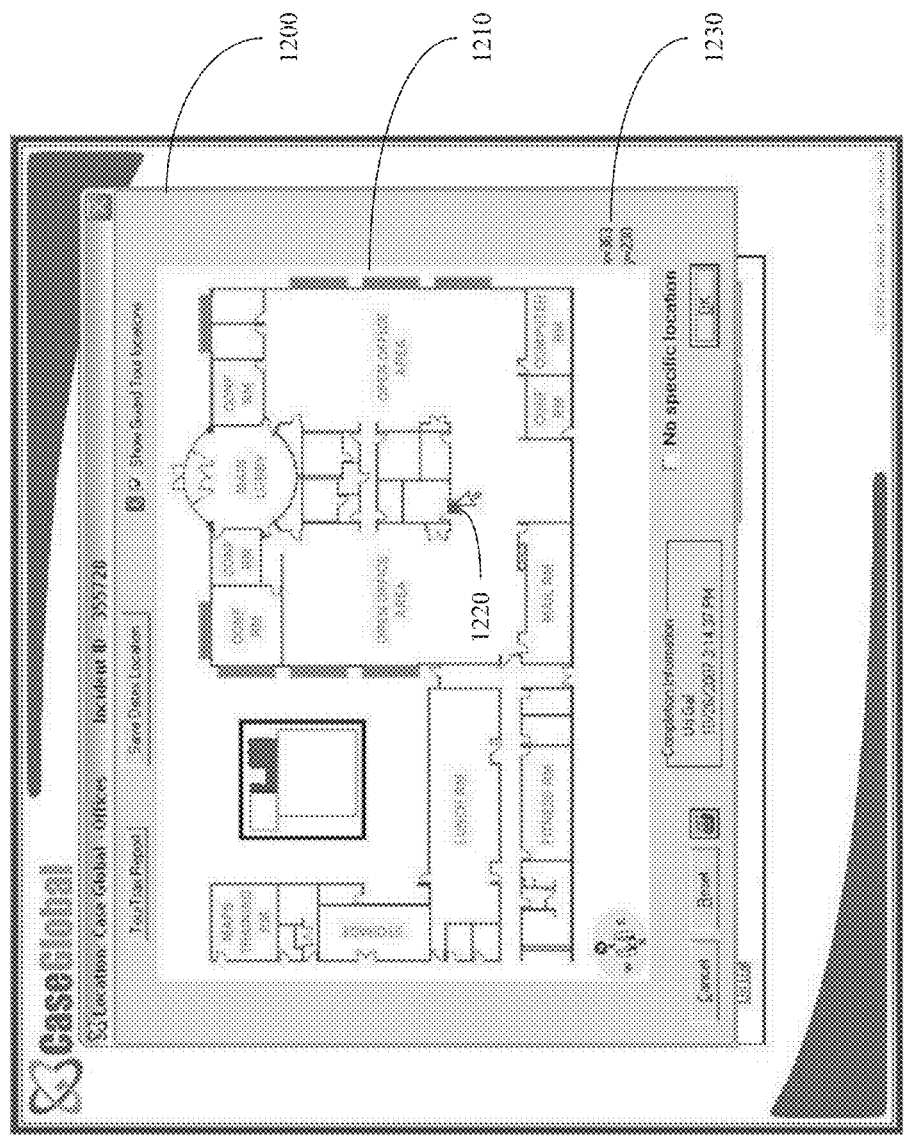
FIG. 12 illustrates a location map page in accordance with an embodiment of the present invention for specifying a position at a facility that is associated with an incident.

FIG. 12 illustrates a location map page 1200 in accordance with an embodiment of the present invention for specifying a position at or near a facility that is associated with an incident. With reference to FIGS. 3, 5, and 12, in various embodiments the client computer 321 is programmed to display the location map page 1200 in a case where the incident map button 511 is pressed on the incident page 500. In various embodiments, the web server 310 is programmed to generate the location map page 1200 based on one or both of the location name specified in the location name section 551 and the level or zone specified in the level/zone section 552 for a currently displayed incident in the incident page 500. In such embodiments, the web server 310 may then provide the information for the location map page 1200 to the client computer 321 to be displayed by the client computer 321. In some embodiments, the location map page 1200 includes a map 1210 of at least a portion of a facility specified by the location name section 551 of the incident page 500 for an incident.

In various embodiments, the client computer 321 is programmed to receive input that specifies a position associated with the incident at or near the facility. In some embodiments, the position is specified by positioning a cursor over the map 1210 on a display screen of the client computer 321 using, for example, a mouse, a touch-pad, or the like, and then receiving a mouse click, or the like, to place an icon 1220 at specified coordinates 1230 represented by the location of the cursor over the map 1210. In various embodiments, the client computer 321 may be programmed to send the coordinates 1230 of the icon 1220 with respect to the map 1210 to the web server 310, and the web server 310 may be programmed to issue one or more commands to cause the first SQL server 340A to save the coordinates in a database in association with other information for the incident. In some embodiments, the icon 1220 may be placed on the map 1210 at an approximate position of occurrence of the incident at the facility represented by the map 1210. Thus, various embodiments allow for receiving input that specifies information about a position at or near a facility at which an incident has occurred.

The example provided in FIG. 12 is an example where a location name of Case Global has been provided in the location name section 551 of FIG. 5 and a zone of Offices has been provided in the level/zone section 552 of FIG. 5, such that when the incident map button 511 of FIG. 5 is pressed, the map 1210 in the location map page 1200 displayed by the client computer 321 is a map of the offices of the Case Global facility. In the example of FIG. 12, the icon 1220 is then placed using a cursor at the coordinates 1230 of (x=363, y=230) with respect to the map 1210, which associates the incident with a position in an open office area of the offices of the Case Global facility. Also, in the example, the coordinates may then be transmitted from the client computer 321 to the web server 310, and the web server 310 may then cause the coordinates to be stored by the first SQL server 340A in association with information related to the incident.

Figure 13:
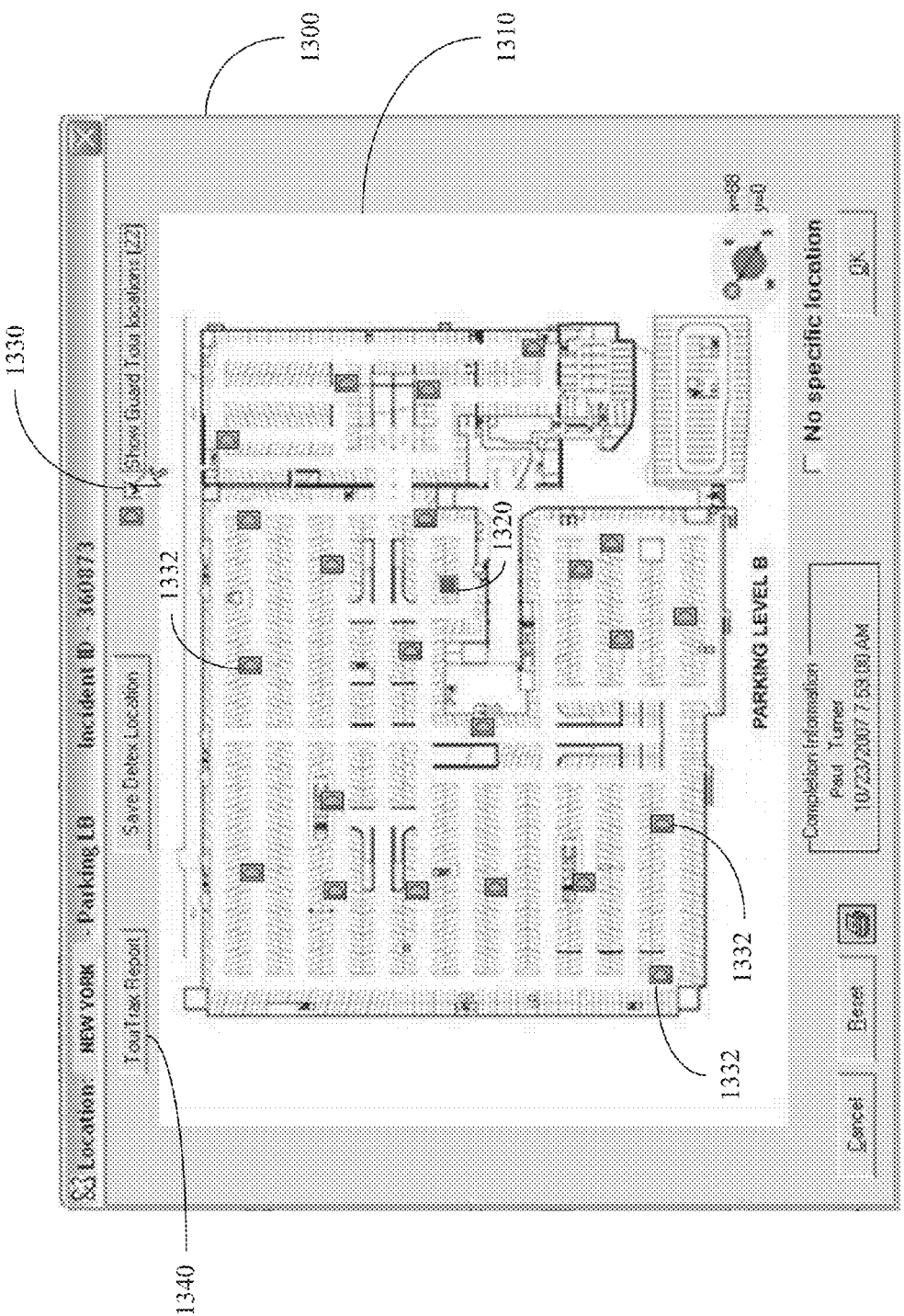
FIG. 13 illustrates another location map page in accordance with an embodiment of the present invention for specifying a position at a facility that is associated with an incident.

FIG. 13 illustrates another location map page 1300 in accordance with an embodiment of the present invention for specifying a position at a facility that is associated with an incident. The example location map page 1300 illustrated in FIG. 13 includes a map 1310 of a parking level B of a New York facility. In the example, a position of an incident at the parking level B of the New York facility is indicated by the icon 1320 on the map 1310. In various embodiments, the location map page 1300 further includes a guard tour check box 1330, or the like, for indicating whether or not to show guard tour locations on the map 1310. The guard tour locations represent locations that a security guard may visit during a tour of the facility. In the example of FIG. 13, the guard tour check box 1330 is checked and, thus, the guard tour locations are indicated by icons, such as icons 1332, on the map 1310. In a case where the guard tour check box 1330 is unchecked, the icons of the guard tour locations, such as the icons 1332, would be removed from the map 1310. In some embodiments, the location map page 1300 further includes a report button 1340, or the like, that when pressed causes a guard tracking report related to the facility represented by the map 1310 to be displayed. Example guard tracking reports for security guard tours of a facility are discussed below with reference to FIGS. 14 and 15.

In various embodiments, information from security guard tours may be stored by a guard tracking system (not shown), such as the TourTrax system provided by Digital Security Concepts Inc. that records activities of security guards as they go on patrols around facilities. Some guard tracking systems (not shown) include buttons, barcodes, or the like, that can be placed at various checkpoint locations around a facility, and allow for a security guard to carry a wand or other similar device that records data for later download or wirelessly reports information upon interaction with the buttons, barcodes, or the like. For example, information such as a time a security guard was at the location of a button, an order in which buttons at a facility were visited by the security guard, or the like, may be stored for later retrieval.

Figure 14:
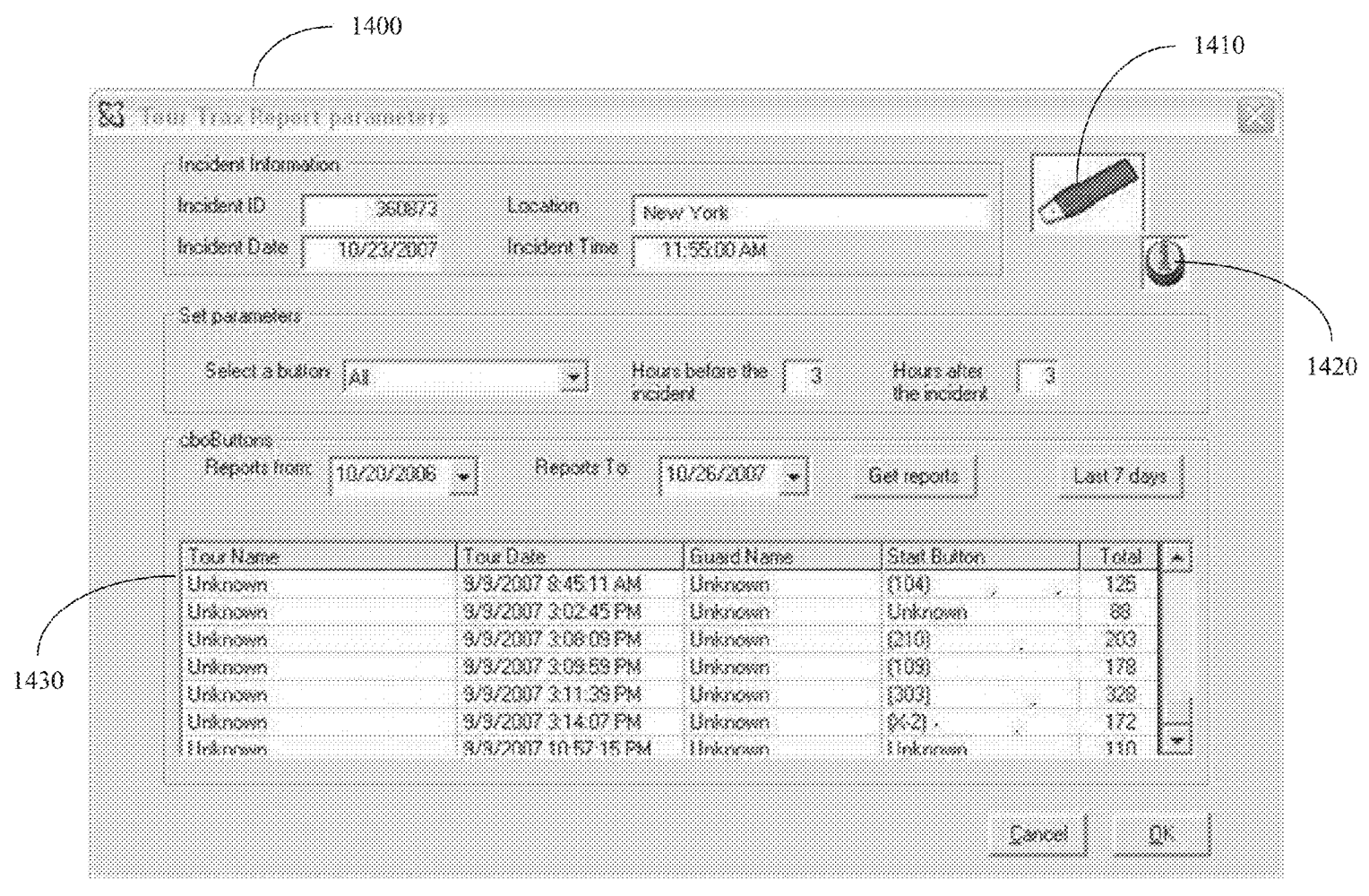

FIG. 14 illustrates a guard tracking report parameters page 1400 in accordance with an embodiment of the present invention for specifying guard tracking report parameters. In various embodiments, guard tracking reports provide reports of tours of security guards around facilities, where each security guard carries a corresponding wand, as illustrated by a wand 1410, and each security guard uses the wand to touch or pass over buttons, as illustrated by a button 1420, that are located in various locations around a facility. In various embodiments, each time a security guard touches a wand to a button at a facility, the button sends a signal to a guard tracking system (not shown) that records a time the button was touched and the security guard associated with the wand, if known.

With reference to FIGS. 3, 13, and 14, in various embodiments, the web server 310 interfaces with the guard tracking system (not shown) to obtain guard tracking reports for security guard tours. In various embodiments, the client computer 321 is programmed to send a request to the web server 310 for guard tracking reports when the report button 1340 of the location map page 1300 is pressed. In some embodiments, the web server 310 is programmed to provide the guard tracking report parameters page 1400 to the client computer 321 upon receiving the request for guard tracking reports from the client computer 321. Also, in some embodiments, the guard tracking report parameters page 1400 is generated to show security guard tours that occurred on a date and time that are near an incident date and incident time associated with an incident whose position is mapped in the location map page 1300. For example, the guard tracking report parameters page 1400 may provide a list of tours 1430 with associated tour dates and times that occurred within a particular number of hours before the incident time and within a specific number of hours after the incident time. In various embodiments, the list of tours 1430 includes, for each tour in the list, a tour name, a tour date, a guard name of a security guard associated with the tour, a start button indicating a button at the facility where the tour started, and a number indicating a total number of buttons touched on the tour. In various embodiments, the client computer 321 may be programmed to allow for selection of any tour from the list of tours 1430 to provide a full report of the tour.

Figure 15:
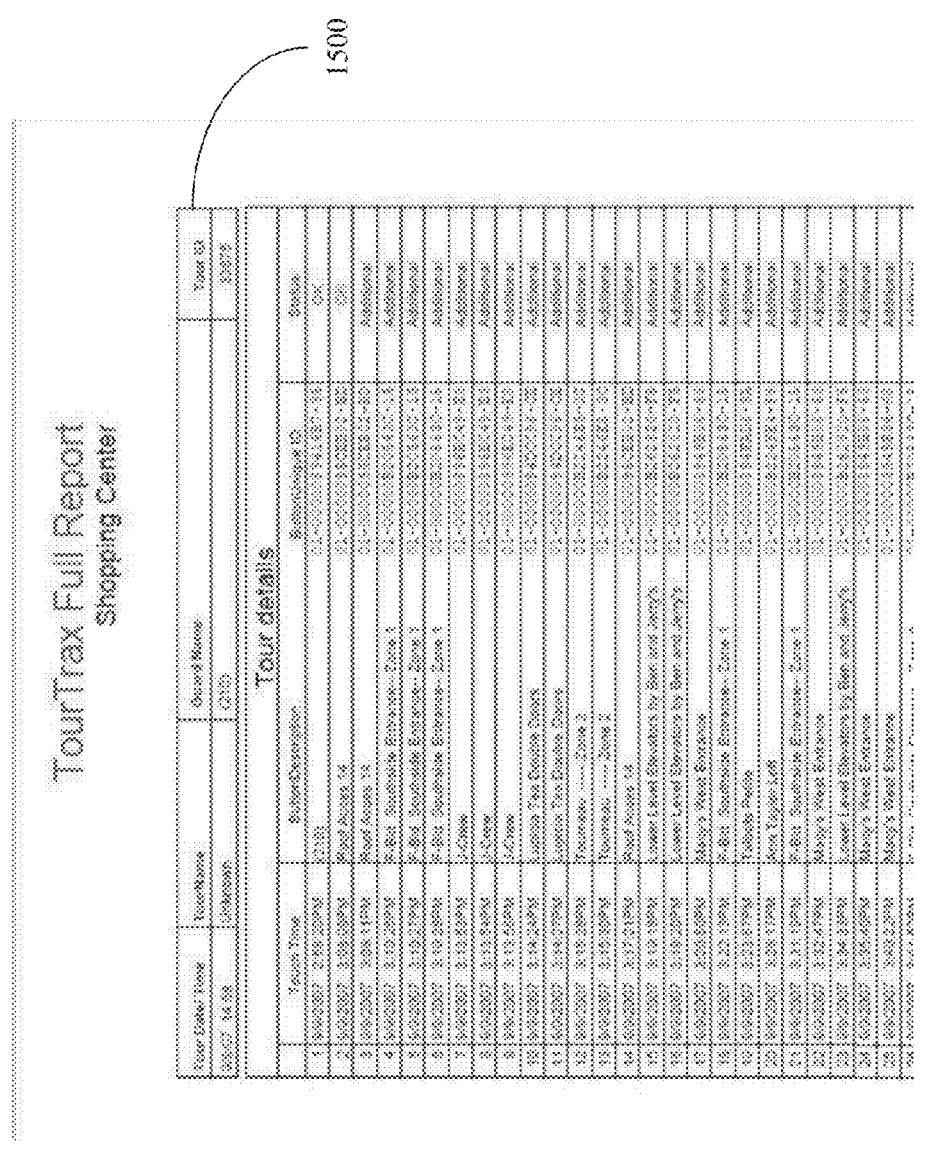

FIG. 15 illustrates a guard tracking report 1500 in accordance with an embodiment of the present invention for providing details of a security guard tour around a facility. With reference to FIGS. 3, 14, and 15, in various embodiments, the client computer 321 is programmed to send a request to the web server 310 for a guard tracking report in a case where a tour is selected by a user from the list of tours 1430 of the guard tracking report parameters page 1400. In various embodiments, the web server 310 is programmed to send the requested guard tracking report, such as the guard tracking report 1500, to the client computer 321 in response to the request from the client computer 321.

In some embodiments, the guard tracking report 1500 includes information about a tour date and time, a tour name, a guard name of a guard associated with the tour, a tour ID that is a unique identifier of the tour, and a list of tour details. The list of tour details may include, for example, a touch time indicating a time that each button is touched by the guard on the tour, a description of the button touched such as a location or store near the button, a button ID that is a unique identifier of the button, and a status indicating whether the guard found everything to be "ok" at that time or whether the guard provided additional information. In various embodiments, by reviewing a guard tracking report for a facility, such as the guard tracking report 1500, it can be determined where a security guard was approximately located when an incident occurred at the facility.

Figure 16:
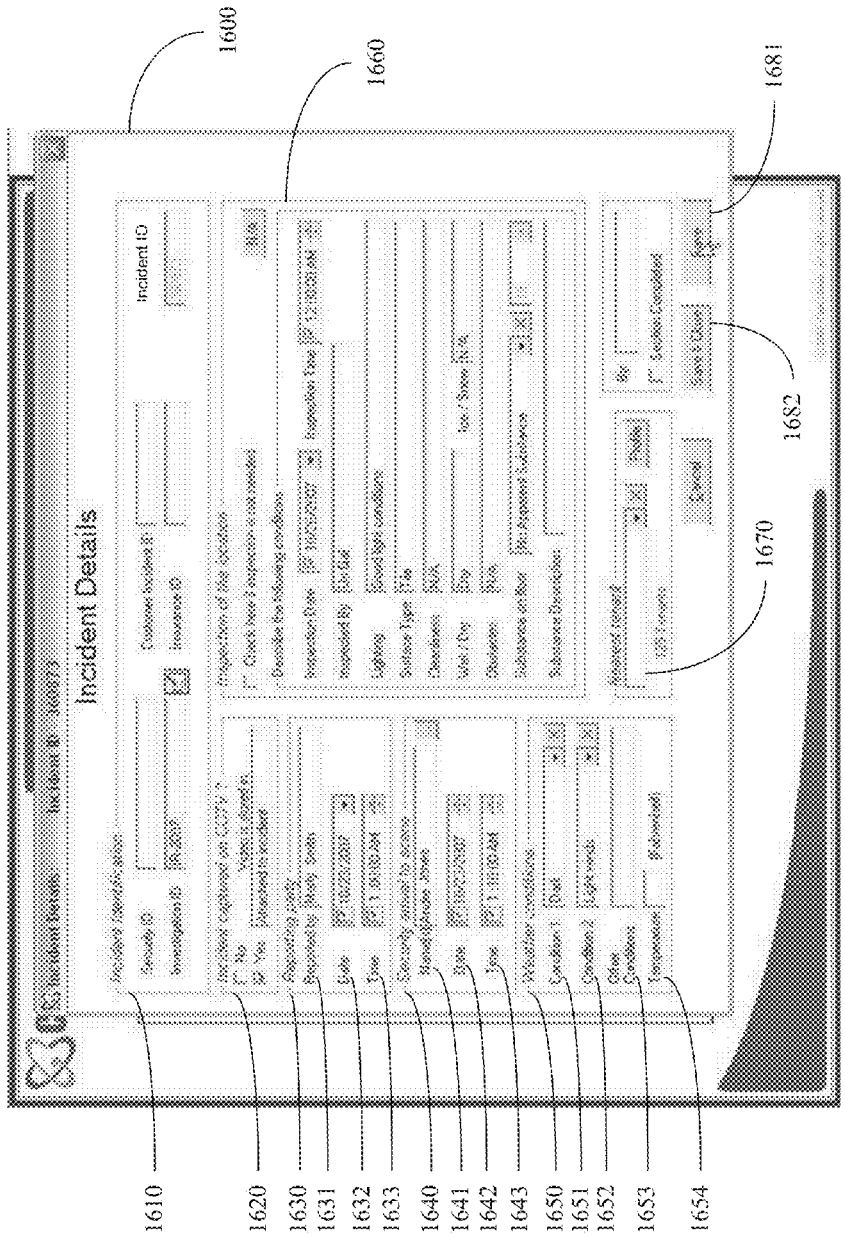
FIG. 16 illustrates an incident details page in accordance with an embodiment of the present invention for specifying details related to an incident that occurred at a facility.

FIG. 16 illustrates an incident details page 1600 in accordance with an embodiment of the present invention for specifying details related to an incident that occurred at a facility. With reference to FIGS. 3, 5, and 16, in various embodiments the web server 310 is programmed to provide the incident details page 1600 to the client computer 321 in a case where the client computer 321 receives input from the details button 512 of the incident page 500 being pressed, and the client computer 321 is programmed to display the incident details page 1600. The client computer 321 may be programmed to receive input specifying details of an incident in the incident details page 1600 and to send the input to the web server 310. The web server 310 may be programmed to generate one or more commands to cause the first SQL server 340A to save the input in a database in association with information related to the incident. In various embodiments, the incident details page 1600 includes an incident identification section 1610, an incident captured section 1620, a reporting party section 1630, a security arrival section 1640, a weather conditions section 1650, an inspection section 1660, a nearest tenant section 1670, a save button 1681, and a save and close button 1682.

In various embodiments, the incident identification section 1610 includes an incident ID section for indicating the incident ID of the currently displayed incident, a security ID section, an investigation ID section, a customer incident ID section, and an insurance ID section. The security ID section may include a text box, or the like, for inputting an identifier provided by security personnel for the incident. The investigation ID section may include a text box, or the like, for inputting an identifier specifying an investigation number of an investigation related to the incident. The customer incident ID section may include a text box, or the like, for inputting an identifier supplied by a customer for the incident. The insurance ID section may include a text box, or the like, for inputting an identifier supplied by an insurance company for the incident. Thus, in some embodiments, the currently displayed incident may be associated with more than one identifier.

In various embodiments, the incident captured section 1620 includes check boxes, or the like, for indicating whether or not the currently displayed incident was captured on closed-circuit television (CCTV). In various embodiments, there may be cameras located at various positions at a facility, and the cameras may capture video of an incident as it is occurring. In a case where the currently displayed incident has been captured on video, a check mark may be placed in a "yes" box of the incident captured section 1620. In some embodiments, the incident captured section 1620 further includes a text box, or the like, for receiving information indicating where the video of the incident is stored.

In various embodiments, the reporting party section 1630 includes a reported by section 1631, a reporting date section 1632, and a reporting time section 1633. The reported by section 1631 may include a text box, or the like, for receiving input that specifies a person who reported the incident. The reporting date section 1632 may include a text box, a drop-down calendar, or the like, for receiving input that specifies a date on which the incident was reported. The reporting time section 1633 may include a text box, a scrollable time field, or the like, for receiving input that specifies a time at which the incident was reported.

In various embodiments, the security arrival section 1640 includes a security personnel name section 1641, a security arrival date section 1642, and a security arrival time section 1643. The security personnel name section 1641 may include a text box, or the like, for receiving input that specifies names of security personnel that arrived at the scene of the incident. The security arrival date section 1642 may include a text box, a drop-down calendar, or the like, for receiving input that specifies a date on which the security personnel arrived at the scene of the incident. The security arrival time section 1643 may include a text box, a scrollable time field, or the like, for receiving input that specifies a time at which the security personnel arrived to the scene of the incident.

In various embodiments, the weather conditions section 1650 includes a first condition section 1651, a second condition section 1652, an other conditions sections 1653, and a temperature section 1654. The first condition section 1651 and the second condition section 1652 may include a drop-down list, or the like, for specifying weather conditions at the time of the incident. For example, weather conditions may include dark, light, cloudy, rainy, light winds, heavy winds, snowing, or the like. The other conditions section 1653 may include a text box, or the like, for specifying other weather conditions present during the incident. The temperature section 1654 may include a text box, or the like, for specifying a temperature that existed at a time of occurrence of the incident.

In various embodiments, the inspection section 1660 includes input fields for providing results of an inspection of a location where the incident occurred. In some embodiments, the inspection section 1660 includes fields for specifying an inspection date and time at which the incident location was inspected. Also, in some embodiments, the inspection section 1660 includes fields for specifying a name of a person who inspected the location where the incident occurred, a condition of lighting at the location at a time of occurrence of the incident, a surface type of a walking surface at the location, an indication of cleanliness at the location, an indication of whether the location was wet or dry, an indication of whether there was ice or snow at the location, an indication of whether there were obstacles at the location, an indication of whether there were substances on a floor at the location, and a description of the substances in a case where there were substances on the floor.

In various embodiments, the nearest tenant section 1670 includes a drop-down list, or the like, for specifying a nearest tenant at the facility to a position where the incident occurred. In various embodiments, the web server 310 provides the incident details page 1600 such that the drop-down list for the nearest tenant section 1670 is based on the facility specified in the location name section 551 of the incident page 500 when the details button 512 of the incident page 500 is pressed. The selection of a nearest tenant to a position of an incident is further discussed below with reference to FIG. 17.

In various embodiments, the client computer 321 is programmed such that the client computer 321 sends information concerning incident details for an incident entered in the incident details page 1600 to the web server 310 when the save button 1681 or the save and close button 1682 of the incident details page 1600 is pressed. In various embodiments, the client computer 321 may be further configured to close the incident details page 1600 when the save and close button 1682 is pressed. In various embodiments, the web server 310 may be programmed to receive the incident details for the incident from the client computer 321 and to generate one or more commands to cause the first SQL server 340A to save the incident details in a database in association with other information related to the incident.

Figure 17:
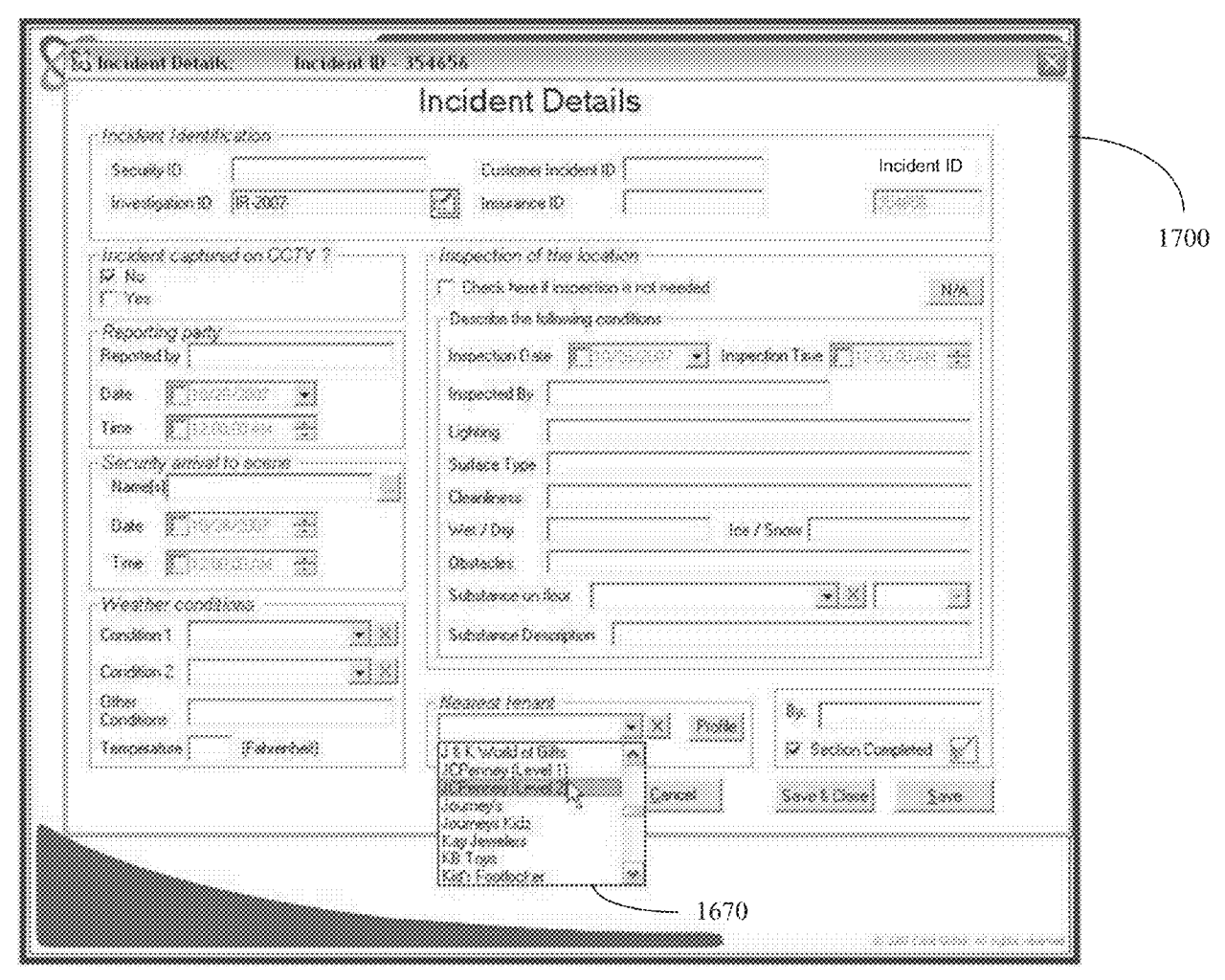

FIG. 17 illustrates an incident details page 1700 in accordance with an embodiment of the present invention that shows a selection of a nearest tenant to a position of an incident at a facility. The incident details page 1700 is similar to the incident details page 1600 of FIG. 16, and the incident details page 1700 includes the nearest tenant section 1670. As illustrated in FIG. 17, the nearest tenant section 1670 may include a drop-down list with a list of names of tenants at a facility where the currently displayed incident occurred. A selection of a nearest tenant to a position of the incident may then be made from the list of tenants in the drop-down list of the nearest tenant section 1670. In various embodiments, the tenants are tenants of the facility, such as businesses with stores at the facility, renters with spaces at the facility, or the like. With reference to FIGS. 3, 12, and 17, in various embodiments, the nearest tenant may be automatically determined by the client computer 321, the web server 310, or the first SQL server 340A based on the position of the incident specified in the location map page 1200 and based on the locations of tenants at the facility.

Figure 18:
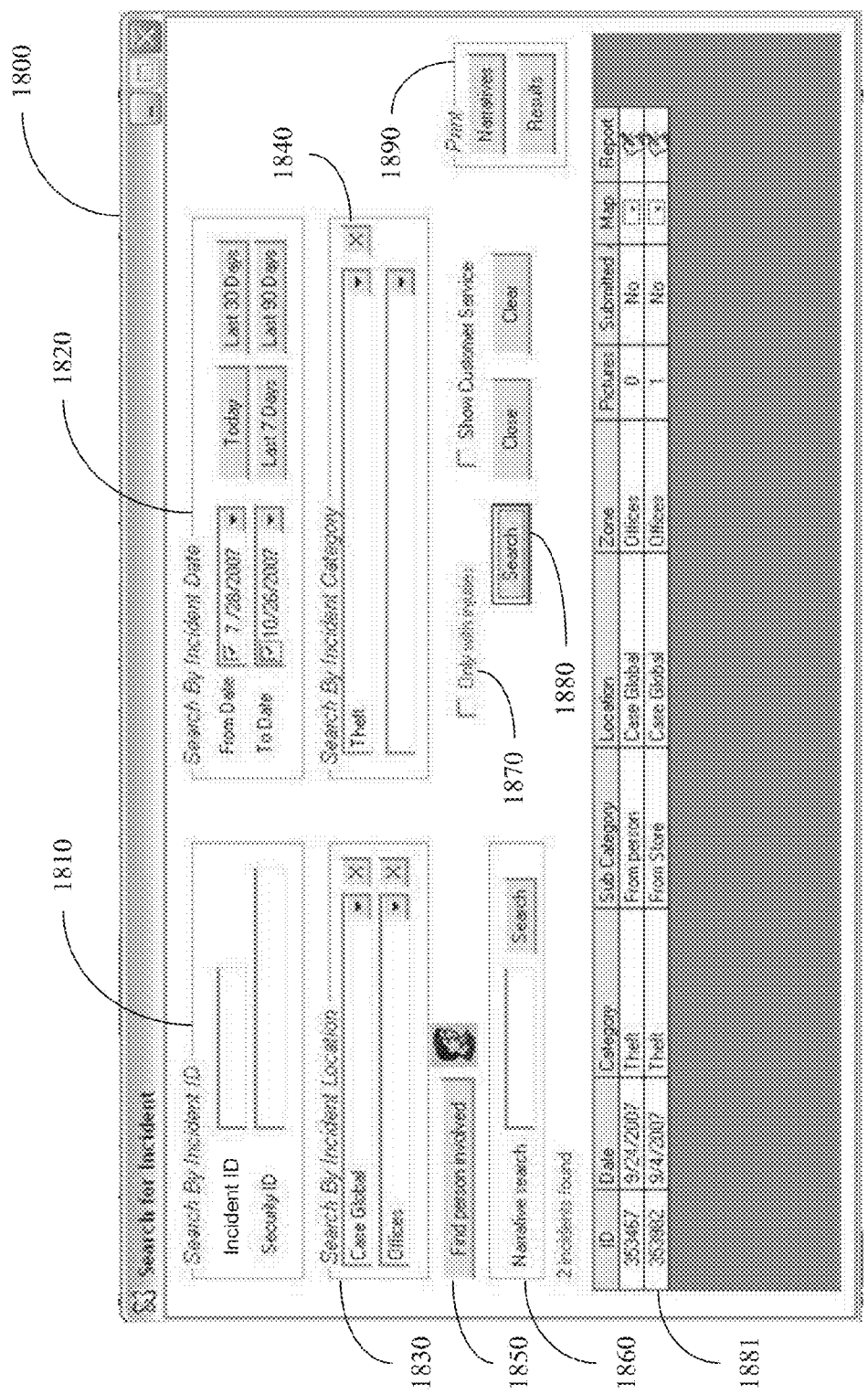
FIG. 18 illustrates a search page in accordance with an embodiment of the present invention for searching for incidents.

FIG. 18 illustrates a search page 1800 in accordance with an embodiment of the present invention for searching for incidents. With reference to FIGS. 3, 5, and 18, in various embodiments, the web server 310 is programmed to send the search page 1800 to the client computer 321 in a case where the advanced search link 533 of the search for incident section 530 of the incident page 500 is clicked by a user. In various embodiments, the search page 1800 includes a search by incident ID section 1810, a search by incident date section 1820, a search by incident location section 1830, a search by incident category section 1840, a find person involved button 1850, a narrative search section 1860, an only with injuries section 1870, a search button 1880, a search results list section 1881, and a print section 1890.

In various embodiments, the search by incident ID section 1810 includes one or more text boxes, or the like, for entering identification numbers for searching for incidents. For example, the search by incident ID section 1810 may include an incident ID section for entering an incident ID, and may include a security ID section for entering a security ID. In various other embodiments, further fields may be added for searching based on other identifiers, such as an investigation ID, a customer incident ID, an insurance ID, or the like. In various embodiments, in a case where one or more identification numbers are entered in the search by incident ID section 1810 and a search is performed, the search results provides incidents associated with the identification numbers.

In various embodiments, the search by incident date section 1820 includes one or more fields for specifying a date search range. For example, the search by incident date section 1820 may include a "from date" field and a "to date" for specifying a date search range. In some embodiments, the search by incident date section 1820 further includes one or more buttons with customized date search ranges, such as today, last 7 days, last 30 days, last 90 days, or the like. In various embodiments, in a case where a date search range is specified in the search by incident date section 1820 and a search is performed, the search results provides incidents that occurred within the date search range.

In various embodiments, the search by incident location section 1830 includes a field for specifying a name of a facility and a field for specifying a level or zone within the facility. For example, the search by incident location section 1830 may include a drop-down list for specifying a name of a facility and a drop-down list for specifying a level or zone within the facility. In various embodiments, in a case where a name of a facility is specified in the search by incident location section 1830 and a search is performed, the search results provides incidents that occurred at the facility. Also, in various embodiments, in a case where a name of a facility and a level or zone are specified in the search by incident location section 1830 and a search is performed, the search results provides incidents that occurred at the facility and within the level or zone.

In various embodiments, the search by incident category section 1840 includes fields for specifying a main category and a sub-category within the main category. For example, the search by incident category section 1840 may include a drop-down list for selecting a main category and a drop-down list for selecting a sub-category within the main category. In various embodiments, in a case where a particular main category is specified in the search by incident category section 1840 and a search is performed, the search results provides incidents associated with main categories that match the particular main category and also provides incidents associated with secondary main categories that match the particular main category. Also, in various embodiments, in a case where a particular main category and a particular sub-category are specified in the search by incident category section 1840 and a search is performed, the search results provides incidents associated with main categories and sub-categories that match the particular main category and particular sub-category and also provides incidents associated with secondary main categories and secondary sub-categories that match the particular main category and particular sub-category.

In various embodiments, in a case where the find person involved button 1850 is pressed, a pop-up window is displayed that allows for searching for people involved in incidents. In various embodiments, the narrative search section 1860 includes a text box, or the like, for receiving search words to be searched for in narratives related to incidents. In some embodiments, the only with injuries section 1870 includes a check box, or the like, for indicating whether or not the search results should only include incidents in which there were injuries.

It should be appreciated that, in various embodiments, one or more sections of the search page 1800 may be filled-out for a search. For example, a search may be performed for a location and within a specified date range. Also, for example, a search may be performed for incidents associated with a particular category that occurred at a particular facility and that resulted in injuries. Thus, in some embodiments, various combinations of fields in the search page 1800 may be filled-out for a single search.

In various embodiments, the client computer 321 is programmed such that the client computer 321 sends search information entered in the fields of the search page 1800 to the web server 310 in a case where the search button 1880 is pressed. Also, in various embodiments, the web server 310 is programmed such that the web server 310 generates one or more SQL queries to send to the first SQL server 340A based on the search information received from the client computer 321. In various embodiments, the first SQL server 340A is programmed to search a database based on the one or more SQL queries received from the web server 310 and to provide search results to the web server 310 in response to the one or more SQL queries. Also, in various embodiments, the web server 310 is programmed to send the search results to the client computer 321, and the client computer 321 is programmed to display a list of the search results in the search results list section 1881 of the search page 1800.

In various embodiments, the search results list section 1881 provides, for each incident search result, the incident ID of the incident, the incident date of the incident, the main category of the incident, the sub-category of the incident, the location name of the facility associated with the incident, the level or zone at the facility associated with the incident, an indication of a number of pictures associated with the incident, an indication of whether the incident has been finally submitted in the system, a link to a map showing a position of the incident at the facility, and a link to a report of the incident. In other embodiments, more or fewer fields may be shown in the search results list section 1881. In various embodiments, the print section 1890 provides one or more buttons that allow for printing information related to the search results. For example, the print section 1890 may include a results button that causes the search results to be printed by a printer in a case where the results button is pressed.

Figure 19:
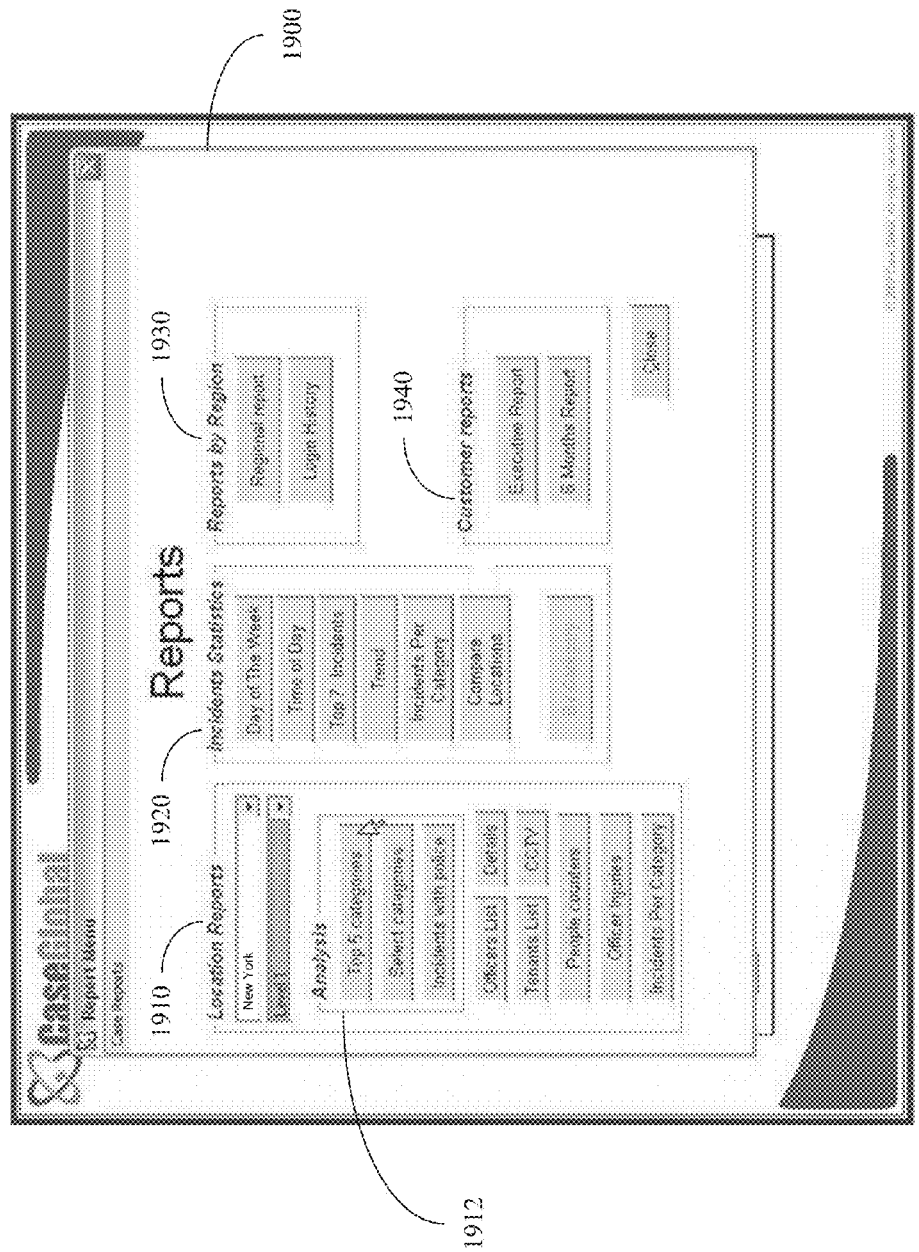
FIG. 19 illustrates a reports menu page in accordance with an embodiment of the present invention for selecting reports to be displayed.

FIG. 19 illustrates a reports menu page 1900 in accordance with an embodiment of the present invention for selecting reports to be displayed. With reference to FIGS. 3, 5, and 19, in various embodiments the web server 310 is programmed to send the reports menu page 1900 to the client computer 321 in a case where the reports button 572 of the incident page 500 is pressed at the client computer 321. In various embodiments, the reports menu page 1900 includes a location reports section 1910, an incident statistics section 1920, a reports by region section 1930, and a customer reports section 1940.

In various embodiments, the location reports section 1910 allows for obtaining reports concerning incidents at a facility. In some embodiments, the location reports section 1910 includes one or more fields for specifying a location name of a facility and a level or zone within the facility. Also, in some embodiments, the location reports section 1910 includes an analysis section 1912 with one or more buttons for selecting reports regarding, for example, a particular number of top categories of incidents at the facility, select categories of incidents at the facility, incidents with police involvement at the facility, or the like. In various embodiments, the location reports section 1910 further includes: (i) an officers list button for providing a report concerning officers at the facility; (ii) a details button for providing details about incidents at the facility; (iii) a tenants list for providing a list of tenants at the facility; (iv) a CCTV button for providing a list of CCTV video links; (v) a people counters button for providing a count of people visiting the facility; (vi) an officer injuries button for providing a report about officer injuries at the facility; and (vii) an incidents per category button for providing a report about a number of incidents at the facility per category.

In various embodiments, the incident statistics section 1920 allows for obtaining statistics concerning incidents at one or more facilities. In some embodiments, the incident statistics section 1920 includes: (i) a day of the week button for providing statistics on incidents by day of week; (ii) a time of day button for providing statistics on incidents by time of day; (iii) a top "n" incidents button for providing statistics on a top "n" categories associated with the most incidents, where "n" is an integer; (iv) a trend button for providing information on incident trends; (v) an incidents per category button for providing statistics on a number of incidents associated with each category; and (vi) a compare locations button for comparing incident statistics between different facilities.

In various embodiments, the reports by region section 1930 includes: (i) a regional report button for providing a report on all facilities within a given region; and (ii) a login history button for providing a history of user log-in information. In various embodiments, the customer reports section 1940 includes: (i) an executive report button for providing a customized executive report for a customer; and (ii) a six months report button for providing a report on incidents related to a particular customer that occurred within the last six months.

Figure 20:
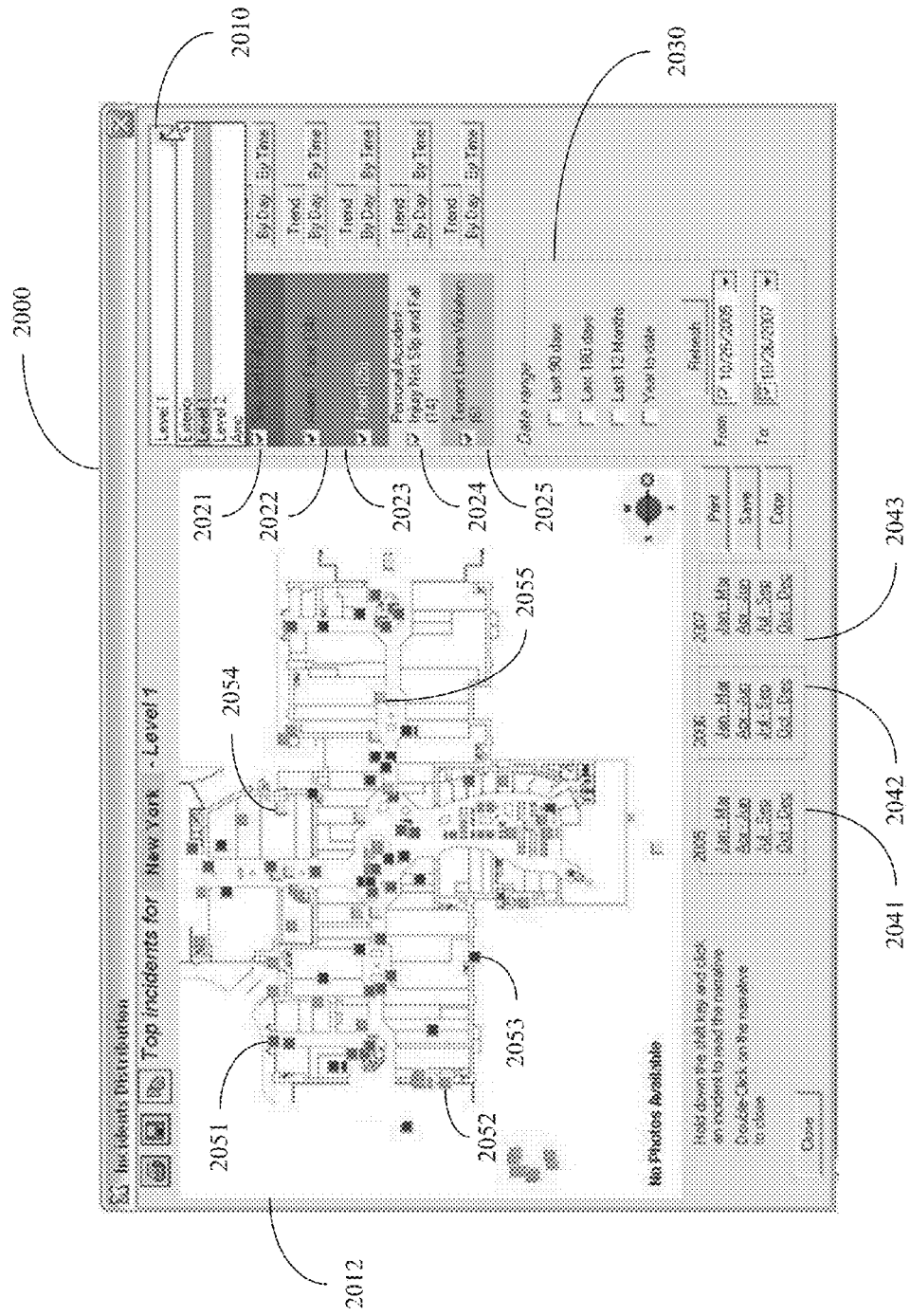
FIG. 20 illustrates an incidents distribution page in accordance with an embodiment of the present invention.

FIG. 20 illustrates an incidents distribution page 2000 in accordance with an embodiment of the present invention. With reference to FIGS. 3, 19, and 20, in various embodiments the client computer 321 is programmed to request an incidents distribution page, such as the incidents distribution page 2000, from the web server 310 in a case where the top five categories button of the analysis section 1912 of the reports menu page 1900 is pressed. Also, in various embodiments, in a case where the top five categories button of the analysis section 1912 is pressed, the client computer 321 sends to the web server 310 the location name of the facility and the level or zone specified in the location reports section 1910 of the reports menu page 1900. In various embodiments, the web server 310 is programmed to receive the request for the top five categories associated with the level or zone of the specified facility, and to generate one or more SQL queries to send to the first SQL server 340A to obtain information on incidents in the five categories associated with the most incidents at the level or zone of the facility. Also, in various embodiments, the web server 310 is programmed to generate an incidents distribution page, such as the incidents distribution page 2000, based on the information returned from the first SQL server 340A in response to the one or more SQL queries, and the client computer 321 is programmed to display the incidents distribution page 2000 received from the web server 310 on a display screen of a display of the client computer 321.

In various embodiments, the incidents distribution page 2000 includes a map 2012 of a level or zone of a facility, a level/zone menu 2010 for changing the map 2012 to a different level or zone of the facility, category legends 2021, 2022, 2023, 2024, 2025, for controlling categories of incidents to be displayed on the map 2012, a date range section 2030 for specifying a date range for incident dates of incidents to be displayed on the map 2012, and pre-set date range sections 2041, 2042, 2043, with pre-set date ranges for incident dates of incidents to be displayed on the map 2012.

In various embodiments, the map 2012 is initially shown as a map of a level or zone of a facility specified in the location reports section 1910 of the reports menu page 1900. In the example illustrated in FIG. 20, the map 2012 defaults to showing a first level of a New York shopping center. Also, in various embodiments, the category legends 2021, 2022, 2023, 2024, 2025, default to showing the top five categories in terms of number of incidents associated with the category for the displayed level or zone of the facility. In some embodiments, when calculating the number of incidents associated with a category, both the main category of an incident and the secondary main category of the incident are used in calculating the totals. In the example illustrated in FIG. 20, the category legends are as follows: (i) a slip and fall category legend 2021; (ii) an alarm-false category legend 2022; (iii) a theft category legend 2023; (iv) a personal accident-injury not slip and fall category legend 2024; and (v) a tenant lease violation category legend 2025.

In various embodiments, the date range section 2030 includes one or more fields for specifying a date range. For example, the date range section 2030 may include a "from date" drop-down calendar for specifying a starting date for a date range and may include a "to date" drop-down calendar for specifying an ending date for the date range. Also, in various embodiments, the date range section 2030 may include one or more check boxes, or the like, for specifying common date ranges, such as "last 90 days", "last 180 days", "last 12 months", "year to date", or the like. In some embodiments, the incidents distribution page 2000 further includes the pre-set date range sections 2041, 2042, 2043, for specifying pre-set date ranges, such as for each three-month interval within the most recent three years. In various embodiments, in a case where a pre-set date range from one of the pre-set date range sections 2041, 2042, 2043, is selected, the date range in the date range section 2030 is set to the selected pre-set date range.

In various embodiments, the web server 310 is programmed to initiate a search in a database managed by the first SQL server 340A by sending a query to the first SQL server 340A to obtain from the first SQL server 340A coordinates for positions of incidents with respect to the map 2012 of the level or zone of the facility specified by the level/zone menu 2010 that are associated with categories in the category legends 2021, 2022, 2023, 2024, 2025, and that are associated with incident dates that are within the date range specified in the date range section 2030. Also, in various embodiments, the web server 310 is programmed to generate the incidents distribution page 2000 with icons, such as icons 2051, 2052, 2053, 2054, 2055, placed on the map 2012 to indicate the obtained positions of the incidents satisfying the level or zone, category, and date range search criteria. In various embodiments, the client computer 321 is programmed to display the incidents distribution page 2000 on a display screen of a display, such as a display screen of the display 160 of the computer 100 of FIG. 1, and to plot the icons, such as icons 2051, 2052, 2053, 2054, 2055, at the coordinates to indicate the positions where the corresponding incidents occurred at the facility.

In various embodiments, the icons on the map 2012 showing positions of incidents that occurred at a level or zone of a facility and that are associated with specified categories and that occurred within a specified date range are dynamically updated each time the level or zone is changed, and each time the specified categories are changed, and each time the specified date range is changed. For example, in various embodiments, the client computer 321 is programmed such that when the date range specified in the date range section 2030 is changed, the icons on the map 2012, such as icons 2051, 2052, 2053, 2054, 2055, are updated to only display icons for corresponding incidents have an incident date within the specified date range. In such embodiments, the client computer 321 may be programmed to automatically send a signal to the web server 310 when the date range is changed to indicate the newly specified date range, and the web server 310 may be programmed to update the incidents distribution page 2000 such that the icons plotted on the map 2012 correspond to incidents with incident dates within the newly specified date range, and the client computer 321 may be programmed to display the updated incidents distribution page 2000.

In various embodiments, each category legend 2021, 2022, 2023, 2024, 2025, has an associated check box, or the like, for indicating whether or not icons for incidents of the corresponding category should be plotted on the map 2012. Also, in various embodiments, each category legend 2021, 2022, 2023, 2024, 2025, is associated with a corresponding color, and icons for incidents of the corresponding category plotted on the map 2012 are shown in the corresponding color. For instance, in the example illustrated in FIG. 20: (i) a slip and fall category legend 2021 is associated with a first color, and icons for slip and fall incidents, such as icon 2051, are shown in the first color; (ii) an alarm-false category legend 2022 is associated with a second color, and icons for alarm-false incidents, such as icon 2052, are shown in the second color; (iii) a theft category legend 2023 is associated with a third color, and icons for theft incidents, such as icon 2053, are shown in the third color; (iv) a personal accident-injury not slip and fall category legend 2024 is associated with a fourth color, and icons for personal accident-injury not slip and fall incidents, such as icon 2054, are shown in the fourth color; and (v) a tenant lease violation category legend 2025 is associated with a fifth color, and icons for tenant lease violation incidents, such as icon 2055, are shown in the fifth color.

In various embodiments, the client computer 321 is programmed such that, in a case where a check box of any of the category legends 2021, 2022, 2023, 2024, 2025, is changed from being checked to unchecked, or from unchecked to checked, the client computer 321 automatically sends an update to the web server 310 indicating which check boxes of the category legends 2021, 2022, 2023, 2024, 2025, are checked. Also, in various embodiments, the web server 310 is programmed to update the incidents distribution page 2000 to show only icons of incidents for categories corresponding to category legends 2021, 2022, 2023, 2024, 2025, with check boxes that are checked, and the client computer 321 is configured to display the updated incidents distribution page 2000. Thus, in various embodiments, the icons displayed on the map 2012 may be dynamically updated each time a check box for a category legend 2021, 2022, 2023, 2024, 2025, is checked or unchecked, so as to display only icons for incidents associated with categories that are checked. In various embodiments, an incident is associated with a category if either the main category for the incident matches the category or the secondary main category for the incident matches the category.

In various embodiments, the client computer 321 is programmed such that, in a case where the level or zone is changed using the level/zone menu 2010, the client computer 321 automatically sends a request to the web server 310 to request that the incidents distribution page 2000 be updated based on the selected level or zone. Also, in various embodiments, the web server 310 is programmed to initiate a search by generating one or more SQL queries to send to the first SQL server 340A upon receiving the update request from the client computer 321 to search for coordinates of positions of incidents with respect to a map of the selected level or zone, where the incidents are associated with categories selected in the category legends 2021, 2022, 2023, 2024, 2025, and are associated with incident dates within the date range specified in the date range section 2030. In various embodiments, the web server 310 is programmed to update the map 2012 to show a map of the newly selected level or zone of the facility, and to provide the map and coordinate information of the positions of the incidents returned from the first SQL server 340A to the client computer 321. Also, in various embodiments, the client computer 321 is programmed to dynamically change the map 2012 to show the map of the newly selected level or zone and to dynamically plot icons at the coordinates provided by the web server 310 to show the positions of the corresponding incidents at the facility.

Figure 21:
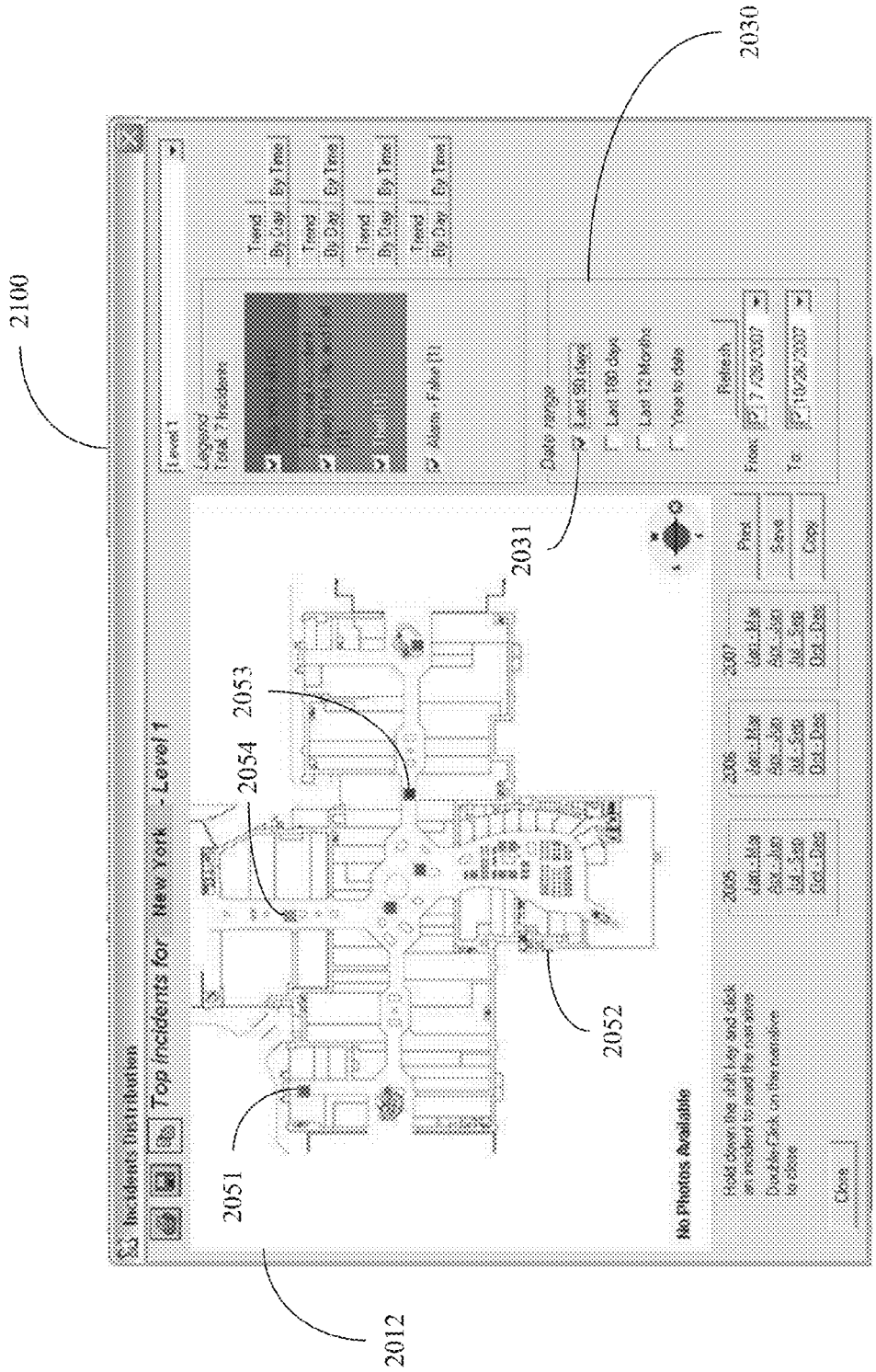
FIG. 21 illustrates an incidents distribution page in accordance with an embodiment of the present invention that shows a selection of a date range.

FIG. 21 illustrates an incidents distribution page 2100 in accordance with an embodiment of the present invention that shows a selection of a date range. The incidents distribution page 2100 is similar to the incidents distribution page 2000 of FIG. 20, except that a date range in the date range section 2030 has been set to a date range of the "last 90 days" as indicated by the check in a check box 2031. As a consequence, the icons on the map 2012 of FIG. 21, such as icons 2051, 2052, 2053, 2054, are automatically updated from the icons on the map 2012 of FIG. 20 to show only incidents associated with incident dates that are within the last 90 days from a current date. Moreover, in the example provided in FIG. 21, there were no tenant lease violation incidents within the last 90 days, so the tenant lease violation category legend 2025 of FIG. 20 is automatically removed when the incidents distribution page 2100 is created, and the other category legends 2021, 2022, 2023, 2024, from FIG. 20 are automatically re-ordered by number of incidents in the category within the last 90 days for the level or zone of the facility when the incidents distribution page 2100 is created. Thus, as illustrated by the differences between FIG. 20 and FIG. 21, in various embodiments, an incidents distribution page may be dynamically changed when different date ranges are selected in the date range section 2030.

Figure 22:
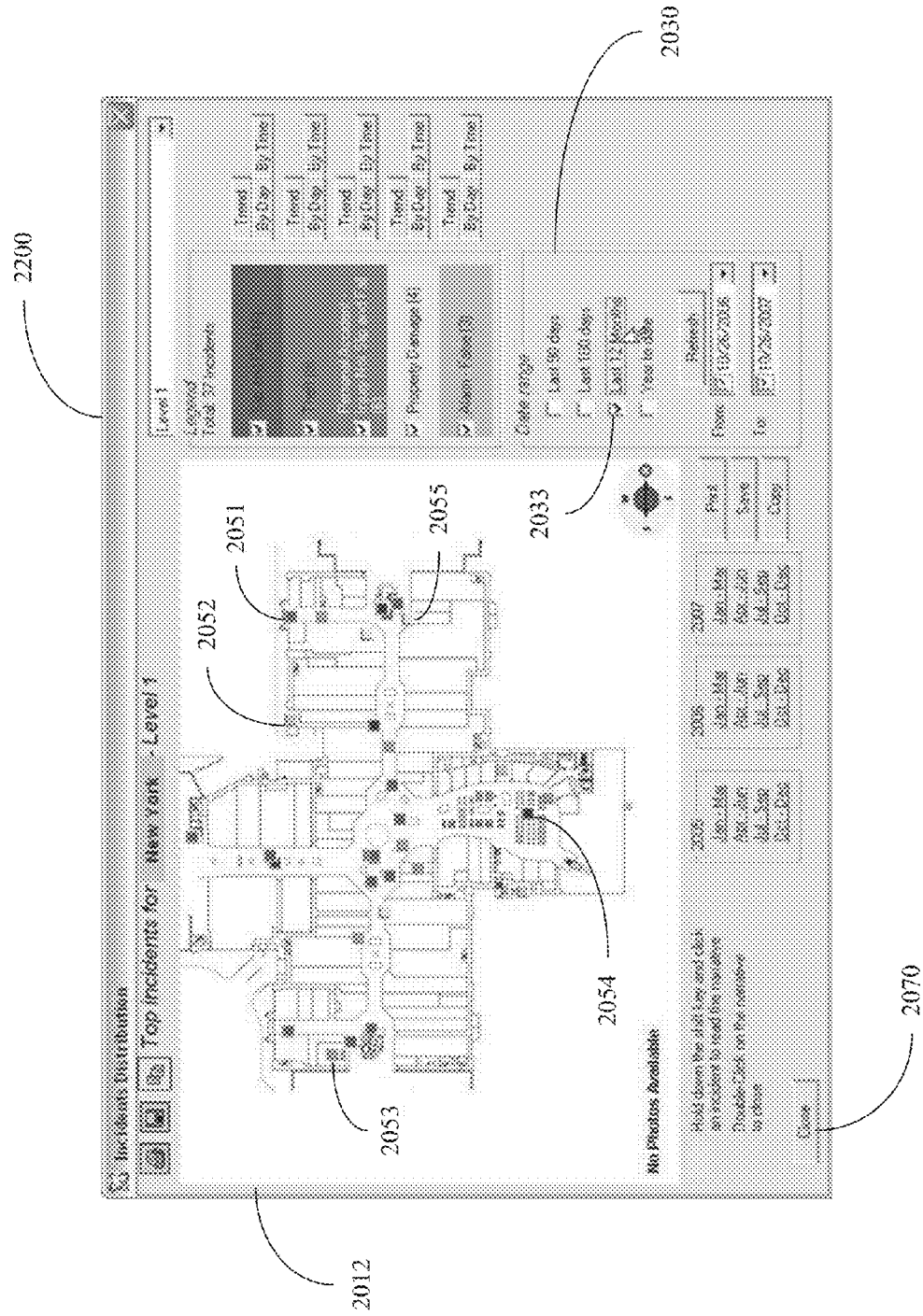
FIG. 22 illustrates an incidents distribution page in accordance with an embodiment of the present invention that shows a selection of another date range.

FIG. 22 illustrates an incidents distribution page 2200 in accordance with an embodiment of the present invention that shows a selection of another date range. The incidents distribution page 2200 is similar to the incidents distribution page 2000 of FIG. 20 and the incidents distribution page 2100 of FIG. 21, except that a date range in the date range section 2030 has been set to a date range of the "last 12 months" as indicated by the check in a check box 2033. As a consequence, the icons on the map 2012 of FIG. 22, such as icons 2051, 2052, 2053, 2054, 2055, are automatically updated from the icons on the map 2012 of FIG. 21 to show incidents associated with incident dates that are within the last 12 months from a current date. In some embodiments, a narrative associated with an incident may be obtained by, for example, holding a shift key on a keyboard and clicking on an icon representing the incident on the map 2012 using a mouse, a touch-pad, or the like. In various embodiments, the incidents distribution page 2200 further includes a close button 2070 for closing the incidents distribution page 2200.

Figure 23:
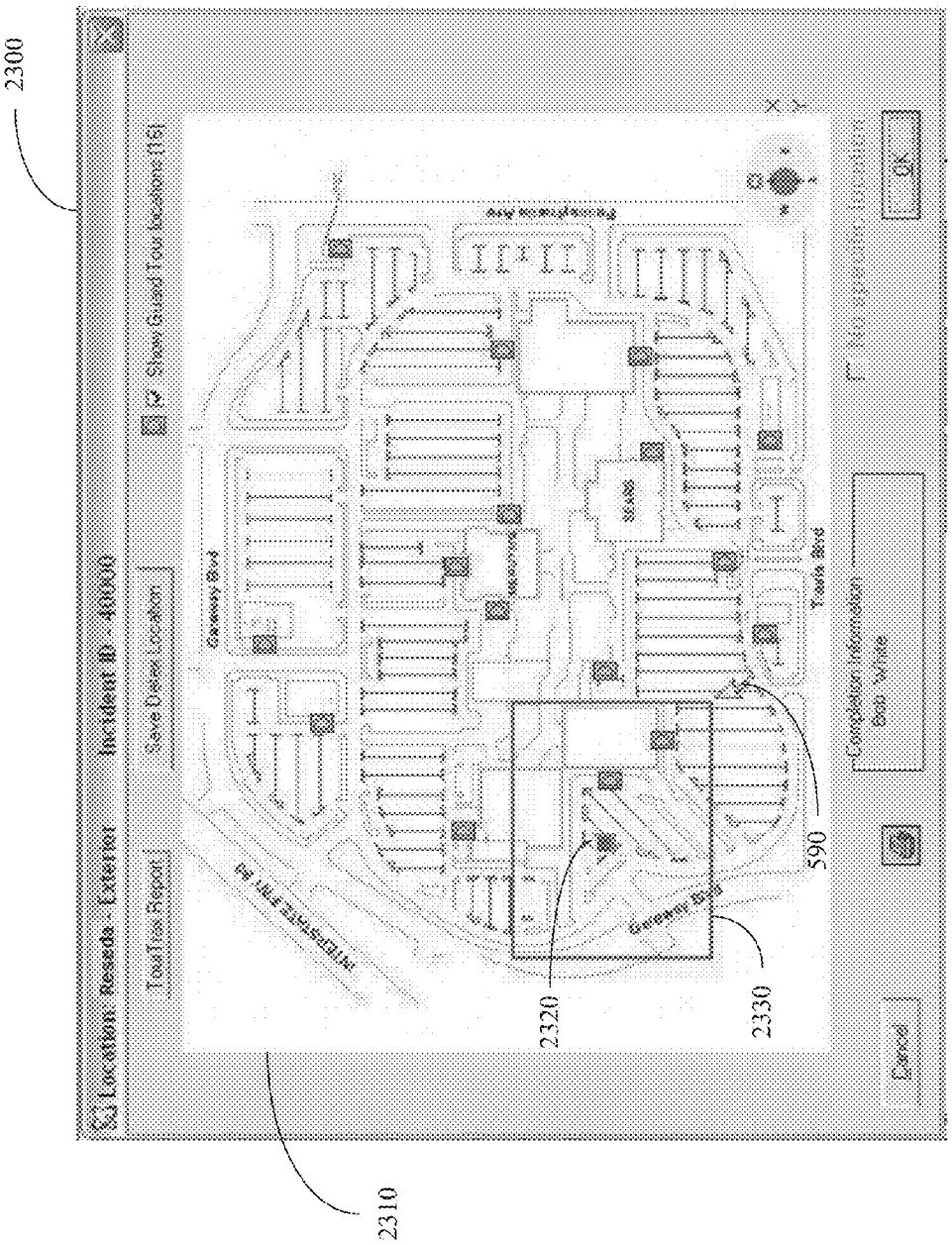
FIG. 23 illustrates a location map page in accordance with an embodiment of the present invention that allows for defining a search area.

FIG. 23 illustrates a location map page 2300 in accordance with an embodiment of the present invention that allows for defining a search area. With reference to FIGS. 3, 5, and 23, in various embodiments, the client computer 321 is programmed to display the location map page 2300 in a case where the incident map button 511 is pressed on the incident page 500. In various embodiments, the web server 310 is programmed to generate the location map page 2300 based on one or both of the location name specified in the location name section 551 and the level or zone specified in the level/zone section 552 for a currently displayed incident in the incident page 500. In such embodiments, the web server 310 may then provide the information for the location map page 2300 to the client computer 321 to be displayed by the client computer 321. In some embodiments, the location map page 2300 includes a map 2310 of at least a portion of a facility specified by the location name section 551 of the incident page 500 for an incident.

In various embodiments, the client computer 321 is programmed to receive input that specifies a position associated with the incident at the facility. In some embodiments, the position is specified by positioning the cursor 590 over the map 2310 on a display screen of a display of the client computer 321 using, for example, a mouse, a touch-pad, or the like, and then receiving a mouse click, or the like, to place an icon 2320 at specified coordinates represented by the location of the cursor 590 over the map 2310. In various embodiments, the client computer 321 may be programmed to send the coordinates of the icon 2320 with respect to the map 2310 to the web server 310, and the web server 310 may be programmed to issue one or more commands to cause the first SQL server 340A to save the coordinates in a database in association with other information for the incident. In some embodiments, the icon 2320 may be placed on the map 2310 at an approximate position of occurrence of the related incident at the facility represented by the map 2310. Thus, various embodiments allow for receiving input that specifies information about a position at a facility at which an incident has occurred.

In various embodiments, the client computer 321 is programmed to receive input that defines a search area adjacent to the position indicated by the icon 2320 on the map 2310, where the search area is changeable. In some embodiments, once the icon 2320 has been placed on the map 2310, the cursor 590 may be controlled by a mouse, a touch-pad, a keyboard, or the like, to draw a polygon, a closed convex shape, or the like, on the map 2310 to define a search area adjacent to the position indicated by the icon 2320. In the example illustrated in FIG. 23, a boundary of the search area is defined by a polygon 2330, which is a rectangle that surrounds the icon 2320 on the map 2310.

In some embodiments, the search area defined by the polygon 2330 is changeable by controlling the cursor 590 to expand, shrink, move, change, or modify the polygon 2330. Also, in some embodiments, the map 2310 is divided into a grid with coordinates, the icon 2320 is located at particular coordinates on the grid, and the polygon 2330 is specified with reference to the grid. In various embodiments, the icon 2320 indicating the position of the incident is displayed on the map 2310 on a display screen of a display of the client computer 321, and the client computer 321 is programmed to receive input that specifies the search area by highlighting pixels of the display screen. For example, a mouse, a touch-pad, a keyboard, or the like, may be used to draw a boundary of a search area on the map 2310 by highlighting pixels, such as the pixels that are highlighted to show the polygon 2330.

Thus, various embodiments of the present invention allow for receiving input that specifies an incident at a facility, where the incident is associated with a position at the facility, and for defining a search area adjacent to the position, where the search area is changeable. Also, various embodiments allow for receiving input that specifies the search area in terms of a polygon, an ellipse, or the like, on a map of at least a portion of the facility on a display screen. Some embodiments allow for locating a position of an incident on a grid and for receiving input that specifies the search area with reference to the grid, such as by providing coordinates of a polygon on the grid that defines a boundary of the search area. Also, some embodiments allow for displaying a position of an incident on a map of at least a portion of a facility on a display screen, and for receiving input that specifies a search area by highlighting pixels of the display screen.

In various embodiments, the client computer 321 is programmed to send coordinates representing the polygon 2330 to the web server 310 once the polygon 2330 has been drawn on the map 2310. Also, in various embodiments, the web server 310 is programmed to receive the coordinates of the polygon 2330 that defines the search area, and is programmed to initiate a search in a database managed by the first SQL server 340A by, for example, generating one or more SQL queries to send to the first SQL server 340A to find other incidents that occurred at the facility and that are each associated with a corresponding position that is within the search area defined by the polygon 2330. In various embodiments, the first SQL server 340A is configured to determine incidents associated with coordinates for the map 2310 that are within the search area defined by the polygon 2330. For example, the first SQL server 340A may be configured to receive coordinates for a search area from the web server 310 and to determine mathematically other incidents that are associated with coordinates for positions that are within a boundary specified by the coordinates of the search area, and to provide information about those other incidents. Also, in various embodiments, the web server 310 may be programmed to convert between coordinates on the map 2310 and positions at the facility represented by the coordinates by scaling according to a scale of the map 2310 to the facility. In various embodiments, the web server 310 is programmed to provide coordinates to the client computer 321 that specify locations of one or more other incidents that occurred at the facility indicated by the map 2310 and that are each associated with a corresponding position that is within the search area defined by the polygon 2330. Also, in various embodiments, the client computer 321 is programmed to receive the coordinates for the one or more other incidents from the web server 310 and to display icons at the coordinates so as to display the one or more other incidents that occurred at the facility and that are each associated with a corresponding position that is within the search area defined by the polygon 2330.

Figure 24:
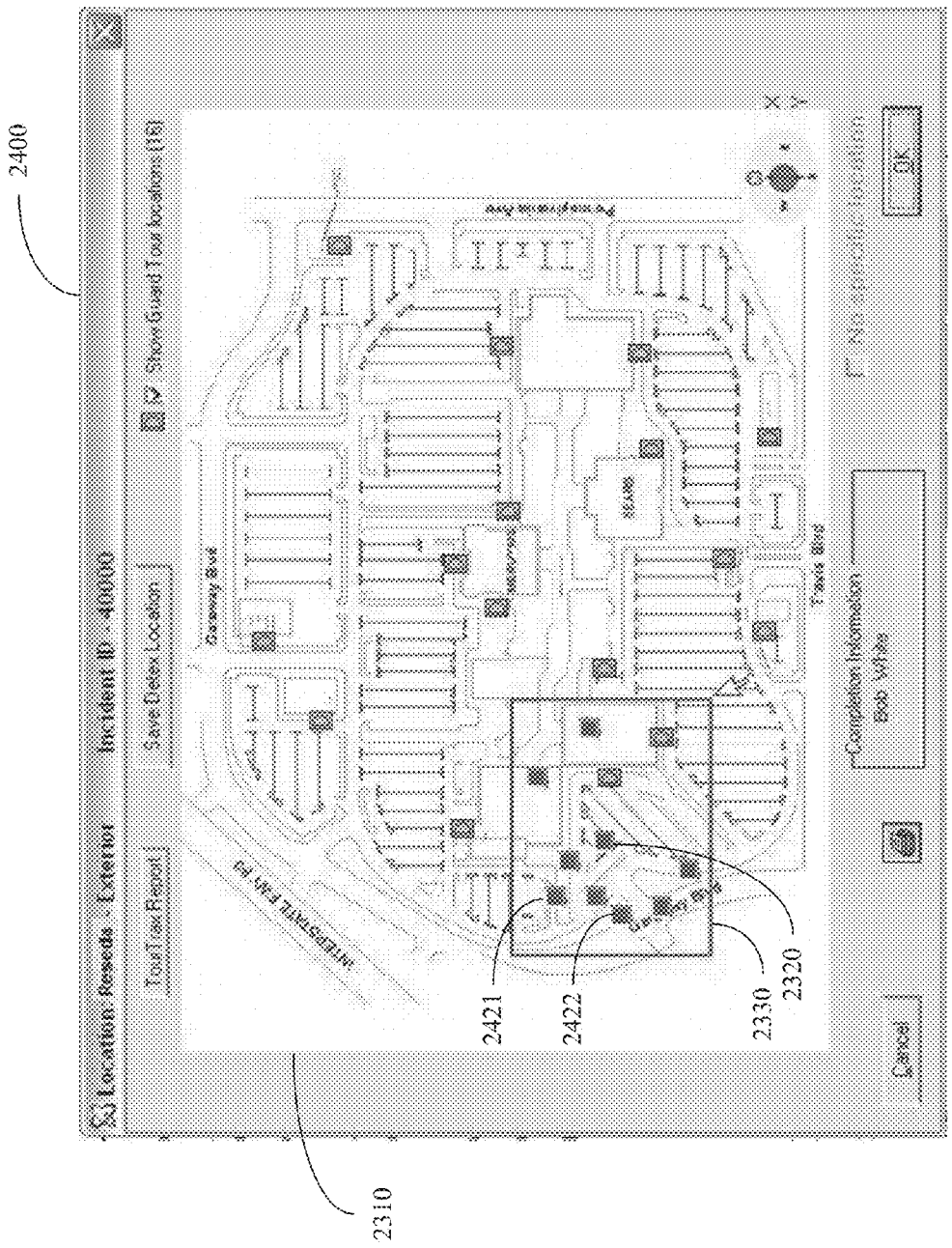
FIG. 24 illustrates a location map page in accordance with an embodiment of the present invention in which incidents associated with positions within a search area are displayed.

FIG. 24 illustrates a location map page 2400 in accordance with an embodiment of the present invention in which incidents associated with positions within a search area are displayed. The location map page 2400 illustrates an updated version of the location map page 2300 of FIG. 23 after the polygon 2330 has been drawn over a portion of the map 2310 to define a search area surrounding the icon 2320, where the map 2310 is a map of at least a portion of a facility. With reference to FIGS. 3 and 24, in various embodiments the client computer 321 is programmed to display one or more icons, such as icons 2421 and 2422, indicating positions of one or more other incidents that occurred at the facility, where the positions of the one or more other incidents are within the search area defined by the polygon 2330. In various embodiments, the client computer 321 is programmed to automatically display the icons for the one or more other incidents on a display screen of a display once the search area has been defined.

Figure 25:
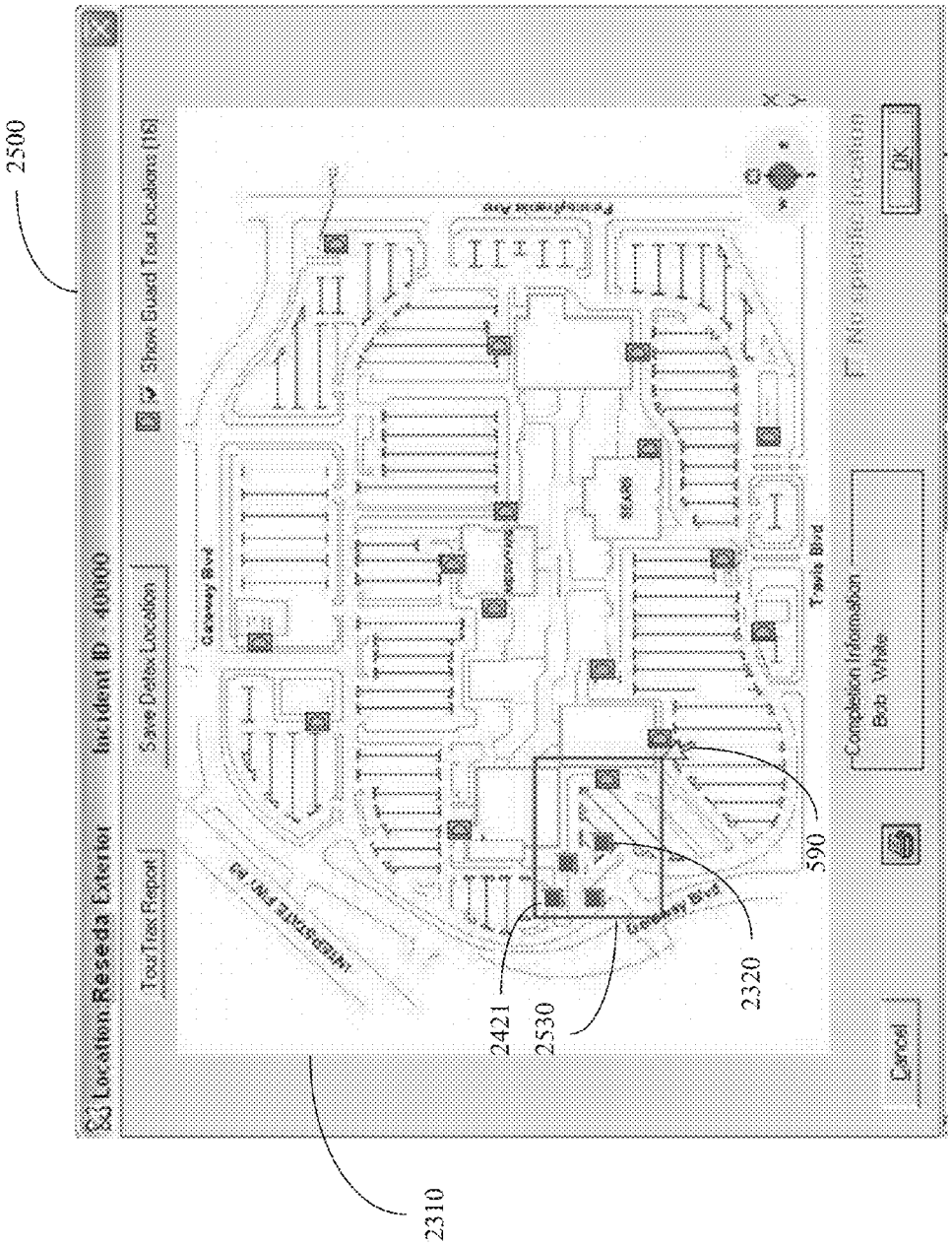
FIG. 25 illustrates a location map page in accordance with an embodiment of the present invention that shows a changing of a search area.

FIG. 25 illustrates a location map page 2500 in accordance with an embodiment of the present invention that shows a changing of a search area. The location map page 2500 of FIG. 25 is similar to the location map page 2400 of FIG. 24, except that the search area defined by the polygon 2330 has been changed to the search area defined by a polygon 2530. In the example of FIG. 25, the polygon 2530 has been made smaller than the polygon 2330 of FIG. 24, so as to define a smaller search area adjacent to the position indicated by the icon 2320. In various other embodiments, the search area may be expanded, shifted, rotated, or the like, by expanding, shifting, or rotating the polygon 2530. With reference to FIGS. 3, 24, and 25, in various embodiments, the client computer 321 includes a pointing device, such as the pointing device 150 of the computer 100 of FIG. 1, which may include a mouse, a touch-pad, a track-pad, or the like, for moving the cursor 590 on a display screen of a display of the client computer 321, such as the display 160 of the computer 100 of FIG. 1. Also, in various embodiments, the cursor 590 may be controlled to change a position of the polygon 2530 with respect to the map 2310, change a size of the polygon 2530, rotate the polygon 2530, or the like, so as to change the search area.

In various embodiments, the client computer 321 is programmed to send updated coordinates describing the polygon 2530 to the web server 310 each time the polygon 2530 is changed in size, changed in position, rotated, or the like. Also, in various embodiments, the web server 310 is programmed to determine one or more other incidents that are each associated with a corresponding position that is within a search area defined by the coordinates received from the client computer 321. For example, in various embodiments, the web server 310 is programmed to initiate a search by, for example, generating one or more SQL queries to send to the first SQL server 340A to find all incidents that are associated with positions within the search area defined by the coordinates received from the client computer 321. In various embodiments, the web server 310 is programmed to provide information related to the positions of the incidents that occurred within the search area to the client computer 321, and the client computer 321 is programmed to display icons, such as the icon 2421, on the map 2310 to indicate the positions of the incidents that occurred within the search area defined by the polygon 2530. In various embodiments, the client computer 321 automatically updates the icons representing incidents that occurred within a search area each time the search area is changed. In some embodiments, the web server 310 plots icons, such as the icon 2421, on the map 2310 to indicate the positions of the incidents that occurred within the search area defined by the polygon 2530, and then provides the map 2310 with the plotted icons to the client computer 321 to be displayed by the client computer 321.

Figure 26:
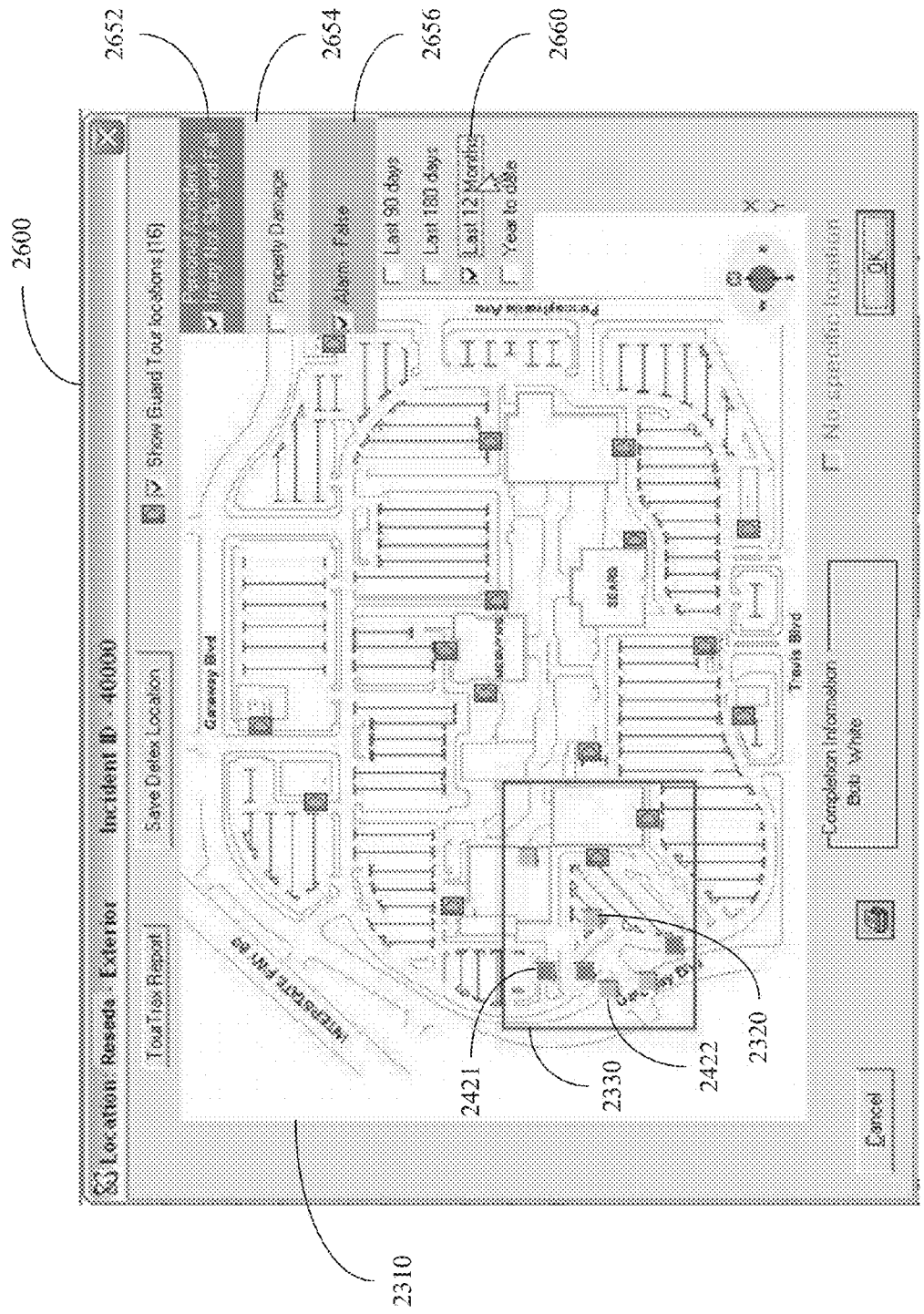
FIG. 26 illustrates a location map page in accordance with an embodiment of the present invention that allows for defining a search area and for specifying categories of incidents to be displayed and for specifying a date range of incidents to be displayed.

FIG. 26 illustrates a location map page 2600 in accordance with an embodiment of the present invention that allows for defining a search area and for specifying categories of incidents to be displayed and for specifying a date range of incidents to be displayed. The location map page 2600 of FIG. 26 is similar to the location map page 2400 of FIG. 24, but the location map page 2600 includes category legends 2652, 2654, 2656, that allow for specifying categories of incidents to be displayed, and the location map page 2600 includes a date range section 2660 for specifying a date range of incidents to be displayed. With reference to FIGS. 3, 24, and 26, in various embodiments the web server 310 is programmed to determine the categories of incidents with positions that are within the search area defined by the polygon 2330, and to provide the category legends 2652, 2654, 2656, to the client computer 321 that include the categories of the incidents with positions that are within the search area defined by the polygon 2330. For example, the web server 310 may be programmed to generate one or more SQL queries to send to the first SQL server 340A to determine the categories of the incidents with positions that are within the search area defined by the polygon 2330.

Also, in various embodiments, each of the category legends 2652, 2654, 2656, may have a check box, or the like, for indicating whether or not incidents of the corresponding category should be displayed. For instance, in the example of FIG. 26, a check box for a personal accident-injury not slip and fall category legend 2652 is checked, a check box for a property damage category legend 2654 is unchecked, and a check box for an alarm-false category legend 2656 is checked, so that only incidents with main categories or secondary main categories that are personal accident-injury not slip and fall or alarm-false are displayed in the location map page 2600. In various embodiments, each of the category legends 2652, 2654, 2656, may be associated with a corresponding color, and icons representing positions of incidents on the map 2310, such as icons 2320, 2421, 2422, may be shown in a color corresponding to the category to which they are associated. For instance, in the example of FIG. 26, the icon 2421 is of a same color as the personal accident-injury not slip and fall category legend 2652, indicating that the icon 2421 represents a position of an incident that is associated with the category of personal accident-injury not slip and fall.

In various embodiments, the location map page 2600 includes the date range section 2660 and the client computer 321 is programmed to dynamically plot, each time a search area is changed on the map 2310 and an associated date range is indicated in the date range section 2660, positions on the map 2310 within the search area where incidents have occurred at the facility associated with the map 2310 within the date range. In some embodiments, the date range section 2660 may include various selections, such as "last 90 days", "last 180 days", "last 12 months", "year to date", or the like. Also, in some embodiments, the date range section 2660 may allow for setting a date range to any desired range. In the example of FIG. 26, a check has been placed in the date range section 2660 to indicate that only incidents with incident dates within the last 12 months should be shown with icons on the map 2310. In various embodiments, the client computer 321 is programmed to send information to the web server 310 each time a date range is changed in the date range section 2660, and the web server 310 is programmed to send information to the client computer 321 to update the location map page 2600 to show only incidents with incident dates within the date range. In various embodiments, the web server 310 may determine incidents with incident dates within a date range by, for example, generating one or more SQL queries to send to the first SQL server 340A to search a database within the first SQL server 340A to return only incidents with incident dates within the date range.

Figure 27:
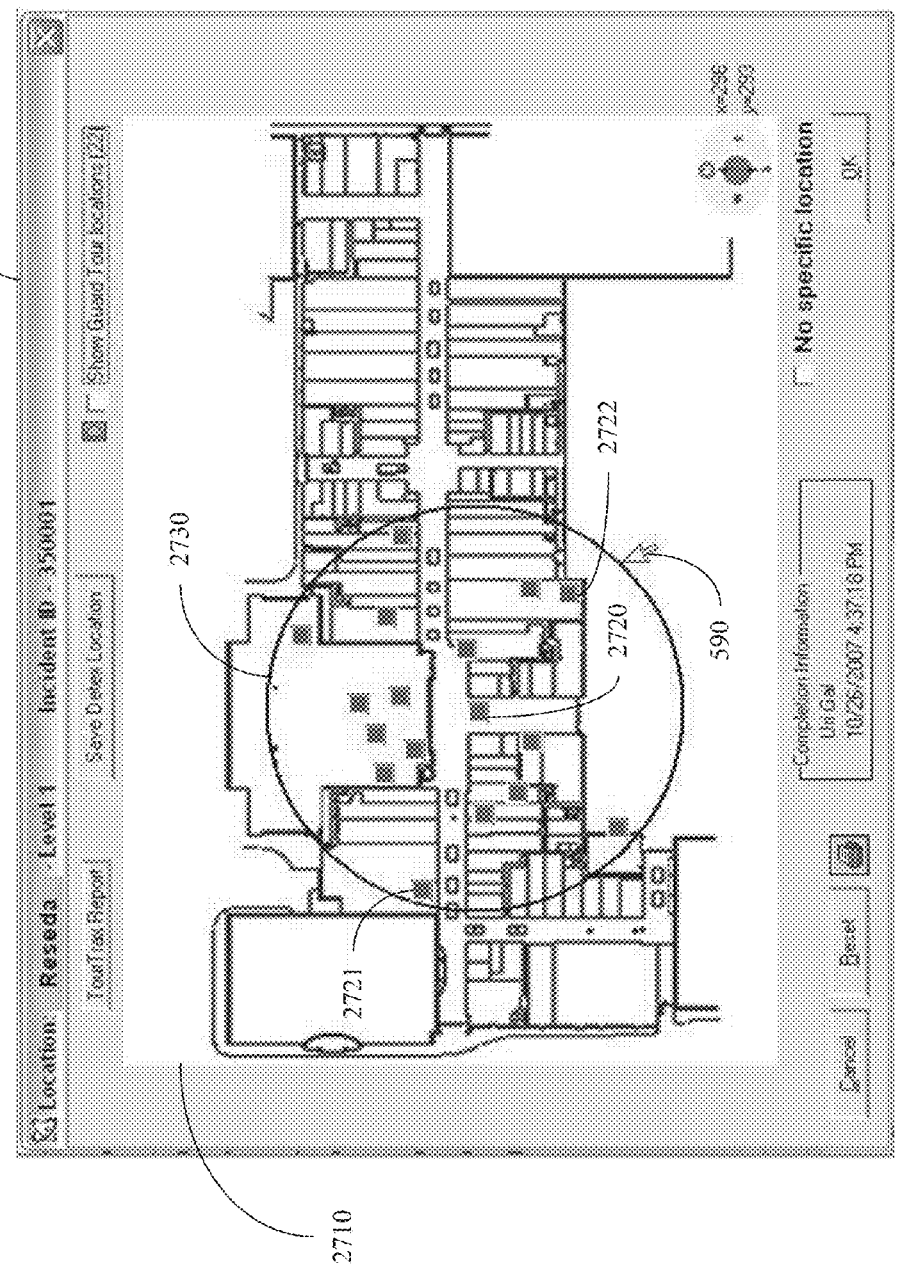
FIG. 27 illustrates a location map page in accordance with an embodiment of the present invention that allows for defining a search area.

FIG. 27 illustrates a location map page 2700 in accordance with an embodiment of the present invention that allows for defining a search area. The location map page 2700 of FIG. 27 is similar to the location map page 2400 of FIG. 24, but a search area in the location map page 2700 is defined by a closed convex shape such as an ellipse 2730 or the like, rather than by a polygon. In various embodiments, the ellipse 2730 may be a circle. With reference to FIGS. 3 and 27, in various embodiments the client computer 321 is programmed to receive input that specifies a position of an incident at a facility, such as by receiving a click with the cursor 590 to specify a location of an icon 2720 representing a position of an incident on a map 2710 of at least a portion of the facility. Also, in various embodiments, the client computer 321 is programmed to define a search area adjacent to the position of the incident specified by the icon 2720 on the map 2710 by, for example, receiving input using the cursor 590 that specifies the ellipse 2730. In various embodiments, the client computer 321 is programmed to display one or more other incidents that occurred at the facility and that are each associated with a corresponding position that is within the search area specified by the ellipse 2730, such as by displaying one or more icons representing positions of the other incidents like icons 2721 and 2722.

In various embodiments, the client computer 321 is programmed to send coordinates representing a position and a shape of the ellipse 2730 with respect to a grid to the web server 310, so as to provide the search area to the web server 310. Also, in various embodiments, the web server 310 is programmed to determine the one or more other incidents that occurred at the facility and that are each associated with a corresponding position that is within the search area specified by the ellipse 2730, and to provide information about the one or more other incidents to the client computer 321. In some embodiments, the search area is specified as an area within a particular radial distance from a position represented by the icon 2720 that is a position of a currently entered incident. For example, in various embodiments, a search area may be specified as being within "n" meters of a position of an incident, where "n" is a real value. Also, in various embodiments, the client computer 321 and/or the web server 310 may be programmed to automatically define a search area adjacent to a position of an incident upon receiving input that specifies the position of the incident based on one or more stored values. For instance, in various embodiments, in a case where the icon 2720 is placed on the map 2710, a search area may be automatically determined to be within "n" meters in terms of distance at the facility represented by the map 2710. In such embodiments, a circle, such as the ellipse 2730, may be automatically displayed to show the search area on the map 2710 in terms of a scale of the map 2710 to the actual facility, and one or more other incidents may be displayed that occurred at the facility and that are each associated with a corresponding position that is within the search area.

Figure 28:
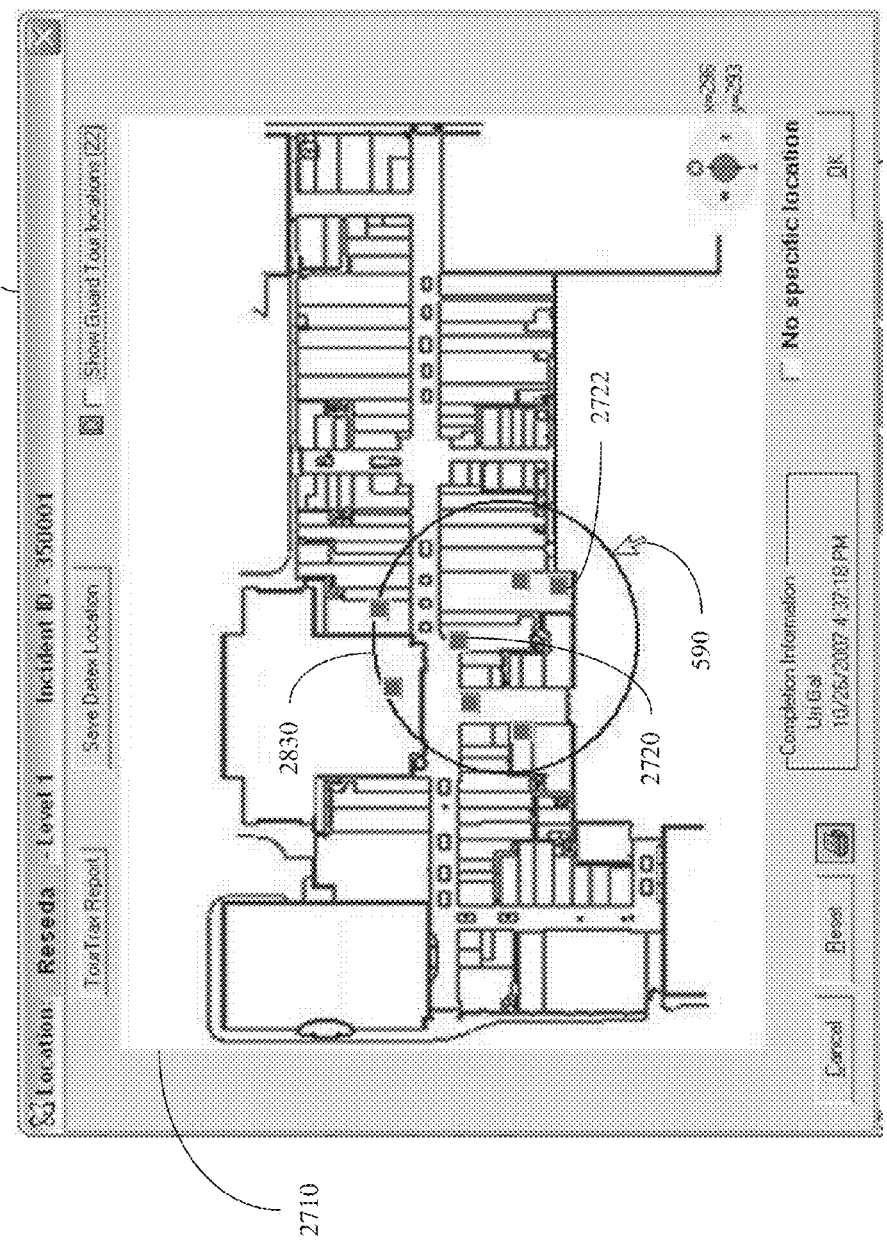
FIG. 28 illustrates a location map page in accordance with an embodiment of the present invention that shows a change of a search area.

FIG. 28 illustrates a location map page 2800 in accordance with an embodiment of the present invention that shows a change of a search area. The location map page 2800 of FIG. 28 is similar to the location map page 2700 of FIG. 27, except that a search area defined by the ellipse 2730 has been changed to a search area defined by an ellipse 2830. In various embodiments, the ellipse 2730 may be changed in shape, changed in position, or the like, such as is shown by the ellipse 2830, which is smaller than the ellipse 2730 and is shifted in position. In various embodiments, the ellipse 2830 defines a search area adjacent to a position of an incident indicated by icon 2720. Also, in various embodiments, the map 2710 is a map of at least a portion of a facility, and one or more other incidents are displayed on the map 2710 that occurred at the facility and that are each associated with a corresponding position that is within the search area defined by the ellipse 2830. For instance, the icon 2722 may be displayed on the map 2710 to show a position of an incident that occurred at the facility within the search area defined by the ellipse 2830.

In various embodiments, the one or more other incidents displayed on the map 2710 are associated with either a same main category or a same secondary main category as a main category and a secondary main category of the incident specified by the icon 2720. For instance, in various embodiments, in a case where a main category of the incident represented by the icon 2720 is theft and a secondary main category of the incident is arrest by police, only other incidents with either a main category or a secondary main category that are theft or arrest by police and that are within the search area specified by the ellipse 2830 are displayed on the map 2710. In such embodiments, the web server 310 may be programmed to determine incidents with a same main category or secondary main category by issuing one or more SQL queries to the first SQL server 340A.

Figure 29:
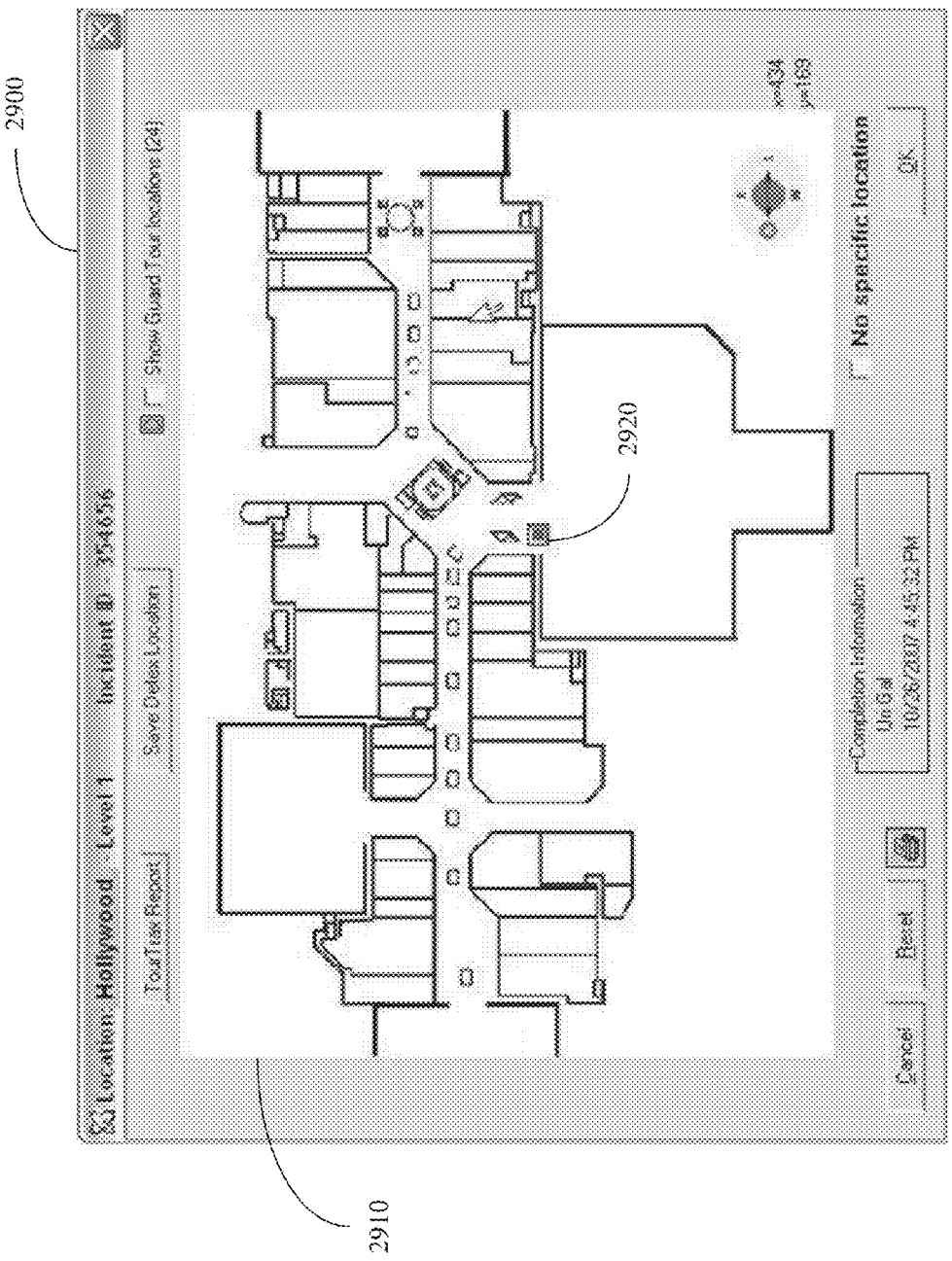
FIG. 29 illustrates a location map page in accordance with an embodiment of the present invention.

FIG. 29 illustrates a location map page 2900 in accordance with an embodiment of the present invention. In various embodiments, the location map page 2900 includes a map 2910 of at least a portion of a facility, and a grid is defined with respect to the map 2910. For example, in various embodiments, a lower left corner of the map 2910 may represent coordinates of (x=0, y=0) on the grid, where the x coordinate increases along a horizontal direction of the map 2910 and the y coordinate increases along a vertical direction of the map 2910. Then, in various embodiments, a position of an incident may be specified by an icon, such as the icon 2920, located on the map 2910, where the icon 2920 is associated with coordinates on the grid.

Figure 30:
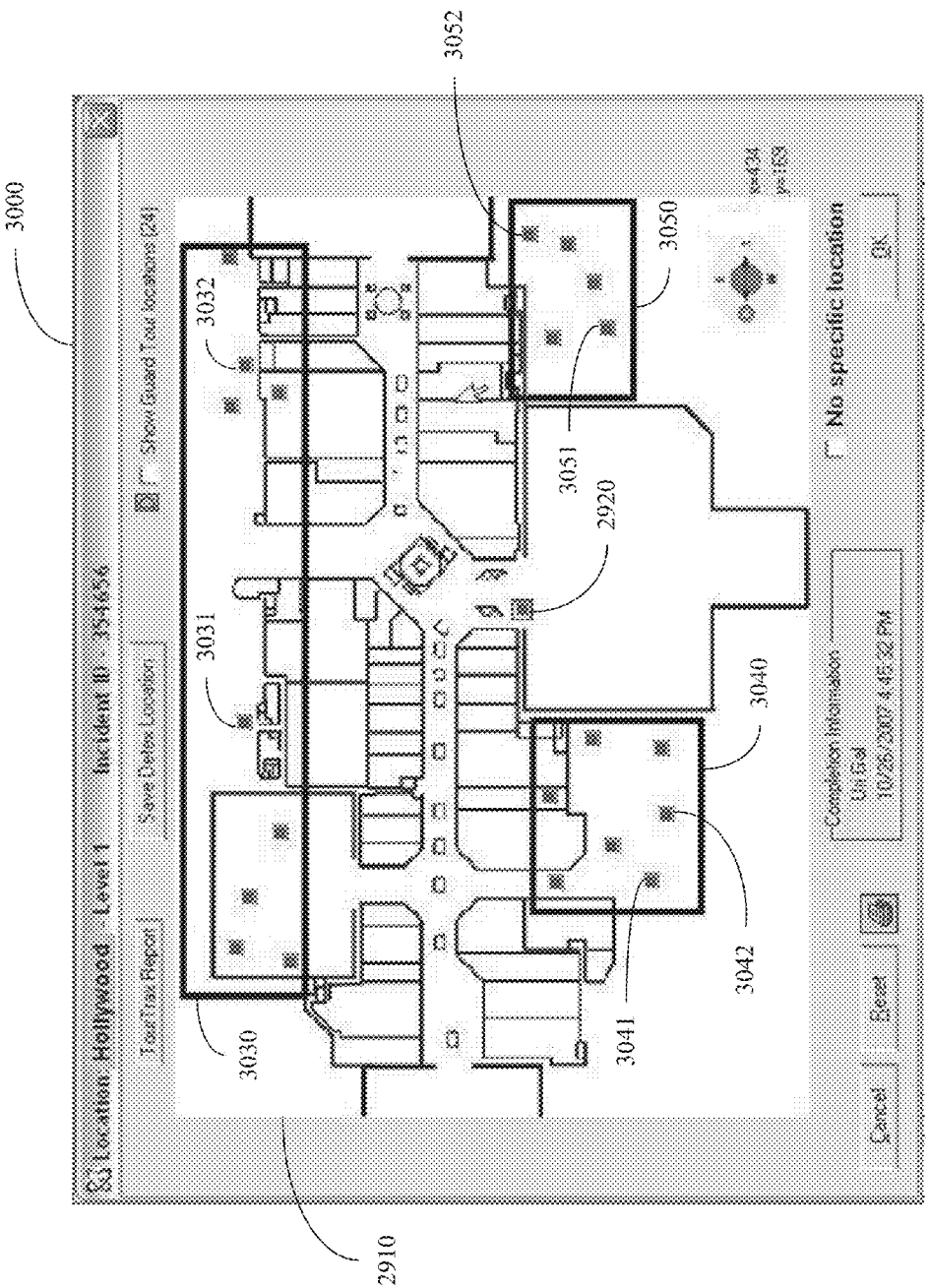
FIG. 30 illustrates a location map page in accordance with an embodiment of the present invention that allows for specifying multiple search areas.

FIG. 30 illustrates a location map page 3000 in accordance with an embodiment of the present invention that allows for specifying multiple search areas. With reference to FIGS. 3 and 30, in various embodiments, the client computer 321 may be programmed to allow for multiple search areas to be defined on the map 2910 in which a position of a currently specified incident is provided by an icon, such as the icon 2920. For example, in the location map page 3000 of FIG. 30, three search areas have been defined by a rectangle 3030, a rectangle 3040, and a rectangle 3050, respectively. Once the search areas have been defined, other incidents that occurred in the search areas are displayed, such as shown by icons 3031 and 3032 within rectangle 3030, icons 3041 and 3042 within rectangle 3040, and icons 3051 and 3052 within rectangle 3050. In various embodiments, rather than using only polygons or ellipses, search areas may be defined by any desired shape and may even be drawn in free-form.

FIG. 31 illustrates a business incident report 3100 for a business having stores at multiple facilities. With reference to FIG. 19, in various embodiments the reports menu page 1900 may include a business incident report button (not shown) for requesting business incident reports, such as the business incident report 3100. With reference to FIG. 17, in various embodiments, each incident may be associated with a nearest tenant at a facility by specifying a nearest tenant in the nearest tenant section 1670. In some embodiments, a business may have stores at multiple facilities and, thus, the business may be a tenant at multiple facilities. For instance, in the example of FIG. 31, a business named "Bagel Pavilion" has stores at facilities in New York, Boston, Chicago, and Los Angeles.

With reference to FIGS. 3 and 31, in various embodiments the client computer 321 may be programmed to receive a request for a business incident report to display information about incidents that are related to stores of a business and that occurred within a date range. In various embodiments, the client computer 321 is programmed to send information about the business and the date range to the web server 310, and the web server 310 is programmed to generate one or more SQL queries to send to the first SQL server 340A to find incidents in which a store of the business has been specified as the nearest tenant and which are associated with incident dates within the date range. Also, in various embodiments, the web server 310 is programmed to supply a business incident report with information about the incidents returned from the SQL server 340A to the client computer 321 to be displayed by the client computer 321. For instance, in the business incident report 3100, incidents near stores of the "Bagel Pavilion" at multiple facilities occurring in the year 2003 or later are displayed for viewing. In various embodiments, the business incident report 3100 includes columns specifying, for each incident, a facility location where the incident occurred, an incident date on which the incident occurred, an incident category associated with the incident, and an incident sub-category associated with the incident.

In various embodiments, the business incident report 3100 may be updated to display only incidents of a same type as a type of a currently specified incident. In some embodiments, a type of an incident is a main category of the incident. Also, in some embodiments, a type of an incident is a main category and a sub-category of the incident. In some embodiments, a type of an incident is one or more of a main category of the incident, a sub-category of the incident, a secondary main category of the incident, and a secondary sub-category of the incident. For example, in various embodiments an incident type of an incident may be specified as slip and fall, and the business incident report 3100 may be updated to show only incidents with incident categories that are slip and fall. Thus, various embodiments allow for displaying information about incident of a same type as a specified type that are related to stores of a business and that occurred within a date range, where the business has stores at multiple facilities.

Figure 32:
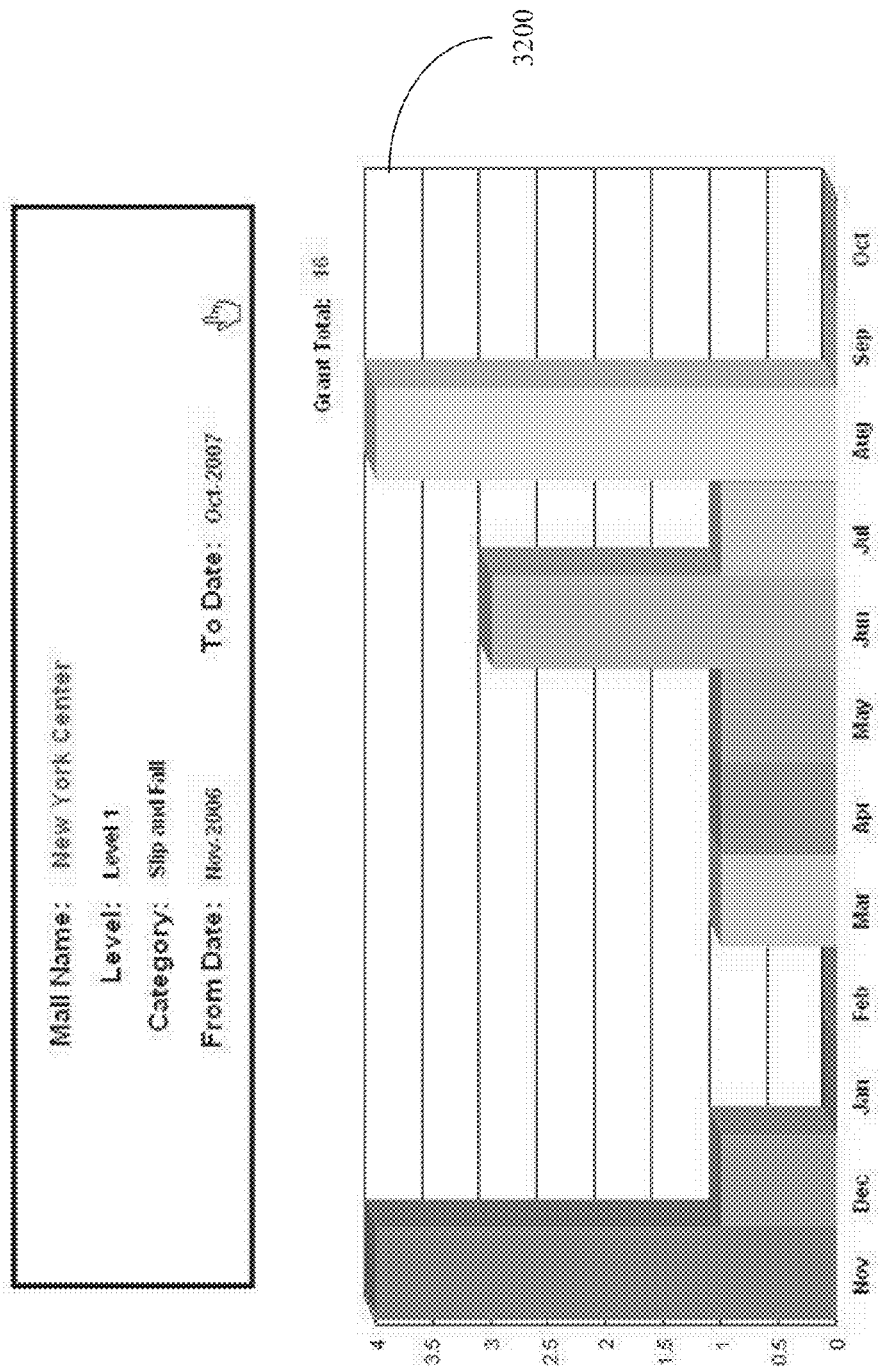
FIG. 32 illustrates an incident category report for a facility in accordance with an embodiment of the present invention.

FIG. 32 illustrates an incident category report 3200 for a facility in accordance with an embodiment of the present invention. With reference to FIG. 19, in various embodiments the reports menu page 1900 includes the select categories button in the analysis section 1912 of the location reports section 1910, and when the select categories button is pressed, one or more categories and a date range may be selected to produce a report for a level or zone of a facility specified in the location reports section 1910. In the example incident category report 3200 of FIG. 32, a single category of slip and fall has been selected for the report and a date range of November 2006 to October 2007 has been selected for the report for level 1 of a New York Center facility.

With reference to FIGS. 3 and 32, in various embodiments the client computer 321 is programmed to send information about a name of a facility, a level or zone of the facility, a desired category, and a date range to the web server 310, and the web server 310 is programmed to generate one or more SQL queries to send to the first SQL server 340A to obtain information about incidents that occurred at the level or zone of the facility and that are associated with a main category or secondary main category that matches the desired category and that have an incident date within the date range. In various embodiments, the web server 310 may be programmed to produce an incident category report, such as the incident category report 3200, with a bar graph, or the like, showing a number of incidents per month within the date range that occurred at the level or zone of the facility and that are associated with the desired category.

Figure 33:
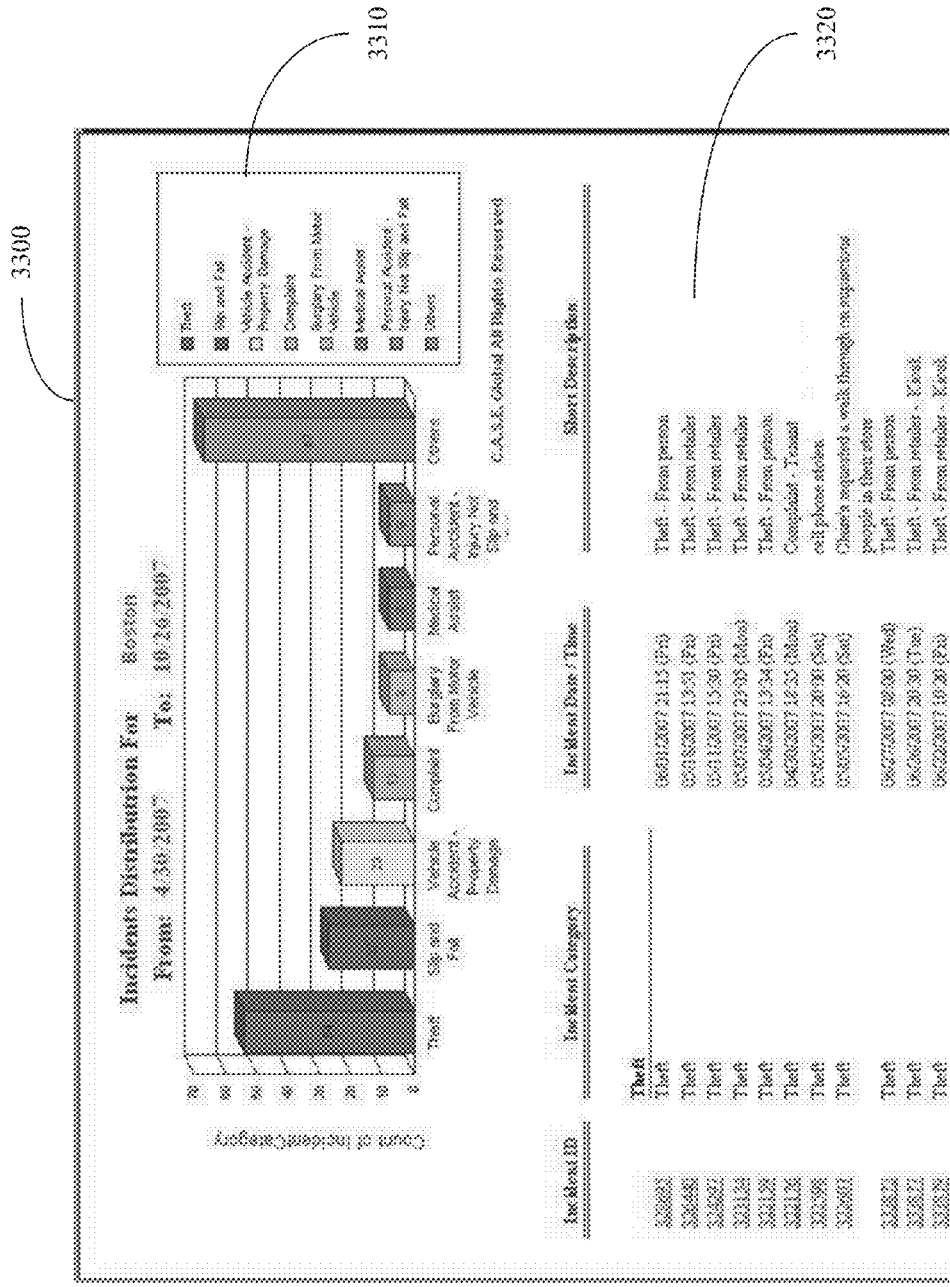
FIG. 33 illustrates an incident count report for a facility in accordance with an embodiment of the present invention.

FIG. 33 illustrates an incident count report 3300 for a facility in accordance with an embodiment of the present invention. With reference to FIGS. 19 and 33, in various embodiments the reports menu page 1900 includes the incident per category button in the location reports section 1910, and an incident count report such as the incident count report 3300 is generated for a facility specified in the location reports section 1910 when the incident per category button is pressed. In various embodiments, the incident count report 3300 includes a bar chart 3310, or the like, showing a count of incidents associated with each category at the specified facility within a specified date range. In various embodiments, each incident is counted for both the main category associated with the incident and the secondary main category associated with the incident. Also, in various embodiments, the incident count report 3300 further includes a table 3320 with columns showing, for each incident counted in the bar graph, an incident ID of the incident, a category of the incident, an incident date and time of the incident, and a short description associated with the incident. With reference to FIGS. 3 and 33, in various embodiments, information for the incident count report 3300 may be obtained by the client computer 321 from the web server 310 that issues one or more queries to the first SQL server 340A in response to a request for the incident count report 3300.

Figure 34:
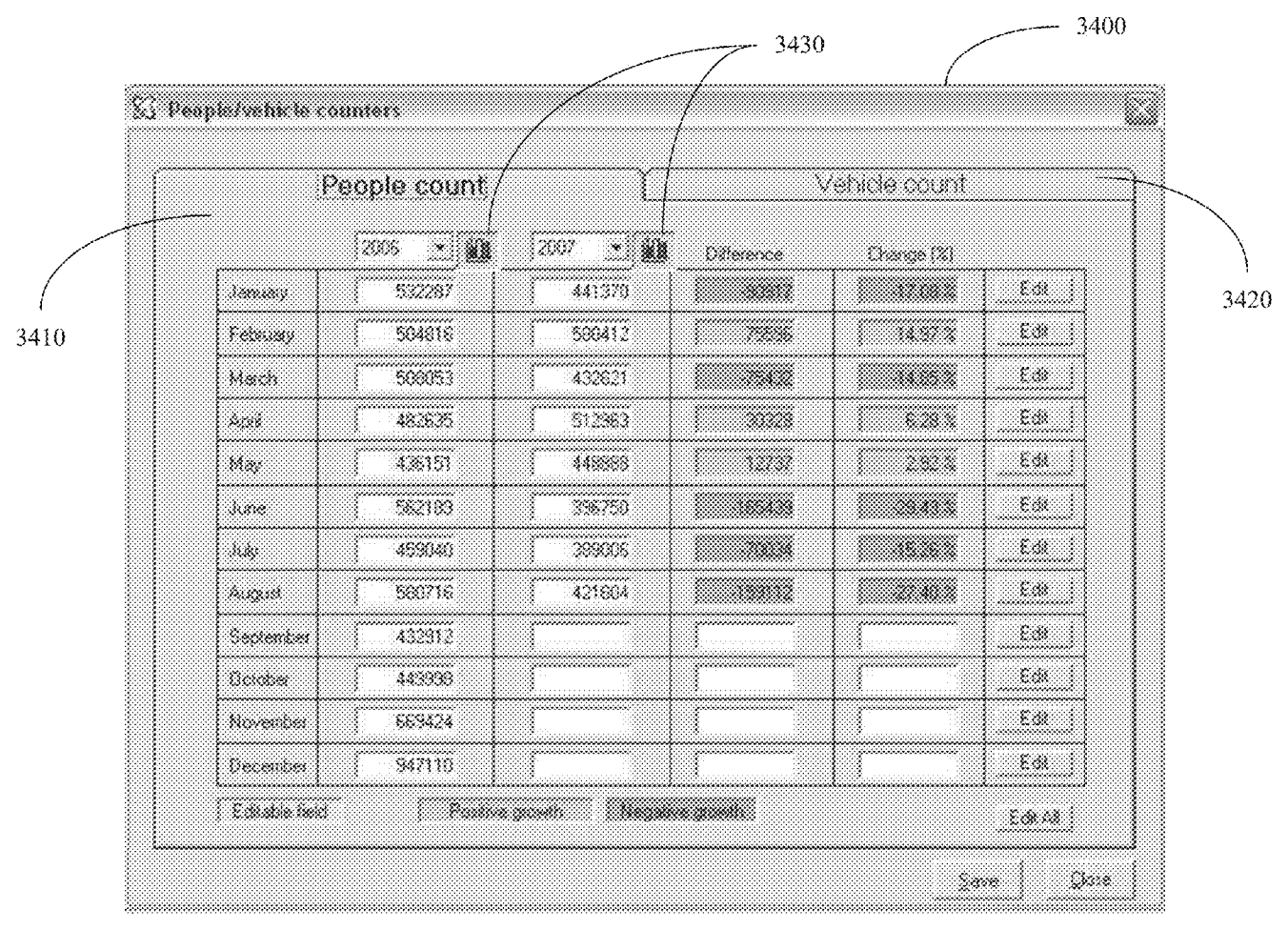

FIG. 34 illustrates a people count/vehicle count report page 3400 for a facility in accordance with an embodiment of the present invention. With reference to FIGS. 19 and 34, in various embodiments the reports menu page 1900 includes the people counters button in the location reports section 1910, and in a case where the people counters button is pressed, a people count/vehicle count report page such as the people count/vehicle count report page 3400 is displayed for a facility specified in the location reports section 1910. In various embodiments, laser beams, cameras, or the like, may be positioned at entrances of a facility and may be connected to a computing device that counts people crossing the laser beams or passing in front of the cameras. With reference to FIGS. 3 and 34, in various embodiments, the count of people entering each facility may be stored in a database in the first SQL server 340A.

In various embodiments, the client computer 321 may receive a request to display a count of people entering a facility within a date range. For instance, in the example illustrated in FIG. 34, a count of people entering a facility is shown by month for two different years, and a total difference and percentage difference between the counts in each year is provided for each month. In various embodiments, the client computer 321 is programmed to send a request to the web server 310 for the people count information, and the web server 310 is programmed to generate one or more SQL queries to obtain the people count information from the first SQL server 340A, and to provide the people count information to the client computer 321. In various embodiments, the client computer 321 displays the people count information when a people count tab 3410 of the people count/vehicle count report page 3400 is selected. In various embodiments, vehicles entering a facility may be counted similar to the counting of people by counting vehicles entering parking lots of the facility, or the like. Then, in various embodiments, the client computer 321 may be programmed to display vehicle count information for the facility when a vehicle count tab 3420 of the people count/vehicle count report page 3400 is selected. In some embodiments, the people count/vehicle count report page 3400 includes one or more chart buttons 3430 for obtaining people count reports for specified years, such as is illustrated in FIG. 35.

Figure 35:
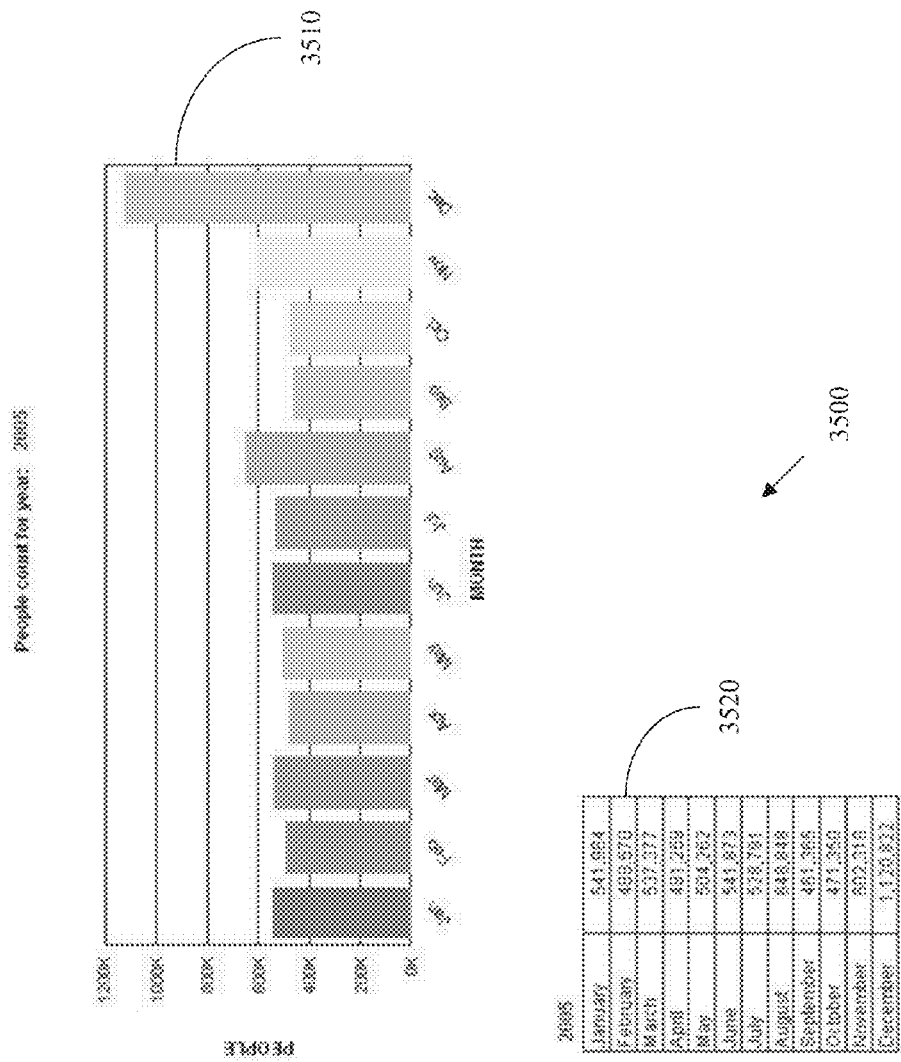
FIG. 35 illustrates a people count report for a facility for a specified year in accordance with an embodiment of the present invention.

FIG. 35 illustrates a people count report 3500 for a facility for a specified year in accordance with an embodiment of the present invention. With reference to FIGS. 34 and 35, in various embodiments, when one of the one or more chart buttons 3430 are pressed, a people count report such as the people count report 3500 is generated from information displayed in the people count/vehicle count report page 3400. In various embodiments, the people count report 3500 includes a bar chart 3510, or the like, for showing a number of people visiting a facility per month over the course of a year, and includes a table 3520 indicating a number of people visiting the facility per month over the course of the year.

Figure 36:
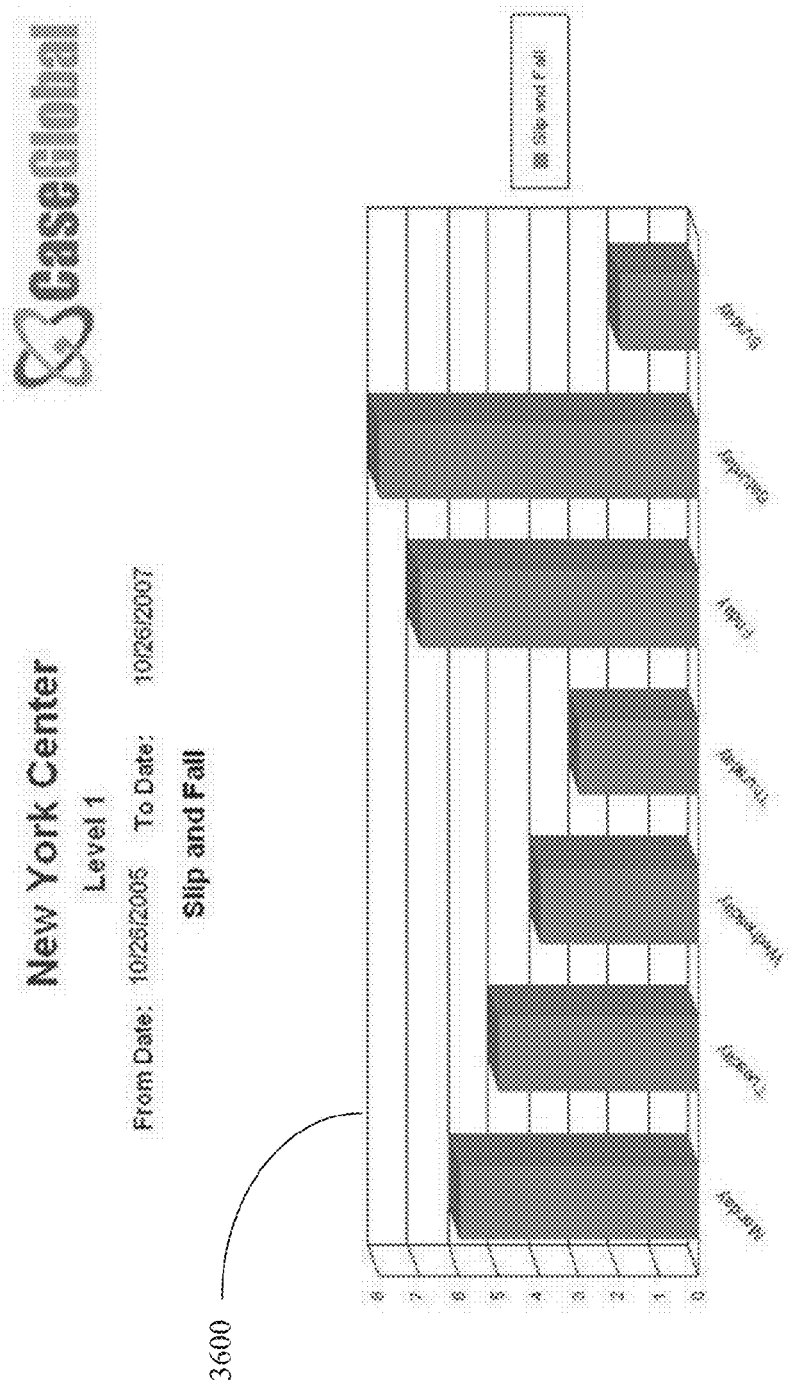
FIG. 36 illustrates a report by day of week in accordance with an embodiment of the present invention.

FIG. 36 illustrates a report by day of week 3600 in accordance with an embodiment of the present invention. With reference to FIGS. 19 and 36, in various embodiments, in a case where the day of the week button of the incident statistics section 1920 of the reports menu page 1900 is pressed, information may be entered including a name of a facility, a level or zone of the facility, a category, and a date range, to obtain a report by day of week such as the report by day of week 3600. As illustrated by the example report by day of week 3600, a report by day of week may provide a count of incidents associated with a category at a level or zone of a facility for each day of the week for incidents that occurred within a specified date range. In various embodiments, an incident is counted for a category if either the main category specified for the incident or the secondary main category specified for the incident matches the category. With reference to FIGS. 3 and 36, in various embodiments, the client computer 321 is programmed to send a request for a report by day of week to the web server 310, the web server 310 is programmed to obtain information needed for the report from the first SQL server 340A, the web server 310 is programmed to provide the report to the client computer 321, and the client computer 321 is programmed to display the report.

Figure 37:
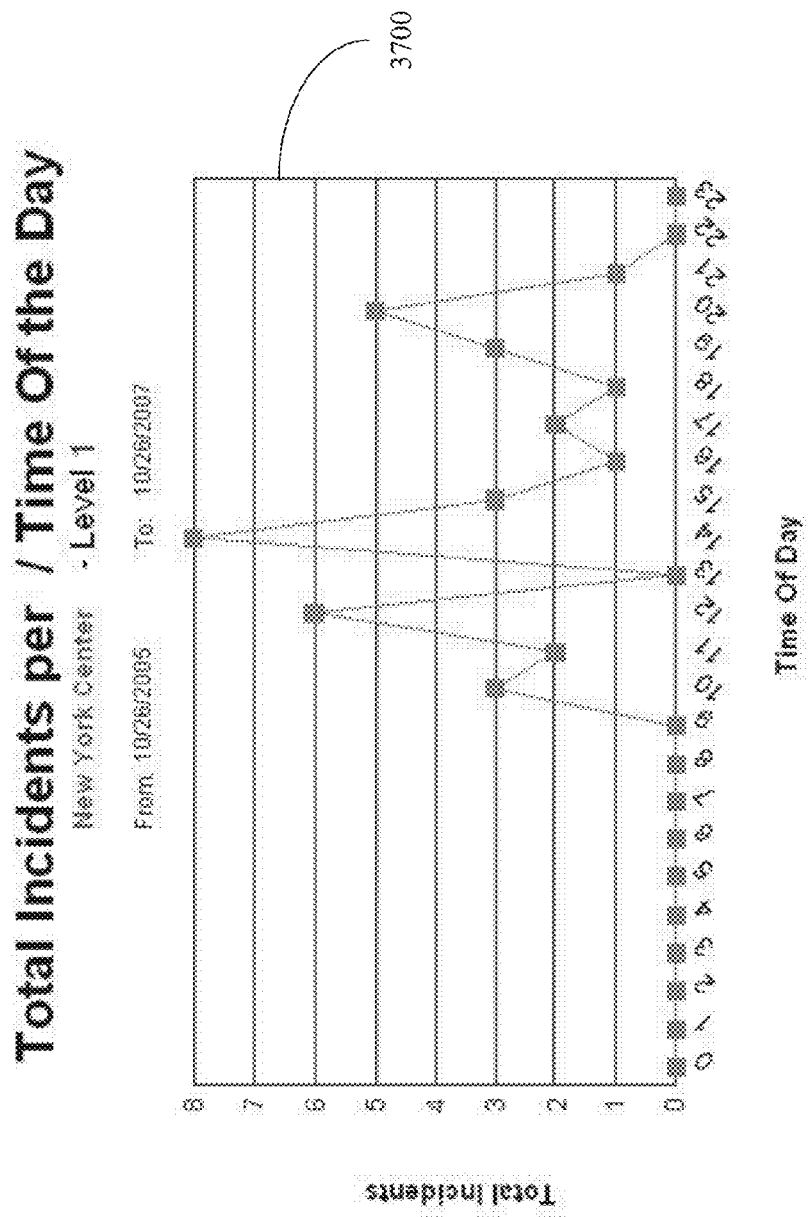
FIG. 37 illustrates a report by time of day in accordance with an embodiment of the present invention.

FIG. 37 illustrates a report by time of day 3700 in accordance with an embodiment of the present invention. With reference to FIGS. 19 and 37, in various embodiments, in a case where the time of day button of the incident statistics section 1920 of the reports menu page 1900 is pressed, information may be entered including a name of a facility, a level or zone of the facility, a category, and a date range, to obtain a report by time of day such as the report by time of day 3700. As illustrated by the example report by time of day 3700, a report by time of day may provide a count of incidents associated with a category at a level or zone of a facility for each hour of the day for incidents that occurred within a specified date range. In various embodiments, an incident is counted for a category if either the main category specified for the incident or the secondary main category specified for the incident matches the category. With reference to FIGS. 3 and 37, in various embodiments, the client computer 321 is programmed to send a request for a report by time of day to the web server 310, the web server 310 is programmed to obtain information needed for the report from the first SQL server 340A, the web server 310 is programmed to provide the report to the client computer 321, and the client computer 321 is programmed to display the report.

Figure 38:
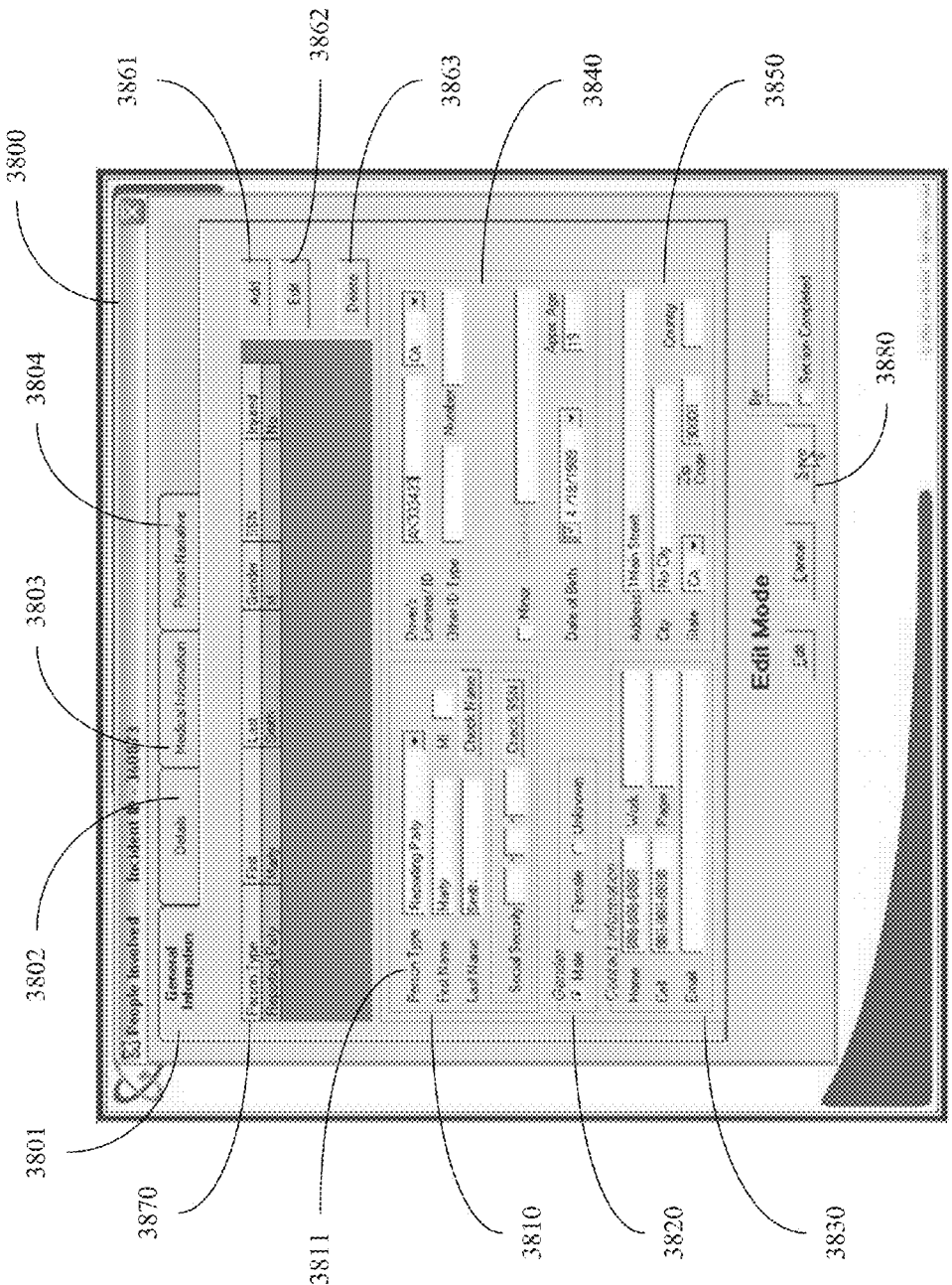
FIG. 38 illustrates a people involved page in accordance with an embodiment of the present invention for specifying people involved in an incident.

FIG. 38 illustrates a people involved page 3800 in accordance with an embodiment of the present invention for specifying people involved in an incident. With reference to FIGS. 3, 5, and 38, in various embodiments, in a case where the client computer 321 receives input in which the people involved button 513 of the incident page 500 is pressed, the client computer 321 sends a request to the web server 310 for the people involved page 3800 to specify people involved in an incident that is currently displayed in the incident page 500 when the people involved button 513 is pressed. Also, in various embodiments, the web server 310 is programmed to provide the people involved page 3800 in response to the request from the client computer 321, and the client computer 321 is programmed to display the people involved page 3800.

In various embodiments, the people involved page 3800 for an incident includes a general information tab 3801, a details tab 3802, a medical information tab 3803, and a person narrative tab 3804. In various embodiments, when the general information tab 3801 is selected, the people involved page 3800 includes a personal information section 3810, a gender section 3820, a contact information section 3830, a personal identification section 3840, an address section 3850, an add button 3861, an edit button 3862, a delete button 3863, a people involved list 3870, and a save button 3880.

In various embodiments, the personal information section 3810 includes one or more text boxes, or the like, for receiving input that specifies a first name, a middle initial, and a last name of a person involved in the incident. Also, in various embodiments, the personal information section 3810 includes a person type section 3811 for indicating a role that the person played in the incident. For example, the person type section 3811 may include a drop-down list, or the like, for selecting a role that the person played in the incident from a list of available roles, such as reporting party, security officer, suspect, tenant employee, vehicle operator, vehicle owner, victim, with injured, or the like. In some embodiments, the person type section 3811 further includes one or more text boxes, or the like, for receiving input that specifies a social security number of the person involved in the incident. Also, in some embodiments, the client computer 321 may be able to communicate with a federal database to check that an entered social security number is a valid social security number for the specified person.

In various embodiments, the gender section 3820 includes a radio button, or the like, for specifying a gender of the person involved in the incident, such as male, female, or unknown. In various embodiments, the contact information section 3830 includes one or more text boxes, or the like, for receiving input that specifies one or more of a home phone number of the person, a work phone number of the person, a cell-phone number of the person, a pager number of the person, an e-mail address of the person, and the like.

In various embodiments, the personal identification section 3840 includes one or more text boxes, drop-down menus, check boxes, or the like, for specifying one or more of a driver's license or identification number of the person, a state of issuance of the driver's license or identification number, another identification number and type for the person, whether the person is a minor, a guardian of the person if the person is a minor, a date of birth of the person, and an approximate age of the person. In various embodiments, the address section 3850 includes one or more text boxes, or the like, for receiving input that specifies one or more of a street address, a city, a state, a zip code, and a country of a residence of the person.

In various embodiments, the client computer 321 is programmed such that in a case where the add button 3861 is pressed, the client computer 321 sends information entered in the people involved page 3800 to the web server 310, and the web server 310 is programmed to generate one or more commands to cause the first SQL server 340A to store the information into a database in association with other information related to the incident. Also, in various embodiments, in a case where the add button 3861 is pressed, the people involved page 3800 is updated to show information about the added person in the people involved list 3870. In some embodiments, each time a new person is added for an incident, information for the new person is added to the people involved list 3870, which shows a list of the people involved in the incident. In various embodiments, the people involved list 3870 shows, for each person involved in the incident, a person type indicating a role the person played in the incident, a first name of the person, a last name of the person, a gender of the person, a social security number (SSN) of the person, and an indication as to whether or not the person was injured in the incident.

In various embodiments, a person may be highlighted in the people involved list 3870, and the edit button 3862 may be pressed to edit information entered in the people involved page 3800 for the person. Also, in various embodiments, a person may be highlighted in the people involved list 3870, and the delete button 3863 may be pressed to delete the person from the people involved list 3870 and to cause the database in the first SQL server 340A to be updated to no longer associate the deleted person with the incident. In various embodiments, the save button 3880 may be pressed to send information entered in the people involved page 3800 from the client computer 321 to the web server 310 to have the web server 310 cause the information to be stored in a database in the first SQL server 340A.

Figure 39:
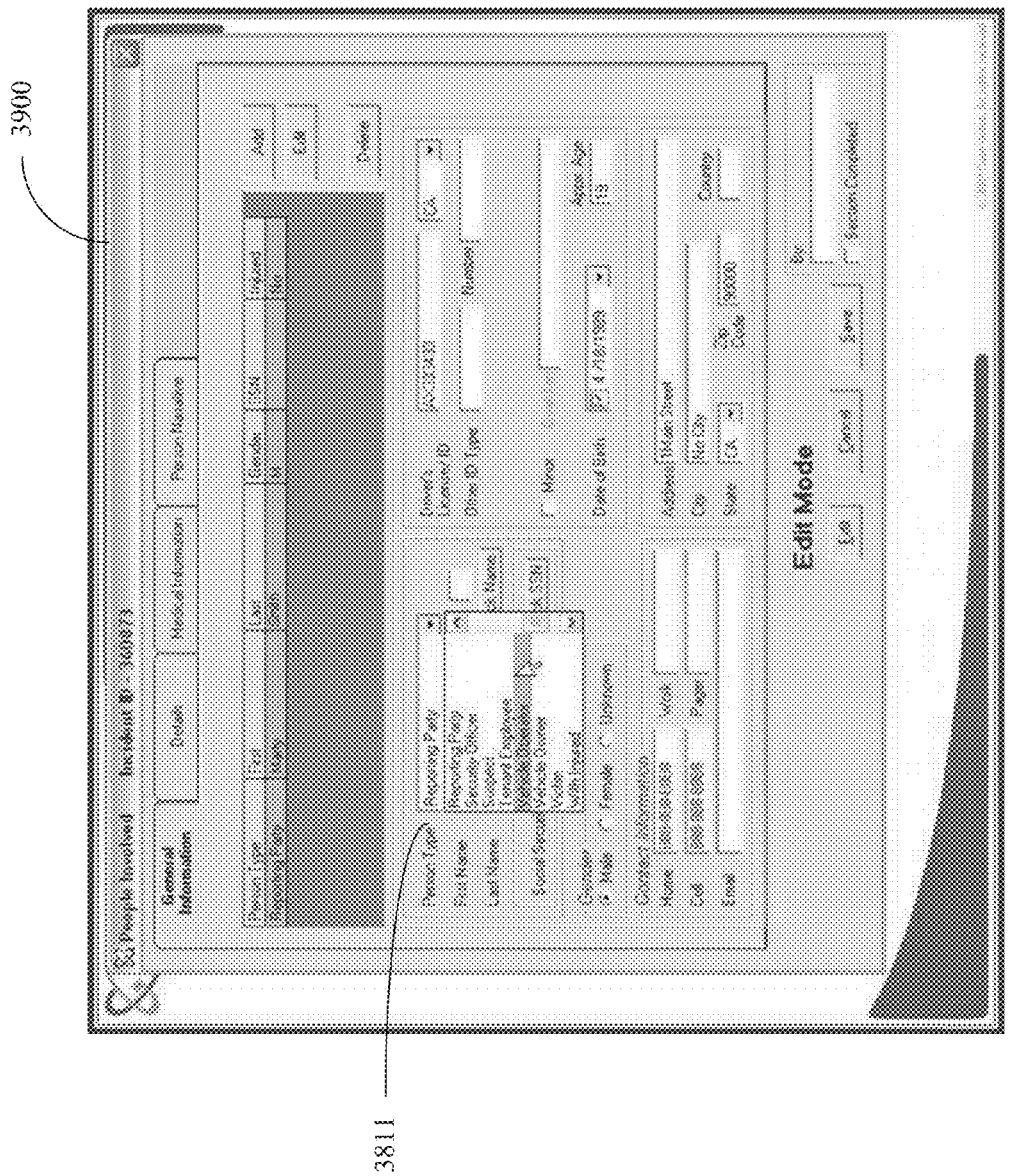
FIG. 39 illustrates a people involved page in accordance with an embodiment of the present invention that shows a selection of a role a person played in an incident.

FIG. 39 illustrates a people involved page 3900 in accordance with an embodiment of the present invention that shows a selection of a role a person played in an incident. The people involved page 3900 of FIG. 39 is similar to the people involved page 3800 of FIG. 38, and shows the person type section 3811 as a drop-down menu for selecting a person type for a person from a list of available person types. In various embodiments, the person type for a person specifies a role that the person played in the corresponding incident. In the example shown in FIG. 39, some of the available roles include reporting party, security officer, suspect, tenant employee, vehicle operator, vehicle owner, victim, and with injured. As an example, in a case where a person was a victim in an incident, a person type for the person may be selected as victim in the person type section 3811.

Figure 40:
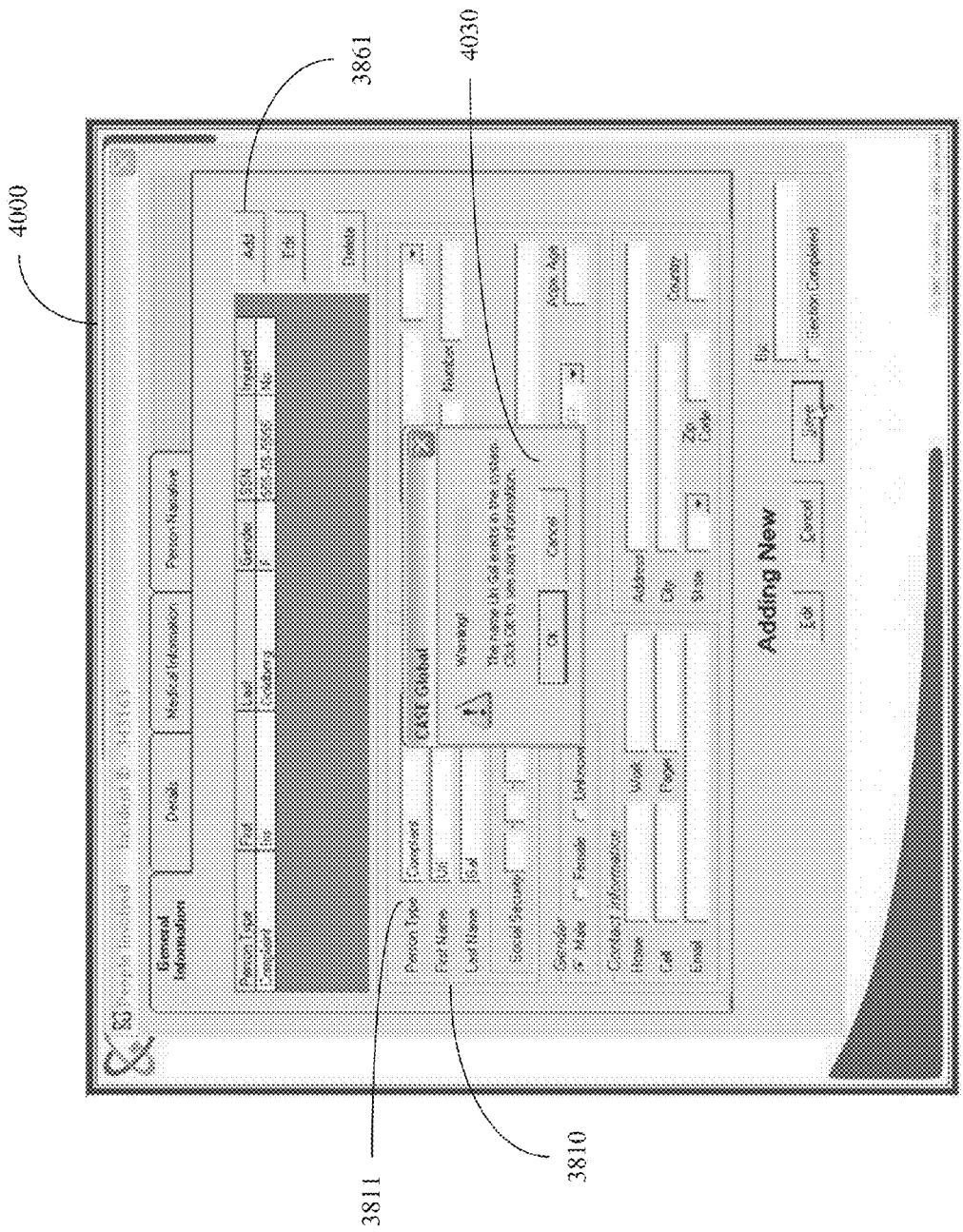
FIG. 40 illustrates a people involved page in accordance with an embodiment of the present invention that shows an identification of a person as being of interest in a case where the person has been involved in one or more other incidents.

FIG. 40 illustrates a people involved page 4000 in accordance with an embodiment of the present invention that shows an identification of a person as being of interest in a case where the person has been involved in one or more other incidents. The people involved page 4000 of FIG. 40 is similar to the people involved page 3800 of FIG. 38. With reference to FIGS. 3 and 40, in various embodiments, in a case where a name of a person involved in an incident at a facility is entered in the personal information section 3810 and a person type is selected for the person in the person type section 3811 and the add button 3861 is pressed, the client computer 321 sends the name of the person and the person type to the web server 310. In various embodiments, the web server 310 generates a SQL query to send to the first SQL server 340A to determine whether or not a person with a same name as the received name is already associated with one or more other incidents.

In various embodiments, the web server 310 is programmed such that, in a case where the web server 310 determines that a person with a same name as the received name is already associated with one or more other incidents, the web server 310 identifies the person being added in the people involved page 4000 as being a person of interest. Also, in various embodiments, the web server 310 is programmed such that in a case where the person being added is identified as being a person of interest, the web server 310 causes the client computer 321 to display as warning, such as a warning message 4030, on a display screen of a display of the client computer 321. In some embodiments, a person is identified as being of interest if the person has been involved in one or more other incidents at the facility.

For instance, in the example illustrated in FIG. 40, a person named Uri Gal is specified as a person making a complaint in an incident at a facility in the personal information section 3810 and the add button 3861 has been pressed to add Uri Gal as a person involved in the incident. Also, in the example illustrated in FIG. 40, when the add button 3861 is pressed, it is automatically determined whether or not the name Uri Gal already exists with respect to one or more other incidents, and the person being added is automatically identified as being of interest because the name Uri Gal already exists with respect to one or more other incidents. Moreover, in the example illustrated in FIG. 40, the warning message 4030 is automatically displayed to warn a user that the name Uri Gal already exists in the system.

Thus, various embodiments allow for receiving input that specifies an incident at a facility including a name of a person associated with the incident and a role the person played in the incident, and for automatically identifying the person as being of interest if the person has been involved in one or more other incidents at the facility. Also, various embodiments allow for automatically displaying a warning on a display screen of a display in a case where the person has been identified as being of interest.

Figure 41:
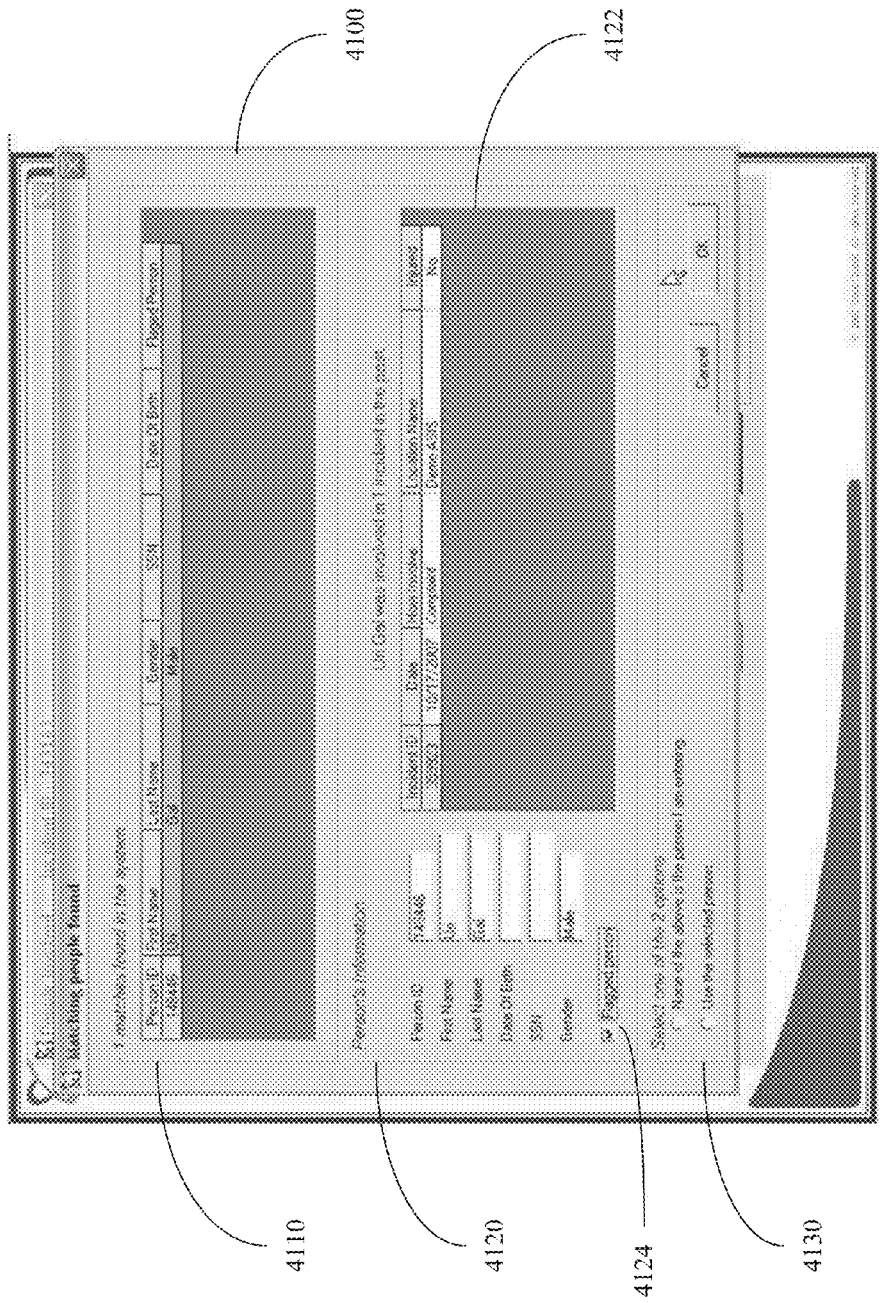
FIG. 41 illustrates a matching people found page in accordance with an embodiment of the present invention.

FIG. 41 illustrates a matching people found page 4100 in accordance with an embodiment of the present invention. With reference to FIGS. 3, 40, and 41, the web server 310 may be programmed to provide the matching people found page 4100 to the client computer 321 in a case where an "ok" button of the warning message 4030 is pressed, where the warning message 4030 indicates that a name of a person entered for an incident at a facility is already associated with one or more other incidents. In various embodiments, the matching people found page 4100 includes a matching people list 4110, a person information section 4120, and a selection section 4130.

In various embodiments, the matching people list 4110 includes a list of people with a same name as a name to be added in the people involved page 4000. In various embodiments, the matching people list 4110 includes, for each potential matching person, a person ID that is a unique identifier for the person, a first name of the person, a last name of the person, a gender of the person, a social security number of the person, a date of birth of the person, and an indication as to whether or not the person is a flagged person. Also, in various embodiments, in a case where a person is highlighted in the matching people list 4110, information for the person is displayed in the person information section 4120.

In various embodiments, the person information section 4120 includes one or more text boxes, or the like, for providing information about a person, such as a person ID of the person, a first name of the person, a last name of the person, a date of birth of the person, a social security number of the person, and a gender of the person. In some embodiments, the person information section 4120 includes a person involvement list 4122 that shows other incidents in which the person has been involved. In various embodiments, the person involvement list 4122 includes information for each incident in which the person has been involved, such as an incident ID that specifies the incident ID of the incident, an incident date of the incident, a role the person played in the incident that specifies how the person was involved in the incident, a location name of a facility at which the incident occurred, and an indication of whether or not the person was injured in the incident.

In various embodiments, the person information section 4120 includes a flagged person section 4124 for specifying whether or not the person is a flagged person. In some embodiments, flagging a person indicates that the person is of great interest and is at a greater risk than the average population of being involved in incidents. In various embodiments, one or more of the client computer 321, the web server 310, and the first SQL server 340A is programmed to automatically flag a person as being of interest in a case where the person has played a same role as a role indicated in the person type section 3811 in at least one other incident at the facility. Thus, various embodiments allow for flagging a person in a case where the person has played a same role in at least two incidents at a facility. In some embodiments, the flagged person section 4124 includes a check box, or the like, that also allows for a user to flag a person.

In various embodiments, the selection section 4130 includes a radio button, or the like, that allows for a selection from among options such as: (i) none of the above is the person I am entering; and (ii) use the selected person. Thus, the selection section 4130 allows for specifying whether the person to be added is the selected person from the matching people list 4110 or whether the person to be added does not exist in the matching people list and should be added as a new person.

Figure 42:
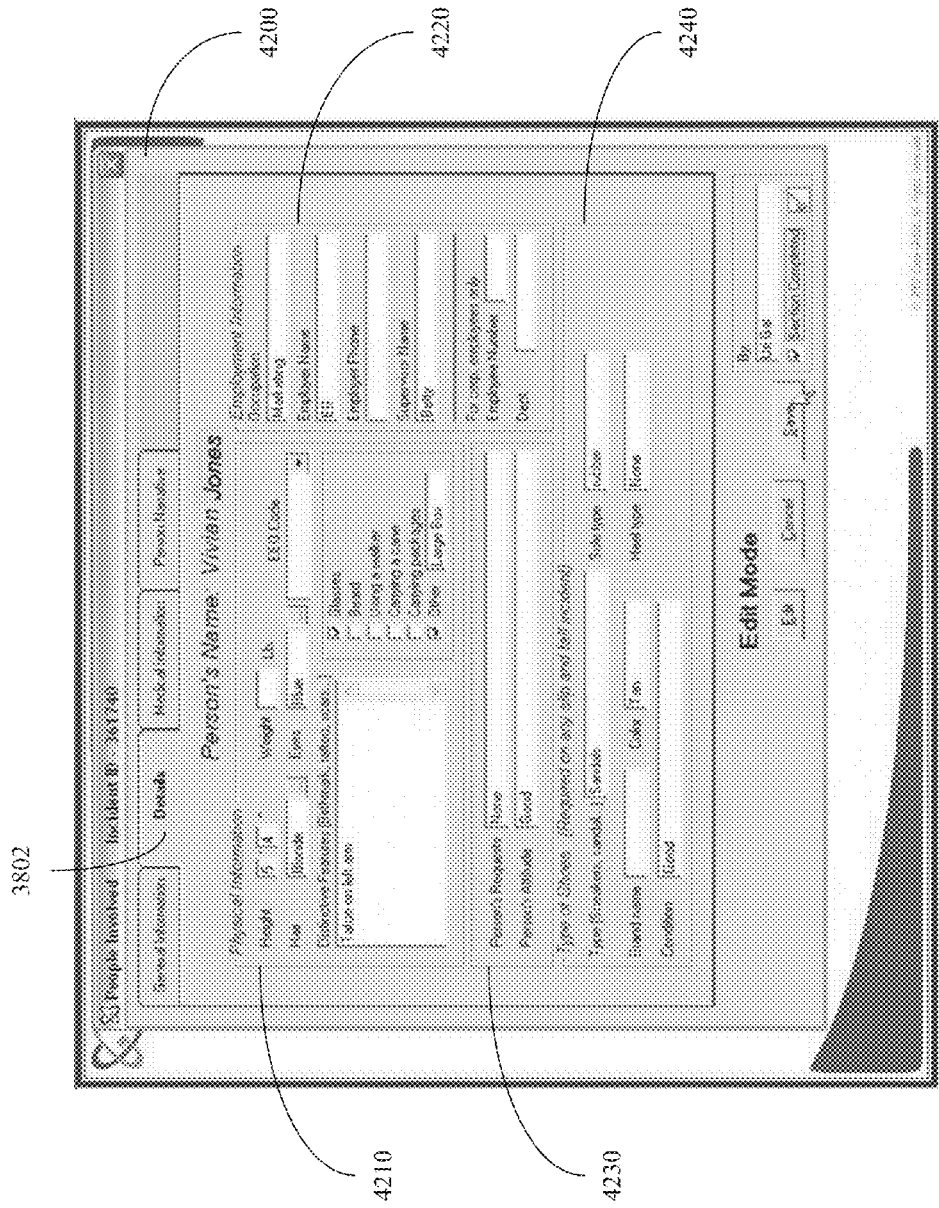
FIG. 42 illustrates a people involved page in accordance with an embodiment of the present invention that shows fields for entering details about a person involved in an incident at a facility.

FIG. 42 illustrates a people involved page 4200 in accordance with an embodiment of the present invention that shows fields for entering details about a person involved in an incident at a facility. In the people involved page 4200, the details tab 3802 has been selected. In various embodiments the people involved page 4200 includes a physical information section 4210, an employment information section 4220, a request and attitude section 4230, and a type of shoes section 4240.

In various embodiments, the physical information section 4210 includes one or more text boxes, check boxes, or the like, for providing physical information about the person such as height, weight, hair color, eye color, distinctive features, and whether or not the person was wearing glasses, has a beard, was using a walker, was carrying a cane, was carrying packages, or other. In various embodiments, the employment information section 4220 includes one or more text boxes, or the like, for providing employment information about the person such as occupation, employer name, employer phone number, supervisor name, employee number, and department.

In various embodiments, the request and attitude section 4230 includes one or more text boxes, or the like, for receiving input specifying the person's requests, the person's attitude, or the like. In various embodiments, the type of shoes section 4240 includes information concerning a type of shoes the person was wearing during the incident, such as shoe type, sole type, brand name, color, heel type, shoe conditions, and the like. With reference to FIGS. 3 and 42, in various embodiments, a save button of the people involved page 4200 may be pressed to send information entered in the people involved page 4200 from the client computer 321 to the web server 310 to have the web server 310 cause the information to be stored in a database in the first SQL server 340A in association with other information related to the incident.

Figure 43:
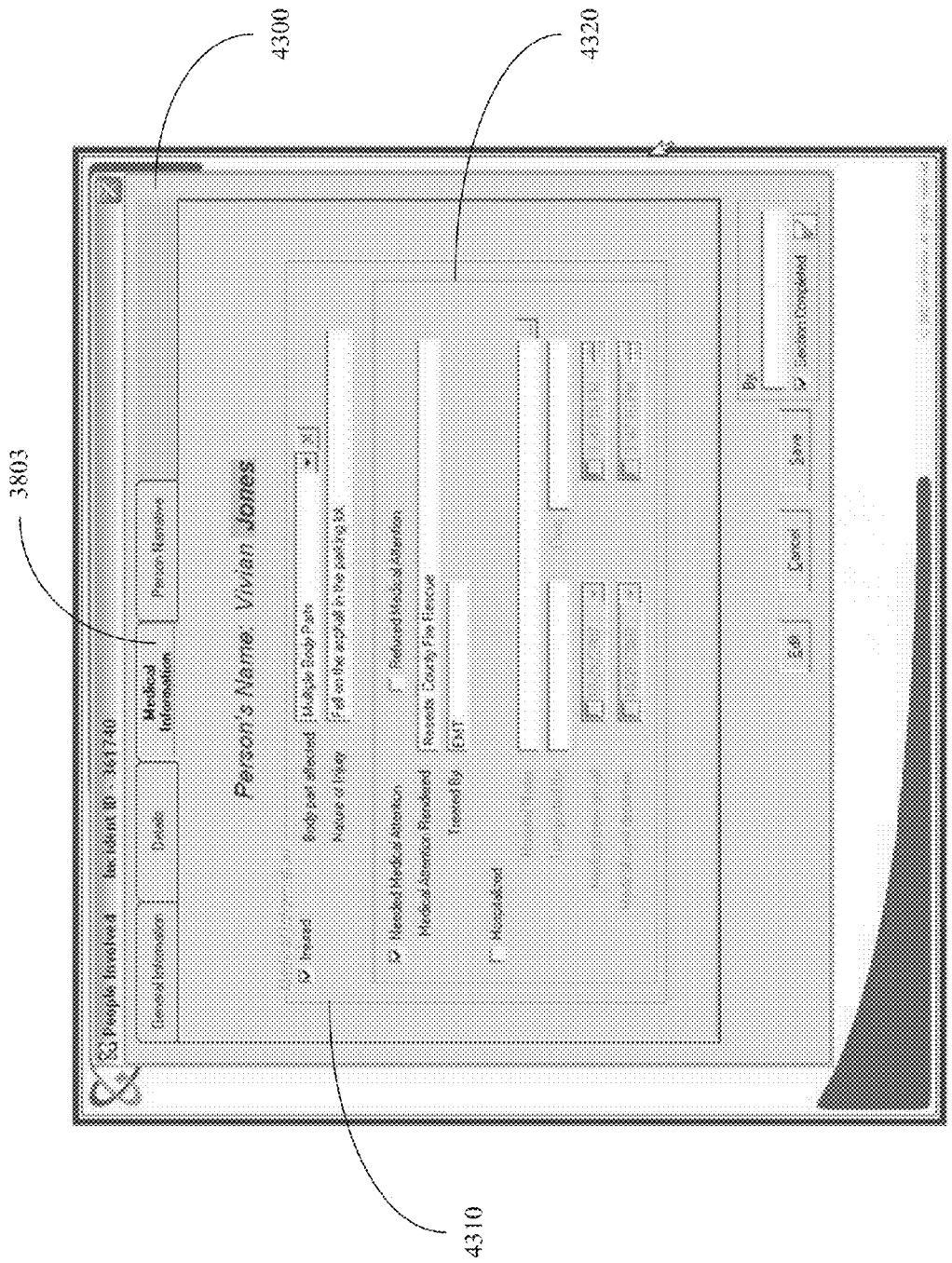
FIG. 43 illustrates a people involved page in accordance with an embodiment of the present invention that shows fields for entering medical information about a person involved in an incident at a facility.

FIG. 43 illustrates a people involved page 4300 in accordance with an embodiment of the present invention that shows fields for entering medical information about a person involved in an incident at a facility. In the people involved page 4300, the medical information tab 3803 has been selected. In various embodiments, the people involved page 4300 includes a medical information section 4310. In various embodiments, the medical information section 4310 includes one or more text boxes, drop-down lists, check boxes, or the like, for specifying medical information about the person such as whether or not the person was injured in the incident, which body part of the person was affected, and the nature of the injury.

In various embodiments, the medical information section 4310 further includes a medical attention section 4320. In various embodiments, the medical attention section 4320 includes one or more text boxes, drop-down lists, check boxes, or the like, for receiving input concerning medical attention, such as whether the person needed medical attention, whether the person refused medical attention, whether medical attention was rendered on the person, who treated the person, whether the person was hospitalized as a result of the incident, a name of the hospital, who transported the person to the hospital, where the person was transported from, a date and time a medical crew arrived, and a date and time the medical crew departed. With reference to FIGS. 3 and 43, in various embodiments, a save button of the people involved page 4300 may be pressed to send information entered in the people involved page 4300 from the client computer 321 to the web server 310 to have the web server 310 cause the information to be stored in a database in the first SQL server 340A in association with other information related to the incident.

Figure 44:
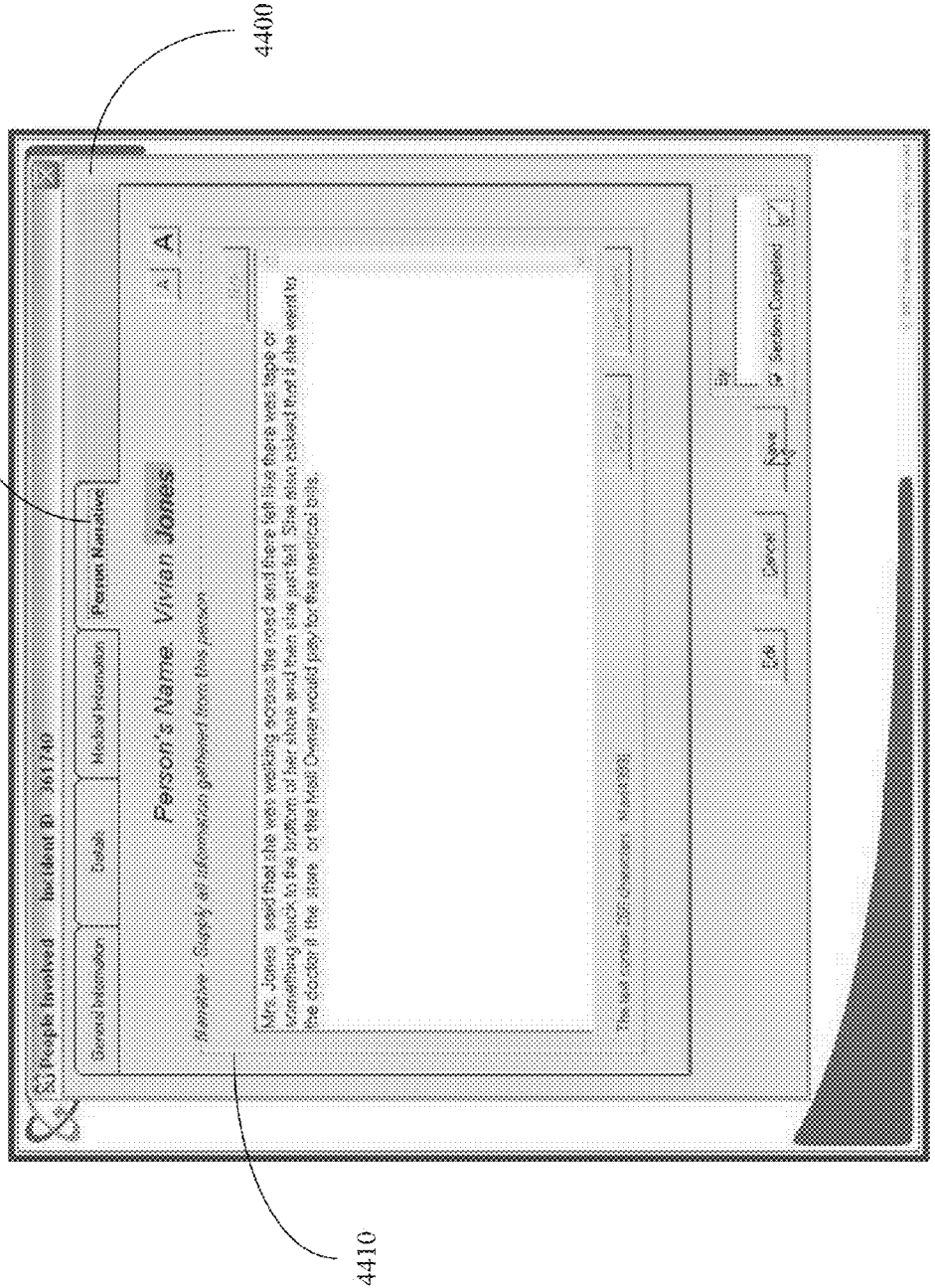
FIG. 44 illustrates a people involved page in accordance with an embodiment of the present invention that shows a field for entering a narrative obtained from a person involved in an incident at a facility.

FIG. 44 illustrates a people involved page 4400 in accordance with an embodiment of the present invention that shows a field for entering a narrative obtained from a person involved in an incident at a facility. In the people involved page 4400, the person narrative tab 3804 has been selected. In various embodiments, the people involved page 4400 includes narrative section 4410 with a text box, or the like, for receiving input that specifies information gathered from the person involved in the incident. With reference to FIGS. 3 and 44, in various embodiments, a save button of the people involved page 4400 may be pressed to send information entered in the people involved page 4400 from the client computer 321 to the web server 310 to have the web server 310 cause the information to be stored in a database in the first SQL server 340A in association with other information related to the incident.

Figure 45:
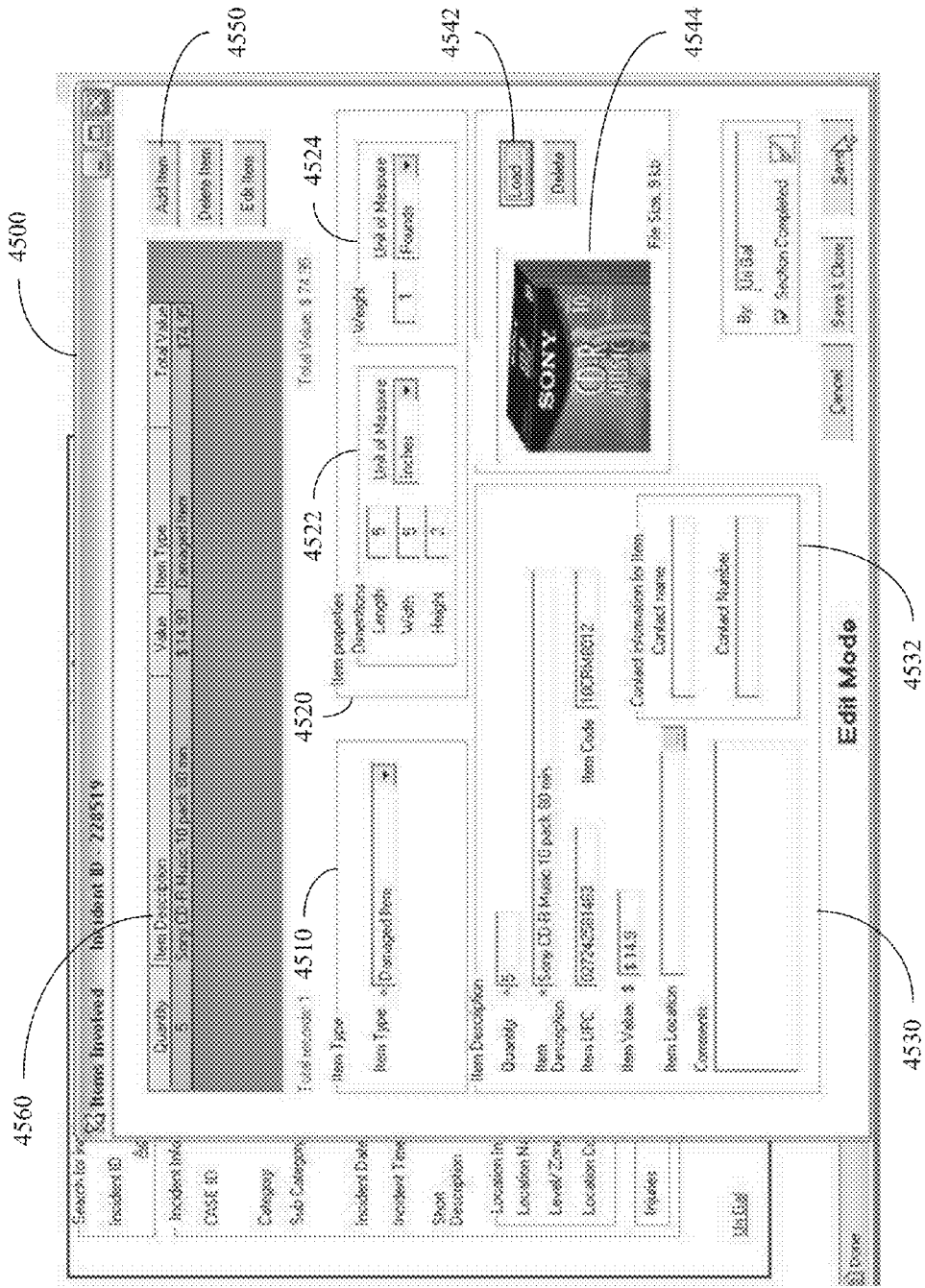
FIG. 45 illustrates an items involved page in accordance with an embodiment of the present invention for receiving input that specifies information about one or more items involved in an incident.

FIG. 45 illustrates an items involved page 4500 in accordance with an embodiment of the present invention for receiving input that specifies information about one or more items involved in an incident. With reference to FIGS. 3, 5, and 45, in various embodiments, in a case where the client computer 321 receives input in which the items involved button 514 of the incident page 500 is pressed, the client computer 321 sends a request to the web server 310 for the items involved page 4500 to specify items involved in an incident that is currently displayed in the incident page 500 when the items involved button 514 is pressed. Also, in various embodiments, the web server 310 is programmed to provide the items involved page 4500 in response to the request from the client computer 321, and the client computer 321 is programmed to display the items involved page 4500.

In various embodiments, the items involved page 4500 for an incident at a facility includes an item type section 4510, an item properties section 4520, an item description section 4530, a load button 4542, an item picture section 4544, an add item button 4550, and an items involved list 4560. In various embodiments, the item type section 4510 includes a drop-down list, a text box, or the like, for receiving input that specifies an item type of an item, such as a damaged item, a stolen item, a returned item, or the like. In various embodiments, the item properties section 4520 includes an item dimensions section 4522 and an item weight section 4524. In various embodiments, the item dimensions section 4522 includes one or more text boxes, drop-down lists, or the like, for specifying information about dimension of the item, such as a length, a width, and a height of the item, and a unit of measurement. In various embodiments, the item weight section 4524 includes one or more text boxes, drop-down lists, or the like, for specifying information about a weight of the item, such as a weight of the item and a unit of measurement.

In various embodiments, the item description section 4530 includes one or more text boxes, or the like, for specifying information about a description of the item, such as a quantity of the item involved in the incident, an item description such as a name of the item, a universal product code (UPC) of the item, an item code of the item, a value of the item, a location of the item, and other comments. Also, in various embodiments, the item description section 4530 further includes a contact information section 4532 for specifying contact information for the item, such as a contact name and a contact number. In various embodiments, the load button 4542 allows for loading a picture of the item from a storage device and for showing the loaded picture of the item in the item picture section 4544.

In various embodiments, the client computer 321 is programmed such that in a case where the add item button 4550 is pressed, the client computer 321 sends information entered in the items involved page 4500 to the web server 310, and the web server 310 is programmed to generate one or more commands to cause the first SQL server 340A to store the information into a database in association with other information related to the incident. Also, in various embodiments, in a case where the add item button 4550 is pressed, the items involved page 4500 is updated to show information about the added item in the items involved list 4560. In some embodiments, each time a new item is added for an incident, information for the new item is added to the items involved list 4560, which shows a list of the items involved in the incident. In various embodiments, the items involved list 4560 shows, for each item involved in the incident, a quantity of the item involved in the incident, an item description of the item, a value of the item, an item type of the item, and a total value taking into account the value of the item and the quantity of the item involved in the incident.

Figure 46:
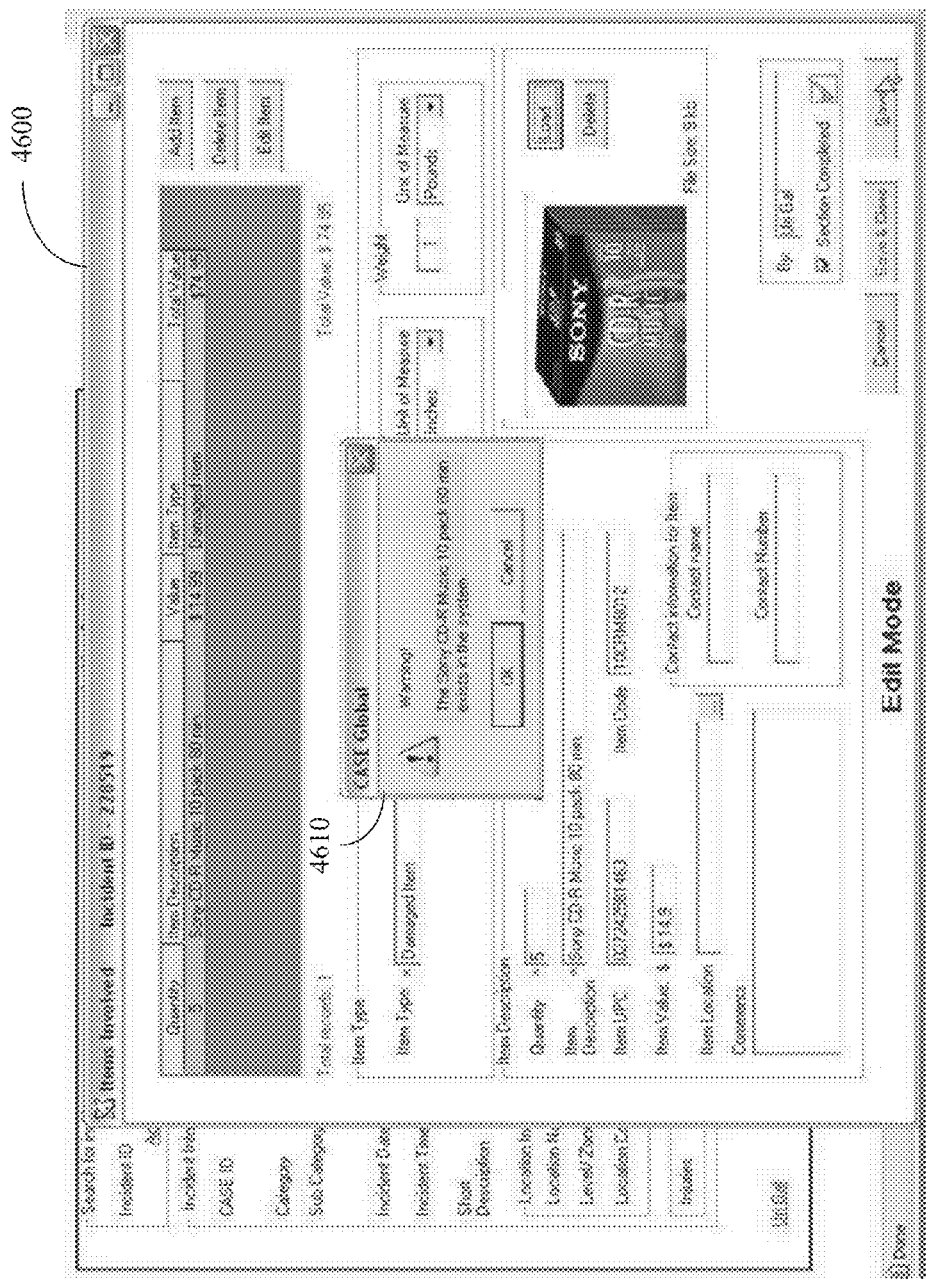
FIG. 46 illustrates an items involved page in accordance with an embodiment of the present invention that shows an identification of an item as being of interest in a case where the item has been involved in one or more other incidents.

FIG. 46 illustrates an items involved page 4600 in accordance with an embodiment of the present invention that shows an identification of an item as being of interest in a case where the item has been involved in one or more other incidents. The items involved page 4600 of FIG. 46 is similar to the items involved page 4500 of FIG. 45. With reference to FIGS. 3, 45, and 46, in various embodiments, in a case where at least one of an item description, an item UPC, and an item code is entered in the item description section 4530 and the add item button 4550 is pressed, the client computer 321 sends the at least one of the item description, the item UPC, and the item code to the web server 310. In various embodiments, the web server 310 generates a SQL query to send to the first SQL server 340A to determine whether or not an item with at least one of a same item description, a same item UPC, or a same item code as the received at least one of the item description, the item UPC, and the item code is already associated with one or more other incidents.

In various embodiments, the web server 310 is programmed such that, in a case where the web server 310 determines that there is a match of at least one of the item description, the item UPC, and the item code with an item already involved in one or more other incidents, the web server 310 identifies the item being added in the items involved page 4500 as being an item of interest. Also, in various embodiments, the web server 310 is programmed such that in a case where the item being added is identified as being an item of interest, the web server 310 causes the client computer 321 to display a warning, such as a warning message 4610, on a display screen of a display of the client computer 321. In such embodiments, the client computer 321 is programmed to display the warning, such as the warning message 4610 on the display screen. In some embodiments, an item is identified as being of interest if the item has been involved in one or more other incidents at the facility.

For instance, in the example illustrated in FIGS. 45 and 46, an item named "Sony CD-R Music 10 pack 80 min." is specified as an item involved in an incident at a facility in the item description section 4530 and the add item button 4550 has been pressed to add the item as being involved in the incident. Also, in the example illustrated in FIGS. 45 and 46, when the add item button 4550 is pressed, it is automatically determined whether or not the item name "Sony CD-R Music 10 pack 80 min." already exists with respect to one or more other incidents, and the item being added is automatically identified as being of interest because the name already exists with respect to one or more other incidents. Moreover, in the example illustrated in FIGS. 45 and 46, the warning message 4610 is automatically displayed to warn a user that the item already exists in the system.

In various embodiments, the web server 310 is programmed to determine how many times items of a same type, items having a same item description, items having a same item UPC, and/or items having a same item code as a currently added item in the items involved page 4600 have been involved in incidents at the facility within a specified date range. In such embodiments, the web server 310 may be programmed to make such a determination by generating one or more SQL queries to send to the first SQL server 340A to retrieve such information, and the web server 310 may be programmed to send the information to the client computer 321. In various embodiments, the client computer 321 is programmed to display information related to how many times items of a same type, items having a same item description, items having a same item UPC, and/or items having a same item code as a currently added item in the items involved page 4600 have been involved in incidents at the facility within the specified date range.

Thus, various embodiments allow for receiving input that specifies an item involved in an incident at a facility and for identifying the item as being of interest in a case where the item has been involved in one or more other incidents at the facility. Also, various embodiments allow for displaying a warning on a display screen in a case where the item is identified as being of interest. Moreover, various embodiments allow for displaying information relating to how many times items of a same type, items having a same item description, items having a same item UPC, and/or items having a same item code as a currently added item have been involved in incidents within a specified date range.

Figure 47:
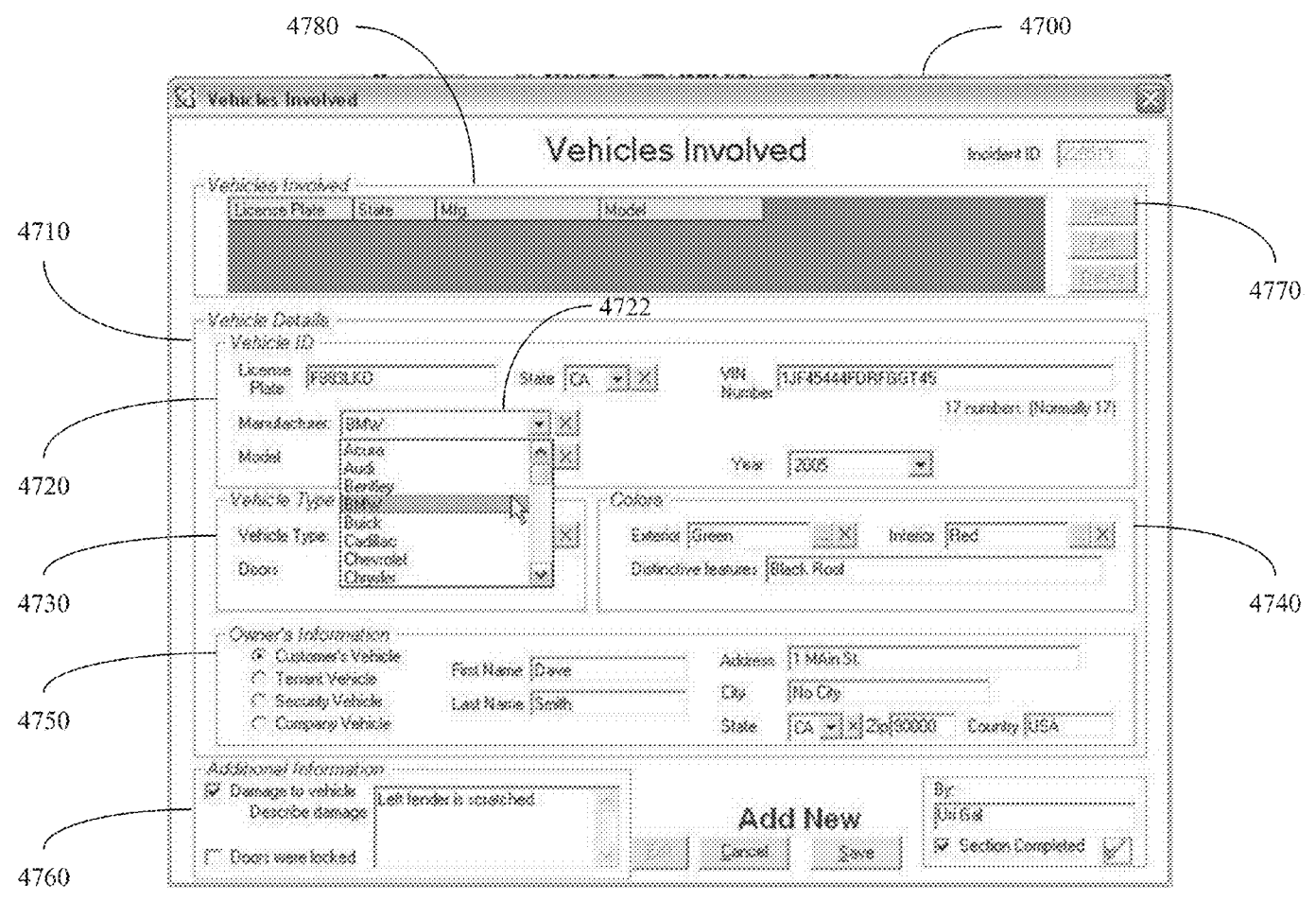

FIG. 47 illustrates a vehicles involved page 4700 in accordance with an embodiment of the present invention for receiving input that specifies information about one or more vehicles involved in an incident. With reference to FIGS. 3, 5, and 47, in various embodiments, in a case where the client computer 321 receives input in which the vehicles involved button 515 of the incident page 500 is pressed, the client computer 321 sends a request to the web server 310 for the vehicles involved page 4700 to specify vehicles involved in an incident that is currently displayed in the incident page 500 when the vehicles involved button 515 is pressed. Also, in various embodiments, the web server 310 is programmed to provide the vehicles involved page 4700 in response to the request from the client computer 321, and the client computer 321 is programmed to display the vehicles involved page 4700.

In various embodiments, the vehicles involved page 4700 for an incident at a facility includes a vehicle details section 4710, an additional information section 4760, an add button 4770, and a vehicles involved list 4780. In various embodiments, the vehicle details section 4710 includes a vehicle ID section 4720, a vehicle type section 4730, a colors section 4740, and an owner information section 4750.

In various embodiments, the vehicle ID section 4720 includes one or more text boxes, drop-down lists, or the like, for receiving input that specifies identification information about a vehicle, such as a license plate number of the vehicle, a state of registration of the vehicle, a vehicle identification number (VIN number) of the vehicle, a manufacturer or make of the vehicle, a model of the vehicle, and a year of the vehicle. In various embodiments, the vehicle type section 4730 includes one or more text boxes, drop-down lists, or the like, for receiving input that specifies information about the vehicle, such as vehicle type and number of doors of the vehicle.

In various embodiments, the colors section 4740 includes one or more text boxes, drop-down lists, menus, or the like, for receiving input that specifies colors of the vehicles, such as exterior color, interior color, and distinctive features of the vehicle. In various embodiments, the owner information section 4750 includes one or more text boxes, drop-down lists, radio buttons, or the like, for receiving input that specifies information about an owner of the vehicle, such as whether the vehicle is a customer's vehicle or a tenant vehicle or a security vehicle or a company vehicle, a first name of the owner, a last name of the owner, a street address, a city, a state, a zip code, and a country of the owner. In various embodiments, the additional information section 4760 includes one or more text boxes, check boxes, or the like, for receiving input that specifies additional information about the vehicle, such as whether there has been damage to the vehicle, a description of the damage, and whether the doors were locked.

In various embodiments, the client computer 321 is programmed such that in a case where the add button 4770 is pressed, the client computer 321 sends information entered in the vehicles involved page 4700 to the web server 310, and the web server 310 is programmed to generate one or more commands to cause the first SQL server 340A to store the information into a database in association with other information related to the incident. Also, in various embodiments, in a case where the add button 4770 is pressed, the vehicles involved page 4700 is updated to show information about the added vehicle in the vehicles involved list 4780. In some embodiments, each time a new vehicle is added for an incident, information for the new vehicle is added to the vehicles involved list 4780, which shows a list of the vehicles involved in the incident. In various embodiments, the vehicles involved list 4780 shows, for each vehicle involved in the incident, a license plate number of the vehicle, a state of registration of the vehicle, a manufacturer or make of the vehicle, and a model of the vehicle.

FIG. 47 illustrates an example in which a manufacturer is being selected for a vehicle in the vehicles involved page 4700. The manufacturer of a vehicle is also known as the make of the vehicle. As illustrated in FIG. 47, in various embodiments the vehicle ID section 4720 includes a manufacturer section 4722 for receiving input that specifies a make of the vehicle. In various embodiments, the manufacturer section 4722 includes a drop-down list, or the like, with manufacturer names, such as Acura, Audi, Bentley, BMW, Buick, Cadillac, Chevrolet, Chrysler, Ford, and the like. In such embodiments, a make of the vehicle being added may be selected from the drop-down list.

Figure 48:
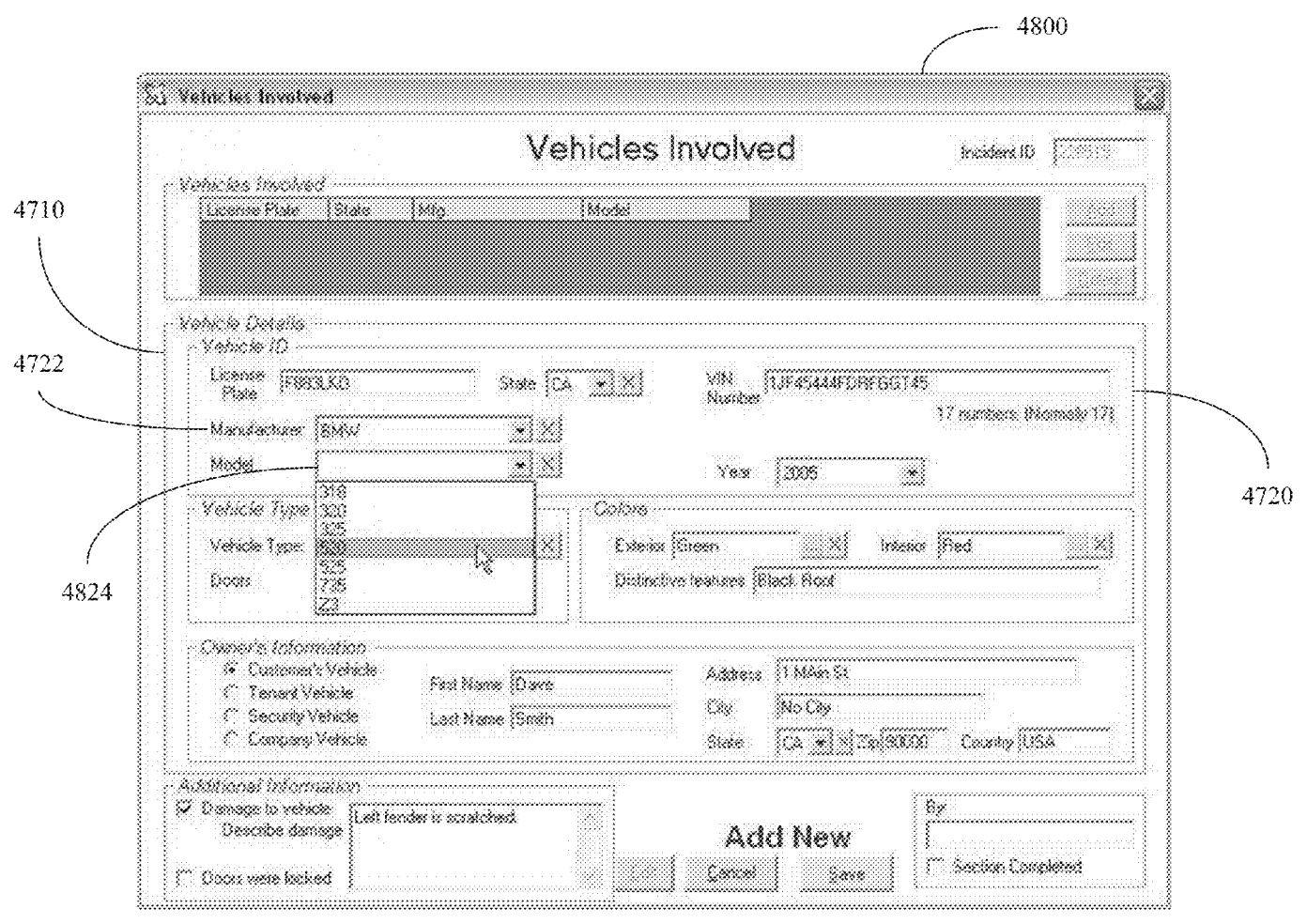

FIG. 48 illustrates a vehicles involved page 4800 in accordance with an embodiment of the present invention that shows a selection of a model of a vehicle. As illustrated in FIG. 48, in various embodiments the vehicle ID section 4720 of the vehicle details section 4710 includes a model section 4824 for receiving input that specifies a model of the vehicle. In various embodiments, the model section 4824 includes a drop-down list, or the like, with available models to select that are based on a make specified in the manufacturer section 4722. For instance, in the example provided in FIG. 48, a make of a vehicle has been selected in the manufacturer section 4722 as "BMW", and the available models in the model section 4824 include models of BMW vehicles, such as "318", "320", "325", "520", "525", "735", and "Z3".

Figure 49:
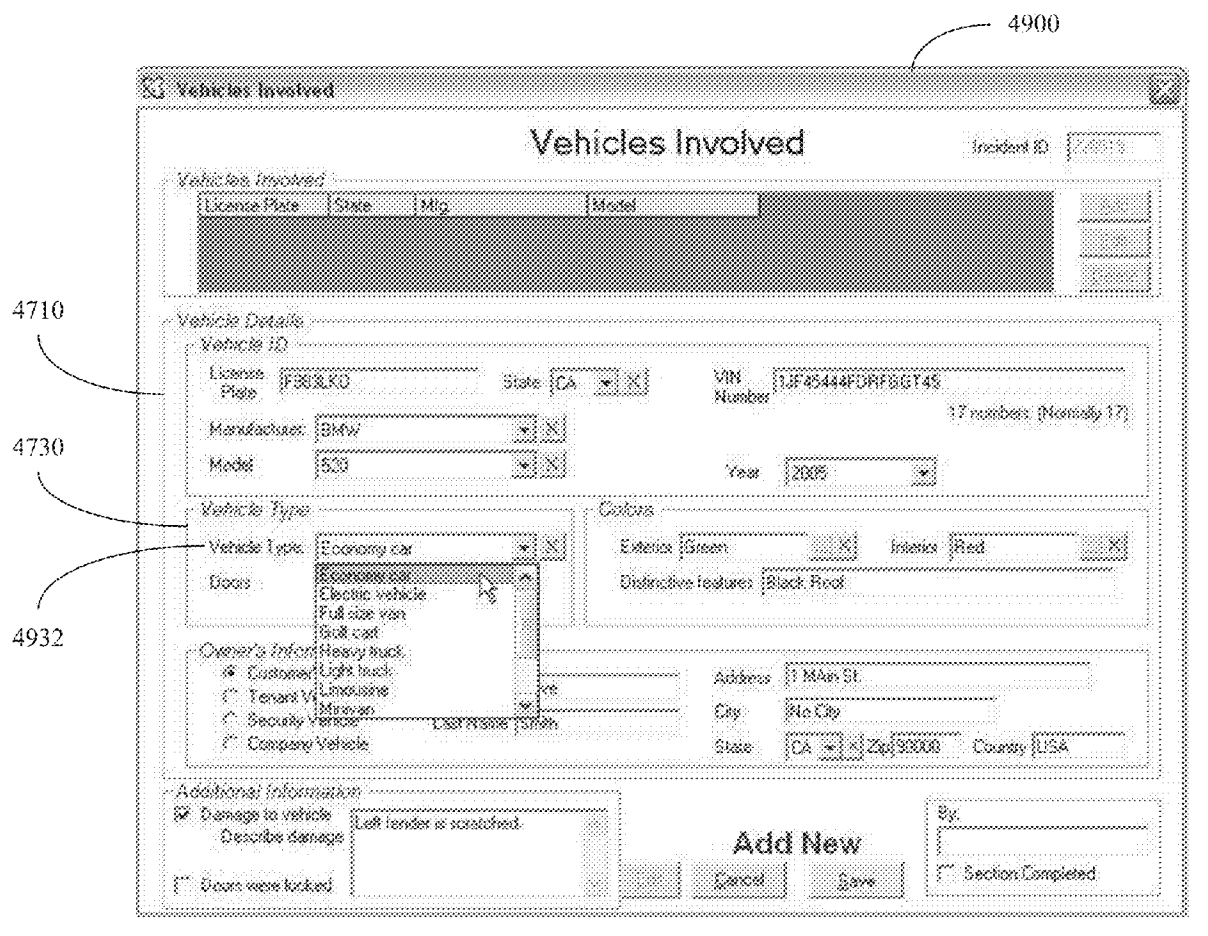

FIG. 49 illustrates a vehicles involved page 4900 in accordance with an embodiment of the present invention that shows a selection of a type of a vehicle. In various embodiments, the vehicle type section 4730 of the vehicle details section 4710 includes a vehicle type drop-down list 4932 for receiving input that specifies a type of the vehicle, such as economy car, electric vehicle, full size van, golf cart, heavy truck, light truck, limousine, minivan, or the like. In some embodiments, the type of the vehicle is automatically determined based on the make and model of the vehicle specified in the vehicle details section 4710.

Figure 50:
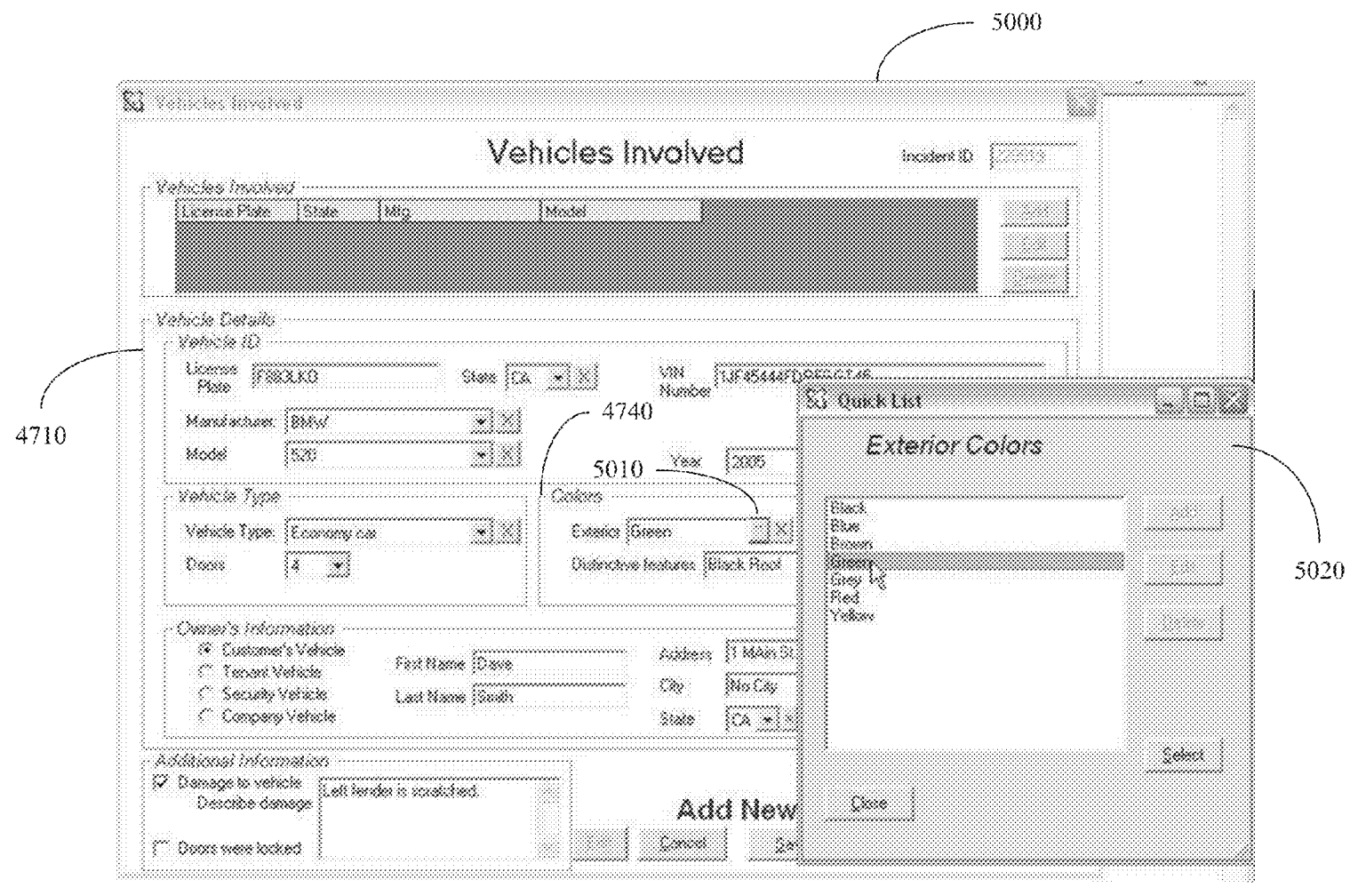

FIG. 50 illustrates a vehicles involved page 5000 in accordance with an embodiment of the present invention that shows a selection of one or more exterior colors of a vehicle. In various embodiments, the colors section 4740 of the vehicle details section 4710 includes a color pop-up menu button 5010 that when pressed provides an exterior color pop-up menu 5020 for receiving input that specifies one or more exterior colors of the vehicle, such as black, blue, brown, green, grey, red, and yellow.

Figure 51:
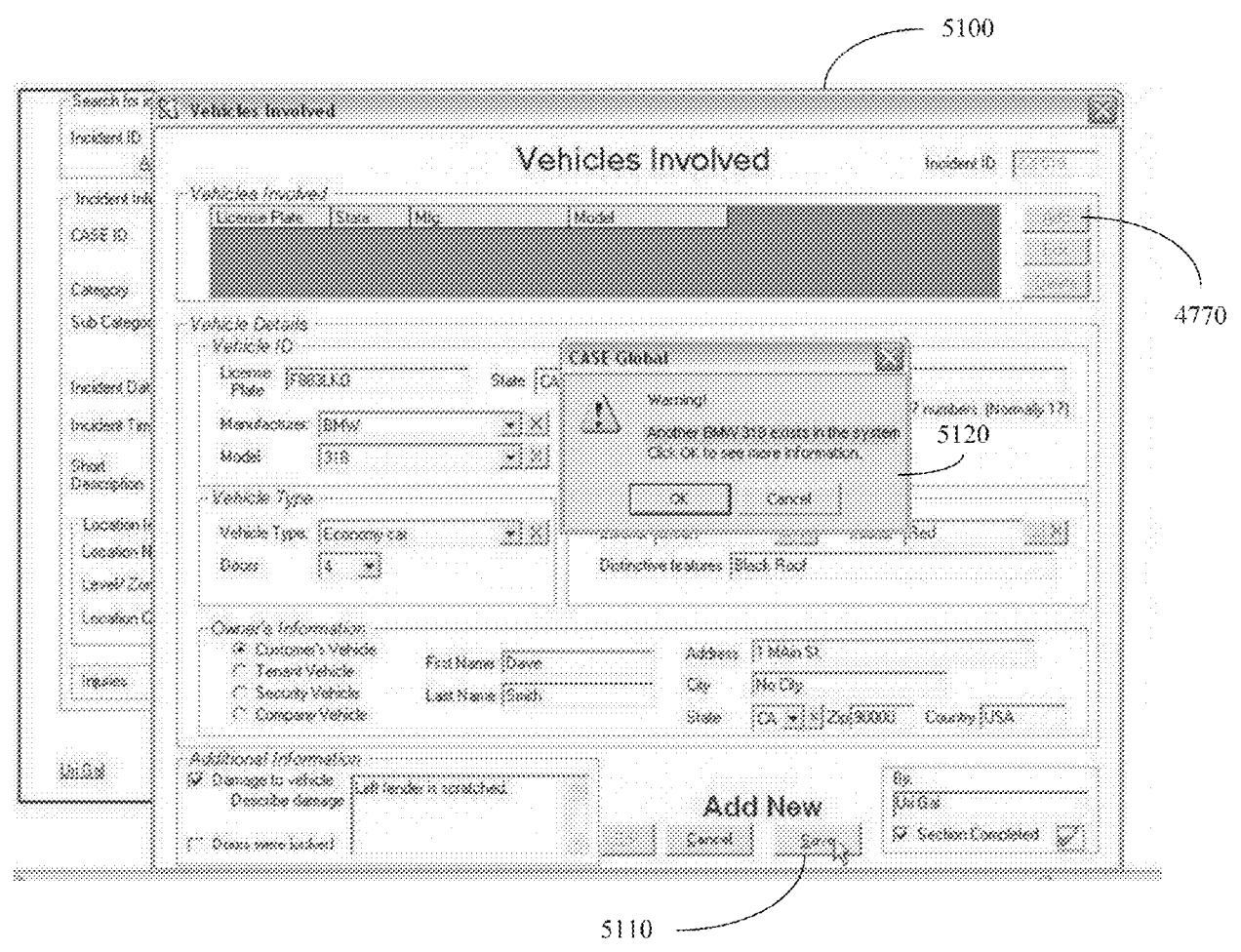

FIG. 51 illustrates a vehicles involved page 5100 in accordance with an embodiment of the present invention that shows an identification of a vehicle as being of interest. The vehicles involved page 5100 of FIG. 51 is similar to the vehicles involved page 4700 of FIG. 47. With reference to FIGS. 3, 47, and 51, in various embodiments, in a case where at least one of a license plate number, a VIN number, a make, a model, and an owner name is entered in the vehicle details section 4710 and the add button 4770 is pressed, the client computer 321 sends the at least one of the license plate number, the VIN number, the make, the model, and the owner name to the web server 310.

In various embodiments, the web server 310 is programmed to generate a SQL query to send to the first SQL server 340A to determine whether or not a vehicle with a same license plate number as a license plate number of a vehicle being added in the vehicles involved page 4700 is already associated with one or more other incidents. Also, in various embodiments, the web server 310 is programmed to identify the vehicle being added as being a vehicle of interest in a case where it is determined that a vehicle with a same license plate number as a license plate number of the vehicle being added is already associated with one or more other incidents. In some embodiments, the web server 310 is programmed to check for both a same license plate number and a same state of registration to determine whether a vehicle is of interest. Also, in some embodiments, the one or more other incidents are one or more other incidents that occurred at a same facility as a facility where the incident involving the vehicle being added occurred.

In various embodiments, the web server 310 is programmed to generate a SQL query to send to the first SQL server 340A to determine whether or not a vehicle with a same VIN number as a VIN number of a vehicle being added in the vehicles involved page 4700 is already associated with one or more other incidents. Also, in various embodiments, the web server 310 is programmed to identify the vehicle being added as being a vehicle of interest in a case where it is determined that a vehicle with a same VIN number as a VIN number of the vehicle being added is already associated with one or more other incidents. In some embodiments, the web server 310 is programmed to check for both a same VIN number and a same license plate number to determine whether a vehicle is of interest. Also, in some embodiments, the one or more other incidents are one or more other incidents that occurred at a same facility as a facility where the incident involving the vehicle being added occurred.

In various embodiments, the web server 310 is programmed to generate a SQL query to send to the first SQL server 340A to determine whether or not a vehicle with a same make and model as a make and model of a vehicle being added in the vehicles involved page 4700 is already associated with one or more other incidents. Also, in various embodiments, the web server 310 is programmed to identify the vehicle being added as being a vehicle of interest in a case where it is determined that a vehicle with a same make and model as a make and model of the vehicle being added is already associated with one or more other incidents. In some embodiments, the one or more other incidents are one or more other incidents that occurred at a same facility as a facility where the incident involving the vehicle being added occurred. Also, in some embodiments, the web server 310 is programmed to determine whether at least "m" other vehicles with a same make and model as the make and model of the vehicle being added have already been associated with other incidents, and to identify the vehicle being added as being of interest in a case where it is determined that there have been at least "m" such other vehicles, where "m" may be set to any desired integer value.

In various embodiments, the web server 310 is programmed to generate a SQL query to send to the first SQL server 340A to determine whether or not a vehicle with a same owner as an owner of a vehicle being added in the vehicles involved page 4700 is already associated with one or more other incidents. Also, in various embodiments, the web server 310 is programmed to identify the vehicle being added as being a vehicle of interest in a case where it is determined that a vehicle with a same owner as an owner of the vehicle being added is already associated with one or more other incidents. In some embodiments, the one or more other incidents are one or more other incidents that occurred at a same facility as a facility where the incident involving the vehicle being added occurred.

In various embodiments, the web server 310 is programmed such that in a case where the vehicle being added is identified as being a vehicle of interest, the web server 310 causes the client computer 321 to display a warning, such as a warning message 5120, on a display screen of a display of the client computer 321, such as a display screen of the display 160 of the computer 100 of FIG. 1. Also, in such embodiments, the client computer 321 is programmed to display the warning, such as the warning message 5120 on the display screen.

For instance, in the example illustrated in FIG. 51, a vehicle with a make of "BMW" and a model of "318" is specified as a vehicle involved in an incident at a facility and the add button 4770 or a save button 5110 has been pressed to add the vehicle as being involved in the incident. Also, in the example illustrated in FIG. 51, when the add button 4770 is pressed, it is automatically determined whether or not the make of "BMW" and the model of "318" already exist with respect to vehicles involved in one or more other incidents, and the vehicle being added is automatically identified as being of interest because the make of "BMW" and model of "318" already exist with respect to one or more other incidents. Moreover, in the example illustrated in FIG. 51, the warning message 5120 is automatically displayed to warn a user that another vehicle with a same make and model as the vehicle being added already exists in the system.

In various embodiments, the web server 310 is programmed to determine how many times vehicles of a same make, a same model, a same type, having a same license plate, having a same VIN number, and/or having a same owner as a currently added vehicle in the vehicles involved page 5100 have been involved in incidents at the facility within a specified date range. In such embodiments, the web server 310 may be programmed to make such a determination by generating one or more SQL queries to send to the first SQL server 340A to retrieve such information, and the web server 310 may be programmed to send the information to the client computer 321. In various embodiments, the client computer 321 is programmed to display information related to how many times vehicles of a same make, a same model, a same type, having a same license plate, having a same VIN number, and/or having a same owner as a currently added vehicle in the vehicles involved page 5100 have been involved in incidents at the facility within the specified date range.

Thus, various embodiments allow for receiving input that specifies a vehicle involved in an incident at a facility and for identifying the vehicle as being of interest in a case where the vehicle has been involved in one or more other incidents at the facility. Also, various embodiments allow for displaying a warning on a display screen in a case where the vehicle is identified as being of interest. Moreover, various embodiments allow for displaying information relating to how many times vehicles of a same make, a same model, a same type, having a same license plate, having a same VIN number, and/or having a same owner as a currently added vehicle have been involved in incidents within a specified date range.

Figure 52:
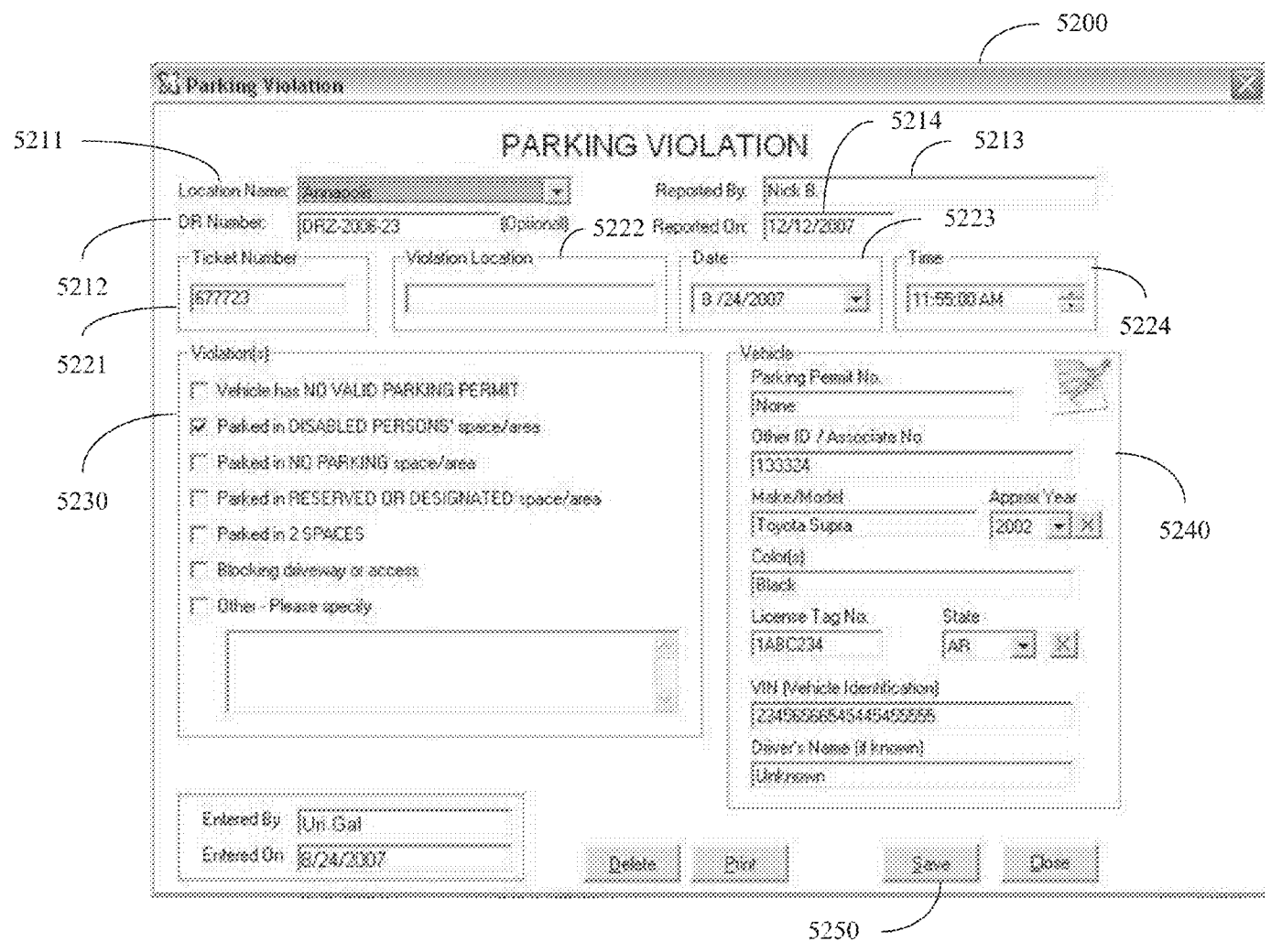

FIG. 52 illustrates a parking violation page 5200 in accordance with an embodiment of the present invention for receiving input that specifies information about a parking violation. With reference to FIGS. 3, 5, and 52, in various embodiments the incident page 500 includes a parking violation button (not shown), and in a case where the client computer 321 receives input in which the parking violation button (not shown) of the incident page 500 is pressed, the client computer 321 sends a request to the web server 310 for the parking violation page 5200 to specify a parking violation related to an incident that is currently displayed in the incident page 500 when the parking violation button (not shown) is pressed. Also, in various embodiments, the web server 310 is programmed to provide the parking violation page 5200 in response to the request from the client computer 321, and the client computer 321 is programmed to display the parking violation page 5200.

In various embodiments, the parking violation page 5200 for an incident at a facility includes a location name section 5211, a DR number section 5212, a reported by section 5213, a reported on section 5214, a ticket number section 5221, a violation location section 5222, a date section 5223, a time section 5224, a violation section 5230, a vehicle section 5240, and a save button 5250. In various embodiments, the location name section 5211 includes a text box, a drop-down list, or the like, for receiving input that specifies a name of a facility where the parking violation occurred. In various embodiments, the DR number section 5212 includes a text box, or the like, for receiving input that specifies a code for the parking violation. In various embodiments, the reported by section 5213 includes a text box, or the like, for receiving input that specifies a name of a person that reported the parking violation. In various embodiments, the reported on section 5214 includes a text box, or the like, for receiving input that specifies a date on which the parking violation was reported.

In various embodiments, the ticket number section 5221 includes a text box, or the like, for receiving input that specifies a ticket number for the parking violation. In various embodiments, the violation location section 5222 includes a text box, or the like, for receiving input that specifies a more specific location at the facility where the parking violation occurred. In various embodiments, the date section 5223 includes a text box, a drop-down menu, or the like, for receiving input that specifies a date on which the parking violation occurred. In various embodiments, the time section 5224 includes a text box, a scrollable time field, or the like, for receiving input that specifies a time of day at which the parking violation occurred.

In various embodiments, the violation section 5230 includes one or more text boxes, check boxes, or the like, for receiving input that specifies one or more violations that were committed for the parking violation, such as vehicle has no valid parking permit, parked in a disabled person's space/area, parked in a no parking space/area, parked in a reserved or designated space/area, parked in two spaces, blocking driveway or access, and other. In various embodiments, the vehicle section 5240 includes one or more text boxes, drop-down lists, or the like, for receiving input that specifies information about a vehicle involved in the parking violation, such as parking permit number, other ID or associate number, make and model of the vehicle, approximate year of the vehicle, color of the vehicle, license tag or plate number, state of registration, VIN number of the vehicle, and driver's name. With reference to FIGS. 3 and 52, in various embodiments the save button 5250 may be pressed to send information entered in the parking violation page 5200 from the client computer 321 to the web server 310 to have the web server 310 cause the information to be stored in a database in the first SQL server 340A.

Figure 53:
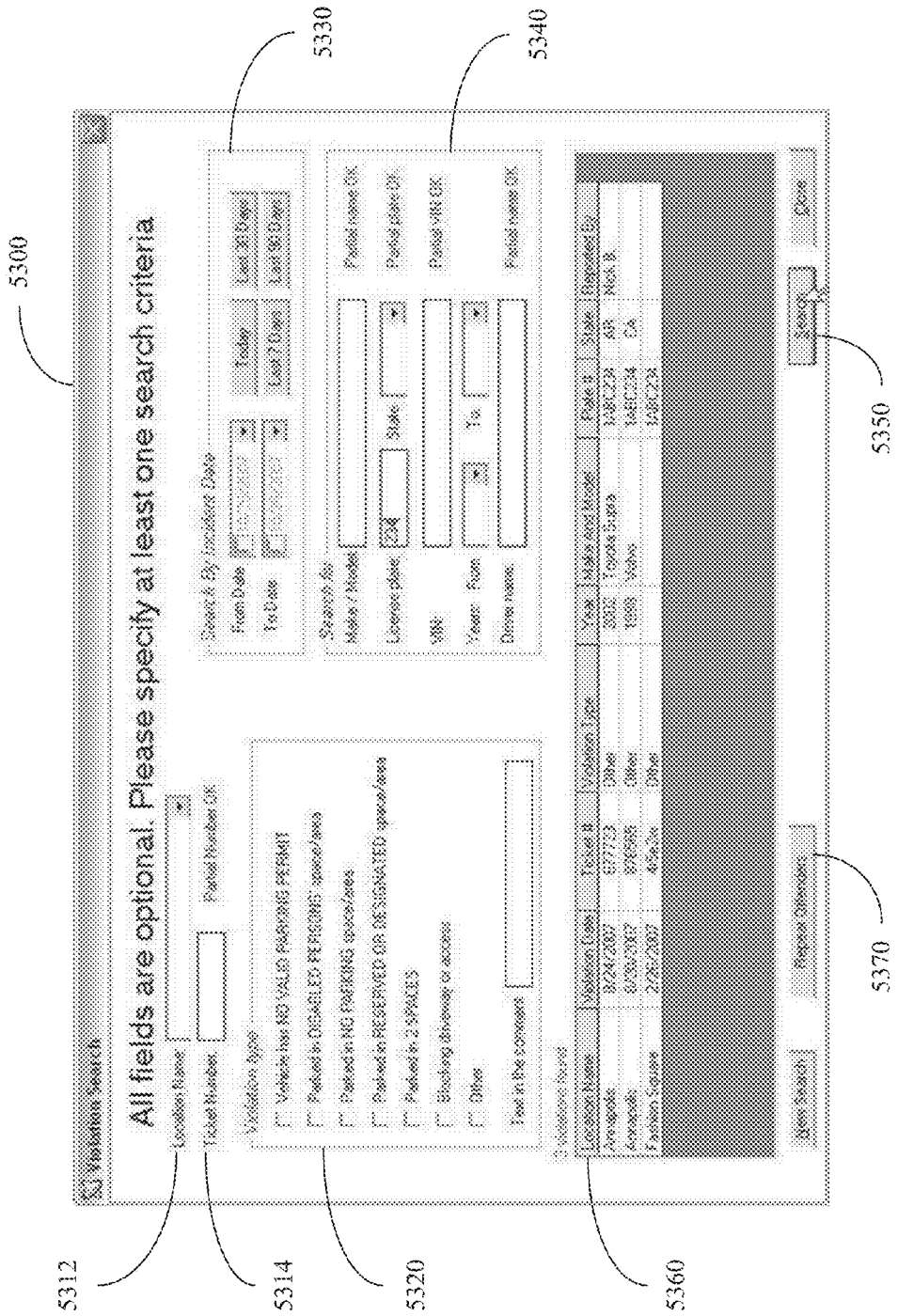
FIG. 53 illustrates a violation search page in accordance with an embodiment of the present invention for searching for parking violations.

FIG. 53 illustrates a violation search page 5300 in accordance with an embodiment of the present invention for searching for parking violations. With reference to FIGS. 3, 5, and 53, in various embodiments, the web server 310 is programmed to send the violation search page 5300 to the client computer 321 in a case where a violation search button (not shown) of the incident page 500 is clicked by a user. In various embodiments, the violation search page 5300 includes a location name section 5312, a ticket number section 5314, a violation type section 5320, a search by incident date section 5330, a vehicle search section 5340, a search button 5350, a violations found list 5360, and a repeat offenders button 5370.

In various embodiments, the location name section 5312 includes a text box, a drop-down list, or the like, for specifying a facility for which to search for related parking violations. In various embodiments, in a case where a name of a facility is specified in the location name section 5312 and a search is performed, the search results provides parking violations that occurred at the facility.

In various embodiments, the ticket number section 5314 includes a text box, or the like, for specifying a ticket number for searching for one or more parking violations. In various embodiments, in a case where a ticket number is specified in the ticket number section 5314 and a search is performed, the search results provides parking violations that are associated with the ticket number. In some embodiments, a partial ticket number may be entered in the ticket number section 5314 to search for all parking violations associated with ticket numbers that have portions that match the partial ticket number.

In various embodiments, the violation type section 5320 includes one or more text boxes, check boxes, or the like, for specifying one or more violation types for searching for parking violations. For example, in various embodiments, the violation type section 5320 may include check boxes for the following violation types: (i) vehicle has no valid parking permit; (ii) parked in a disabled person's space/area; (iii) parked in no parking space/area; (iv) parked in reserved or designated space/area; (v) parked in two spaces; (vi) blocking driveway or access; and (vii) other. Also, in various embodiments, the violations type section 5320 may include a text box for specifying text in a comment with which to search for parking violations. In various embodiments, in a case where one or more violation types are specified in the violation type section 5320 and a search is performed, the search results provides parking violations that are associated with the one or more violation types.

In various embodiments, the search by incident date section 5330 includes one or more text boxes, drop-down lists, buttons, or the like, for specifying a date range within which to search for parking violations. For example, in various embodiments, the search by incident date section 5330 includes a "From Date" field for specifying a starting date for a date range, and a "To Date" field for specifying an ending date for the date range. In some embodiments, the search by incident date section 5330 includes buttons with pre-set date ranges, such as "today", "last 7 days", "last 30 days", and "last 90 days". In various embodiments, in a case where a date range is specified in the search by incident date section 5330 and a search is performed, the search results provides parking violations that occurred within the date range.

In various embodiments, the vehicle search section 5340 includes one or more text boxes, drop-down lists, or the like, for specifying information about one or more vehicles to search for parking violations. For example, in various embodiments, the vehicle search section 5340 includes one or more text boxes, drop-down lists, or the like, for specifying a make and model, a license plate number, a state of registration, a VIN number, years of manufacture, and a driver name. In various embodiments, in a case where vehicle information is specified in the vehicle search section 5340 and a search is performed, the search results provides parking violations that are associated with the specified vehicle information. In some embodiments, a partial make or model, a partial license plate number, a partial VIN number, and/or a partial drive name may be entered in the vehicle search section 5340 to perform a search.

It should be appreciated that, in various embodiments, one or more sections of the violation search page 5300 may be filled-out for a search. For example, a search may be performed for a location and within a specified date range. Also, for example, a search may be performed for parking violations that occurred at a particular facility and that are of a particular type. Thus, in some embodiments, various combinations of fields in the violation search page 5300 may be filled-out for a single search.

In various embodiments, the client computer 321 is programmed such that the client computer 321 sends search information entered in the fields of the violation search page 5300 to the web server 310 in a case where the search button 5350 is pressed. Also, in various embodiments, the web server 310 is programmed such that the web server 310 generates one or more SQL queries to send to the first SQL server 340A based on the search information received from the client computer 321. In various embodiments, the first SQL server 340A is programmed to search a database based on the one or more SQL queries received from the web server 310 and to provide search results to the web server 310 in response to the one or more SQL queries. Also, in various embodiments, the web server 310 is programmed to send the search results to the client computer 321, and the client computer 321 is programmed to display a list of the search results in the violations found list 5360 of the violation search page 5300.

In various embodiments, the violations found list 5360 provides, for each parking violation search result, a location name of a facility where the parking violation occurred, a violation date, a ticket number, a violation type, a year of the vehicle involved in the violation, a make and model of the vehicle, a license plate number of the vehicle, a state of registration of the vehicle, and a name of a person who reported the parking violation. In other embodiments, more or fewer fields may be shown in the violations found list 5360. In various embodiments, in a case where the repeat offenders button 5370 is pressed, a pop-up window such as is shown in FIG. 54 is displayed to allow for searching for repeat vehicle parking violation offenders.

Figure 54:
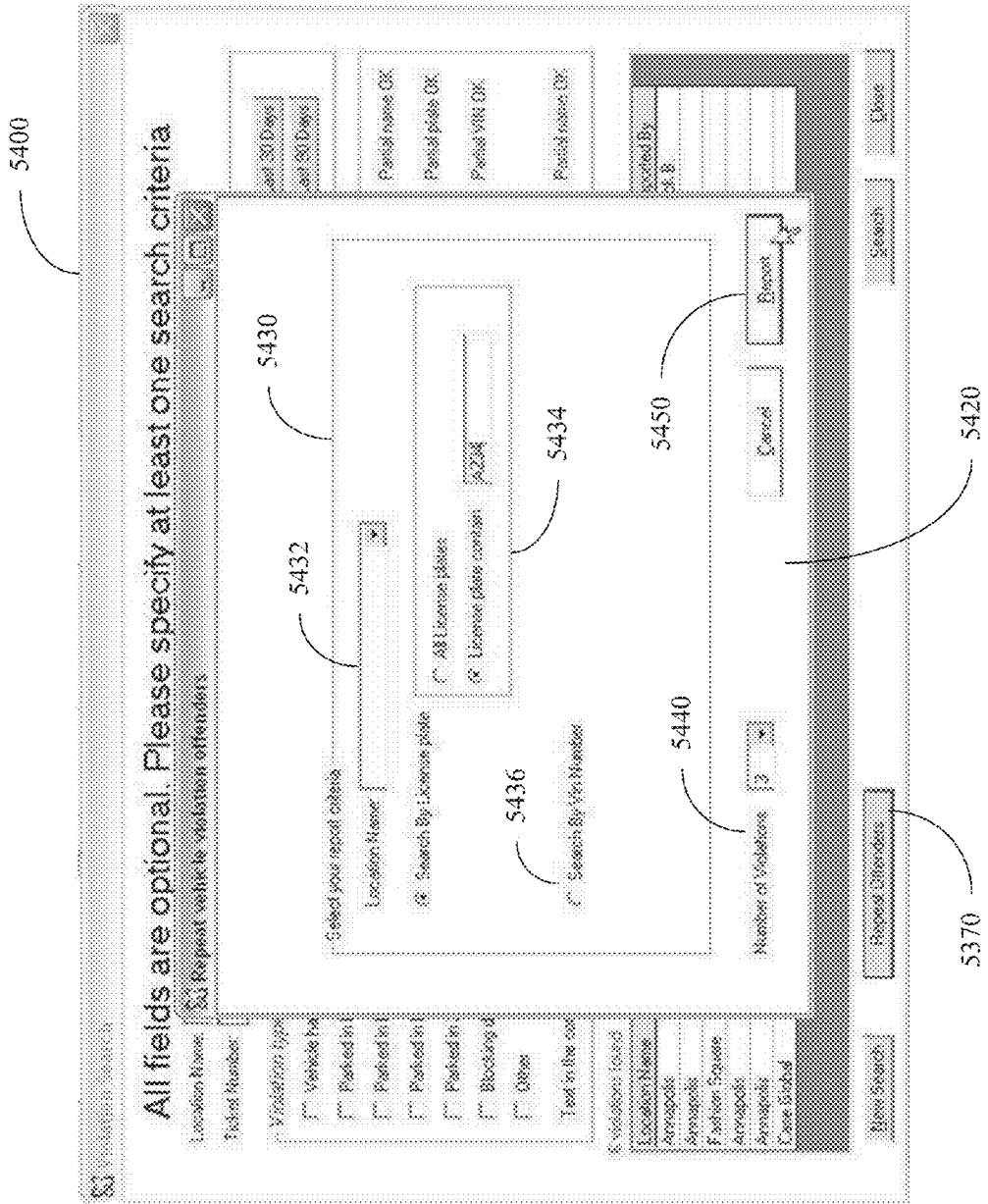
FIG. 54 illustrates a violation search page with a repeat vehicle violation offenders window in accordance with an embodiment of the present invention for searching for repeat vehicle parking violation offenders.

FIG. 54 illustrates a violation search page 5400 with a repeat vehicle violation offenders window 5420 in accordance with an embodiment of the present invention for searching for repeat vehicle parking violation offenders. The violation search page 5400 of FIG. 54 is similar to the violation search page 5300 of FIG. 53, and the violation search page 5400 includes the repeat offenders button 5370. In various embodiments, in a case where the repeat offenders button 5370 is pressed, the repeat vehicle violation offenders window 5420 is displayed on a display screen to allow for searching for repeat vehicle parking violation offenders. In various embodiments, the repeat vehicle violation offenders window 5420 includes a report criteria section 5430, a number of violations section 5440, and a report button 5450.

In various embodiments, the report criteria section 5430 includes a location name section 5432, a search by license plate section 5434, and a search by VIN number section 5436. In various embodiments, the location name section 5432 includes a text box, a drop-down list, or the like, for specifying a location name of a facility. In various embodiments, in a case where a name of a facility is specified in the location name section 5432 and a repeat offender report is generated, the report results provides repeat offender parking violations that occurred at the facility.

In various embodiments, the search by license plate section 5434 includes one or more radio buttons, text boxes, or the like, to specify license plate information to search for repeat parking violation offenders, such as searching for all license plates, searching based on an entire license plate number, or searching based on a partial license plate number. In various embodiments, in a case where information is provided in the search by license plate section 5434 and a repeat offender report is generated, the report results provides repeat offender parking violations for vehicles that match the information provided in the search by license plate section 5434.

In various embodiments, the search by VIN number section 5436 includes one or more radio buttons, text boxes, or the like, to specify VIN number information to search for repeat parking violation offenders, such as searching for all VIN numbers, searching based on an entire VIN number, or searching based on a partial VIN number. In various embodiments, in a case where information is provided in the search by VIN number section 5436 and a repeat offender report is generated, the report results provides repeat offender parking violations for vehicles that match the information provided in the search by VIN number section 5436.

In various embodiments, the number of violations section 5440 includes a text box, a drop-down list, or the like, for specifying a number of parking violations for which vehicles must have been involved in to be included on a generated repeat offender report. In various embodiments, the number of violations specified in the number of violations section 5440 may be two or greater.

With reference to FIGS. 3 and 54, in various embodiments, the client computer 321 is programmed such that the client computer 321 sends search information entered in the fields of the repeat vehicle violation offenders window 5420 to the web server 310 in a case where the report button 5450 is pressed. Also, in various embodiments, the web server 310 is programmed such that the web server 310 generates one or more SQL queries to send to the first SQL server 340A based on the search information received from the client computer 321. In various embodiments, the first SQL server 340A is programmed to search a database based on the one or more SQL queries received from the web server 310 and to provide report results to the web server 310 in response to the one or more SQL queries. Also, in various embodiments, the web server 310 is programmed to send the report results to the client computer 321, and the client computer 321 is programmed to display a report with the report results to show the search results for repeat vehicle parking violation offenders.

Figure 55:
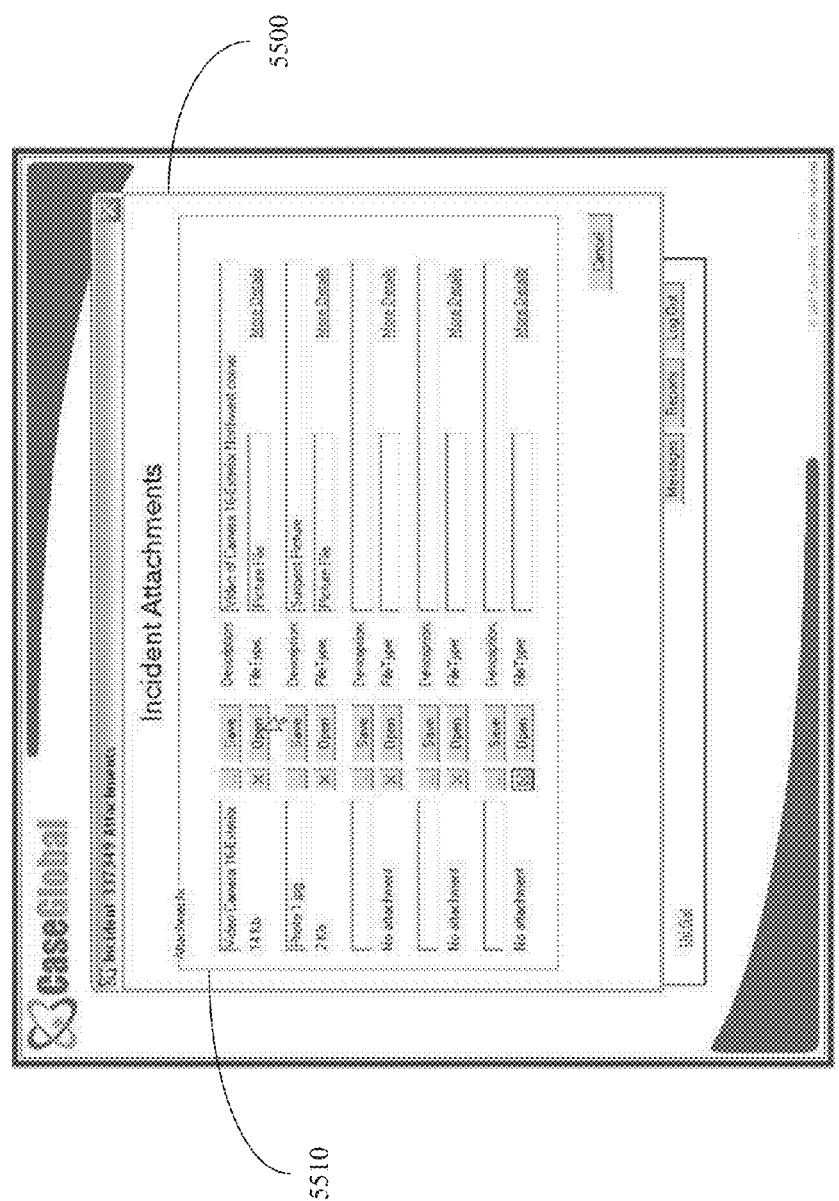
FIG. 55 illustrates an incident attachments page in accordance with an embodiment of the present invention for receiving input that specifies file attachments to be associated with an incident.

FIG. 55 illustrates an incident attachments page 5500 in accordance with an embodiment of the present invention for receiving input that specifies file attachments to be associated with an incident. With reference to FIGS. 3, 5, and 55, in various embodiments, in a case where the client computer 321 receives input in which the attachments button 520 of the incident page 500 is pressed, the client computer 321 sends a request to the web server 310 for the incident attachments page 5500 to specify attachments to be associated with an incident that is currently displayed in the incident page 500 when the attachments button 520 is pressed. Also, in various embodiments, the web server 310 is programmed to provide the incident attachments page 5500 in response to the request from the client computer 321, and the client computer 321 is programmed to display the incident attachments page 5500.

In various embodiments, the incident attachments page 5500 for an incident includes an attachments section 5510. In various embodiments, the attachments section 5510 includes one or more fields for specifying one or more file attachments to be associated with the incident. In various embodiments, the file attachments may include text files, video files, picture or photo files, sound files, or the like. In various embodiments, the attachments section 5510 includes, for each attachment, one or more text boxes, or the like, for specifying a file path and name for the file attachment, a description of the attachment, and a file type of the attachment.

In various embodiments, the client computer 321 is programmed such that in a case where a save button associated with an attachment on the incident attachments page 5500 is pressed, the client computer 321 sends the attachment and corresponding description and file type information to the web server 310, and the web server 310 is programmed to generate one or more commands to cause the first SQL server 340A to store the attachment, description, and file type information into a database in association with other information related to the incident. Thus, various embodiments allow for receiving input that specifies at least one of a photo, a video, and a sound associated with an incident.

Figure 56:
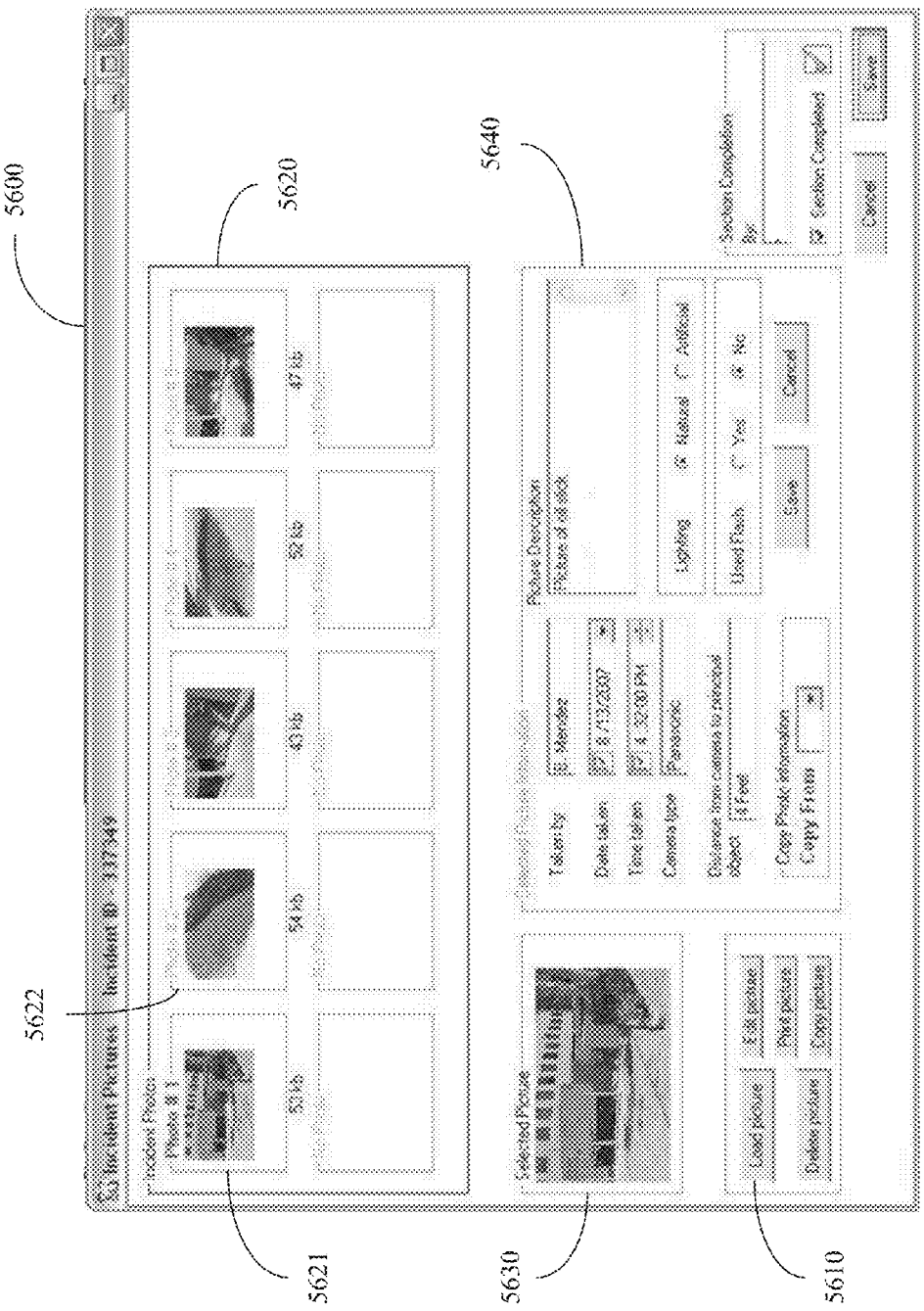
FIG. 56 illustrates an incident pictures page in accordance with an embodiment of the present invention for receiving input that specifies pictures to be associated with an incident.

FIG. 56 illustrates an incident pictures page 5600 in accordance with an embodiment of the present invention for receiving input that specifies pictures to be associated with an incident. With reference to FIGS. 3, 5, and 56, in various embodiments, in a case where the client computer 321 receives input in which the pictures button 519 of the incident page 500 is pressed, the client computer 321 sends a request to the web server 310 for the incident pictures page 5600 to specify attachments to be associated with an incident that is currently displayed in the incident page 500 when the pictures button 519 is pressed. Also, in various embodiments, the web server 310 is programmed to provide the incident pictures page 5600 in response to the request from the client computer 321, and the client computer 321 is programmed to display the incident pictures page 5600.

In various embodiments, the incident pictures page 5600 for an incident includes a load picture button 5610, an incident photos section 5620, a selected picture section 5630, and a selected picture information section 5640. In various embodiments, in a case where the load picture button 5610 is pressed, a picture may be loaded from a file path, and may be sent from the client computer 321 to the web server 310 to be stored in the first SQL server 340A in association with other information related to the incident. Also, in various embodiments, when a picture file is loaded with the load picture button 5610, the picture is displayed in one or more photo sections, such as photo sections 5621 and 5622, of the incident photos section 5620.

In various embodiments, in a case where a photo in the incident photos section 5620 is highlighted by a mouse click, a keyboard command, or the like, the photo is shown in the selected picture section 5630, and information about the photo may be entered in the selected picture information section 5640. In various embodiments, the selected picture information section 5640 includes one or more text boxes, radio buttons, drop-down lists, or the like, for specifying information about the selected picture in the selected picture section 5630, such as who the picture was taken by, a date the picture was taken, a time of day the picture was taken, a camera type of a camera that took the picture, a distance from the camera to a principal object in the picture at the time the picture was taken, a picture description, whether lighting for the picture was natural or artificial, whether or not a flash was used in taking the picture, and whether or not information for the photo should be copied from information already entered for another photo.

In various embodiments, the client computer 321 is programmed such that in a case where a save button of the selected picture information section 5640 is pressed, the client computer 321 sends the information entered in the selected picture information section 5640 to the web server 310, and the web server 310 is programmed to generate one or more commands to cause the first SQL server 340A to store the information into a database in association with other information related to the incident.

Figure 57:
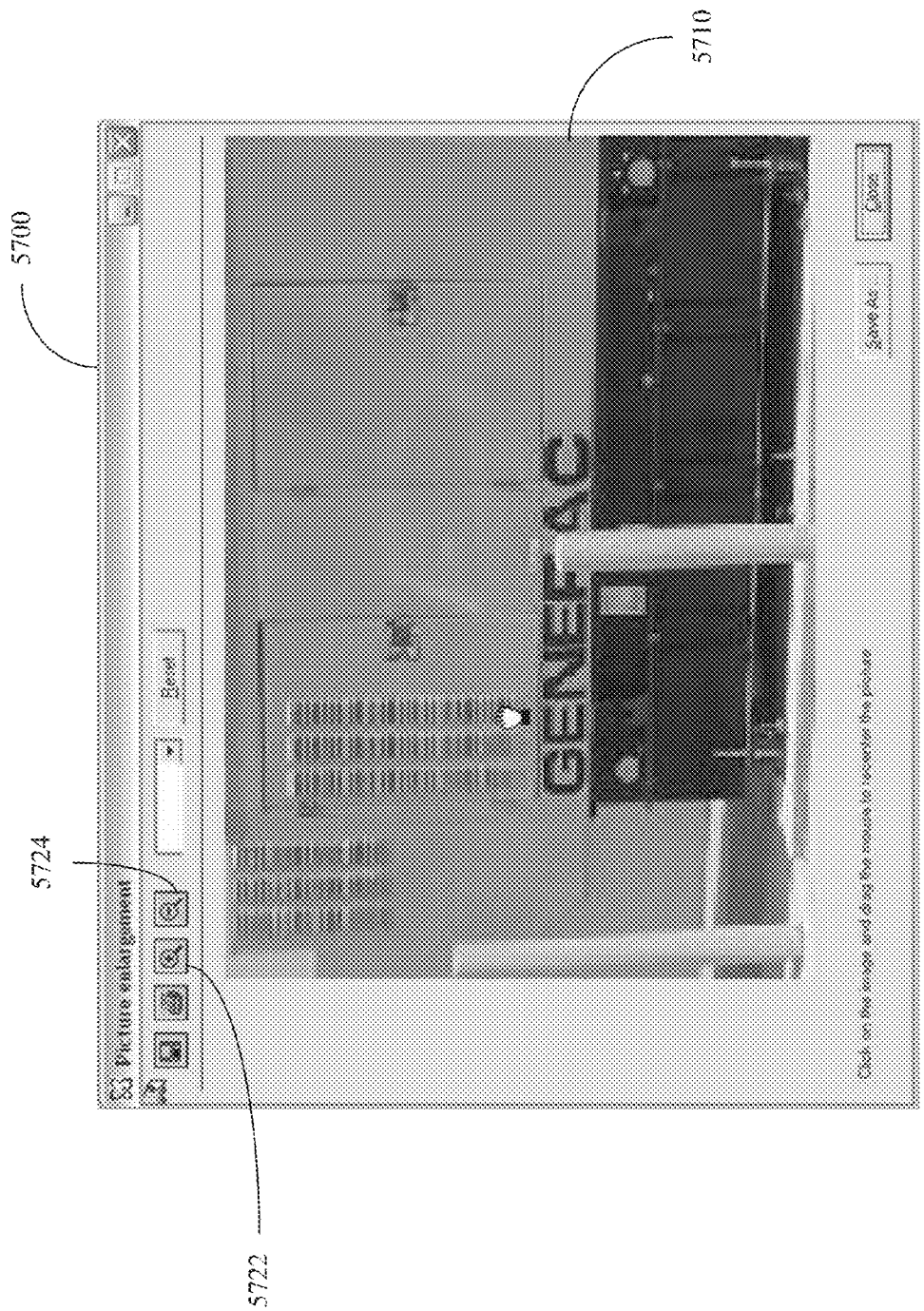
FIG. 57 illustrates a picture enlargement window in accordance with an embodiment of the present invention for enlarging a photograph.

FIG. 57 illustrates a picture enlargement window 5700 in accordance with an embodiment of the present invention for enlarging a photograph. With reference to FIGS. 3, 56 and 57, in various embodiment, in a case where the selected picture in the selected picture section 5630 is double-clicked, or the like, the client computer 321 displays the picture enlargement window 5700 with an enlarged picture 5710 of the selected picture. In various embodiments, the picture enlargement window 5700 includes a zoom-in button 5722 for zooming in on the enlarged picture 5710, and also includes a zoom-out button 5724 for zooming-out on the enlarged picture 5710. Also, in various embodiments, the enlarged picture 5710 may be clicked on and dragged with a mouse, a touch-pad, or the like, to re-center the enlarged picture 5710.

Figure 58:
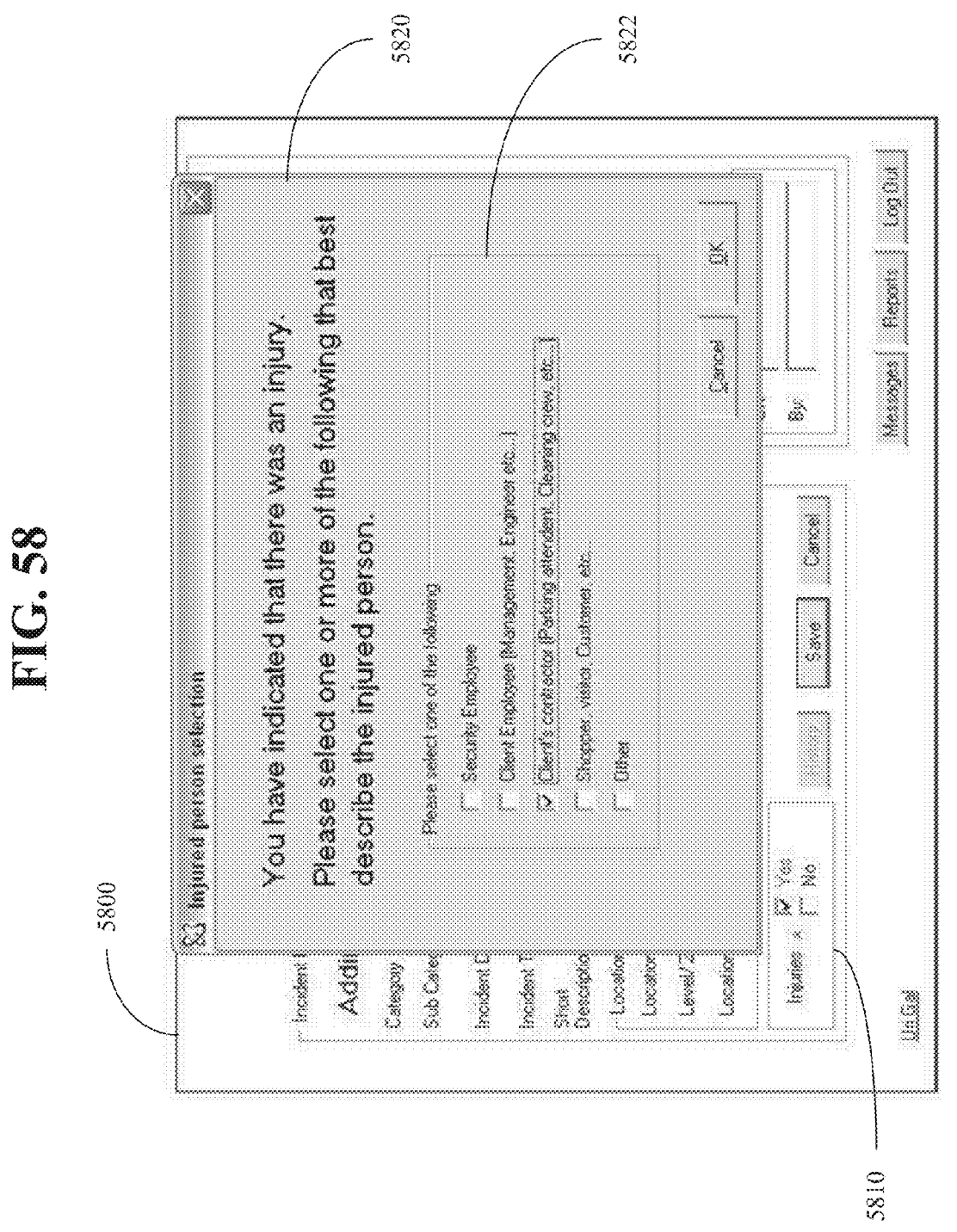

FIG. 58 illustrates an incident page 5800 with an injured person selection window 5820 in accordance with an embodiment of the present invention for receiving input that describes an injured person. The incident page 5800 of FIG. 58 is similar to the incident page 500 of FIG. 5. With reference to FIGS. 3 and 58, in various embodiments, in a case where the client computer 321 receives input in which an injury is specified in an injuries section 5810 of the incident page 5800 for an incident, the client computer 321 sends a request to the web server 310 for the injured person selection window 5820 to provide input that describes an injured person in the incident. Also, in various embodiments, the web server 310 is programmed to provide the injured person selection window 5820 in response to the request from the client computer 321, and the client computer 321 is programmed to display the injured person selection window 5820.

In various embodiments, the injured person selection window 5820 for an incident includes an injured person type section 5822. In various embodiments, the injured person type section 5822 includes check boxes, or the like, for describing a type of the injured person, such as security employee, client employee (management, engineer, etc.), client's contractor (parking attendant, cleaning crew, etc.), shopper, visitor, customer, and other. In various embodiments, the client computer 321 is programmed such that in a case where an "ok" button of the injured person selection window 5820 is pressed, the client computer 321 sends the injured person type information entered in the injured person selection window 5820 to the web server 310, and the web server 310 is programmed to generate one or more commands to cause the first SQL server 340A to store the injured person type information into a database in association with other information related to the incident. In various embodiments, the client computer 321 or the web server 310 may be programmed to send information to an insurance company computer, or the like, over a network to alert an insurance company about an injury based on the injured person type information entered in the injured person selection window 5820.

Figure 59:
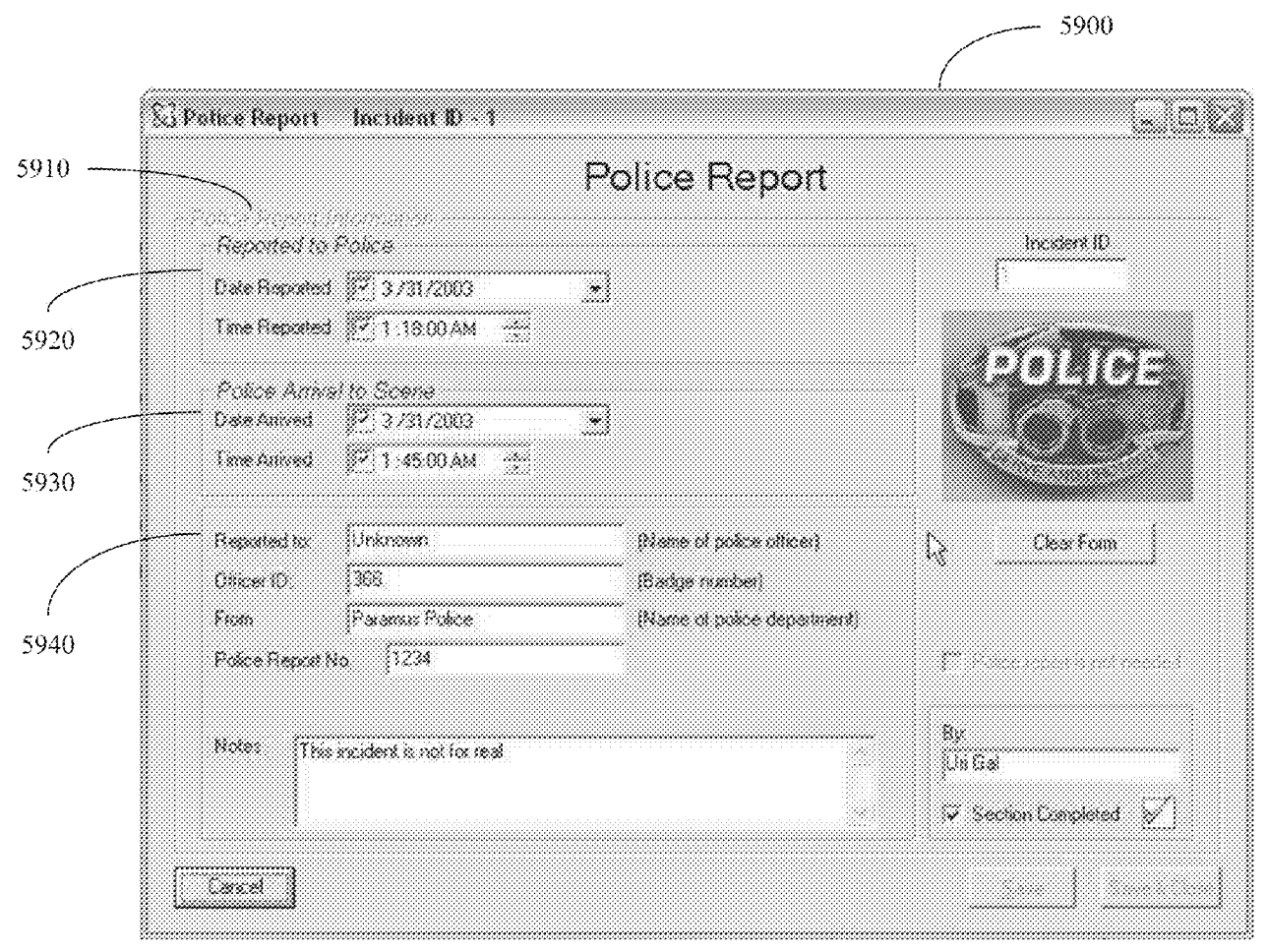

FIG. 59 illustrates a police report page 5900 in accordance with an embodiment of the present invention for receiving input that specifies police report information about an incident. With reference to FIGS. 3, 5, and 59, in various embodiments the incident page 500 includes a police report button 518, and in a case where the client computer 321 receives input in which the police report button 518 of the incident page 500 is pressed, the client computer 321 sends a request to the web server 310 for the police report page 5900 to specify police report information related to an incident that is currently displayed in the incident page 500 when the police report button 518 is pressed. Also, in various embodiments, the web server 310 is programmed to provide the police report page 5900 in response to the request from the client computer 321, and the client computer 321 is programmed to display the police report page 5900.

In various embodiments, the police report page 5900 for an incident at a facility includes a police report information section 5910. In various embodiments, the police report information section 5910 includes a reported to police section 5920, a police arrival to scene section 5930, and a police information section 5940. In various embodiments, the reported to police section 5920 includes one or more text boxes, drop-down lists, or the like, for specifying a date and a time at which the incident was reported to the police. In various embodiments, the police arrival to scene section 5930 includes one or more text boxes, drop-down lists, or the like, for specifying a date and a time that police arrived to a scene of the incident.

In various embodiments, the police information section 5940 includes one or more text boxes, or the like, for specifying information about the police responding to the incident, such as a name of a police officer to which the incident was reported, an officer ID such as a badge number of the police officer, a name of a police department from which the police officer arrived, a police report number assigned to the incident, and other notes. In some embodiments, the client computer 321 or the web server 310 sends a request to a state or federal database, or the like, to obtain or check information about a police officer. In various embodiments a save button of the police report page 5900 may be pressed to send information entered in the police report page 5900 from the client computer 321 to the web server 310 to have the web server 310 cause the information to be stored in a database in the first SQL server 340A in association with other information related to the incident.

Figure 60:
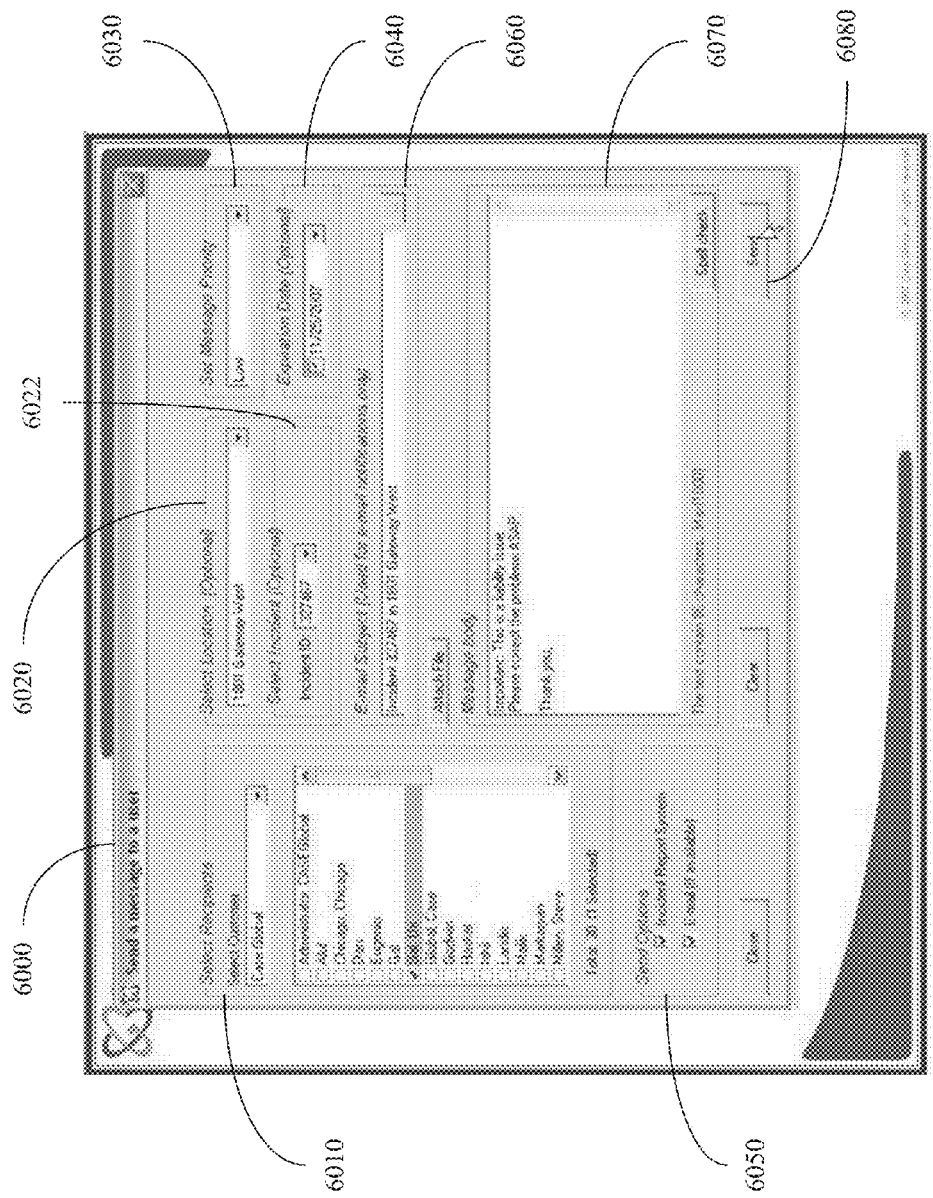
FIG. 60 illustrates a send message page in accordance with an embodiment of the present invention for sending a message to a user.

FIG. 60 illustrates a send message page 6000 in accordance with an embodiment of the present invention for sending a message to a user. With reference to FIGS. 3, 5, and 60, in various embodiments the incident page 500 includes a messages button 571, and in a case where the client computer 321 receives input in which the messages button 571 of the incident page 500 is pressed, the client computer 321 sends a request to the web server 310 for the send message page 6000 to specify information to send a message to a user. Also, in various embodiments, the web server 310 is programmed to provide the send message page 6000 in response to the request from the client computer 321, and the client computer 321 is programmed to display the send message page 6000.

In various embodiments, the send message page 6000 includes a select recipients section 6010, a select location section 6020, a set message priority section 6030, an expiration date section 6040, a send options section 6050, an e-mail subject section 6060, a message body section 6070, and a send button 6080. In various embodiments, the select recipients section 6010 includes one or more drop-down lists, check boxes, or the like, for specifying information about one or more recipients of a message, such as a customer for which the recipient works, and a name of the recipient. In various embodiments, the select location section 6020 includes a drop-down list, or the like, for specifying a location name of a facility to which the message relates. Also, in various embodiments, the select location section 6020 includes a select incident section 6022 that includes a drop-down list, or the like, to select an incident ID of an incident to which the message relates.

In various embodiments, the set message priority section 6030 includes a drop-down list, or the like, for specifying a priority of the message, such as low, medium, or high. In various embodiments, the expiration date section 6040 includes a text box, a drop-down calendar, or the like, for specifying an expiration date for the message. In various embodiments, the send options section 6050 includes one or more check boxes, or the like, for specifying options for the message, such as whether the message should be sent within the incident report system to the recipient and whether the message should be sent to an e-mail address of the recipient. In various embodiments, the e-mail subject section 6060 includes a text box, or the like, for specifying a subject for the message. In various embodiment, the message body section 6070 includes a text box, or the like, for providing text for a message body of the message.

In various embodiments, in a case where the send button 6080 is pressed, the message is formed with a subject specified by the e-mail subject section 6060 and a body specified by the message body section 6070, and is transmitted to the one or more recipients specified in the select recipients section 6010. In various embodiments, the message is sent to the one or more recipients through the incident reporting system in a case where an incident report system check box of the send options section 6050 is checked. Also, in various embodiments, the message is sent to the one or more recipients by e-mail in a case where an e-mail check box of the send options section 6050 is checked.

In various embodiments, one or more recipients may be associated with a facility, and a message may be automatically sent to the one or more recipients in a case where a person has been identified as a person of interest due to one or more incidents at the facility. In various embodiments, one or more recipients may be associated with a facility, and a message may be automatically sent to the one or more recipients in a case where an item has been identified as an item of interest due to one or more incidents at the facility. Also, in various embodiments, one or more recipients may be associated with a facility, and a message may be automatically sent to the one or more recipients in a case where a vehicle has been identified as a vehicle of interest due to one or more incidents at the facility.

Figure 61:
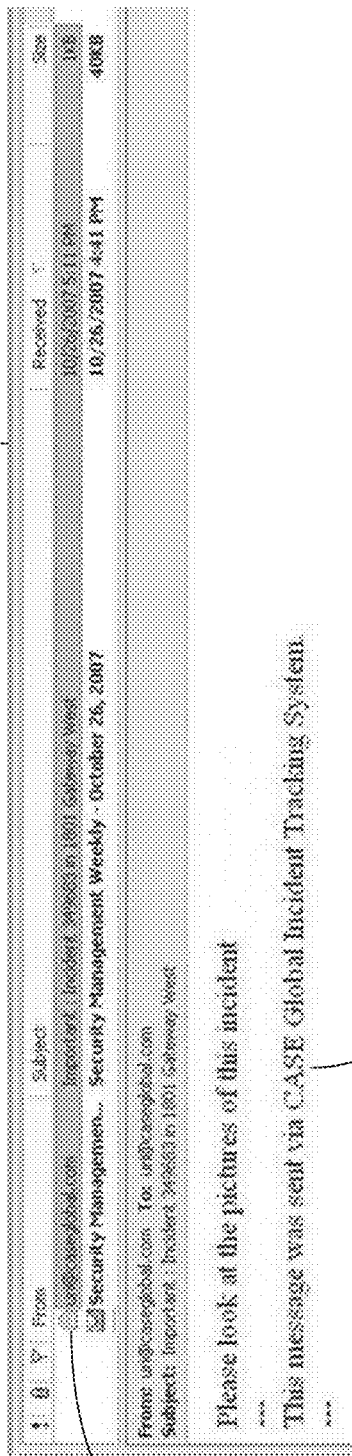
FIG. 61 illustrates an e-mail application window in accordance with an embodiment of the present invention that shows a reception of a message sent from a send message page.

FIG. 61 illustrates an e-mail application window 6100 in accordance with an embodiment of the present invention that shows a reception of a message sent from the send message page 6000 of FIG. 60. In various embodiments, the e-mail application window 6100 includes a message overview section 6110 that shows information about a message, such as who the message is from, a subject of the message, when the message was received, and a size of the message. In various embodiments, the e-mail application window 6100 also includes a message body section 6120 for showing the text of the message body.

Figure 62:
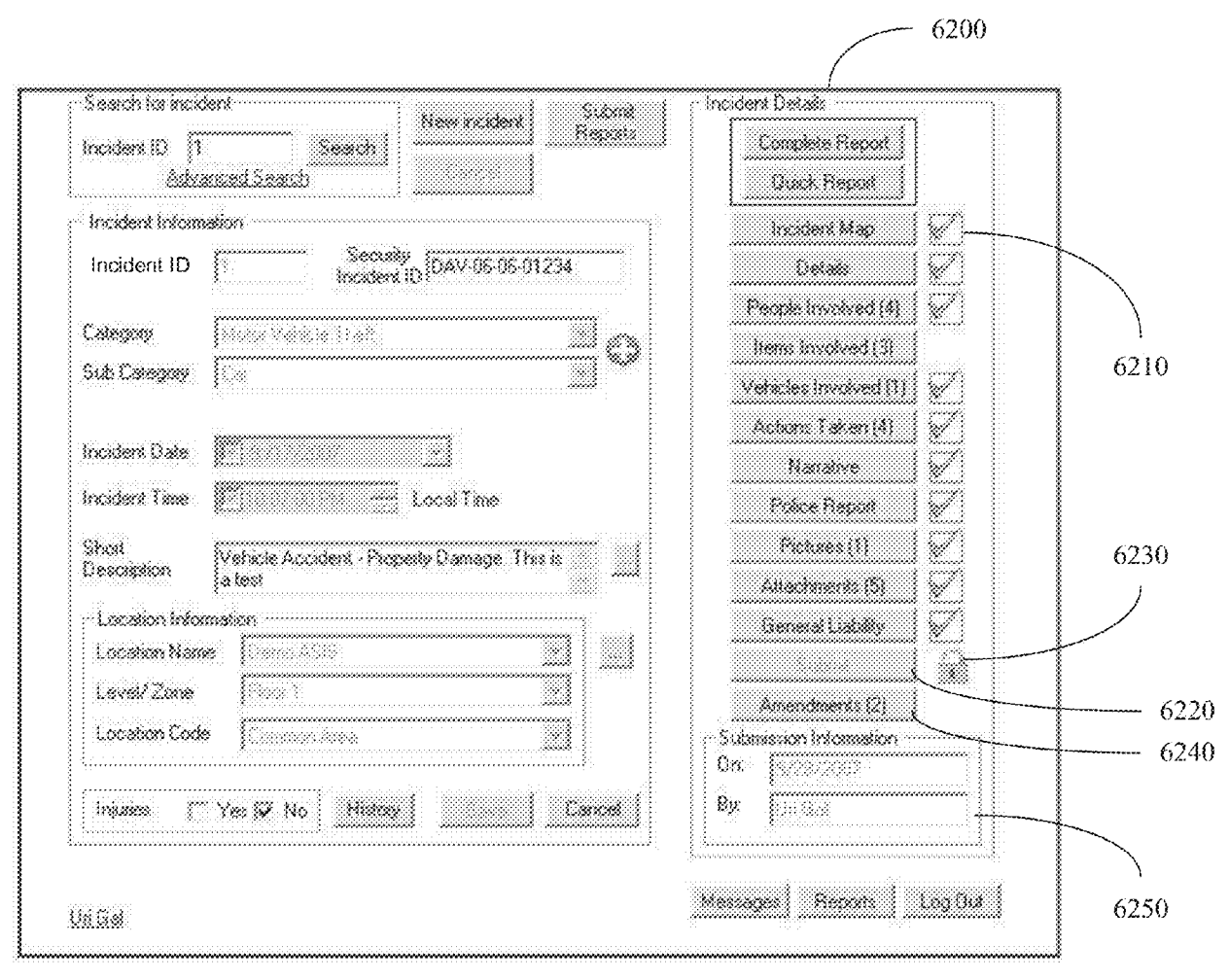

FIG. 62 illustrates an incident page 6200 in accordance with an embodiment of the present invention that shows an incident that has been submitted and that has amendments. The incident page 6200 of FIG. 62 is similar to the incident page 500 of FIG. 5. In various embodiments, a check mark or other icon 6210 is placed next to each button for a section, such as the incident map section, the details section, and the like, when the section has been completed. Also, in various embodiments, when a submit button 6220 of the incident page 6200 is pressed, the information entered for the incident is locked from modification from at least some users, as indicated by a padlock icon 6230 that may appear next to the submit button 6220 once the submit button 6220 has been pressed. In some embodiments, only system administrators or other privileged users may be able to unlock a submitted incident.

In various embodiments, once an incident has been submitted, an amendments button 6240 is provided on the incident page 6200 to allow for making amendments to the incident. For example, if additional information is gathered regarding the incident after the incident has been submitted, the additional information may be specified in an amendment by pressing the amendments button 6240 and entering the additional information. Also, in various embodiments, the incident page 6200 includes a submission information section 6250 that provides submission information, such as when the incident was submitted and a name of a user who submitted the incident.

Figure 63:
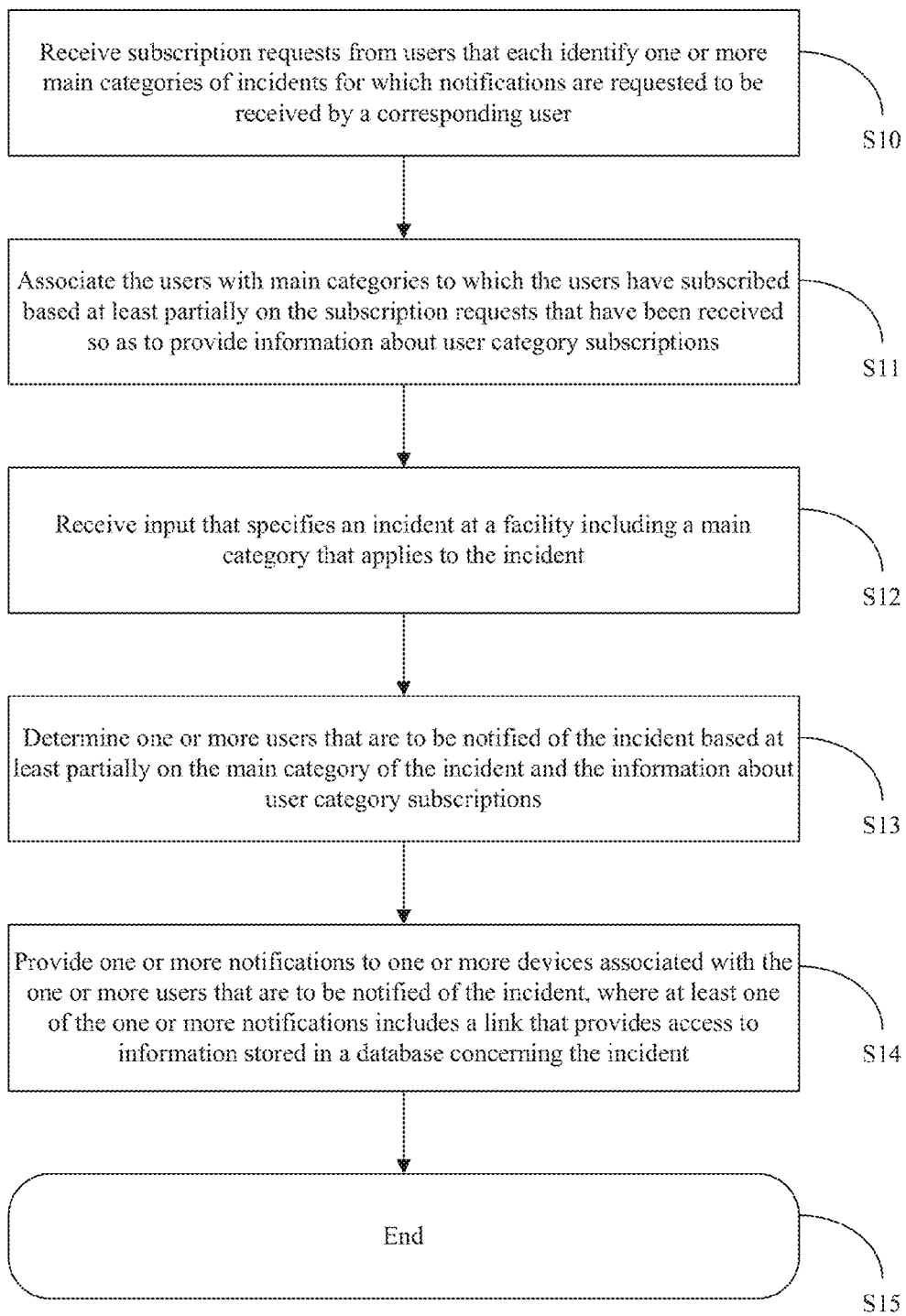
FIG. 63 illustrates a flowchart of a method in accordance with an embodiment of the present invention.

FIG. 63 illustrates a flowchart of a method in accordance with an embodiment of the present invention that can be performed by one or more computers. With reference to FIGS. 3 and 63, in S10 subscription requests are received from users that each identify one or more main categories of incidents for which notifications are requested to be received by a corresponding user. For example, a user may enter a subscription request into the client computer 321 to indicate that the user would like to receive notifications when information for incidents related to certain specified main categories are received by the web server 310. As an example, a subscription request may specify main categories such as assault, battery, theft, vandalism, or the like. In various embodiments, the client computer 321 is programmed to send the subscription request to the web server 310, and the web server 310 is programmed to receive the subscription request transmitted from the client computer 321.

In various embodiments, each user is only able to receive notifications related to incidents that have occurred at one or more facilities with which the user has been associated. In some embodiments, a subscription request may further specify a particular one or more facilities, such that the corresponding user is only notified of incidents related to the subscribed to main categories that occurred at any of the particular one or more facilities. Also, in some embodiments, a subscription request may further specify one or more sub-categories within the main category, such that the corresponding user is only notified of incidents related to the subscribed to main categories that are also associated with the subscribed to one or more sub-categories within the corresponding main category. In various embodiments, a subscription request may further specify one or more secondary main categories, such that the corresponding user is only notified of incidents related to the subscribed to main categories that are also associated with the subscribed to one or more secondary main categories. In some embodiments, a subscription request may specify various types of parameters, such as one or more of an incident date, an incident time, a location name, a level/zone, a location code, an indication of injuries, a person involved, a vehicle involved, an item involved, a nearest tenant, or the like, to indicate that notifications are desired for incidents related to one or more of the specified parameters.

In various embodiments, once the web server 310 has received one or more subscription requests, the method continues to S11. In S11, users are associated with main categories or other parameters to which the users have subscribed based at least partially on the one or more subscription requests that have been received, so as to provide information about user category subscriptions. In various embodiments, the web server 310 is programmed to generate requests to the first SQL server 340A to associate user profiles with main categories to indicate which users should receive notifications of incidents that are related to which types of main categories. In various embodiments, the user category subscriptions indicate which main categories have been associated with each user based on received subscription requests. In some embodiments, the method then continues to S12.

In S12, input is received that specifies an incident at a facility including a main category that applies to the incident. Examples of the reception of such input have been described above with reference to FIGS. 3, 5-12, 16, 17, 38, 39, 42-45, 47-50, 52, 55, 56, 58, and 59. With reference to FIGS. 3, 5, and 6, in various embodiments, the client computer 321 is programmed to receive input that specifies a new incident at a facility through entries in the new incident addition page 600. Also, in various embodiments, the web server 310 is programmed to receive input that specifies the new incident at the facility from the client computer 321 by receiving the input from the client computer 321 once the client computer 321 receives the input in the new incident addition page 600 and a save button 610 is pressed. In some embodiments, the web server 310 may be programmed to send new incident information received from the client computer 321 to the first SQL server 340A to be stored in a database in the first SQL server 340A in association with an incident ID assigned to the new incident. The new incident addition page 600 may include the main category section 543 for selecting a main category for the new incident. In various embodiments, the main category section 543 includes a drop-down list, or the like, with available categories to select for the main category of a new incident. Referring again to FIGS. 3 and 63, in various embodiments the method then continues to S13.

In S13, one or more users that are to be notified of the incident are determined based at least partially on the main category of the incident and the information about the user category subscriptions. For example, in some embodiments, each user that has subscribed to receive notifications of incidents related to the main category of the currently input incident are determined as users that are to be notified of the incident. In various embodiments, the web server 310 is programmed to generate a query to determine all users that have submitted subscription requests for the main category of the currently input incident and to submit the query to the first SQL server 340A. Also, in various embodiments, the first SQL server 340A is configured to determine one or more users that have subscribed to receive notifications of incidents that are related to the main category specified in the query from the web server 310, and to return a list of address information for one or more devices associated with the one or more users that are to be notified of the incident. In various embodiments, the method then continues to S14.

In S14, one or more notifications are provided to the one or more devices associated with the one or more users that are to be notified of the incident, where at least one of the one or more notifications includes a link that provides access to information stored in a database concerning the incident. In some embodiments, the one or more notifications may further include a summary of information concerning the incident. In various embodiments, some of the one or more notifications may be provided as text messages, such as Short Message Service (SMS) messages. Also, in various embodiments, some of the one or more notifications may be provided as e-mail messages. In various embodiments, some of the one or more notifications may be provided as internal system notifications. In some embodiments, a computer generated voice message may be provided to a device of a user, where the computer generated voice message recites at least a portion of the information stored in the database concerning the incident to a telephone. In some embodiments, the providing of the one or more notifications includes automatically transmitting the one or more notifications after receiving the input that specifies the incident at the facility and determining the one or more users that are to be notified of the incident.

In various embodiments, the web server 310 is programmed to generate an e-mail message as a notification of an incident, where the e-mail message includes a link that provides access to more information concerning the incident. The link may comprise, for example, a Uniform Resource Locator (URL), a Uniform Resource Identifier (URI) or the like. In some embodiments, the web server 310 is programmed to send a query to the first SQL server 340A to obtain at least some information concerning the incident, and to include the information in the notification as a summary of the incident. In various embodiments, the web server 310 is programmed to send the notification to the one or more devices associated with the one or more users that are to be notified of the incident. The one or more devices may include, but are not limited to, a computer, a cellular phone, a Personal Digital Assistant (PDA), or the like. In various embodiments, each of the one or more devices is associated with an address, such as an Internet Protocol (IP) address or the like, and the web server 310 is programmed to transmit the notification to each address.

FIG. 64 illustrates an example of a notification 6400 of an incident at a facility in accordance with an embodiment of the present invention. The notification 6400 may comprise, for example, an e-mail message or the like. With reference to FIGS. 3 and 64, in various embodiments, a subject 6410 of the notification 6400 may be automatically generated by the web server 310 to include information such as an incident ID of the incident, a name of a facility at which the incident occurred, a main category associated with the incident, and the like. Also, in various embodiments, the web server 310 may be programmed to provide a summary 6420 of the incident in a body portion of the notification 6400, where the summary 6420 may include information about the incident such as an incident ID of the incident, a name of a facility at which the incident occurred, a main category associated with the incident, a sub-category within the main category associated with the incident, a secondary main category associated with the incident, an incident date of the incident, a short description of the incident, or the like.

In various embodiments, the notification 6400 includes a link 6430, such as a URL, a URI, or the like. In some embodiments, the link 6430 may be activated by, for example, clicking on the link, pressing certain keys, touching the link on a touch screen, or the like. In various embodiments, once the link 6430 is activated at a device of an end user, the web server 310 provides more information concerning the incident to the device. For example, activation of the link 6430 in the notification 6400 by a device may cause the web server 310 to send an incident web page, such as the incident page 500 of FIG. 5 or the like, to the device that includes access to further information about the incident. In some embodiments, the web server 310 is programmed to determine whether a user associated with a device that activated the link 6430 is already logged-in to receive incident information, and in a case where the user is not already logged-in, the web server 310 may provide a log-in page, such as the log-in page 400 of FIG. 4 or the like, to the device to force the user to log-in before providing the additional information concerning the incident. In such embodiments, upon the user logging-in, the web server 310 may automatically provide additional information concerning the incident that is identified by the link 6430 to the device of the user.

With reference again to FIG. 63, in various embodiments the method then ends in S15. Thus, various embodiments allow for system notifications, where users are able to subscribe to receive notifications for types of incidents for which they desire to be notified. For example, a user may desire to be notified of all incidents at a facility that involve vehicle injuries, and may subscribe to receive notifications of such incidents. Then, when such incidents occur at a facility, the user may be automatically and instantly notified of the incident on a device associated with the user. In various embodiments, the notification may include a link that when activated provides the user with direct access to more information concerning the incident. Also, in various embodiments, the notification may include a summary of the incident.

In some embodiments, if an incident date associated with an incident is over a certain number of days old when entered, then the notification of the users subscribed to a main category associated with the incident may be skipped. For example, in various embodiments, if an incident date for an entered incident is more than 3 days prior to a current date when the incident information for the incident is entered, then a notification of users may be skipped so that users need not be instantly notified of older incidents. In some embodiments, if an incident date of an incident indicates that the incident is already more than a certain number of days old when entered, then a confirmation box may be presented to a user entering the incident information to confirm that the incident date of the incident is correct. For example, if an incident date for an entered incident is more than 7 days prior to a current date when the incident information for the incident is entered, then a confirmation box may be presented to have a user confirm that the incident date is correct. In some embodiments, another level of verification may be required for really old incidents that are currently being entered. For example, if an incident date for an entered incident is more than 100 days prior to a current date when the incident information for the incident is entered, then a message may be displayed to inform a user of the situation before allowing further information related to the incident to be input.

Figure 65:
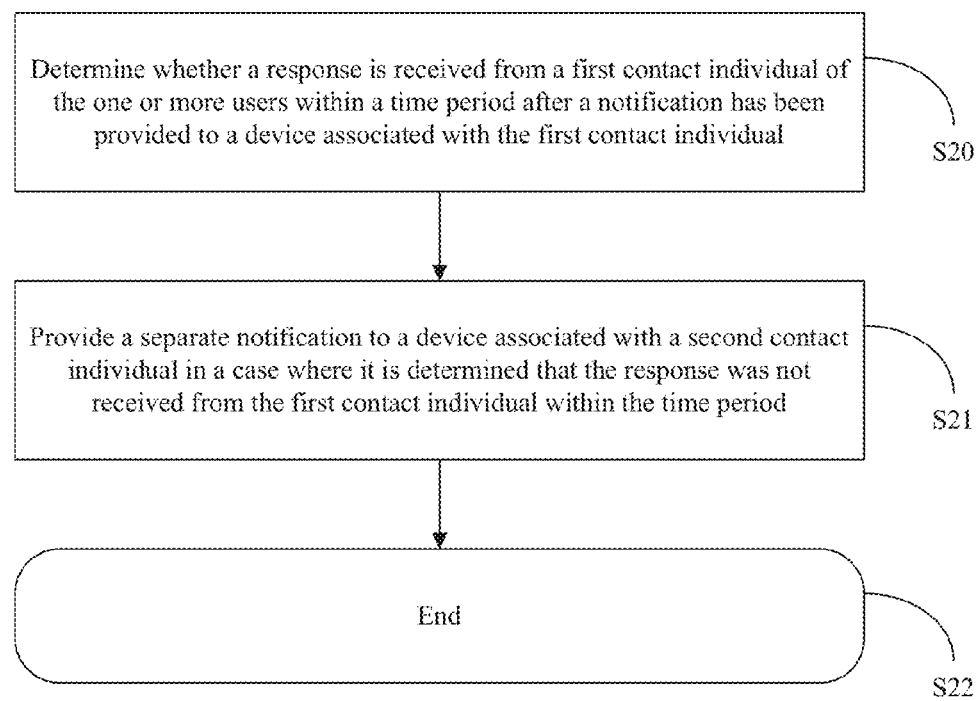
FIG. 65 illustrates a flowchart of a method in accordance with an embodiment of the present invention.

FIG. 65 illustrates a flowchart of a method in accordance with an embodiment of the present invention that can be performed by one or more computers. With reference to FIGS. 3 and 65, in S20 it is determined whether a response is received from a first contact individual of one or more users that have been notified of an incident within a time period after a notification has been provided to a device associated with the first contact individual. In various embodiments, the web server 310 is programmed to provide the notification of the incident to the device associated with the first contact individual and then to start a timer that counts for a specified amount of time. Also, in various embodiments, the web server 310 is programmed to determine whether a response is received from the first contact individual, such as the clicking of a link, the accessing of a web-page, the sending of a reply e-mail or text message, the placement of a telephone call to a security center, or the like, before the timer times-out. In various embodiments, the method then continues to S21.

In S21, a separate notification is provided to a device associated with a second contact individual in a case where it is determined that the response was not received from the first contact individual within the time period. In various embodiments, the web server 310 is programmed to provide the separate notification to the device associated with the second contact individual when the response is not received from the first contact individual within the specified amount of time. In some embodiments, the first contact individual and the second contact individual may be selected based on, for example, a facility at which the incident occurred, a main category associated with the incident, or the like. In some embodiments, the method is repeated, such as by waiting for a response from the second contact individual, and then notifying a third contact individual if no response is received from the second contact individual within a given time period, and so on until a response is received from at least one contact individual within a chain of command. Thus, for example, in various embodiments a general manager of a facility may be notified of an incident at the facility and it may be determined whether the general manager responds to the notification within a time period and, if no response is received from the general manager within the time period, a head of security may be notified of the incident, and so on until a response is received from a contact individual within a chain of command. The method may then end in S22.

Figure 66:
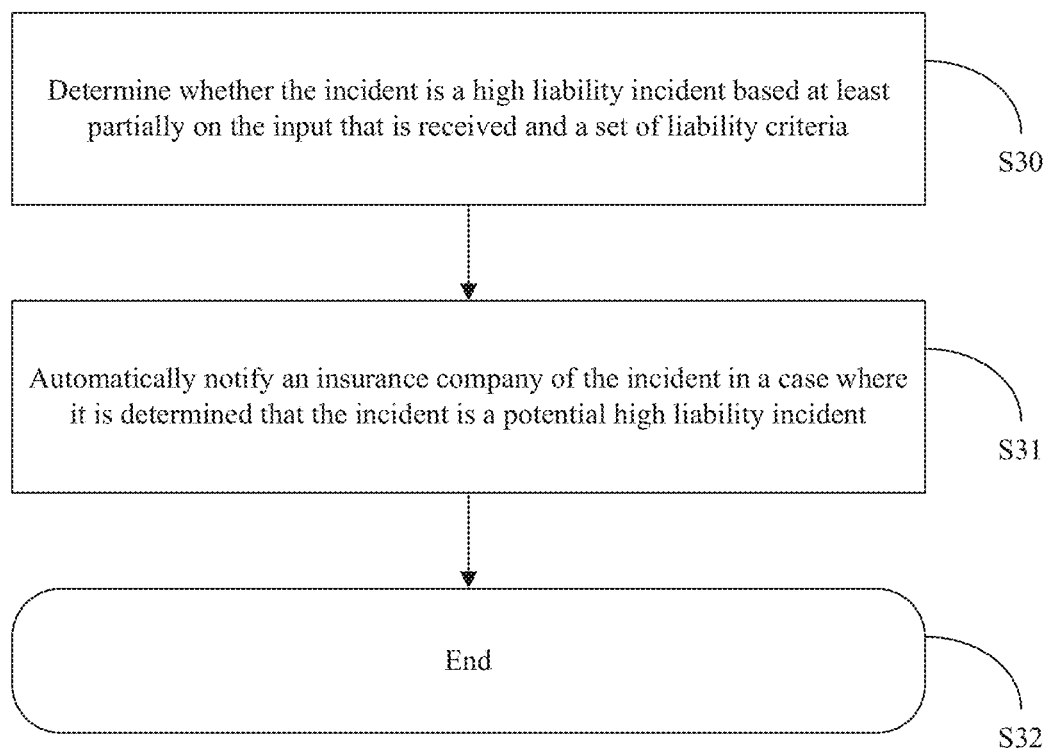
FIG. 66 illustrates a flowchart of a method in accordance with an embodiment of the present invention.

FIG. 66 illustrates a flowchart of a method in accordance with an embodiment of the present invention that can be performed by one or more computers. With reference to FIGS. 3 and 66, in S30 it is determined whether an incident for which input has been received is a high liability incident based at least partially on the input related to the incident that is received and a set of liability criteria. The liability criteria may specify, for example, that an incident is a high liability incident if a client employee has been injured, if a shopper or visitor has been injured, if there has been a police report for the incident, if there has been damage to a vehicle, if there has been damage to an item, or the like. In various embodiments, the liability criteria is settable to any desired criteria related to obtained incident information. In various embodiments, the web server 310 is programmed to receive the input related to the incident from the client computer 321 and to determine whether the incident is a high liability incident based at least partially on the input and a set of liability criteria. In various embodiments, the method then continues to S31.

In S31, an insurance company is automatically notified of the incident in a case where it is determined that the incident is a potential high liability incident. In various embodiments, the web server 310 is programmed to send a notification to a device of the insurance company, such as a computer of the insurance company, in a case where it is determined that the incident is a potential high liability incident. In various embodiments, the web server 310 may be further programmed to receive a response from the computer of the insurance company that specifies insurance information related to the incident, such as an insurance ID related to the incident, names of one or more insurance case workers assigned to the incident, an amount of money awarded as payment from insurance for the incident, or the like. Also, in various embodiments, the web server 310 may be programmed to cause the first SQL server 340A to store the insurance information related to the incident received from the computer of the insurance company into a database in correspondence with information related to the incident. The method may then end in S32.

Figure 67:
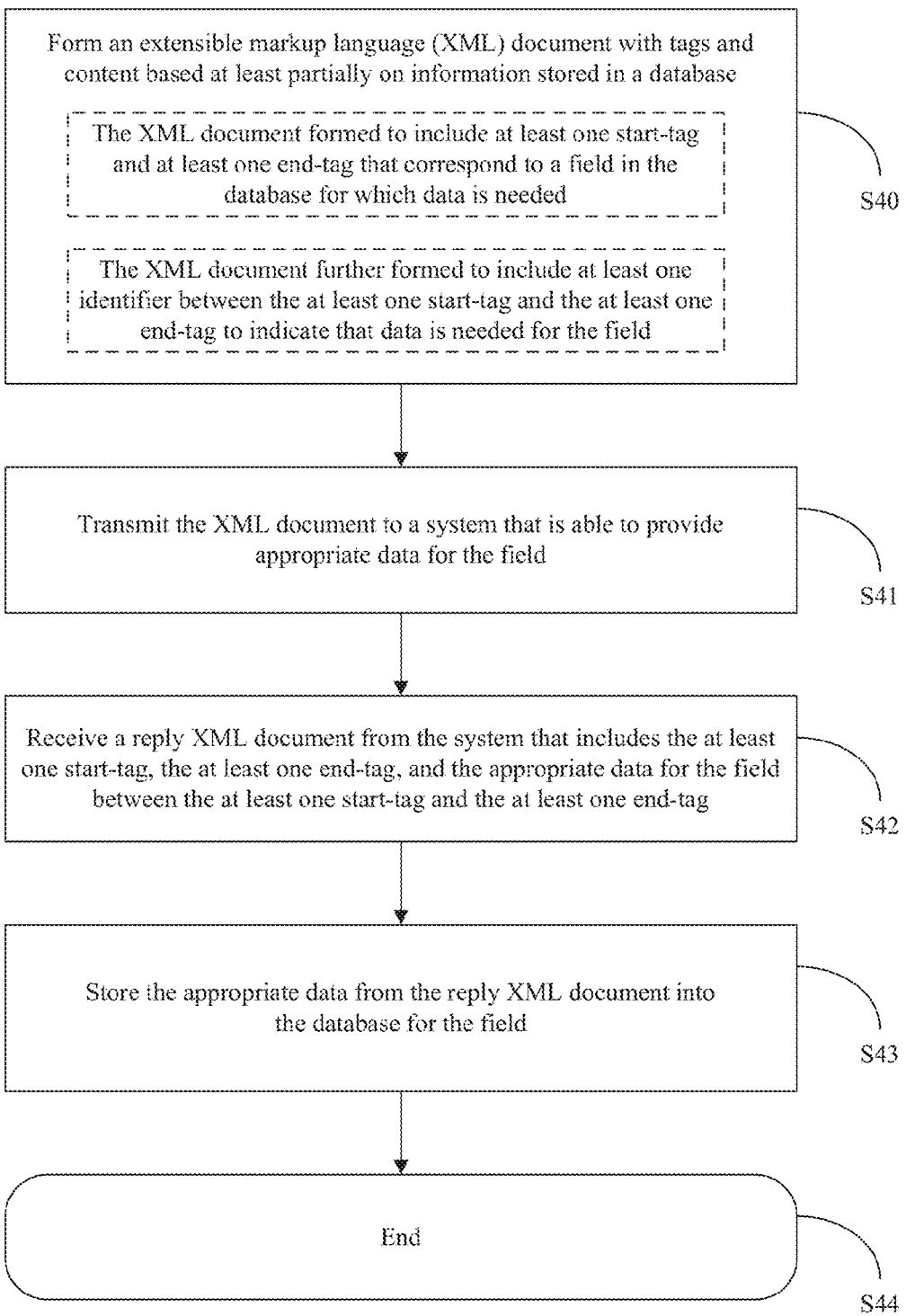
FIG. 67 illustrates a flowchart of a method in accordance with an embodiment of the present invention.

FIG. 67 illustrates a flowchart of a method in accordance with an embodiment of the present invention that can be performed by one or more computers. In S40, an extensible markup language (XML) document is formed with tags and content based at least partially on information stored in a database. In various embodiments, the XML document is formed to include at least one start-tag and at least one end-tag that correspond to a field in the database for which data is needed or desired. Also, in various embodiments, the XML document is further formed to include at least one identifier between the at least one start-tag and the at least one end-tag to indicate that data is needed for the field. With reference to FIGS. 3 and 67, in some embodiments, the web server 310 is programmed to form the XML document based at least partially on information about an incident stored in the first SQL server 340A.

FIG. 69 illustrates an example of an XML document 6900 that could be formed by the method of FIG. 67. In various embodiments, the XML document 6900 is formed to include a document type declaration 6970 that references a Document Type Definition (DTD) file, which defines a syntax for the XML document 6900. For example, in the XML document 6900, the DTD file "incident.dtd" is specified as the file that provides the syntax for the XML document 6900. In various other embodiments, other schema languages than DTD may be used to specify the syntax of the XML document 6900. For example, the XML Schema (XSD) language may be used in various embodiments to express a valid structure of the XML document 6900, where the XML Schema language may be used to define constraints such as elements and attributes that must or may be included in the XML document 6900 and the structure of the elements.

The XML document 6900 is formed to include various elements that each have a structure of "<name> content </name>", where the two instance of "name" are a start-tag and an end-tag, respectively, and the "content" is text that may include further elements. In various embodiments, the structure of the elements in the XML document 6900 are forced to conform with syntax rules established in the DTD file. Also, in various embodiments, the DTD file specifies start-tags and end-tags for elements based on information that can be stored for incidents in a database. For example, a new incident may be specified by the start-tag "<incident>", and the end-tag "</incident>", and content between the <incident> start-tag and the </incident> end-tag may include further elements related to the incident, such as (i) an incident ID element "<incident_id> content </incident_id>" that indicates the incident ID for the incident; (ii) a main category element "<main_category> content </main_category>" that indicates the main category of the incident; (iii) a sub-category element "<sub_category> content </sub_category>" that indicates a sub-category within the main category associated with the incident; (iv) a secondary main category element "<secondary_main_category> content </secondary_main_category>" that indicates a secondary main category of the incident; (v) a location name element "<location_name> content </location_name>" that indicates a name of a facility where the incident occurred; (vi) a level/zone element "<level_zone> content </level_zone>" that indicates a level or zone within the facility where the incident occurred; (vii) an injuries element "<injuries> content </injuries>" that indicates whether there were any injuries due to the incident; (viii) an incident details element "<incident_details> content </incident_details>" that may have sub-elements to indicate details related to the incident; and (ix) any other elements that may be specified to indicate information related to the incident, such as persons involved, vehicles involved, items involved, police reports, incident images, or the like.

With reference to FIGS. 3 and 69, in various embodiments the web server 310 is programmed to send one or more queries to the first SQL server 340A to obtain information to fill into an XML document, such as the XML document 6900 or the like. The XML document 6900 illustrates an example for an incident with an incident ID number of 228518, where the incident ID number has been inserted into a content portion 6920 of the XML document 6900 between a start-tag 6910 named <incident_id> and an end-tag 6930 named </incident_id>. In the example XML document 6900, the main category of the incident is "Vandalism", and the sub-category of the incident is "With Major Damage", which have been inserted as content between the tags of the corresponding elements in the XML document 6900.

In various embodiments, the web server 310 is programmed to insert one or more identifiers in an XML document, such as the XML document 6900, to indicate that particular data is needed or desired for an incident. For example, in the XML document 6900, an identifier of "Need to Add" has been inserted in a content section 6950 between a start-tag 6940 named "<reported_by>" and an end-tag 6960 named "</reported_by>" to indicate that data for a database field concerning a name of a reporting party is needed for the incident specified in the XML document 6900. It should be appreciated that the identifier "Need to Add" is merely provided as an example of one type of identifier, and that various other types of identifiers or character strings may be used as an identifier. In the XML document 6900, the identifier "Need to Add" has also been inserted in content sections between start-tags and end-tags of elements corresponding to database fields of a condition 1 and a condition 2 to indicate that data is needed concerning weather conditions prevailing during the incident. Thus, in various embodiments, an XML document may provide a convenient format to indicate data that is known and stored in a database concerning an incident, and to also indicate data that is needed or desired concerning the incident. With reference again to FIG. 67, in various embodiments the method then continues to S41.

In S41, the XML document is transmitted to a system that is able to provide appropriate data for a database field that has been identified in the XML document as a field for which data is needed. In various embodiments, the XML document is automatically generated and automatically pushed to the system that is able to provide the appropriate data. In various embodiments, the system to which the XML document is transmitted may comprise, for example, an insurance system run by an insurance company, a risk management system, a customer system run by a customer, a security system run by a security company, a loss prevention system run by a loss prevention service, an engineering system run by an engineering company, a maintenance system run by a maintenance company, or the like. Also, in various embodiments, the system to which the XML document is transmitted may comprise a computer or the like. In some embodiments, the XML document may include a list of attachments, such as photos, videos, or the like related to an incident with links to the attachments.

With reference to FIGS. 3 and 67, in various embodiments the web server 310 is programmed to transmit the XML document to the system (not shown) that is able to provide the appropriate data. The use of XML allows for a transfer of information to be Operating System (OS) independent, because it is based on text. Also, XML allows for data concerning an incident and a description of a meaning of the data to be combined together in a single file with a defined structure. In various embodiments, the system (not shown) to which the XML document is transmitted is configured to store data from the XML document into a database by, for example, storing content from each element in the XML document into a database field that corresponds to the start-tag and the end-tag of the element. Also, in various embodiments, the system (not shown) to which the XML document is transmitted searches for specific identifiers, such as "Need to Add" or the like, in the XML document and replaces each identifier with appropriate data by, for example, retrieving data from a database field that corresponds to a start-tag and an end-tag of the identifier and replacing the identifier with the retrieved data to generate a reply XML document. In various embodiments, the method then continues to S42.

In S42, the reply XML document is received from the system (not shown), where the reply XML document includes the at least one start-tag, the at least one end-tag, and the appropriate data between the at least one start-tag and the at least one end-tag for the database field for which data is needed or desired. FIG. 70 illustrates an example of a reply XML document 7000 that may be received in reply to the XML document 6900 of FIG. 69. As illustrated in changes between the XML document 6900 and the reply XML document 7000, the identifier "Need to Add" in the XML document 6900 for the element with the start-tag "<reported_by>" has been replaced in the XML document 7000 with the name "Abraham Israel" to specify that the incident in the example was reported by a person named "Abraham Israel". Also, the identifier "Need to Add" in the XML document 6900 for the element with the start-tag "<condition_1>" has been replaced in the XML document 7000 with the weather condition of "Dark" to specify a first weather condition for the corresponding incident. Similarly, the identifier "Need to Add" in the XML document 6900 for the element with the start-tag "<condition_2>" has been replaced in the XML document 7000 with the weather condition of "Heavy Winds" to specify a second weather condition for the corresponding incident. With reference again to FIGS. 3 and 67, in various embodiments the web server 310 is programmed to receive the reply XML document. Also, in various embodiments, the method then continues to S43.

In S43, the appropriate data from the reply XML document is stored into the database for the corresponding field. In various embodiments, the web server 310 is programmed to extract the appropriate data from the reply XML document from the content portions of the elements where the identifiers were located in the XML document, and the web server 310 is programmed to cause the first SQL server 340A to store the extracted appropriate data into a database in relation with the incident corresponding to the reply XML document. In various embodiments, the method then ends in S44. Thus, various embodiments allow for an XML document to be formed to include data that is known about an incident and also to include identifiers to request data for the incident. Also, various embodiments allow for transmitting the XML document so as to inform one or more other systems about the data known about the incident, and also allow for receiving a reply XML document with identifiers of the XML document replaced by the data requested for the incident. In some embodiments, the reply XML document may remove some elements from the XML document when forming the reply XML document.

As an example, the web server 310 may generate an XML document with some known data related to an incident and also include identifiers in the XML document to request data related to security information for the incident and then transmit the XML document to a security system (not shown) run by a security company that is able to supply the requested security information. In the example, the web server 310 may then receive a reply XML document from the security system with the identifiers in the XML document replaced by the requested data, so that the requested data could then be stored in the related database fields for the incident. Such security information may include, for example, a security ID for the incident, information about whether the incident was captured on closed-circuit television, a reporting party of the incident, a reporting date and time of the incident, a name of a security officer that arrived to the scene of the incident, a date and time of arrival of the security officer to the scene of the incident, weather conditions of the incident, inspection conditions of a location of the incident, a nearest tenant to the incident, people involved in the incident, vehicles involved in the incident, items involved in the incident, a police report for the incident, or the like. As another example, the XML document may be transmitted to an system run by an insurance company, and a reply XML document may be returned with insurance information from the insurance company. Such insurance information may include, for example, an insurance ID for the incident, an insurance case worker assigned to the incident, an amount of money awarded from the insurance company for the incident, or the like.

In some embodiments, a reply XML document may be returned by a system with one or more identifiers that have not been replaced in a case where the appropriate data for the corresponding one or more fields are not currently known by the system. Also, in various embodiments, an XML document with identifiers requesting data may be transmitted to more than one system simultaneously to request data from more than one system at a time. In some embodiments, the web server 310 is programmed to receive pushed XML documents, which are XML documents that are pushed to the web server 310 from external systems (not shown) without the web server 310 sending a request for the pushed XML documents. In such embodiments that allow for the web server 310 to receive pushed XML documents, the web server 310 may be further programmed to extract needed data from each pushed XML document and to cause the first SQL server 340A to store the extracted data in relation with an incident corresponding to the pushed XML document. For example, an insurance company could push an insurance ID for an incident to the web server 310 in a pushed XML document, and the web server 310 could cause the first SQL server 340A to store the insurance ID in relation with information for the incident.

Figure 68:
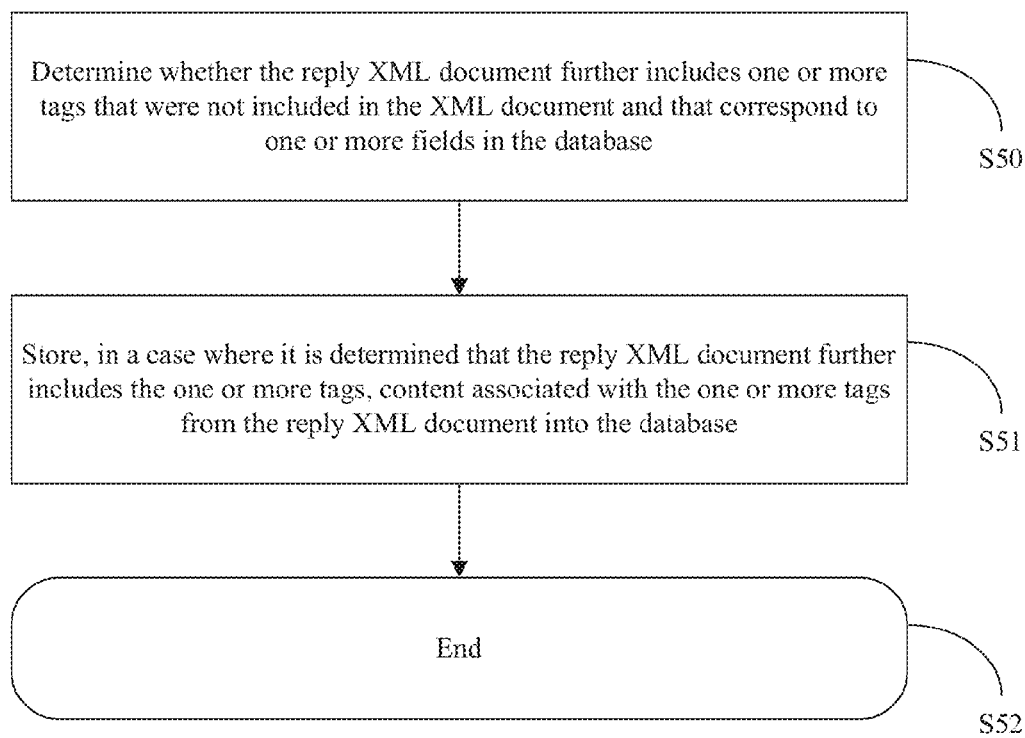
FIG. 68 illustrates a flowchart of a method in accordance with an embodiment of the present invention.

FIG. 68 illustrates a flowchart of a method in accordance with an embodiment of the present invention that can be performed by one or more computers. In S50, it is determined whether a reply XML document further includes one or more tags that were not included in an XML document to which the reply XML document is a response, where the one or more tags correspond to one or more fields in a database. With reference to FIGS. 3 and 68, in various embodiments the web server 310 is programmed to make such a determination. In some embodiments, the method then continues to S51. In S51, content associated with the one or more tags from the reply XML document is stored into the database in a case where it is determined that the reply XML document further includes the one or more tags. In various embodiments, the web server 310 is programmed to extract data from a content portion of elements that include the one or more tags and to cause the first SQL server 340A to store the extracted data into a database in relation with information concerning a corresponding incident. The method may then end in S52.

As an example, the reply XML document 7000 of FIG. 70 includes the start-tags "<incident_identification>", "<security_id>", and <insurance_id>" in an added portion 7020 of the reply XML document 7000, which were not included in the XML document 6900 of FIG. 69. In the example, the web server 310 may receive the reply XML document 7000, determine that it includes additional tags that were not in the XML document 6900, extract data from content portions of elements that correspond to the additional tags, and then cause the first SQL server 340A to store the extracted data in a database in correspondence with the incident specified in the reply XML document 7000. Thus, in the example, the web server 310 may extract the security ID of "SID-2007-37" and the insurance ID of "2460" from the reply XML document 7000 and cause the first SQL server 340A to store the extracted security ID and insurance ID into a database in relation with information for the incident with the incident ID of "228518".

In various embodiments, the reply XML document must be transmitted along with a password, such as a code that is generated from the incident ID of the incident specified in the reply XML document, or the like. In various embodiments, the web server 310 and each system from which the web server 310 receives reply XML documents or pushed XML documents have a same password logic to generate a same password number from an incident ID. Thus, in various embodiments, the web server 310 may calculate a code from an incident ID of an incident and compare the code with a code received along with a reply XML document or pushed XML document so as to verify that the reply XML document or pushed XML document has been supplied from an authorized system. In some embodiments, the web server 310 only extracts data from the reply XML document or pushed XML document if the codes are determined to be the same. In some embodiments, specific users may only be able to access information for incidents for which they have supplied information, such as a user from an insurance company being restricted to only accessing information concerning incidents for which the insurance company has provided an insurance ID to the web server 310. In some embodiments, updates for incidents are transmitted from the web server 310 to a device of an end user and a device of an insurance company simultaneously.

In some embodiments, the web server 310 may transmit information concerning available tags that each correspond to a respective field in a database and that can each be selectively inserted into a reply XML document or a pushed XML document to demarcate respective data for the respective field. Such information about available tags may be considered as a type of Application Programming Interface (API) that specifies elements for XML documents that are recognized by the web server 310. In various embodiments, external systems (not shown) may use the information concerning the available tags to send particular information to the web server 310 to have the web server 310 associate the particular information with a corresponding incident. In various embodiments, the web server 310 provides a file, such as an XML Schema language file or the like, that defines a valid schema for XML documents to be provided to the web server 310. In some embodiments, a Software Development Kit (SDK) may be provided with development tools to allow for software engineers to develop programs to interact with a program running on the web server 310 to transmit data to the web server 310 concerning incidents or to receive data from the web server 310 concerning incidents. Such an SDK may define a standard interface to allow programs to automatically interface with the web server 310 to provide and obtain information about incidents. In various embodiments, the web server 310 may transmit programs, such as Java applets or the like, that are to be run by external systems (not shown) to interface with the web server 310 to transmit and receive information about incidents. In various embodiments, one or more computer-readable storage mediums store one or more computer programs that when executed on one or more computers cause the one or more computers to perform methods, such as one or more of the methods of FIGS. 63 and 65-68.

Various embodiments described above with reference to FIGS. 4-70 include the performance of various processes or tasks. In various embodiments, such processes or tasks may be performed through the execution of computer code read from computer-readable storage media. For example, in various embodiments, one or more computer-readable storage mediums store one or more computer programs that, when executed by a server such as the web server 310 (refer to FIG. 3), cause the server to perform processes or tasks as described with respect to the web server 310 in the above embodiments. Also, in various embodiments, one or more computer-readable storage mediums store one or more computer programs that, when executed by a computer such as the client computer 321 (refer to FIG. 3), cause the computer to perform processes or tasks as described with respect to the client computer 321 in the above embodiments. In various embodiments, one or more computer-readable storage mediums store one or more computer programs that, when executed by a database server such as the first SQL server 340A (refer to FIG. 3), cause the database server to perform processes or tasks as described with respect to the first SQL server 340A in the above embodiments.

Thus, embodiments within the scope of the present invention include program products comprising computer-readable or machine-readable media for carrying or having computer or machine executable instructions or data structures stored thereon. Such computer-readable storage media can be any available media that can be accessed, for example, by a general purpose or special purpose computer or other machine with a processor. By way of example, such computer-readable storage media can comprise semiconductor memory, flash memory, hard disks, optical disks such as compact disks (CDs) or digital versatile disks (DVDs), magnetic storage, random access memory (RAM), read only memory (ROM), and/or the like. Combinations of those types of memory are also included within the scope of computer-readable storage media. Computer-executable program code may comprise, for example, instructions and data which cause a computer or processing machine to perform certain functions, calculations, actions, or the like.

The embodiments disclosed herein are to be considered in all respects as illustrative, and not restrictive of the invention. The present invention is in no way limited to the embodiments described above. Various modifications and changes may be made to the embodiments without departing from the spirit and scope of the invention. Various modifications and changes that come within the meaning and range of equivalency of the claims are intended to be within the scope of the invention.

What is claimed is:

1. A method for providing warnings, comprising:
   receiving, by a server over a network from a computer, input that specifies a new incident at a facility including a name of a person associated with the new incident at the facility;
   automatically triggering, by the server in response to receiving the name of the person in the input that specifies the new incident, a search to determine if the person has been involved in one or more other incidents;
   automatically communicating over the network, by the server, to the computer a message for the computer to display a warning on a display screen in a case where it is determined that the person has been involved in one or more other incidents;
   storing roles associated with names or other identification information of one or more people that are associated with the one or more other incidents;
   determining, by the server, whether or not the name and role of the person associated with the new incident sufficiently matches one of the name or role of the one or more people that are associated with the one or more other incidents;

automatically flagging, by the server, the name of the person associated with the new incident to indicate that the person is a flagged person if the name and role of the person associated with the new incident is determined to sufficiently match the name and role of the one or more people associated with the one or more other incidents; and causing the computer to display information related to the flagged person in response to user input received by the computer selecting the warning on the display screen displayed by the computer indicating that the flagged person is flagged.

2. The method of claim 1, wherein the warning includes a button that when pressed causes a page to be displayed on the display screen that shows information about the one or more other incidents in which the person has been involved.

3. The method of claim 2, wherein the information shown about the one or more other incidents includes, for each of the one or more other incidents in which the person has been involved, an associated date, an associated role that the person played, and an associated location.

4. The method of claim 2, wherein the information shown about the one or more other incidents includes, for each of the one or more other incidents in which the person has been involved, an associated indication as to whether the person was injured.

5. The method of claim 2, wherein the page includes an input that can be marked to flag the person so that the person is indicated as a flagged person.

6. The method of claim 5, wherein the input that specifies the incident at the facility further includes a role that the person played in the incident.

7. The method of claim 1, further comprising:

storing, in a database, information about incidents that have occurred at any of a plurality of facilities or businesses; the information including names of people associated with the one or more other incidents and roles of those people in the one or more other incidents;

wherein the search is performed using the database such that the search determines if the name and a role of the person associated with the new incident matches the name and the role of one or more people in the one or more other incidents.

8. The method of claim 1, further comprising:

receiving, by a server over a network from a computer, input that specifies an item involved in an incident at a facility;

automatically triggering, by the server in response to receiving the input, a search to determine if the item has been involved in one or more other incidents; and automatically causing, by the server, the computer to display a warning on a display screen in a case where it is determined that the item has been involved in one or more other incidents.

9. The method of claim 8, wherein the input that specifies the item involved in the incident at the facility includes an item code for the item; and wherein the item code is used in the search to determine if the item has been involved in one or more other incidents.

10. The method of claim 9, wherein the item code is a Universal Product Code (UPC) for the item.

11. The method of claim 9, further comprising:

determining, by the server, a number indicating how many times items with the same item code as the item involved in the incident have been involved in incidents at the facility within a date range; and causing, by the server, the computer to display the number indicating how many times items with the same item code as the item involved in the incident have been involved in incidents at the facility within the date range.

12. The method of claim 8, further comprising:

storing, in a database, information about incidents that have occurred at any of a plurality of facilities or businesses;

wherein the search is performed using the database such that the search determines if the item has been involved in one or more other incidents at any of the plurality of facilities or one or more other incidents that are associated with any of the plurality of businesses.

13. The method of claim 8, wherein the item comprises a vehicle involved in an incident at a facility.

14. The method of claim 13, wherein the input that specifies the vehicle involved in the incident at the facility includes a make and a model of the vehicle; and wherein the search to determine if the vehicle has been involved in one or more other incidents includes determining whether any vehicle with a same make and a same model as the make and the model of the vehicle has been involved in one or more other incidents.

15. The method of claim 13, further comprising:

setting a threshold number;

determining whether a number of incidents at the facility involving vehicles with a same make and a same model as the make and model of the vehicle is greater than the threshold number; and causing, by the server, the computer to display a particular warning if it is determined that the number of incidents at the facility involving vehicles with the same make and the same model as the make and model of the vehicle is greater than the threshold number.

16. The method of claim 1, further including storing in a non-transient, electronic data storage medium, information previously input about the one or more other incidents, wherein the input that specifies the new incident includes information about an incident that is not one of the one or more other incidents for which information was previously input.

17. The method of claim 1, further comprising:

upon a determination that the name and role of the person associated with the new incident sufficiently matches the name and role of the one or more people that are associated with the one or more other incidents, either (a) displaying a user-selectable indication that can be selected by a user to indicate that one or more names on the list of names is flagged, or (b) automatically displaying an indication set by the server, to indicate that one or more names on the list of names is flagged.

18. The method of claim 1, further comprising storing or displaying the name of the person associated with the new incident without flagging that name to indicate that the person is not a flagged person if the name and role of the person associated with the new incident is determined to not sufficiently match the name and role of one or more people associated with the one or more other incidents.

19. A system for providing warnings, comprising:
a server configured to receive, over a communication network from a computer, electronic input that specifies a new incident at a facility including a name of a person associated with the new incident at the facility;
the server further configured to automatically trigger, in response to receiving the name of the person in the input that specifies the new incident, a search to determine if the person has been involved in one or more other incidents;
the server further configured to automatically send an electronic message, over the communication network, to the computer, for the computer to display a warning on a display screen in a case where it is determined that the person has been involved in one or more other incidents;
the server further configured to store roles associated with names or other identification information of one or more people that are associated with the one or more other incidents;
the server further configured to determine whether or not the name and role of the person associated with the new incident sufficiently matches the name and role of the one or more people that are associated with the one or more other incidents;
the server further configured to automatically flag the name of the person associated with the new incident to indicate that the person is a flagged person if the name and role of the person associated with the new incident is determined to sufficiently match the name and role of the one or more people associated with the one or more other incidents; and
the server is further configured to cause the computer to display information related to the flagged person in response to user input received by the computer selecting the warning on the display screen displayed by the computer indicating that the flagged person is flagged.

20. The method of claim 1, further comprising storing, by the server, information related to the new incident.

21. The method of claim 20, wherein:
the server is associated with at least one relational database management system; and
the information related to the new incident is stored in the at least one relational database management system.

22. The method of claim 1, further comprising causing, by the server, the computer to display a page in response to receiving input acknowledging the warning, wherein the page comprises a display indication indicating whether the name of the person has been flagged.

23. The system of claim 19, further including a non-transient, electronic data storage medium associated with the server, storing information previously input about the one or more other incidents, wherein the electronic input that specifies the new incident includes information about an incident that is not one of the one or more other incidents for which information was previously input.

24. The system of claim 19, wherein the warning includes information about the one or more other incidents in which the person has been involved, and wherein the information shown about the one or more other incidents includes, for each of the one or more other incidents in which the person has been involved, at least one of an associated date, an associated role that the person played, or an associated location.

25. The system of claim 19, wherein the information shown about the one or more other incidents includes, for each of the one or more other incidents in which the person has been involved, an associated indication as to whether the person was injured.

26. The system of claim 19, further comprising storing, in a database, information about incidents that have occurred at any of a plurality of facilities or businesses, wherein the search is performed using the database such that the search determines if the person has been involved in one or more other incidents at any of the plurality of facilities or one or more other incidents that are associated with any of the plurality of businesses.

* * * * *